(12) United States Patent
Prince et al.

(10) Patent No.: US 11,815,458 B2
(45) Date of Patent: Nov. 14, 2023

(54) AUTOFOCUS FUNCTIONALITY IN OPTICAL SAMPLE ANALYSIS

(71) Applicant: Illumina, Inc., San Diego, CA (US)

(72) Inventors: Simon Prince, Carlsbad, CA (US); Danilo Condello, San Francisco, CA (US); Vincent Hsieh, San Diego, CA (US); Krysada Phounsiri, Chula Vista, CA (US); John O'Shaughnessy, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 138 days.

(21) Appl. No.: 17/247,777

(22) Filed: Dec. 22, 2020

(65) Prior Publication Data

US 2021/0199587 A1    Jul. 1, 2021

Related U.S. Application Data

(60) Provisional application No. 62/959,681, filed on Jan. 10, 2020, provisional application No. 62/956,083, filed on Dec. 31, 2019.

(51) Int. Cl.
*G01N 21/64*    (2006.01)
*G01N 21/05*    (2006.01)

(52) U.S. Cl.
CPC ... *G01N 21/6458* (2013.01); *G01N 2021/058* (2013.01); *G01N 2021/6463* (2013.01); *G01N 2021/6482* (2013.01)

(58) Field of Classification Search
CPC ......... G01N 21/6458; G01N 2021/058; G01N 2021/6463; G01N 2021/6482; G02B 7/32;
(Continued)

(56) References Cited

U.S. PATENT DOCUMENTS 4,529,520 A * 7/1985 Lampenius .......... B01D 29/945
                                                  209/397
5,557,315 A * 9/1996 Meyers ................ H04N 1/502
                                                  347/255
(Continued)

FOREIGN PATENT DOCUMENTS

CN         1394275 A  *  1/2003   ............... G01J 3/12
CN       103608645 A  *  2/2014   ............. G01B 11/26
(Continued)

OTHER PUBLICATIONS

International Search Report and Written Opinion for PCT Application No. PCT/US2020/070951, dated Apr. 9, 2021, 11 pages.
(Continued)

*Primary Examiner* — Mohamed K Amara
(74) *Attorney, Agent, or Firm* — Brake Hughes Bellermann LLP

(57) ABSTRACT

A method comprises: directing, using an objective and a first reflective surface, first autofocus light toward a sensor, the first autofocus light reflected from a first surface of a substrate; preventing second autofocus light from reaching the sensor, the second autofocus light reflected from a second surface of the substrate; and directing, using the objective and a second reflective surface, emission light toward the sensor, the emission light originating from a sample at the substrate.

19 Claims, 43 Drawing Sheets

(58) Field of Classification Search
CPC .......... G02B 21/241; G02B 5/04; G02B 7/09;
G02B 21/06; G02B 27/425; G02B 7/36;
G02B 7/282; G02B 7/346; G03B 13/36
See application file for complete search history.

(56) References Cited

U.S. PATENT DOCUMENTS

| | | | | |
|---|---|---|---|---|
| 7,329,860 | B2* | 2/2008 | Feng | G02B 21/004 250/234 |
| 8,809,809 | B1* | 8/2014 | Wu | G02B 21/16 359/383 |
| 9,488,824 | B2* | 11/2016 | Dyba | G02B 21/18 |
| 9,540,690 | B2 | 1/2017 | Earney et al. | |
| 9,720,221 | B2* | 8/2017 | Dyba | G02B 21/16 |
| 10,254,526 | B2* | 4/2019 | Pospiech | G02B 21/245 |
| 10,416,428 | B2 | 9/2019 | Condello et al. | |
| 2002/0036775 | A1* | 3/2002 | Wolleschensky | G02B 21/004 356/317 |
| 2004/0113043 | A1* | 6/2004 | Ishikawa | G02B 21/245 250/201.4 |
| 2004/0125374 | A1* | 7/2004 | Berger | G01J 3/18 356/364 |
| 2005/0068614 | A1* | 3/2005 | Yoneyama | G02B 21/245 359/383 |
| 2006/0017001 | A1* | 1/2006 | Donders | G02B 21/0064 250/390.07 |
| 2007/0087445 | A1* | 4/2007 | Tearney | G01N 21/6408 436/172 |
| 2008/0182336 | A1* | 7/2008 | Zhuang | G01N 15/1475 436/172 |
| 2010/0157086 | A1* | 6/2010 | Segale | G02B 26/10 348/222.1 |
| 2011/0072914 | A1* | 3/2011 | Lebl | F04B 19/006 73/864.11 |
| 2011/0188053 | A1* | 8/2011 | Buermann | G02B 21/247 356/624 |
| 2011/0220775 | A1* | 9/2011 | Triener | G01N 21/6428 250/226 |
| 2013/0070076 | A1* | 3/2013 | Kuster | G02B 21/0012 348/79 |
| 2013/0100272 | A1* | 4/2013 | Price | H04N 9/09 348/E5.045 |
| 2013/0128025 | A1* | 5/2013 | Dyba | G02B 21/16 348/79 |
| 2013/0222568 | A1* | 8/2013 | Dyba | G02B 21/16 348/79 |
| 2013/0260372 | A1* | 10/2013 | Buermann | G01N 21/6428 435/6.1 |
| 2014/0152800 | A1* | 6/2014 | Fomitchov | G01N 21/6458 348/79 |
| 2015/0054937 | A1 | 2/2015 | Lippert et al. | |
| 2016/0109693 | A1 | 4/2016 | Feng | |
| 2017/0045457 | A1 | 2/2017 | Richard et al. | |
| 2017/0199210 | A1* | 7/2017 | Ang | G01N 21/6456 |
| 2018/0262670 | A1 | 9/2018 | Condello et al. | |
| 2018/0307005 | A1* | 10/2018 | Price | H04N 5/2258 |
| 2019/0204577 | A1* | 7/2019 | Faris | H04N 23/67 |
| 2019/0276886 | A1* | 9/2019 | Skinner | G01N 21/6458 |
| 2021/0072531 | A1* | 3/2021 | Ashida | G02B 26/106 |

FOREIGN PATENT DOCUMENTS

| | | | |
|---|---|---|---|
| EP | 3376275 A1 | 9/2018 | |
| EP | 3379319 A2 | 9/2018 | |
| JP | 2011-514963 A | 5/2011 | |
| WO | 02/091026 A2 | 11/2002 | |
| WO | WO2003067230 A1 * | 6/2005 | ............ G01N 21/64 |
| WO | 2009/045524 A2 | 4/2009 | |
| WO | WO-2012013586 A1 * | 2/2012 | ......... G01N 21/6458 |
| WO | WO-2016157458 A1 * | 10/2016 | ............ G01N 21/64 |

OTHER PUBLICATIONS

European Search Report for Application No. 20909529.8, dated Jun. 28, 2023, 9 pages.

* cited by examiner

AUTOFOCUS FUNCTIONALITY IN OPTICAL SAMPLE ANALYSIS

CROSS-REFERENCE TO RELATED APPLICATIONS

This application claims priority to U.S. Provisional Application 62/959,681, filed Jan. 10, 2020, and entitled "AUTOFOCUS FUNCTIONALITY IN OPTICAL SAMPLE ANALYSIS." This application also claims priority to U.S. Provisional Application 62/956,083, filed Dec. 31, 2019, and entitled "AUTOFOCUS FUNCTIONALITY IN OPTICAL SAMPLE ANALYSIS." The contents of both applications mentioned above are incorporated herein by reference.

BACKGROUND

Samples of different materials can be analyzed using one or more types of optical systems. An optical system sometimes includes focus tracking functionality to aid the adjustment of optical components in order to improve the quality of the measurements and thereby of the resulting sample analysis. Focus tracking systems typically are integrated with the optical system but in a sense operate independently of the functionality of the optical system. For example, the focus tracking component may use a dedicated light source, one or more optical components (e.g., lenses), and/or a light detector. That is, these components may solely be used for purposes of focus tracking. Having dedicated componentry for the focus tracking system can add to a manufacturing cost of the optical system. As another example, having a greater number of components onboard can increase the likelihood of the system needing service.

SUMMARY

In a first aspect, a method comprises: directing, using an objective and a first reflective surface, first autofocus light toward a sensor, the first autofocus light reflected from a first surface of a substrate; preventing second autofocus light from reaching the sensor, the second autofocus light reflected from a second surface of the substrate; and directing, using the objective and a second reflective surface, emission light toward the sensor, the emission light originating from a sample at the substrate.

Implementations can include any or all of the following features. The method further comprises directing the first autofocus light toward the second reflective surface, the second reflective surface transparent to the first autofocus light, wherein the first reflective surface is positioned behind the second reflective surface relative to a travel direction of the first autofocus light. The method further comprises directing also the second autofocus light toward the second reflective surface, the second reflective surface transparent to the second autofocus light, wherein the first reflective surface is transparent to the second autofocus light to prevent the second autofocus light from reaching the sensor. The first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component. Orienting the first reflective component comprises steering the first autofocus light on the sensor independently of a position of the emission light on the sensor. The method further comprises: forming, using a lateral displacement prism, left autofocus light and right autofocus light that diverge at a predetermined angle from each other, wherein the first autofocus light comprises first left autofocus light from reflection of the left autofocus light off the first surface of the substrate, wherein the first autofocus light further comprises first right autofocus light from reflection of the right autofocus light off the first surface of the substrate, wherein the second autofocus light comprises second left autofocus light from reflection of the left autofocus light off the second surface of the substrate, and wherein the second autofocus light further comprises second right autofocus light from reflection of the right autofocus light off the second surface of the substrate; wherein directing the first autofocus light toward the sensor comprises directing, using the objective and the first reflective surface, the first left autofocus light and the first right autofocus light toward the sensor; and wherein preventing the second autofocus light from reaching the sensor comprises preventing the second left autofocus light and the second right autofocus light from reaching the sensor. The substrate further comprises a third surface, wherein the left autofocus light forms third left autofocus light upon reflection off the third surface, wherein the right autofocus light forms third right autofocus light upon reflection off the third surface, the method further comprising directing, using the objective and the first reflective surface, the third left autofocus light and the third right autofocus light toward the sensor. The method further comprises adjusting a distance between the objective and the substrate based on the first autofocus light.

In a second aspect, a system comprises: a substrate to hold a sample for analysis; a sensor; an objective; a first reflective surface to direct first autofocus light to the sensor, the first autofocus light reflected from a first surface of the substrate and conveyed by the objective; a second reflective surface to direct emission light to the sensor, the emission light originating from the sample and conveyed by the objective; and a structure that prevents second autofocus light from reaching the sensor, the second autofocus light reflected from a second surface of the substrate and conveyed by the objective.

Implementations can include any or all of the following features. The first reflective surface is positioned behind the second reflective surface relative to a travel direction of the first autofocus light, and wherein the second reflective surface is transparent to the first autofocus light. The first reflective surface is positioned on a first reflective component, wherein the second reflective surface is positioned on a second reflective component, and wherein the first reflective component is separate from the second reflective component. The second reflective surface is positioned on a front surface of a reflective component relative to the travel direction of the first autofocus light, wherein the first reflective surface covers a first portion of a rear surface of the reflective component relative to the travel direction of the first autofocus light, and wherein the structure covers a second portion of the rear surface of the reflective component. The system further comprises a lateral displacement prism, the lateral displacement prism forming left autofocus light and right autofocus light that diverge at a predetermined angle from each other, wherein the first autofocus light comprises first left autofocus light from reflection of the left autofocus light off the first surface of the substrate, wherein the first autofocus light further comprises first right autofocus light from reflection of the right autofocus light off the first surface of the substrate, wherein the second autofocus light comprises second left autofocus light from reflection of the left autofocus light off the second surface of the substrate, and wherein the second autofocus light further comprises second right autofocus light from reflection of the right autofocus light off the second surface of the substrate. The lateral displacement prism includes exit surfaces having a non-zero angle relative to each other. The lateral displacement prism comprises: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface. The first surface has boundaries with the third surface, the fourth surface, and the fifth surface; and the second surface has boundaries with the third surface, the fourth surface, and the fifth surface. The third surface is an entry surface, wherein the fourth surface is an exit surface for the left autofocus light, and wherein the fifth surface is an exit surface for the right autofocus light. The lateral displacement prism comprises: a first prism having a first wedge profile, the first wedge profile including a first side forming a non-zero angle with regard to a first exit side; a second prism having a second wedge profile, the second wedge profile including a second side forming a non-zero angle with regard to a second exit side; and a third prism having a parallelogram profile, the parallelogram profile including a third side parallel to a fourth side, and a fifth side parallel to a sixth side, the third side of the parallelogram profile being part of an entry surface of the lateral displacement prism; wherein each of the first side of the first prism and the second side of the second prism faces toward the fourth side of the third prism. The system is configured for analysis of nucleic material at the substrate.

In a third aspect, a method comprises: forming left autofocus light and right autofocus light that diverge at a predetermined angle from each other; directing the left autofocus light and the right autofocus light through an objective toward a first surface of a substrate; and after reflection off the first surface, directing at least a first part of the left autofocus light and at least a first part of the right autofocus light toward a sensor, wherein a predefined separation between the first part of the left autofocus light and the first part of the right autofocus light at the sensor indicates that the substrate is in focus of the objective.

Implementations can include any or all of the following features. The substrate further includes a second surface, wherein the reflection of the left autofocus light off the first surface forms first left autofocus light, wherein a reflection of the left autofocus light off the second surface forms second left autofocus light, wherein at the sensor the first part of the left autofocus light comprises the first left autofocus light and the second left autofocus light, wherein the reflection of the right autofocus light off the first surface forms first right autofocus light, wherein a reflection of the right autofocus light off the second surface forms second right autofocus light, wherein at the sensor the first part of the right autofocus light comprises the first right autofocus light and the second right autofocus light. A first predefined separation between the first left autofocus light and the first right autofocus light at the sensor indicates that the first surface of the substrate is in focus of the objective. A second predefined separation between the second left autofocus light and the second right autofocus light at the sensor indicates that the second surface of the substrate is in focus of the objective. Directing the first part of the left autofocus light and the first part of the right autofocus light toward the sensor comprises directing, using a first reflective surface, the first part of the left autofocus light and the first part of the right autofocus light toward the sensor. The method further comprises directing, using the objective and a second reflective surface, emission light toward the sensor, the emission light originating from a sample at the substrate. The method further comprises directing the first part of the left autofocus light and the first part of the right autofocus light toward the second reflective surface, the second reflective surface transparent to the first part of the left autofocus light and the first part of the right autofocus light, wherein the first reflective surface is positioned behind the second reflective surface relative to a travel direction of the first part of the left autofocus light and the first part of the right autofocus light. The substrate further comprises a second surface, wherein a second part of the left autofocus light is formed upon reflection of the left autofocus light off the second surface, and wherein a second part of the right autofocus light is formed upon reflection of the right autofocus light off the second surface, the method further comprising directing the second part of the left autofocus light and the second part of the right autofocus light toward the second reflective surface, the second reflective surface also transparent to the second part of the left autofocus light and the second part of the right autofocus light, wherein the first reflective surface is transparent to the second part of the left autofocus light and the second part of the right autofocus light to prevent the second part of the left autofocus light and the second part of the right autofocus light from reaching the sensor. The first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component. Orienting the first reflective component causes steering of the first part of the left autofocus light and the first part of the right autofocus light on the sensor independently of a position of the emission light on the sensor. The method further comprises adjusting a distance between the objective and the substrate based on the first part of the left autofocus light and the first part of the right autofocus light.

In a fourth aspect, a system comprises: a beam splitter to form left autofocus light and right autofocus light that diverge at a predetermined angle from each other; an objective to convey the left autofocus light and the right autofocus light toward a first surface of a substrate; and a sensor to receive at least a first part of the left autofocus light and at least a first part of the right autofocus light, after reflection off the first surface, wherein a predefined separation between the first part of the left autofocus light and the first part of the right autofocus light at the sensor indicates that the substrate is in focus of the objective.

Implementations can include any or all of the following features. The beam splitter is part of a lateral displacement prism. The lateral displacement prism includes exit surfaces having a non-zero angle relative to each other. The lateral displacement prism comprises: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface. The first surface has boundaries with the third surface, the fourth surface, and the fifth surface; and the second surface has boundaries with the third surface, the fourth surface, and the fifth surface. The third surface is an entry surface, wherein the fourth surface is an exit surface for the left autofocus light, and wherein the fifth surface is an exit surface for the right autofocus light. The lateral displacement prism comprises: a first prism having a first wedge profile, the first wedge profile including a first side forming a non-zero angle with regard to a first exit side; a second prism having a second wedge profile, the second wedge profile including a second side forming a non-zero angle with regard to a second exit side; and a third prism having a parallelogram profile, the parallelogram profile including a third side parallel to a fourth side, and a fifth side parallel to a sixth side, the third side of the parallelogram profile being part of an entry surface of the lateral displacement prism; wherein each of the first side of the first prism and the second side of the second prism faces toward the fourth side of the third prism. The beam splitter comprises: a first reflective surface at which initial autofocus light is incident; a partially reflective layer at which the initial autofocus light is incident after being reflected at the first reflective surface, the partially reflective layer forming the left autofocus light and the right autofocus light; and a second reflective surface at which one of the left autofocus light or the right autofocus light is incident after being formed at the partially reflective layer. The system further comprises a first reflective surface to direct the first part of the left autofocus light and the first part of the right autofocus light to the sensor. The system further comprises a second reflective surface to direct emission light to the sensor, the emission light originating from a sample at the substrate and conveyed by the objective. The substrate further includes a second surface, wherein a second part of the left autofocus light is formed upon reflection of the left autofocus light off the second surface of the substrate, and wherein a second part of the right autofocus light is formed upon reflection of the right autofocus light off the second surface of the substrate, the system further comprising a structure to prevent the second part of the left autofocus light and the second part of the right autofocus light from reaching the sensor. The first reflective surface is positioned behind the second reflective surface relative to a travel direction of the first part of the left autofocus light, the second part of the left autofocus light, the first part of the right autofocus light, and the second part of the right autofocus light, wherein the second reflective surface is transparent to the first part of the left autofocus light, the second part of the left autofocus light, the first part of the right autofocus light, and the second part of the right autofocus light. The first reflective surface is positioned on a first reflective component, wherein the second reflective surface is positioned on a second reflective component, and wherein the first reflective component is separate from the second reflective component. The second reflective surface is positioned on a front surface of a second reflective component relative to the travel direction of the first part of the left autofocus light, the second part of the left autofocus light, the first part of the right autofocus light, and the second part of the right autofocus light, wherein the first reflective surface covers a first portion of a rear surface of the second reflective component relative to the travel direction of the first part of the left autofocus light, the second part of the left autofocus light, the first part of the right autofocus light, and the second part of the right autofocus light, and wherein the structure covers a second portion of the rear surface of the second reflective component. The system is configured for analysis of nucleic material at the substrate.

In a fifth aspect, an autofocus assembly comprises: a prism comprising: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface; and a light source to direct light at the prism, the prism to form first autofocus light and second autofocus light from the light, the first autofocus light and the second autofocus light diverging at a predetermined angle from each other.

Implementations can include any or all of the following features. The fourth surface and the fifth surface form exit surfaces having a non-zero angle relative to each other. The first surface has boundaries with the third surface, the fourth surface, and the fifth surface; and the second surface has boundaries with the third surface, the fourth surface, and the fifth surface. The third surface is an entry surface. The prism comprises: a first prism having a first wedge profile, the first prism forming the fourth surface, the first wedge profile including a first side forming a non-zero angle with regard to the fourth surface; a second prism having a second wedge profile, the second prism forming the fifth surface, the second wedge profile including a second side forming a non-zero angle with regard to the fifth surface; and a third prism having a parallelogram profile, the parallelogram profile including a third side parallel to a fourth side, the third side defining the third surface, and a fifth side parallel to a sixth side; wherein each of the first side of the first prism and the second side of the second prism faces toward the fourth side of the third prism.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1:
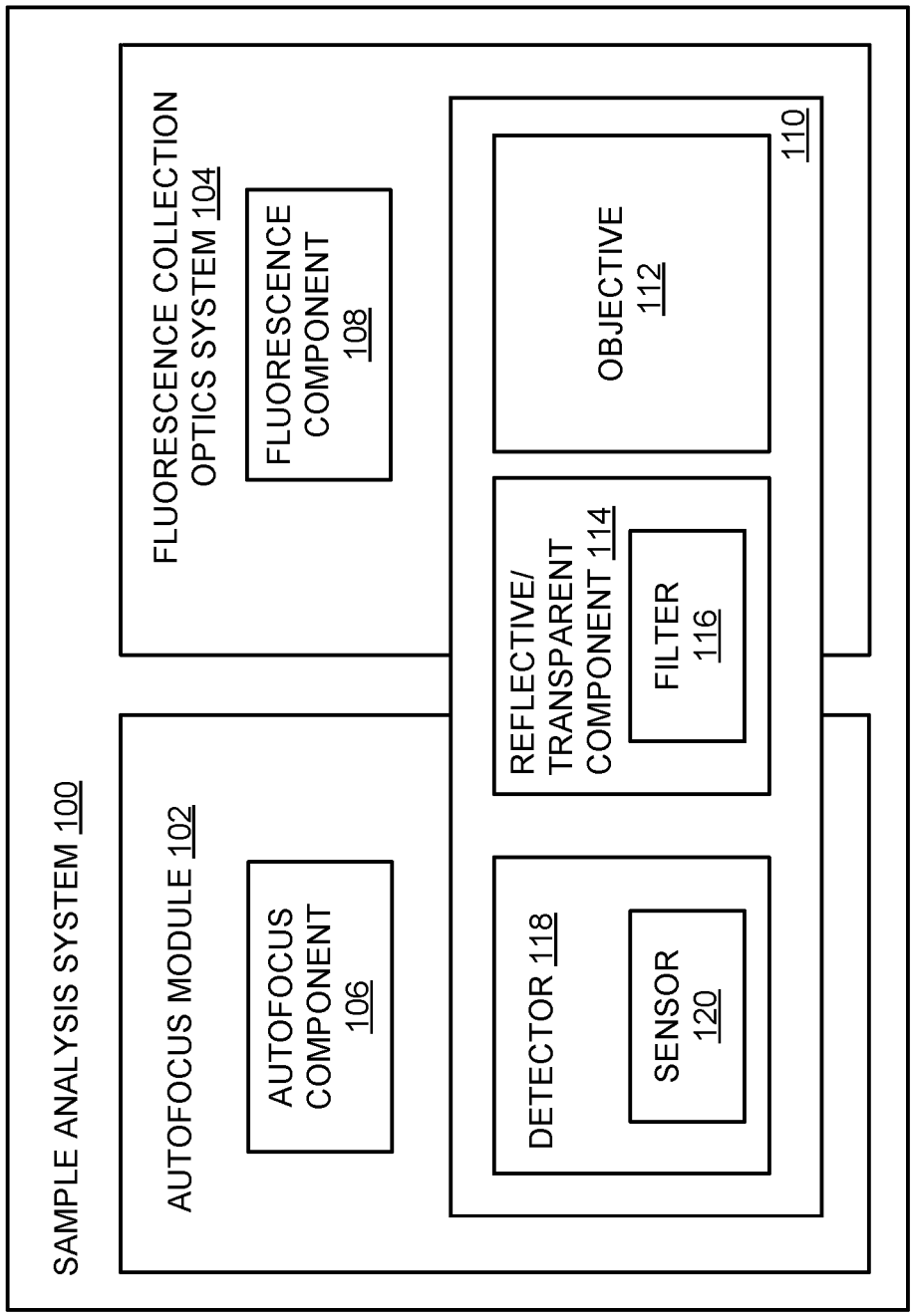
FIG. 1 shows an embodiment of a system that can be used for analyzing a sample.

The present disclosure describes systems, techniques, and/or articles of manufacture relating to respective improvements regarding autofocus functionality. When focus tracking systems or other autofocus systems are used, stray reflections can appear at the detector, the stray reflections originating with multiple optical interfaces (e.g., layers or other surfaces), this can interfere with the focus tracking algorithm. In some implementations, additional beam-steering optics can be used to direct reflections that are relevant to autofocusing toward an image sensor, while preventing irrelevant reflections from reaching the sensor. Such approaches can provide that focus-tracking reflections that are of interest can be selectively steered to a predefined region of the detector that is free of interference from stray reflections. This can increase the focus-tracking ability of the system. One or more implementations described herein can facilitate integration of a focus tracking system, such as an autofocus module, into an optics system for imaging a sample. For example, the optics system can be configured for collecting fluorescence generated at the sample.

In some implementations, an optical system can include a filter having a coating that reflects the emission light toward the sensor, with the filter transmitting relevant and irrelevant reflections. The beam-steering optics can be positioned behind the filter and can include a reflective material (e.g., a mirror) positioned in the path of the relevant reflections and outside the path of the irrelevant reflections. An absorbent material can be placed in the path of the irrelevant reflections. The reflective material can be moveable for directing the relevant reflections relative to the sensor (e.g., to steer them away from the emission light). In another implementation, the reflective material can include a coating at the back surface of the filter, and a high-transmittance coating can be used to allow the irrelevant reflections to exit the filter.

In some implementations, beams of autofocus light can be formed so that they diverge from each other after being split apart. For example, divergent autofocus beams can be provided using angled exit surfaces at a beam-splitting component, such as using a custom prism, or using an off-the-shelf prism with added wedge prisms. As another example, divergent autofocus beams can be provided using an arrangement of mirrors, a 50% reflective filter, and plates of glass that form angled exit surfaces. Each of the divergent AFM beams forms respective spots on the sensor that are offset to opposite sides of the center of the field of view. The angled exit surfaces of the beam-splitting component are configured to induce a predetermined distance between spots reflected from the same surface such that a measure of a difference between a measured distance between the spots and the predetermined distance is used to calculate the z-separation between the objective and the flow cell; the predetermined distance corresponds to a best focus that is more easily measured without affecting alignments of the emission optics.

Examples described herein refer to analysis of one or more samples. As used herein, the term sample includes various matters of interest that undergo an imaging session where optical signals from the sample are observed. In particular embodiments, a sample may include a biological substance of interest and/or a chemical substance of interest. Optionally, the sample can include an optical substrate or support structure that supports the biological substance or chemical substance. As such, a sample may or may not include an optical substrate or support structure. As used herein, the terms biological substance or chemical substance may include a variety of biological or chemical substances that are suitable for being imaged or examined with the optical systems described herein. For example, biological or chemical substances include biomolecules, such as nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, tissues, organisms, and biologically active chemical compound(s) such as analogs or mimetics of the aforementioned species. Other chemical substances include labels that can be used for identification, examples of which include fluorescent labels. Analysis of a sample can include, but is not limited to, genetic sequencing (e.g., determining the structure of genetic material), genotyping (e.g., determining differences in an individual's genetic make-up), gene expression (e.g., synthesizing a gene product using gene information), proteomics (e.g., large-scale study of proteins), or combinations thereof.

Examples herein refer to substrates. A substrate may refer to any material that provides an at least substantially rigid structure, or to a structure that retains its shape rather than taking on the shape of a vessel to which it is placed in contact. The material can have a surface to which another material can be attached including, for example, smooth supports (e.g., metal, glass, plastic, silicon, and ceramic surfaces), as well as textured and/or porous materials. Possible substrates include, but are not limited to, glass and modified or functionalized glass, plastics (including acrylics, polystyrene and copolymers of styrene and other materials, polypropylene, polyethylene, polybutylene, polyurethanes, Teflon™, etc.), polysaccharides, nylon or nitrocellulose, resins, silica or silica-based materials including silicon and modified silicon, carbon, metals, inorganic glasses, plastics, optical fiber bundles, and a variety of other polymers. In general, the substrates allow optical detection and do not themselves appreciably fluoresce.

Examples described herein refer to flow cells. A flow cell can be considered a substrate that can be used in preparing and accommodating or carrying one or more samples in at least one stage of an analysis process. The flow cell is made of a material that is compatible with both the sample material (e.g., genetic material), the illumination and the chemical reactions to which it will be exposed. The substrate can have one or more channels in which sample material can be deposited. A substance (e.g., a liquid) can be flowed through the channel where the sample genetic material is present to trigger one or more chemical reactions and/or to remove unwanted material. The flow cell may enable the imaging by facilitating that the sample in the flow cell channel can be subjected to illuminating light and that any fluorescent responses from the sample can be detected. Some implementations of systems may be designed to be used with at least one flow cell, but may not include the flow cell(s) during one or more stages, such as during shipping or when delivered to a customer. The flow cell can have one or more surfaces configured for accommodating samples, such as, but not limited to, samples of nucleic acid material. In some implementations, the surface(s) are coated with one or more polymers. For example, the polymer can comprise poly(N-(5-azidoacetamidylpentyl) acrylamide-co-acrylamide), sometimes referred to as PAZAM.

Examples described herein refer to autofocus light. Autofocus light can be used by an autofocus module in a sample analysis system to facilitate relative adjustment between an optical component (e.g., an objective) and a substrate (e.g., holding a sample to be analyzed). An autofocus module can optically measure a distance between two or more objects (e.g., an optical component and a substrate) using the autofocus light. In some implementations, an autofocus module uses autofocus light to perform triangulation with regard to the two or more objects. For example, a source of autofocus light (e.g., a laser diode) can generate a light beam that impinges on and is reflected by at least one surface of the substrate. A light detector (e.g., a light-sensitive sensor) can register a reflection of the light beam off the at least one surface. The position of the reflection (e.g., a light spot) on the light detector is an indication of the distance to the substrate. Autofocus light can have any wavelength(s) suitable considering the type of material in the sample (i.e., so that the autofocus light does not substantially degrade the sample or otherwise alter chemical properties thereof) and/or considering the light detector (i.e., so that the light detector is capable of detecting the autofocus light). In some implementations, autofocus light can have one or more wavelengths in a range of about 770 nanometers (nm) to about 880 nm.

Examples described herein refer to emission light. One or more types of emission light can be caused to emanate from a sample as part of performing, or preparing the sample for, analysis regarding one or more characteristics. In some implementations, emission light includes fluorescent light (sometimes referred to as fluorescence) emitted by one or more fluorescent markers or tags at the material of the sample. For example, emission of fluorescent light can be triggered or otherwise stimulated by subjecting the sample to excitation light, including, but not limited to, by directing laser light at the sample.

Examples described herein refer to a surface as being reflective, or as being a reflective surface. A surface can be reflective to at least substantially all wavelengths of light, or can be reflective to only one or more predefined wavelengths (e.g., to one or more bands of wavelengths.) The surface can exhibit specular reflection, meaning that an image embodied in the impinging light is at least substantially preserved in the reflected light. Reflectivity does not necessarily involve reflection of all impinging light, or reflection of all impinging light of the predefined wavelength(s). Rather, a surface can be considered reflective if it reflects some amount (e.g., more than zero) of the impinging light, or of the light having the predefined wavelength(s). A reflective surface can be formed at any type of substrate, and the surface can include any of multiple reflective materials. A reflective surface can be formed by applying one or more layers to a substrate. In some implementations, a reflective surface operates based on thin-film interference involving a top surface of the layer and a top surface of the substrate.

A reflective surface can be referred to as a filter in an optical system. For example, a reflective surface can include a dichroic filter. As used herein, the term filter in an optical system is intended to mean a device for selectively passing or rejecting passage of radiation in a wavelength, polarization or frequency dependent manner. The term can include an interference filter in which multiple layers of dielectric materials pass or reflect radiation according to constructive or destructive interference between reflections from the various layers. Interference filters are also referred to in the art as dichroic filters, or dielectric filters. The term can include an absorptive filter which prevents passage of radiation having a selective wavelength or wavelength range by absorption. Absorptive filters include, for example, colored glass or liquid.

Examples described herein refer to a surface as being transparent, or as being a transparent surface. A surface can be transparent to at least substantially all wavelengths of light, or can be transparent to only one or more predefined wavelengths (e.g., to one or more bands of wavelengths.) Transparency does not necessarily involve transmission of all impinging light, or transmission of all impinging light of the predefined wavelength(s). Rather, a surface can be considered transparent if it transmits some amount (e.g., more than zero) of the impinging light, or of the light having the predefined wavelength(s). A transparent surface can be formed at any type of substrate, and the surface can include any of multiple transparent materials. A transparent surface can be formed by applying one or more anti-reflective materials to a substrate. Examples of suitable anti-reflective materials that may be used include, but are not limited to, any transparent material having a refractive index equal to the square root of the product of the refractive indices of the substrate and the surrounding medium. Some examples of anti-reflective materials include magnesium fluoride ($MgF_2$), fluoropolymers, mesoporous silica nanoparticles, alternating layers of silica and a higher refractive index material, or other anti-reflective materials that exhibit the desirable anti-reflective property within the desirable emission band/wavelengths being used.

Examples described herein refer to one or more structures that prevent transmission of light (e.g., autofocus light) to a predefined component or in a predefined direction. In some implementations, a structure can prevent transmission to a predefined component or in a predefined direction by absorbing the light. For example, the structure can include an absorbent material to takes up at least substantially all of the energy in the light impinging on the structure. In some implementations, a structure can prevent transmission to a predefined component or in a predefined direction by not reflecting the light toward the predefined component or in the predefined direction. For example, the structure can include a material that is transparent to the wavelength(s) sought to be prevented from reaching a predefined component or from being transmitted in a predefined direction.

Examples described herein refer to a portion of light using a modifier such as "left" or "right". The terms left and right are used herein for illustrative purposes only and do not necessarily reflect the spatial arrangement of any component or the relative location of any portion of light. In some implementations, an alternative to the modifiers left and right can be the terms first and second, respectively. For example, left autofocus light and right autofocus light can in some circumstances instead be referred to as first autofocus light and second autofocus light, respectively.

Examples described herein refer to a portion of light using a modifier such as "top" or "bottom". The terms top and bottom are used herein for illustrative purposes only and do not necessarily reflect the spatial arrangement of any components. In some implementations, an alternative to the modifiers top and bottom can be the terms first and second, respectively. For example, a top surface and a bottom surface can in some circumstances be referred to as a first surface and a second surface, respectively.

Examples described herein refer to a component as "behind," or in "front" of another component, or at the "front" or "rear" of the other component. The terms behind, front and rear are used herein for illustrative purposes only and do not necessarily reflect only one of multiple spatial arrangements, or the only possible spatial arrangement, of any components. In some implementations, the terms behind, front and rear are used in a relative sense regarding one or more specified items of reference. For example, a first item can be characterized as being behind a second item relative to a travel direction of light, meaning that the light reaches the second item before reaching the first item. As another example, a first item can be characterized as being in front of a second item relative to a travel direction of light, meaning that the light reaches the first item before reaching the second item. As another example, a surface of a component can be referred to as a front surface relative to a travel direction of light, meaning that the light reaches the front surface before reaching other aspects of the component. As another example, a surface of a component can be referred to as a rear surface relative to a travel direction of light, meaning that the light reaches other aspects of the component before reaching the front surface.

Examples described herein refer to a detector of light. In some implementations, a detector of light can be sensitive to one or more forms of electromagnetic radiation. A detector can include a device or apparatus having several elements that convert the energy of contacted photons into an electrical response. Such elements can be referred to as sensors, or an array of the elements can collectively be referred to as a sensor. A sensor can include a charge coupled device (CCD), wherein the elements are photosensitive charge collection sites that accumulate charge in response to impinging photons. A sensor can include a complementary metal oxide semiconductor (CMOS) detector array, a photodiode array, an avalanche photodiode (APD) detector array, and/or a Geiger-mode photon counter detector array. The elements of a sensor can have any of a variety of arrangements. For example, a rectangular sensor array has elements in a two-dimensional, orthogonal arrangement in which a first dimension, referred to as the "horizontal" dimension can be longer than a second dimension referred to as the "vertical" dimension. A square sensor array has elements in a two-dimensional, orthogonal arrangement in which the first and second dimensions of the arrangement are the same length. The sensor can detect light and generate a corresponding output from one or more pixels. In some implementations, a separation between two or more portions of light at a sensor can be determined (e.g., as part of an autofocus operation.) For example, the separation can be measured using a distance in pixels or using a suitable linear distance unit.

Examples described herein refer to an objective. An objective is a part of an optical system and can include one or more optical components. As used herein, the term optical components includes, but is not limited to, various elements that affect the propagation of optical signals. For example, the optical components may at least one of redirect, filter, shape, magnify, or concentrate the optical signals. The optical signals that may be affected include the optical signals that are upstream from the sample and the optical signals that are downstream from the sample. In a fluorescence-detection system, upstream components include those that direct excitation radiation toward the sample and downstream components include those that direct emission radiation away from the sample. Optical components may be, for example, reflectors, dichroic filters, dichroic mirrors, beam splitters, collimators, lenses, filters, wedges, prisms, mirrors, detectors, and the like. Optical components can include bandpass filters, optical wedges, and optical devices similar to those described herein. In some implementations, an optical system can include a projection lens. The term projection lens can include an optical element configured to transfer the image of an object to a detector. For example, a lens can be placed to transfer an image emanating from an objective lens to a detector array. An objective can support depth of field control (DFC). In some implementations, the DFC can facilitate choosing among different depths of field. For example, the DFC controls the distance between the closest and the farthest objects that are in focus.

Examples described herein refer to a component being in focus of an objective. Due to inherent limitations in physical optics systems (as opposed to ideal systems) there may not exist an exact point of focus relative to the component and the objective. Rather, there may be a range of best focus applicable to the component and the objective, and this is sometimes referred to as the component being in at the best focus of the objective. As used herein, being in focus or out of focus (e.g., in best focus or out of best focus) involves a process of adjusting a detection system to obtain a desired characteristic for a representation of an object being detected. For example, an optical detection system can be adjusted to increase sharpness, contrast or modulation transfer function (MTF) for an image of a test sample being detected. By way of further example, an optical detection system can be adjusted to obtain an image having a desired uniformity, and in particular embodiments the image can have both a desired uniformity and an MTF that is above a defined minimum value. The MTF for an image can vary at different locations of a sample being detected. For example, MTF can be different at two separate locations of a sample to allow the image to have one or more other characteristics that a similar or within a desired range at each of the locations.

Examples described herein refer to a beam splitter. A beam splitter means an optical element that passes a first portion of a radiation beam and reflects a second portion of the beam. In some implementations, a beam splitter can be configured to selectively pass radiation in a first wavelength range and reflect radiation in a second, different radiation range. For example, a beam splitter can divide autofocus light into two separate (e.g., at least substantially equivalent to each other) beams of light. A beam splitter can include a partially reflective layer. The partially reflective layer can include any material having optical properties (e.g., refractive index and/or thickness) so as to reflect a portion of the light and to transmit another portion of the light due to frustrated total internal reflection. In some implementations, the partially reflective layer can have a reflectivity of about 45-55%. The reflectivity can apply for a predefined wavelength or a range of wavelengths. For example, the reflectivity can be measured for one or more wavelengths between about 77 nm and about 880 nm. The reflectivity can apply for one or more angles of incidence. For example, the reflectivity can apply at one or more angles of incidence between about 45 degrees and about 55 degrees.

Examples herein refer to a prism. A prism is an optical element with surfaces that are flat and smooth and form angles between each other, wherein the prism is transparent to at least one wavelength of light. Two adjacent surfaces of a prism that form an angle between them are separated by a boundary. For example, the boundary can be an edge defined by a plane of one of the surfaces meeting a plane of the other surface at the boundary. A prism can include one or more optically effective components. In some implementations, a prism includes a partially reflective layer.

A prism can be referred to as having a predefined profile, meaning a geometric structure of at least part of the prism as manifest by at least some of the boundaries of the prism. In some implementations, the profile of a prism corresponds to a shape of the prism (i.e., a shape of at least some of the visible boundaries) when viewed from at least one direction. In some implementations, a prism can have a wedge profile. A prism with a wedge profile can have a first side of the wedge profile forming a non-zero angle with regard to a second side of the wedge profile, wherein the first side and the second side either share a common boundary or do not share a common boundary. In some implementations, a prism can have a parallelogram profile. A prism with a parallelogram profile can have a first side of the parallelogram profile and a second side of the parallelogram profile that are parallel to each other, and can have a third side of the parallelogram profile and a fourth side of the parallelogram profile that are parallel to each other.

A prism intended to form respective light beams can be referred to as a lateral displacement prism because of the lateral displacement of one or more light beam relative to at least one other light beam. A lateral displacement prism can include a beam splitter, including, but not limited to, a partially reflective layer. In some implementations, a prism can be made from any material that is transparent to one or more wavelengths of light. For example, a prism can be made from one or more of glass (e.g., optical borosilicate-crown glass), plastic, or fluorite. The surfaces of the prism can be polished to a predefined flatness and smoothness.

Examples herein refer to structured illumination microscopy (SIM). SIM imaging is based on spatially structured light. For example, the structure can consist of or include a pattern in the illuminating light that helps increase the resolution of the obtained image(s). In some implementations, the structure can include patterns of fringes. Fringes of light can be generated by impinging a light beam on a diffraction grating (referred to as a grating for simplicity) such that reflective or transmissive diffraction occurs. The structured light can be impinged on the sample, illuminating the sample according to the respective fringes which may occur according to some periodicity. For example, images of the sample can be acquired at different phases of the fringes in the structured light, sometimes referred to as the respective pattern phases of the images. This can allow various locations on the sample to be exposed to a multitude of illumination intensities. The pattern of the structured light can be rotated relative to the sample, and the images just mentioned can be captured for each of the rotation angles.

Examples here refer to a blue channel of emission light (e.g., to be detected to by a blue sensor assembly) and/or to a green channel of emission light (e.g., to be detected by a green sensor assembly.) Emitted illumination can be identified with wavelength bands, each of which can be categorized to a respective color channel. For example, the wavelength bands of the emitted illumination can correspond to a blue color (e.g., 450 nm-525 nm), and/or a green color (e.g., 525 nm-570 nm. In some implementations, the wavelength bands may be defined based on the two or more light wavelengths present during the simultaneous illumination. For example, when only blue and green colors are to be analyzed, the wavelength band corresponding to blue and green colors can be defined as different wavelength bands than the aforementioned ranges. For instance, a blue wavelength band can be set as emitted light from about 450 nm to 510 nm, such as 486 nm-506 nm. In some instances, the blue wavelength band can simply have an upper limit, such as about 500 nm-510 nm or about 506 nm. Similarly, the green wavelength band can be set as emitted light from about 525 nm to 650 nm, such as 584 nm-637 nm. While the foregoing green wavelength band may extend into yellow and red colors, when analyzing emitted light expected to be in only the blue and green color ranges, the upper and/or lower ends of the wavelength band can be extended to capture additional emitted light that is emitted above or below the wavelength for the color. In some instances, the green wavelength band can simply have a lower limit, such as about 550 nm-600 nm or about 584 nm.

FIG. 1 shows an embodiment of a system 100 that can be used for analyzing a sample. The system 100 can include, or be used with, one or more other embodiments described herein. In some implementations, the system 100 can include, or be used with, the system 4200 in FIG. 42. In some implementations, the system 100 can include, or be used with, at least some components of the computing device 4300 in FIG. 43. In some implementations, the system 100 can include, or be used with, the optical system 200 in FIG. 2. In some implementations, the system 100 can include, or be used with, the optical system 500 in FIG. 5. In some implementations, the system 100 can include, or be used with, the optical system 800 in FIG. 8A. In some implementations, the system 100 can include, or be used with, the optical system 820 in FIG. 8B. In some implementations, the system 100 can include, or be used with, the lateral displacement prism 1000 in FIGS. 10A-10C. In some implementations, the system 100 can include, or be used with, the optical system 1100 in FIG. 11. In some implementations, the system 100 can include, or be used with, the optical system 1200 in FIG. 12. In some implementations, the system 100 can include, or be used with, the optical system 1300 in FIG. 13. In some implementations, the system 100 can include, or be used with, the optical system 1400 in FIG. 14. In some implementations, the system 100 can include, or be used with, the lateral displacement prism 1600 in FIGS. 16A-16B. In some implementations, the system 100 can include, or be used with, the beam splitter 1700 in FIG. 17. In some implementations, the system 100 can include, or be used with, the imaging module 1800 in FIGS. 18 and 19A-19B. In some implementations, the system 100 can include, or be used with, the SIM assembly 2000 in FIG. 20. In some implementations, the system 100 can include, or be used with, the imaging module 2100 in FIG. 21. In some implementations, the system 100 can include, or be used with, the imaging module 2200 in FIG. 22. In some implementations, the system 100 can include, or be used with, the imaging module 2400 in FIG. 24. In some implementations, the system 100 can include, or be used with, the optical system 2500 in FIG. 25. In some implementations, the system 100 can include, or be used with, the optical system 2600 in FIG. 26. In some implementations, the system 100 can include, or be used with, the reflective component 2700 in FIG. 27. In some implementations, the system 100 can include, or be used with, the reflective component 2800 in FIG. 28. In some implementations, the system 100 can generate the autofocus light 2900 in FIG. 29. In some implementations, the system 100 can generate the autofocus light 3000 in FIG. 30. In some implementations, the system 100 can generate the autofocus light 3100 in FIGS. 31A-31C. In some implementations, the system 100 can include, or be used with, the laser engine heat sink 3200 in FIGS. 32A-32C. In some implementations, the system 100 can include, or be used with, the laser engine heat sink 3300 in FIGS. 33A-33C. In some implementations, the system 100 can include, or be used with, the SIM assembly 3400 in FIG. 34. In some implementations, the system 100 can include, or be used with, the RIGS 3500 in FIG. 35. In some implementations, the system 100 can include, or be used with, the RIGS 3600 in FIG. 36. In some implementations, the system 100 can include, or be used with, the piezo phase shifter 3700 in FIG. 37. In some implementations, the system 100 can include, or be used with, the piezo phase shifter 3800 in FIG. 38. In some implementations, the system 100 can include, or be used with, the projection lens 3900 in FIG. 39. In some implementations, the system 100 can include, or be used with, the projection lens 4000 in FIG. 40. In some implementations, the system 100 can generate the field of view 4100 in FIG. 41.

The system 100 can be used for analyzing one or more types of sample materials and can be referred to as a sample analysis system. In some implementations, the system 100 can be configured for analysis of nucleic material at a substrate. The system 100 includes an autofocus module 102 and a fluorescence collection optics system 104. The autofocus module 102 can perform one or more autofocus functions regarding imaging performed using the fluorescence collection optics system 104. In some implementations, the fluorescence collection optics system 104 collects fluorescence (sometimes referred to as emission light) generated at a sample for purposes of performing analysis of the same. For example, the autofocus module 102 can automatically determine the best focus to be applied by the fluorescence collection optics system 104 for a sample to be analyzed, and the fluorescence collection optics system 104 can apply the best focus accordingly.

The autofocus module 102 includes one or more autofocus components 106. In some implementations, the autofocus components 106 include a source of autofocus light (e.g., a laser diode). In some implementations, the autofocus components 106 include a beam splitter (e.g., as part of a lateral displacement prism). In some implementations, the autofocus components 106 include an aspherical lens (e.g., to collimate light from the light source). One or more other components used by the autofocus module 102 can be shared with the fluorescence collection optics system 104, for example as will be described below.

The fluorescence collection optics system 104 includes one or more fluorescence components 108. The fluorescence components 108 are involved in the collection of fluorescence in one or more ways. In some implementations, the fluorescence components 108 can trigger emission of fluorescence. For example, the fluorescence components 108 can include one or more excitation lasers generating excitation light of a wavelength and energy that will activate one or more fluorescent tags at a sample material, the activation causing the fluorescent tag(s) to emit fluorescent light. In some implementations, the fluorescence components 108 can control the sample in preparation for, and/or during, the imaging. For example, the fluorescence components 108 can condition the sample for analysis (e.g., by thermal treatment and/or using chemicals), and/or position the substrate holding the sample for the imaging. In some implementations, the fluorescence components 108 can analyze the fluorescence collected from the sample. For example, the collected fluorescence can be analyzed to identify the fluorescent tag(s) of the sample, and thereby determine one or more characteristics of the sample.

The system 100 can include one or more shared components 110. The shared components 110 can be used by the autofocus module 102, or by the fluorescence collection optics system 104, or by both the autofocus module 102 and the fluorescence collection optics system 104. The use can be simultaneous or can occur at different times. For example, the autofocus module 102 can use the shared components 110 during an autofocus process that is performed prior to an analysis process (e.g., involving imaging of the sample) performed by the fluorescence collection optics system 104.

The shared components 110 can include one or more objective 112. For example, the objective 112 can be used for directing autofocus light at the substrate and for conveying reflected autofocus light away from the substrate for performing an autofocus procedure. For example, the objective 112 can be used for directing excitation light at the sample, and for conveying emitted fluorescence away from the sample for collection.

The shared components 110 can include one or more reflective/transparent component 114. The reflective/transparent component 114 can include one or more components that are reflective (e.g., a mirror), and/or one or more components that are transparent (e.g., a filter), and/or one or more components that are both reflective and transparent (e.g., a partially reflective layer), and/or a refractive component (e.g., a lens). In some implementations, the reflective/transparent component 114 is used for steering one or more types of light away from one or more other types of light. For example, the reflective/transparent component 114 can include at least one filter 116. Such steering by the reflective/transparent component 114 can serve to distinguish currently relevant light from currently irrelevant light and thereby improve detection of autofocus light by the autofocus module 102.

The shared components 110 can include one or more detectors 118. The detector 118 can be used for registering autofocus light reflected from the sample for purposes of an autofocus process. The detector 118 can be used for registering emission light (e.g., fluorescence) for an analysis process. The detector 118 can include one or more sensors 120. For example, the sensors 120 include light-sensitive elements arranged in a rectangular array.

Figure 2:
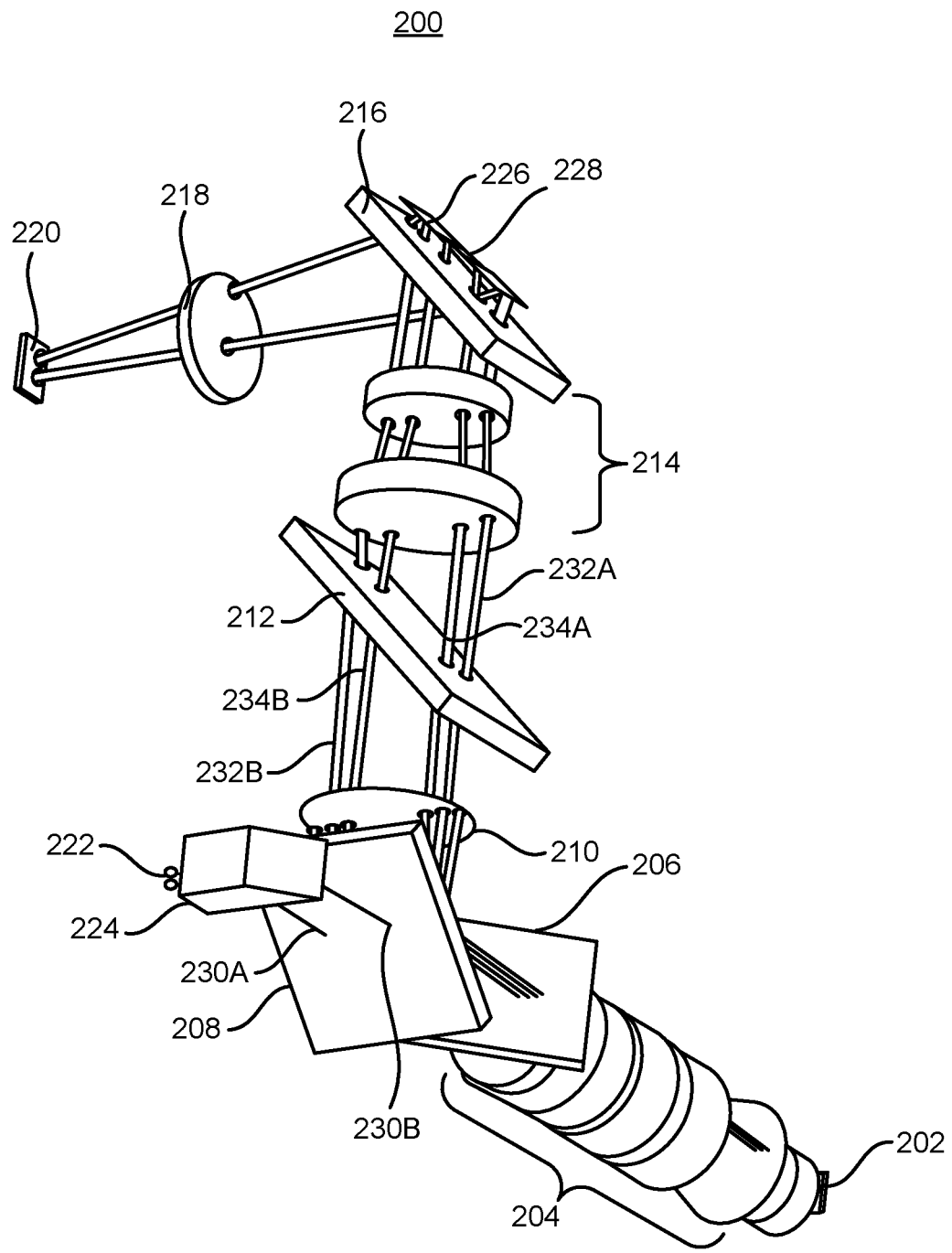
FIG. 2 shows an embodiment of an optical system.

FIG. 2 shows an embodiment of an optical system 200. The optical system 200 can include, or be used with, one or more other embodiments described herein. In some implementations, the optical system 200 can include, or be used with, the optical system 500 in FIG. 5. In some implementations, the optical system 200 can be included within the system 100 in FIG. 1. In some implementations, the optical system 200 can include, or be used with, the optical system 800 in FIG. 8A. In some implementations, the optical system 200 can include, or be used with, the optical system 820 in FIG. 8B. In some implementations, the optical system 200 can include, or be used with, the lateral displacement prism 1000 in FIGS. 10A-10C. In some implementations, the optical system 200 can include, or be used with, the optical system 1100 in FIG. 11. In some implementations, the optical system 200 can include, or be used with, the optical system 1200 in FIG. 12. In some implementations, the optical system 200 can include, or be used with, the optical system 1300 in FIG. 13. In some implementations, the optical system 200 can include, or be used with, the optical system 1400 in FIG. 14. In some implementations, the optical system 200 can include, or be used with, the lateral displacement prism 1600 in FIGS. 16A-16B. In some implementations, the optical system 200 can include, or be used with, the beam splitter 1700 in FIG. 17. In some implementations, the optical system 200 can include, or be used with, the imaging module 1800 in FIGS. 18 and 19A-19B. In some implementations, the optical system 200 can include, or be used with, the SIM assembly 2000 in FIG. 20. In some implementations, the optical system 200 can include, or be used with, the imaging module 2100 in FIG. 21. In some implementations, the optical system 200 can include, or be used with, the imaging module 2200 in FIG. 22. In some implementations, the optical system 200 can include, or be used with, the imaging module 2400 in FIG. 24. In some implementations, the optical system 200 can include, or be used with, the optical system 2500 in FIG. 25. In some implementations, the optical system 200 can include, or be used with, the optical system 2600 in FIG. 26. In some implementations, the optical system 200 can include, or be used with, the reflective component 2700 in FIG. 27. In some implementations, the optical system 200 can include, or be used with, the reflective component 2800 in FIG. 28. In some implementations, the optical system 200 can generate the autofocus light 2900 in FIG. 29. In some implementations, the optical system 200 can generate the autofocus light 3000 in FIG. 30. In some implementations, the optical system 200 can generate the autofocus light 3100 in FIGS. 31A-31C. In some implementations, the optical system 200 can include, or be used with, the laser engine heat sink 3200 in FIGS. 32A-32C. In some implementations, the optical system 200 can include, or be used with, the laser engine heat sink 3300 in FIGS. 33A-33C. In some implementations, the optical system 200 can include, or be used with, the SIM assembly 3400 in FIG. 34. In some implementations, the optical system 200 can include, or be used with, the RIGS 3500 in FIG. 35. In some implementations, the optical system 200 can include, or be used with, the RIGS 3600 in FIG. 36. In some implementations, the optical system 200 can include, or be used with, the piezo phase shifter 3700 in FIG. 37. In some implementations, the optical system 200 can include, or be used with, the piezo phase shifter 3800 in FIG. 38. In some implementations, the optical system 200 can include, or be used with, the projection lens 3900 in FIG. 39. In some implementations, the optical system 200 can include, or be used with, the projection lens 4000 in FIG. 40. In some implementations, the optical system 200 can generate the field of view 4100 in FIG. 41.

The optical system 200 includes a substrate 202. The substrate 202 can be used for holding one or more samples to be analyzed. In some implementations, the sample at the substrate 202 can include nucleic material. For example, the substrate 202 can include a flow cell for imaging nucleic matter.

The optical system 200 includes an objective 204. The objective 204 can be the component directly upstream of the substrate 202. For example, the objective 204 can be used for directing autofocus light at the substrate 202 and for conveying reflected autofocus light away from the substrate 202 for performing an autofocus procedure. For example, the objective 204 can be used for directing excitation light at the sample on the substrate 202, and for conveying emitted fluorescence away from the sample for collection.

The optical system 200 includes a filter 206. The filter 206 can be the component directly upstream of the objective 204. The filter 206 can be a dichroic filter. The filter 206 can allow one or more types of light to enter into the flow. For example, excitation light from an excitation light source (not shown) can be added through the filter 206 and thereby be conveyed toward the substrate 202.

The optical system 200 includes a filter 208. The filter 208 can be the component directly upstream of the filter 206. The filter 206 can be a dichroic filter. In some implementations, the filter 208 can reflect autofocus light reflected at the substrate 202 and emission light generated at the sample and thereby facilitate that the autofocus light and the emission light are conveyed to further aspects of the optical system 200. The filter 208 can allow one or more types of light to enter into the flow. For example, autofocus light can be added through the filter 208 and thereby be conveyed toward the substrate 202.

The optical system 200 includes a structure 210. The structure 210 can be the component directly upstream of the filter 208. The structure 210 can serve to block one or more beams that arrive from the filter 208 from being conveyed to further aspects of the optical system 200. In some implementations, the structure 210 can block one or more aspects of autofocus light that have been reflected at the substrate 202. For example, the structure 210 can block autofocus light reflected from a top surface of a flow cell.

The optical system 200 includes a filter 212. The filter 212 can be the component directly upstream of the structure 210. The filter 212 can be a dichroic filter. In some implementations, the filter 212 can transmit autofocus light reflected at the substrate 202 and emission light generated at the sample and thereby facilitate that the autofocus light and the emission light are conveyed to further aspects of the optical system 200. The filter 212 can divide emission light from the substrate 202 among two or more paths. In some implementations, each path can be associated with a respective color channel. For example, the components upstream of the filter 212 can be associated with one color channel (e.g., a blue or green color channel), and other components (not shown) can be associated with another color channel.

The optical system 200 includes at least one tube lens 214. The tube lens(es) 214 can be the component(s) directly upstream of the filter 212. In some implementations, the tube lens 214 can serve to focus incident light in preparation for detection thereof. For example, the tube lens 214 can focus autofocus light for detection as part of an autofocus process. As another example, the tube lens 214 can focus emission light for detection as part of an analysis process.

The optical system 200 includes a filter 216. The filter 216 can be the component directly upstream of the tube lens 214. The filter 216 can be a dichroic filter. The filter 216 can, alone or together with at least one other component, facilitate steering of one or more types of light. In some implementations, the filter 216 can reflect emission light and transmit autofocus light. For example, the filter 216 can have an antireflective coating that prevents reflection (i.e., facilitates transmission) of autofocus light, and that does reflect emission light. In other implementations, the filter 216 can be configured to prevent reflection (i.e., facilitate transmission) of emission light, and reflect autofocus light.

The optical system 200 includes a filter 218. The filter 218 can be the component directly upstream of the filter 216. The filter 218 can be a dichroic filter. In some implementations, the filter 218 can condition light in one or more regards in preparation for detection. For example, the filter 218 can provide bandpass filtering based on the wavelength(s) of reflected autofocus light and on the wavelength(s) of emission light so as to eliminate noise.

The optical system 200 includes a sensor 220. The sensor 220 can be the component directly upstream of the filter 218. The sensor 220 can detect reflected autofocus light during an autofocus procedure, and/or detect emission light during an analysis procedure. For example, the sensor 220 includes a rectangular array of light-sensitive elements that can detect the respective locations of one or more portions of light incident at the sensor 220.

The optical system 200 includes one or more sources of autofocus light (not shown). A connector 222 can represent a point of entry into the optical system 200 for laser light that serves as autofocus light. In some implementations, the laser light can be provided via a fiberoptic cable by a superluminescent diode that provides autofocus light based on superluminescence (e.g., spontaneously emitted light amplified by stimulated emission). For example, the autofocus light can be collimated by being passed through an aspheric lens.

The initial autofocus light can be split (or laterally displaced) into two or more parts of autofocus light. The optical system 200 includes a lateral displacement prism 224. The lateral displacement prism 224 can be positioned proximate the filter 208. For example, the lateral displacement prism 224 is positioned at an opposite side of the filter 208 than the side that reflects autofocus light and emission light generated at the sample. The side of the filter 208 facing the lateral displacement prism 224 can be transparent to the autofocus light from the lateral displacement prism 224 to allow the autofocus light to be conveyed toward the substrate 202. The lateral displacement prism 224 can form respective parts of autofocus light that are divergent from each other, for example as described below.

The optical system 200 includes one or more reflective component 226. The reflective component 226 can include one or more reflective surfaces and can be positioned behind the filter 216 in the travel direction of light arriving from the tube lens 214. In some implementations, the reflective component 226 reflects light that was transmitted through the filter 216, the reflection causing the light to be directed toward the sensor 220. For example, the reflective component 226 can reflect some (but not all) autofocus light that has been reflected at the substrate 202. The reflective component 226 can have optical properties based on the type of autofocus light being used. In some implementations, the reflective component 226 is reflective in at least part of the near infrared wavelength range (e.g., reflection somewhere between about 750 nm and about 1400 nm.)

The optical system 200 includes one or more structure 228. The structure 228 can be positioned behind the filter 216 in the travel direction of light arriving from the tube lens 214. In some implementations, the structure 228 absorbs light that was transmitted through the filter 216, the absorption preventing the light from reaching the sensor 220 or another region of the optical system 200. For example, the structure 228 can absorb some (but not all) autofocus light that has been reflected at the substrate 202.

In operation of the optical system 200, autofocus light 230A and autofocus light 230B can be formed by the lateral displacement prism 224. The autofocus light 230A and the autofocus light 230B diverge at a predetermined angle from each other. Each of the autofocus light 230A and the autofocus light 230B can be conveyed through the filter 208 and through the objective 204, and impinge on the substrate 202. In some implementations, reflection of the autofocus light 230A and the autofocus light 230B at the substrate 202 can form autofocus light 232A, autofocus light 232B, autofocus light 234A, and autofocus light 234B. For example, the autofocus lights 232A-232B can result from reflection of the autofocus lights 230A-230B, respectively, at a first layer or other surface at the substrate 202. As such, the optical system 200 can direct the autofocus lights 232A-232B toward the filter 216. As another example, the autofocus lights 234A-234B can result from reflection of the autofocus lights 230A-230B, respectively, at a second layer or other surface at the substrate 202. As such, the optical system 200 can direct the autofocus lights 234A-234B toward the filter 216.

The autofocus lights 232A-232B and the autofocus lights 234A-234B can be transmitted through the filter 216. For example, the autofocus lights 232A-232B and the autofocus lights 234A-234B can have wavelengths outside the wavelength range(s) for which the filter 216 is reflective. The reflective component 226 can be positioned at a spatial location such that one or more, but not all, of the autofocus lights 232A-232B and the autofocus lights 234A-234B will be incident at the reflective component 226. For example, the autofocus light 232A and the autofocus light 232B can be incident at the reflective component 226. As such, the reflective component 226 can direct the autofocus light 232A and the autofocus light 232B toward the sensor 220. On the other hand, the autofocus light 234A and the autofocus light 234B may not be incident at the reflective component 226. Rather, the autofocus light 234A and the autofocus light 234B may be incident at the structure 228. In some implementations, the structure 228 absorbs the autofocus light 234A and the autofocus light 234B. For example, this can prevent the autofocus light 234A and the autofocus light 234B from reaching the sensor 220.

An autofocus process can be performed based on one or more portions of autofocus light detected by the sensor 220. In some implementations, a distance between the autofocus light 232A and the autofocus light 232B at the sensor 220 can indicate a distance between the objective 204 (e.g., a lens thereof) and the substrate 202. For example, a predefined distance on the sensor 220 can be specified that corresponds to the substrate 202 being in focus of the objective. The optical system 200 can therefore automatically adjust the distance between the objective 204 and the substrate 202 based on the detected distance between the autofocus light 232A and the autofocus light 232B at the sensor 220.

The optical system 200 illustrates an example of a method that includes directing, using an objective and a first reflective surface, first autofocus light toward a sensor. For example, the optical system 200 directs the autofocus light 232A and the autofocus light 232B toward the sensor 220 using the objective 204 and a reflective surface of the reflective component 226. The first autofocus light is reflected from a first surface of a substrate. The method includes preventing second autofocus light from reaching the sensor, the second autofocus light reflected from a second surface of the substrate. For example, the optical system 200 includes the structure 210 that can block some autofocus light that was reflected at the substrate 202. As another example, the optical system 200 includes the structure 228 that can prevent the autofocus light 234A and the autofocus light 234B from reaching the sensor 220.

The optical system 200 illustrates an example of a system that includes a substrate to hold a sample for analysis, a sensor and an objective. For example, the optical system 200 includes the substrate 202, the sensor 220, and the objective 204. The system includes a first reflective surface to direct first autofocus light to the sensor, the first autofocus light reflected from a first surface of the substrate and conveyed by the objective. For example, the optical system 200 includes a reflective surface at the reflective component 226. The system includes a second reflective surface to direct emission light to the sensor, the emission light originating from the sample and conveyed by the objective. For example, the optical system 200 includes the filter 216 that can direct emission light (not shown) toward the sensor 220. The system includes a structure that prevents second autofocus light from reaching the sensor, the second autofocus light reflected from a second surface of the substrate and conveyed by the objective. For example, the optical system 200 includes the structure 210 that can block some autofocus light that was reflected at the substrate 202. As another example, the optical system 200 includes the structure 228 that can prevent the autofocus light 234A and the autofocus light 234B from reaching the sensor 220.

The optical system 200 illustrates an example of a system that includes a beam splitter to form left autofocus light and right autofocus light that diverge at a predetermined angle from each other. For example, the optical system 200 includes a beam splitter within the lateral displacement prism 224 to form the autofocus light 230A and the autofocus light 230B that diverge at a predetermined angle from each other. The system includes an objective to convey the left autofocus light and the right autofocus light toward a first surface of a substrate. For example, the optical system 200 includes the objective 204 that conveys the autofocus lights 230A-230B toward the substrate 202. The system includes a sensor to receive at least a first part of the left autofocus light and at least a first part of the right autofocus light, after reflection off the first surface. For example, the optical system 200 includes the sensor 220. A predefined separation between the first part of the left autofocus light and the first part of the right autofocus light at the sensor indicates that the substrate is in focus of the objective. For example, the optical system 200 can determine the distance between the autofocus lights 230A-230B at the sensor 220.

Figure 3:
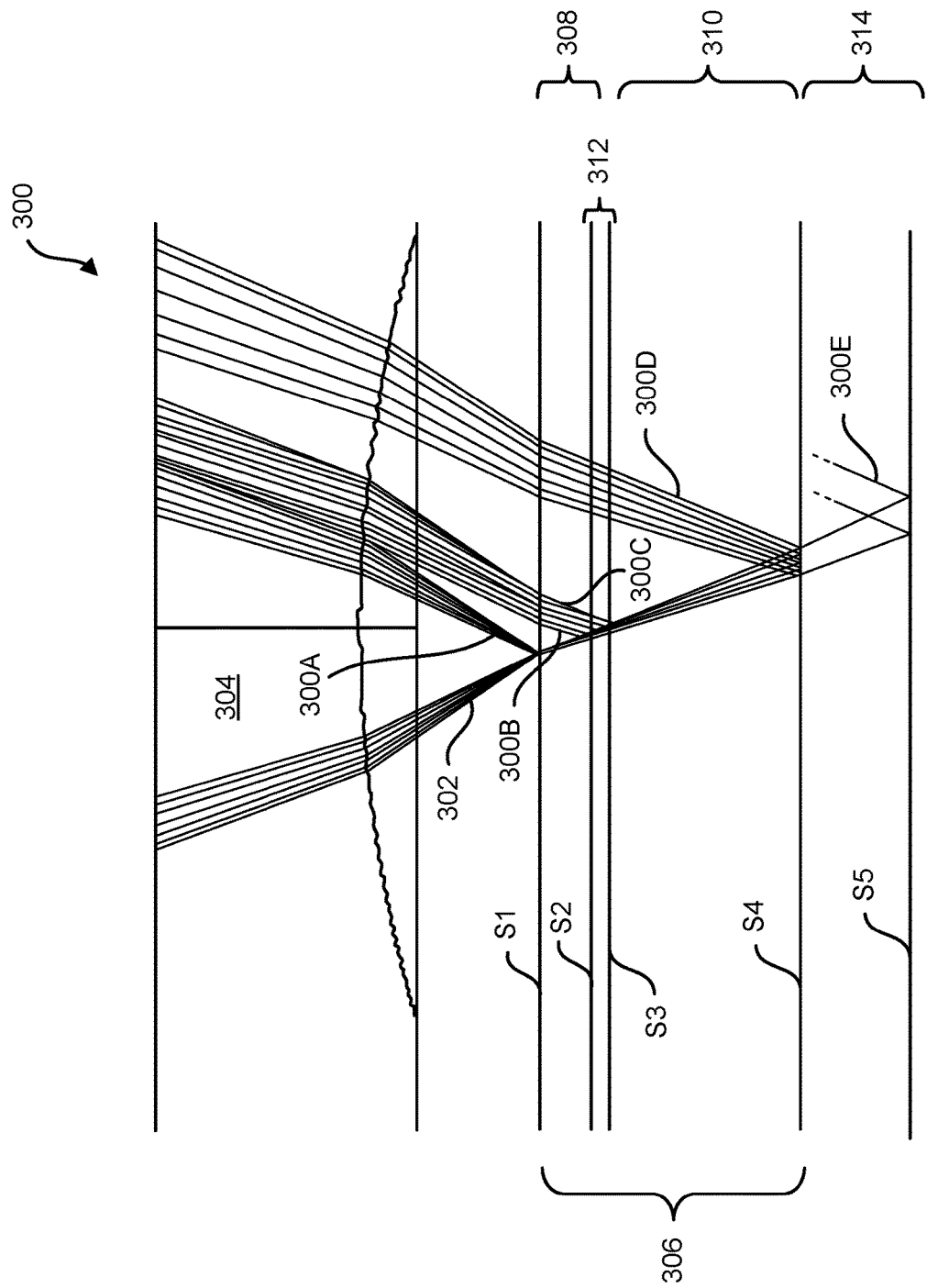
FIG. 3 is a diagram illustrating an example of creation of desired and unwanted reflections off of multiple surfaces of a multilayer sample substrate in some embodiments.

FIG. 3 is a diagram illustrating an example of creation of desired and unwanted reflections 300 off of multiple surfaces of a multilayer sample substrate in some embodiments. The reflections 300 can be created by one or more embodiments described herein. In some implementations, the reflections 300 can be created using the system 100 in FIG. 1. In some implementations, the reflections 300 can be created using the optical system 200 in FIG. 2. In some implementations, the reflections 300 can be created using the optical system 500 in FIG. 5. In some implementations, the reflections 300 can be created using the optical system 800 in FIG. 8A. In some implementations, the reflections 300 can be created using the optical system 820 in FIG. 8B. In some implementations, the reflections 300 can be created using the optical system 1100 in FIG. 11. In some implementations, the reflections 300 can be created using the optical system 1200 in FIG. 12. In some implementations, the reflections 300 can be created using the optical system 1300 in FIG. 13. In some implementations, the reflections 300 can be created using the optical system 1400 in FIG. 14. In some implementations, the reflections 300 can be created using the imaging module 1800 in FIGS. 18 and 19A-19B. In some implementations, the reflections 300 can be created using the SIM assembly 2000 in FIG. 20. In some implementations, the reflections 300 can be created using the imaging module 2100 in FIG. 21. In some implementations, the reflections 300 can be created using the imaging module 2200 in FIG. 22. In some implementations, the reflections 300 can be created using the imaging module 2400 in FIG. 24. In some implementations, the reflections 300 can be created using the optical system 2500 in FIG. 25. In some implementations, the reflections 300 can be created using the optical system 2600 in FIG. 26. In some implementations, the reflections 300 can be created using the reflective component 2700 in FIG. 27. In some implementations, the reflections 300 can be created using the reflective component 2800 in FIG. 28. In some implementations, the reflections 300 can be created using the SIM assembly 3400 in FIG. 34. In some implementations, the reflections 300 can be created using the RIGS 3500 in FIG. 35. In some implementations, the reflections 300 can be created using the RIGS 3600 in FIG. 36. In some implementations, the reflections 300 can be created using the piezo phase shifter 3700 in FIG. 37. In some implementations, the reflections 300 can be created using the piezo phase shifter 3800 in FIG. 38. In some implementations, the reflections 300 can be created using the projection lens 3900 in FIG. 39. In some implementations, the reflections 300 can be created using the projection lens 4000 in FIG. 40. In some implementations, the reflections 300 can be created using the field of view 4100 in FIG. 41.

The reflections 300 are created as a result of light 302 being conveyed from an objective 304 toward a flow cell 306, the objective 304 and the flow cell 306 schematically illustrated for simplicity. In some implementations, the light 302 is autofocus light. For example, the light 302 can be one beam (e.g., a left beam) of a pair of beams of autofocus light formed so that the light 302 diverges from another beam (not shown) by a predetermined angle (e.g., the other beam can be a right beam).

In some implementations, the flow cell 306 includes a substrate 308 (e.g., cladding of a transparent material), a substrate 310 (e.g., cladding of a transparent material), and a channel 312 (e.g., a fluidic channel) formed between the substrates 308 and 310. For example, a sample (e.g., of nucleic material) and/or one or more chemical substances (e.g., sequencing reagent) can be located in, and/or flowed through, the channel 312. One or more additional layers or other surfaces can be associated with the flow cell 306. A layer 314 is here positioned at one side of the substrate 310, opposite from the channel 312. In some implementations, the layer 314 bonds the flow cell 306 to another structure. For example, the layer 314 can include a pressure-sensitive adhesive that bonds the flow cell 306 to a carrier plate.

The flow cell 306 includes multiple layers or other surfaces. Here, a surface S1 can be characterized as a top surface of the substrate 308. A surface S2 can be referred to as a bottom surface of the substrate 308, or as a top surface of the channel 312, or both. A surface S3 can be referred to as a bottom surface of the channel 312, or as a top surface of the substrate 310, or both. A surface S4 can be characterized as a bottom surface of the substrate 310. A surface S5 can be characterized as a bottom surface of the layer 314.

As the light 302 is incident on the flow cell 306, the light 302 can be reflected by one or more of the surfaces S1-S5, the reflection giving rise to a corresponding one of the reflections 300. In some implementations, a reflection 300A is formed by reflection of the light 302 off the surface S1. In some implementations, a reflection 300B is formed by reflection of the light 302 off the surface S2. In some implementations, a reflection 300C is formed by reflection of the light 302 off the surface S3. In some implementations, a reflection 300D is formed by reflection of the light 302 off the surface S4. In some implementations, a reflection 300E is formed by reflection of the light 302 off the surface S5.

One or more reflected portions of autofocus light can be deemed more relevant than another portion. In some implementations, autofocus light reflected from a surface where sample material is located, or is intended to be located, can be relatively more relevant than a surface where sample material should not be located. For example, the reflections 300B-300C (i.e., from the surfaces S2 and S3) can here be considered relatively more relevant than the reflection 300A (i.e., from S1), the reflection 300D (i.e., from S4), or the reflection 300E (i.e., from S5).

Figure 4:
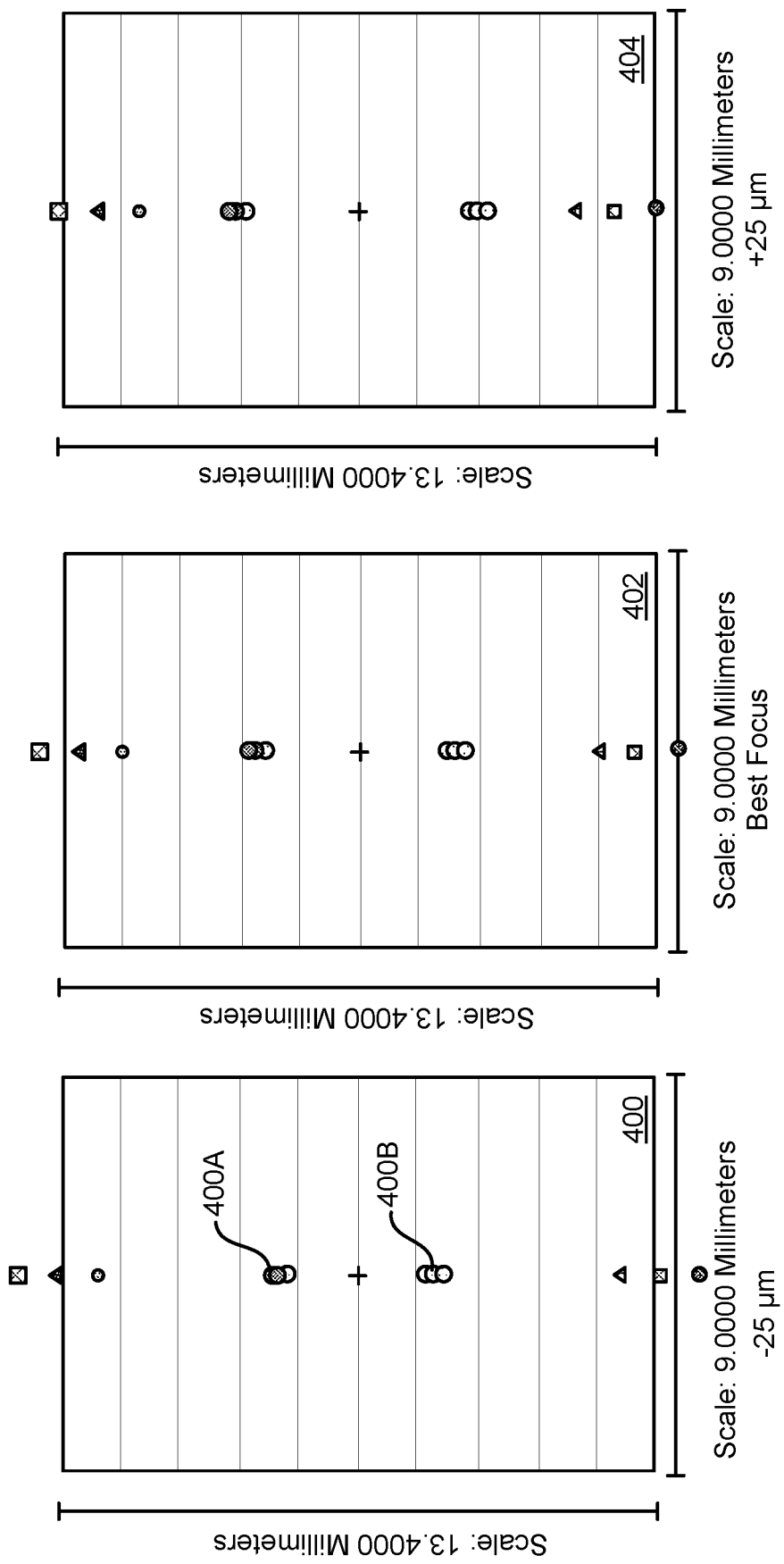
FIGS. 4A-4C shows autofocus light registered at a sensor.

An autofocus process can be more difficult to perform and/or can produce less satisfactory results if relevant autofocus light appears together with less relevant autofocus light at a sensor. FIGS. 4A-4C shows autofocus light registered at a sensor. The detection of light is illustrated using graphs 400, 402, and 404. Here, the graph 400 corresponds to an adjustment of the optical system that is out of focus, wherein the z-distance between the objective and the substrate is 25 micrometers (μm) more than optimal. The graph 402 corresponds to an adjustment of the optical system that is at best focus, wherein the z-distance between the objective and the substrate is optimal. The graph 404 corresponds to an adjustment of the optical system that is out of focus, wherein the z-distance between the objective and the substrate is 25 μm less than optimal.

However, the above focus circumstances (i.e., whether the objective is −25 μm from best focus, or is at best focus, or is at +25 μm from best focus) may not be known during the autofocus process. Rather, the autofocus process seeks to identify when the optical system is, or is not, in best focus. The optical system based on which the graphs 400, 402, and 404 were generated did not have the benefit of some aspects of the present subject matter. For example, the optical system was not equipped to steer relevant autofocus light away from less relevant autofocus light. In each of the graphs 400, 402, and 404, the spots of the reflections off surfaces S4-S5 (FIG. 3) will overlap with the spots of the reflections off surfaces S2-S3 (FIG. 3). For example, while each spot in a spot cluster 400A originates with the same beam of autofocus light (e.g., a right beam), the spots are spatially distributed and are difficult to distinguish from each other. As another example, while each spot in a spot cluster 400B originates with the same beam of autofocus light (e.g., a left beam), the spots are spatially distributed and are difficult to distinguish from each other. Due to the overlap, it can be challenging for an autofocus module to determine when the relevant aspects of the spot clusters 400A-400B, such as the spots from reflection off the surfaces S2-S3, are separated by a predefined distance. This can compromise autofocus or other focus tracking processes.

Figure 5:
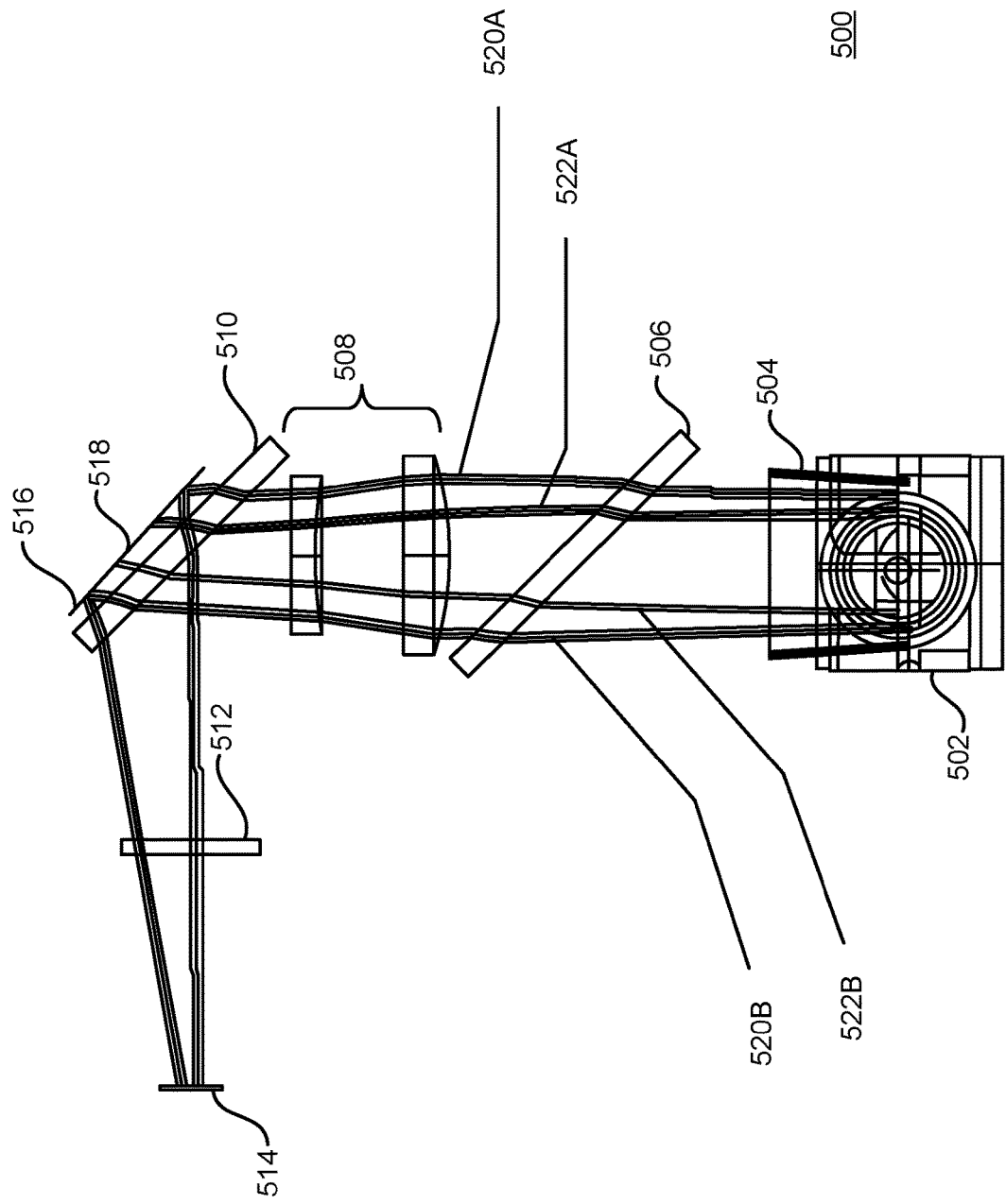
FIG. 5 shows an embodiment of an optical system.

In some implementations, relevant autofocus light can be steered away from less relevant autofocus light. FIG. 5 shows an embodiment of an optical system 500. The optical system 500 can include, or be used with, one or more other embodiments described herein. In some implementations, the optical system 500 can be included within the system 100 in FIG. 1. In some implementations, the optical system 500 can include, or be used with, the optical system 200 in FIG. 2. In some implementations, the optical system 500 can include, or be used with, the optical system 800 in FIG. 8A. In some implementations, the optical system 500 can include, or be used with, the optical system 820 in FIG. 8B. In some implementations, the optical system 500 can include, or be used with, the lateral displacement prism 1000 in FIGS. 10A-10C. In some implementations, the optical system 500 can include, or be used with, the optical system 1100 in FIG. 11. In some implementations, the optical system 500 can include, or be used with, the optical system 1200 in FIG. 12. In some implementations, the optical system 500 can include, or be used with, the optical system 1300 in FIG. 13. In some implementations, the optical system 500 can include, or be used with, the optical system 1400 in FIG. 14. In some implementations, the optical system 500 can include, or be used with, the lateral displacement prism 1600 in FIGS. 16A-16B. In some implementations, the optical system 500 can include, or be used with, the beam splitter 1700 in FIG. 17. In some implementations, the optical system 500 can include, or be used with, the imaging module 1800 in FIGS. 18 and 19A-19B. In some implementations, the optical system 500 can include, or be used with, the SIM assembly 2000 in FIG. 20. In some implementations, the optical system 500 can include, or be used with, the imaging module 2100 in FIG. 21. In some implementations, the optical system 500 can include, or be used with, the imaging module 2200 in FIG. 22. In some implementations, the optical system 500 can include, or be used with, the imaging module 2400 in FIG. 24. In some implementations, the optical system 500 can include, or be used with, the optical system 2500 in FIG. 25. In some implementations, the optical system 500 can include, or be used with, the optical system 2600 in FIG. 26. In some implementations, the optical system 500 can include, or be used with, the reflective component 2700 in FIG. 27. In some implementations, the optical system 500 can include, or be used with, the reflective component 2800 in FIG. 28. In some implementations, the optical system 500 can generate the autofocus light 2900 in FIG. 29. In some implementations, the optical system 500 can generate the autofocus light 3000 in FIG. 30. In some implementations, the optical system 500 can generate the autofocus light 3100 in FIGS. 31A-31C. In some implementations, the optical system 500 can include, or be used with, the laser engine heat sink 3200 in FIGS. 32A-32C. In some implementations, the optical system 500 can include, or be used with, the laser engine heat sink 3300 in FIGS. 33A-33C. In some implementations, the optical system 500 can include, or be used with, the SIM assembly 3400 in FIG. 34. In some implementations, the optical system 500 can include, or be used with, the RIGS 3500 in FIG. 35. In some implementations, the optical system 500 can include, or be used with, the RIGS 3600 in FIG. 36. In some implementations, the optical system 500 can include, or be used with, the piezo phase shifter 3700 in FIG. 37. In some implementations, the optical system 500 can include, or be used with, the piezo phase shifter 3800 in FIG. 38. In some implementations, the optical system 500 can include, or be used with, the projection lens 3900 in FIG. 39. In some implementations, the optical system 500 can include, or be used with, the projection lens 4000 in FIG. 40. In some implementations, the optical system 500 can generate the field of view 4100 in FIG. 41.

The optical system 500 includes an optical component 502. The optical component 502 can include a substrate (not shown). The substrate can be used for holding one or more samples to be analyzed. In some implementations, the sample at the substrate can include nucleic material. For example, the substrate can include a flow cell for imaging nucleic matter.

The optical component 502 includes an objective (not shown). For example, the objective can be used for directing autofocus light at the substrate and for conveying reflected autofocus light away from the substrate for performing an autofocus procedure. For example, the objective can be used for directing excitation light at the sample on the substrate, and for conveying emitted fluorescence away from the sample for collection.

The optical component 502 can include one or more filters (not shown). The filter can be a dichroic filter. In some implementations, the filter can be used for removing one or more irrelevant portions from light being conveyed towards and/or away from the substrate. For example, the filter can serve to remove excitation light that has been reflected at the substrate. As another example, the filter can reflect autofocus light reflected at the substrate and emission light generated at the sample and thereby facilitate that the autofocus light and the emission light are conveyed to further aspects of the optical system 500. The filter can allow one or more types of light to enter into the flow. For example, autofocus light can be added through the filter and thereby be conveyed toward the substrate.

The optical system 500 includes a structure 504. The structure 504 can be the component directly upstream of the optical component 502. The structure 504 can serve to block one or more beams that arrive from the optical component 502 from being conveyed to further aspects of the optical system 500. In some implementations, the structure 504 can block one or more aspects of autofocus light that have been reflected at the substrate. For example, the structure 504 can block autofocus light reflected from a top surface of a flow cell (e.g., the surface S1 in FIG. 3).

The optical system 500 includes a filter 506. The filter 506 can be the component directly upstream of the structure 504. The filter 506 can be a dichroic filter. In some implementations, the filter 506 can transmit autofocus light reflected at the substrate and emission light generated at the sample and thereby facilitate that the autofocus light and the emission light are conveyed to further aspects of the optical system 500. The filter 506 can divide emission light from the substrate among two or more paths. In some implementations, each path can be associated with a respective color channel. For example, the components upstream of the filter 506 can be associated with one color channel (e.g., a blue or green color channel), and other components (not shown) can be associated with another color channel.

The optical system 500 includes at least one tube lens 508. The tube lens(es) 508 can be the component(s) directly upstream of the filter 506. In some implementations, the tube lens 508 can serve to focus incident light in preparation for detection thereof. For example, the tube lens 508 can focus autofocus light for detection as part of an autofocus process. As another example, the tube lens 508 can focus emission light for detection as part of an analysis process.

The optical system 500 includes a filter 510. The filter 510 can be the component directly upstream of the tube lens 508. The filter 510 can be a dichroic filter. The filter 510 can, alone or together with at least one other component, facilitate steering of one or more types of light. In some implementations, the filter 510 can reflect emission light and transmit autofocus light. For example, the filter 510 can have an antireflective coating that prevents reflection (i.e., facilitates transmission) of autofocus light, and that does reflect emission light. In other implementations, the filter 510 can be configured to prevent reflection (i.e., facilitate transmission) of emission light, and reflect autofocus light.

The optical system 500 includes a filter 512. The filter 512 can be the component directly upstream of the filter 510. The filter 512 can be a dichroic filter. In some implementations, the filter 512 can condition light in one or more regards in preparation for detection. For example, the filter 512 can provide bandpass filtering based on the wavelength(s) of reflected autofocus light and on the wavelength(s) of emission light so as to eliminate noise.

The optical system 500 includes a sensor 514. The sensor 514 can be the component directly upstream of the filter 512. The sensor 514 can detect reflected autofocus light during an autofocus procedure, and/or detect emission light during an analysis procedure. For example, the sensor 514 includes a rectangular array of light-sensitive elements that can detect the respective locations of one or more portions of light incident at the sensor 514.

The optical system 500 includes one or more sources of autofocus light (not shown). In some implementations, laser light can be provided via a fiberoptic cable by a superluminescent diode that provides autofocus light based on superluminescence (e.g., spontaneously emitted light amplified by stimulated emission). For example, the autofocus light can be collimated by being passed through an aspheric lens.

The initial autofocus light can be split (or laterally displaced) into two or more parts of autofocus light. The optical system 500 includes a beam splitter (not shown). The beam splitter can be included in a lateral displacement prism. The beam splitter can be positioned proximate the optical component 502 so as to inject autofocus light to be conveyed toward the substrate. The beam splitter can form respective parts of autofocus light that are divergent from each other, for example as described below.

The optical system 500 includes one or more reflective component 516. The reflective component 516 can include one or more reflective surfaces and can be positioned behind the filter 510 in the travel direction of light arriving from the tube lens 508. In some implementations, the reflective component 516 reflects light that was transmitted through the filter 510, the reflection causing the light to be directed toward the sensor 514. For example, the reflective component 516 can reflect some (but not all) autofocus light that has been reflected at the substrate. The reflective component 516 can have optical properties based on the type of autofocus light being used. In some implementations, the reflective component 516 is reflective in at least part of the near infrared wavelength range (e.g., reflection somewhere between about 750 nm and about 1400 nm.)

The optical system 500 includes one or more structure 518. The structure 518 can be positioned behind the filter 510 in the travel direction of light arriving from the tube lens 508. In some implementations, the structure 518 absorbs light that was transmitted through the filter 510, the absorption preventing the light from reaching the sensor 514 or another region of the optical system 500. For example, the structure 518 can absorb some (but not all) autofocus light that has been reflected at the substrate.

In operation of the optical system 500, left autofocus light and right autofocus light can be formed by the beam splitter. The left autofocus light and the right autofocus light diverge at a predetermined angle from each other. Each of the left autofocus light and the right autofocus light can be conveyed through the optical component 502 and impinge on the substrate. In some implementations, reflection of the left autofocus light and the right autofocus light at the substrate can form autofocus light 520A, autofocus light 520B, autofocus light 522A, and autofocus light 522B. For example, the autofocus lights 520A-520B can result from reflection of the left autofocus light and the right autofocus light, respectively, at a first layer or other surface at the substrate (e.g., the S2 surface and/or the S3 surface in FIG. 3). As such, the optical system 500 can direct the autofocus lights 520A-520B toward the filter 510. As another example, the autofocus lights 522A-522B can result from reflection of the left autofocus light and the right autofocus light, respectively, at a second layer or other surface at the substrate (e.g., the S4 surface and/or the S5 surface in FIG. 3). As such, the optical system 500 can direct the autofocus lights 522A-522B toward the filter 510.

The autofocus lights 520A-520B and the autofocus lights 522A-522B can be transmitted through the filter 510. For example, the autofocus lights 520A-520B and the autofocus lights 522A-522B can have wavelengths outside the wavelength range(s) for which the filter 510 is reflective. The reflective component 516 can be positioned at a spatial location such that one or more, but not all, of the autofocus lights 520A-520B and the autofocus lights 522A-522B will be incident at the reflective component 516. For example, the autofocus light 520A and the autofocus light 520B can be incident at the reflective component 516. As such, the reflective component 516 can direct the autofocus light 520A and the autofocus light 520B toward the sensor 514. On the other hand, the autofocus light 522A and the autofocus light 522B may not be incident at the reflective component 516. Rather, the autofocus light 522A and the autofocus light 522B may be incident at the structure 518. In some implementations, the structure 518 absorbs the autofocus light 522A and the autofocus light 522B. For example, this can prevent the autofocus light 522A and the autofocus light 522B from reaching the sensor 514.

An autofocus process can be performed based on one or more portions of autofocus light detected by the sensor 514. In some implementations, a distance between the autofocus light 520A and the autofocus light 520B at the sensor 514 can indicate a distance between an objective of the optical component 502 and the substrate. For example, a predefined distance on the sensor 514 can be specified that corresponds to the substrate being in focus of the objective. The optical system 500 can therefore automatically adjust the distance between the objective and the substrate based on the detected distance between the autofocus light 520A and the autofocus light 520B at the sensor 514.

Figure 6C:
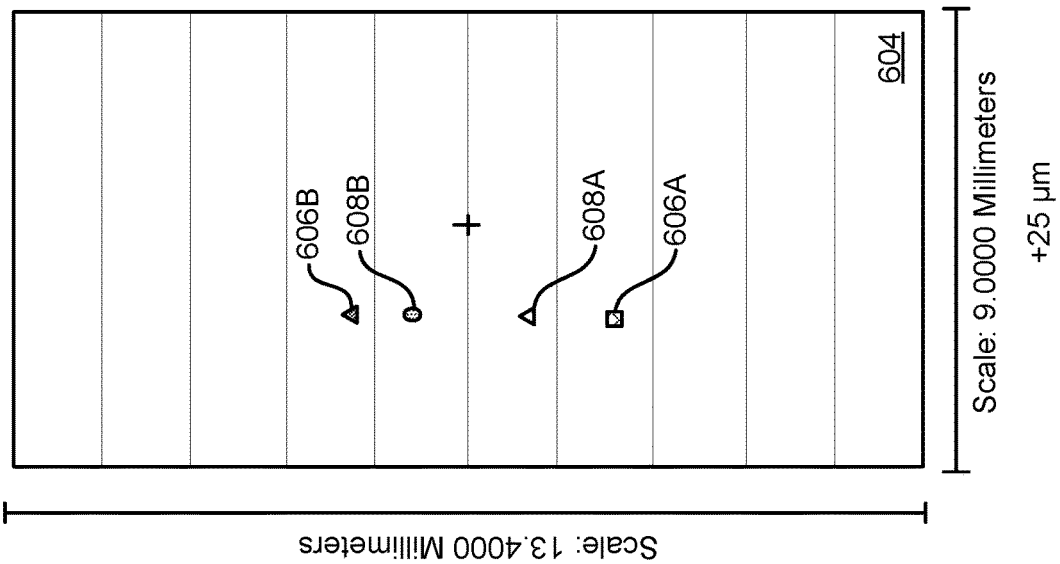
FIGS. 6A-6C shows autofocus light registered at a sensor.
Figure 6B:
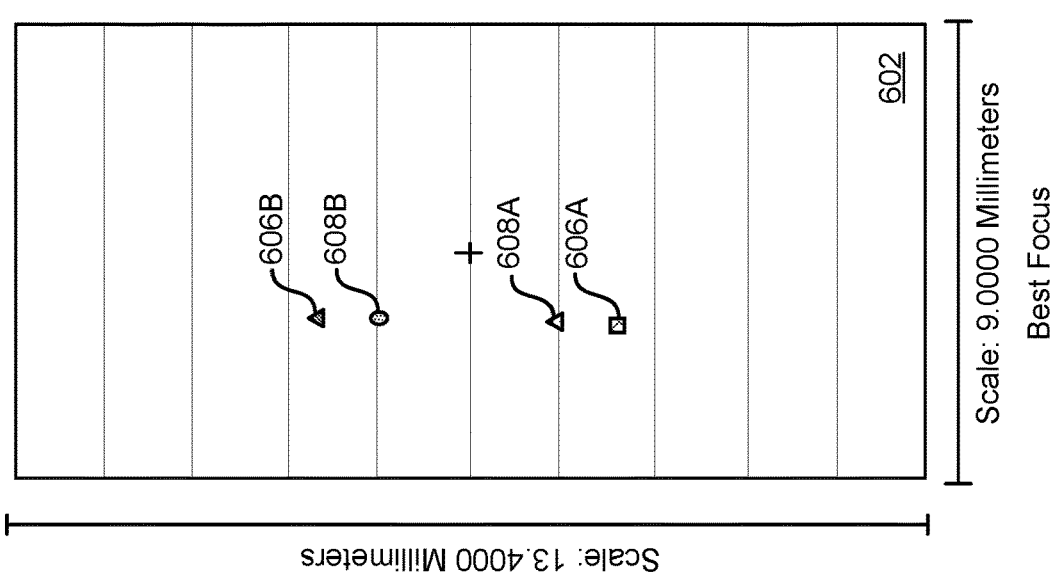
Figure 6A:
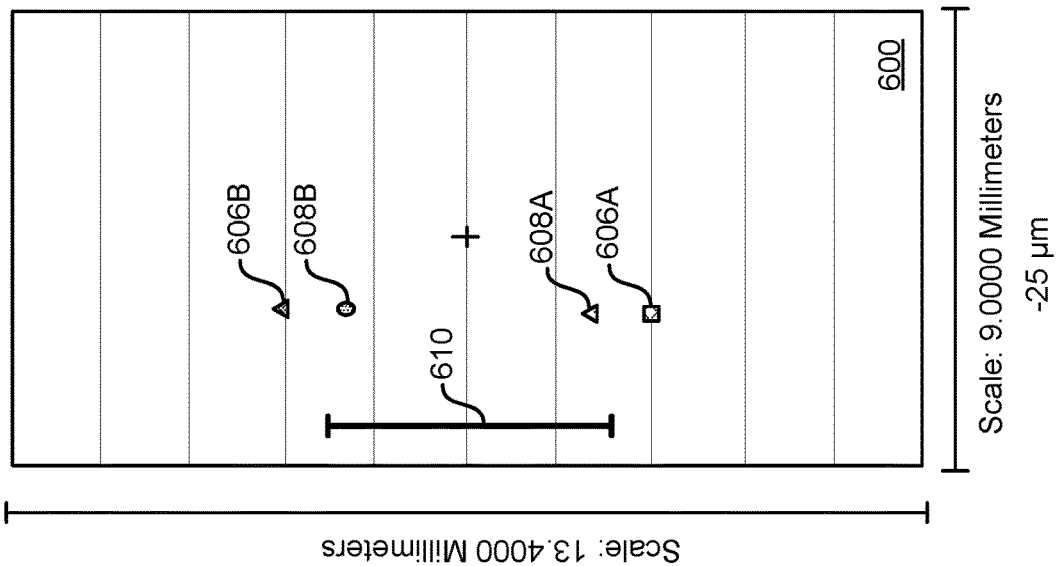

FIGS. 6A-6C shows autofocus light registered at a sensor. The registration of autofocus light is illustrated using graphs 600, 602, and 604. The graphs 600, 602, and 604 can be created using one or more embodiments described herein. In some implementations, the graphs 600, 602, and 604 can be created using the system 100 in FIG. 1. In some implementations, the graphs 600, 602, and 604 can be created using the optical system 200 in FIG. 2. In some implementations, the graphs 600, 602, and 604 can be created using the optical system 500 in FIG. 5. In some implementations, the graphs 600, 602, and 604 can be created using the optical system 800 in FIG. 8A. In some implementations, the graphs 600, 602, and 604 can be created using the optical system 820 in FIG. 8B. In some implementations, the graphs 600, 602, and 604 can be created using the optical system 1100 in FIG. 11. In some implementations, the graphs 600, 602, and 604 can be created using the optical system 1200 in FIG. 12. In some implementations, the graphs 600, 602, and 604 can be created using the optical system 1300 in FIG. 13. In some implementations, the graphs 600, 602, and 604 can be created using the optical system 1400 in FIG. 14. In some implementations, the graphs 600, 602, and 604 can be created using the imaging module 1800 in FIGS. 18 and 19A-19B. In some implementations, the graphs 600, 602, and 604 can be created using the SIM assembly 2000 in FIG. 20. In some implementations, the graphs 600, 602, and 604 can be created using the imaging module 2100 in FIG. 21. In some implementations, the graphs 600, 602, and 604 can be created using the imaging module 2200 in FIG. 22. In some implementations, the graphs 600, 602, and 604 can be created using the imaging module 2400 in FIG. 24. In some implementations, the graphs 600, 602, and 604 can be created using the optical system 2500 in FIG. 25. In some implementations, the graphs 600, 602, and 604 can be created using the optical system 2600 in FIG. 26. In some implementations, the graphs 600, 602, and 604 can be created using the reflective component 2700 in FIG. 27. In some implementations, the graphs 600, 602, and 604 can be created using the reflective component 2800 in FIG. 28. In some implementations, the graphs 600, 602, and 604 can be created using the SIM assembly 3400 in FIG. 34. In some implementations, the graphs 600, 602, and 604 can be created using the RIGS 3500 in FIG. 35. In some implementations, the graphs 600, 602, and 604 can be created using the RIGS 3600 in FIG. 36. In some implementations, the graphs 600, 602, and 604 can be created using the piezo phase shifter 3700 in FIG. 37. In some implementations, the graphs 600, 602, and 604 can be created using the piezo phase shifter 3800 in FIG. 38. In some implementations, the graphs 600, 602, and 604 can be created using the projection lens 3900 in FIG. 39. In some implementations, the graphs 600, 602, and 604 can be created using the projection lens 4000 in FIG. 40. In some implementations, the graphs 600, 602, and 604 can be created using the field of view 4100 in FIG. 41.

In the graphs 600, 602, and 604, a spot 606A corresponds to a reflection of one autofocus light beam (e.g., left autofocus light) off one substrate surface (e.g., the S2 surface in FIG. 3), and a spot 606B corresponds to a reflection of another autofocus light beam (e.g., right autofocus light) off the substrate surface (e.g., the S2 surface in FIG. 3). In the graphs 600, 602, and 604, a spot 608A corresponds to a reflection of the one autofocus light beam (e.g., left autofocus light) off another substrate surface (e.g., the S3 surface in FIG. 3), and a spot 608B corresponds to a reflection of another autofocus light beam (e.g., right autofocus light) off the other substrate surface (e.g., the S3 surface in FIG. 3).

Here, the graphs 600, 602, and 604 are labeled according to whether the S2 surface (FIG. 3) is currently in focus; that is, according to whether a distance between the spots 606A-606B in the graphs 600, 602, and 604 is equal to a predefined separation 610 associated with the optical system. In the graph 600, the distance between the spots 606A-606B is greater than the predefined separation 610; that is, the graph 600 corresponds to an adjustment of the optical system that is out of focus, wherein the z-distance between the objective and the substrate is 25 micrometers (μm) less than optimal. In the graph 602, the distance between the spots 606A-606B is equal to the predefined separation 610; that is, the graph 602 corresponds to an adjustment of the optical system that is at best focus, wherein the z-distance between the objective and the substrate is optimal. In the graph 604, the distance between the spots 606A-606B is shorter than the predefined separation 610; that is, the graph 604 corresponds to an adjustment of the optical system that is out of focus, wherein the z-distance between the objective and the substrate is 25 μm more than optimal.

However, the above focus circumstances (i.e., whether the objective is −25 μm from best focus, or is at best focus, or is at +25 μm from best focus) may not be known during the autofocus process. Rather, the autofocus process seeks to identify when the optical system is, or is not, in best focus. The optical system based on which the graphs 600, 602, and 604 were generated has the benefit of at least some aspects of the present subject matter. For example, the optical system is equipped to steer relevant autofocus light away from less relevant autofocus light. In each of the graphs 600, 602, and 604, the spots of the reflections off surfaces S4-S5 (FIG. 3) are not visible and therefore do not overlap with the spots of the reflections off surfaces S2-S3 (FIG. 3). The autofocus module can therefore more accurately determine when the distance between the spots 606A-606B is equal to the predefined separation 610. This can improve autofocus or other focus tracking processes.

Figure 7C:
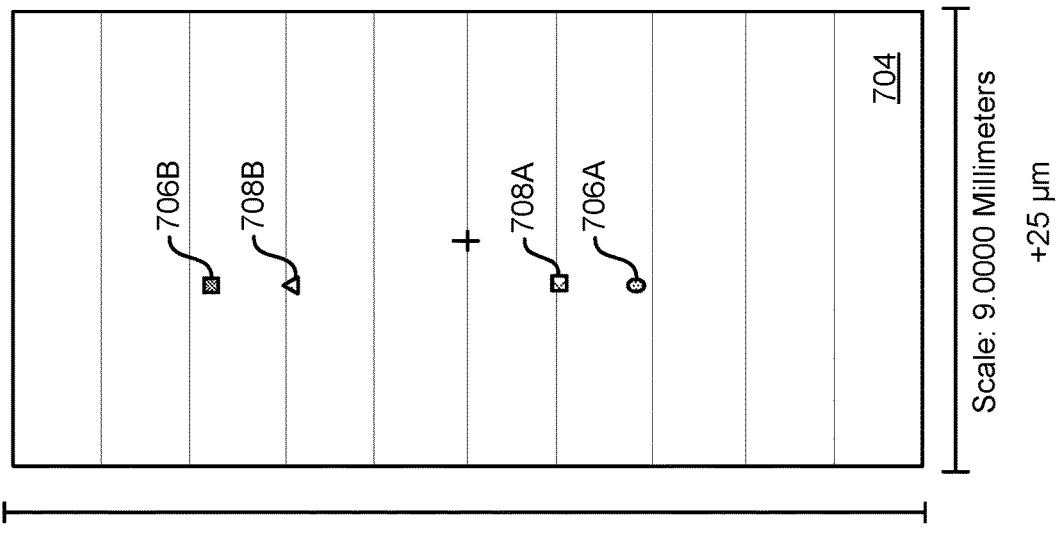
FIGS. 7A-7C shows autofocus light registered at a sensor.
Figure 7B:
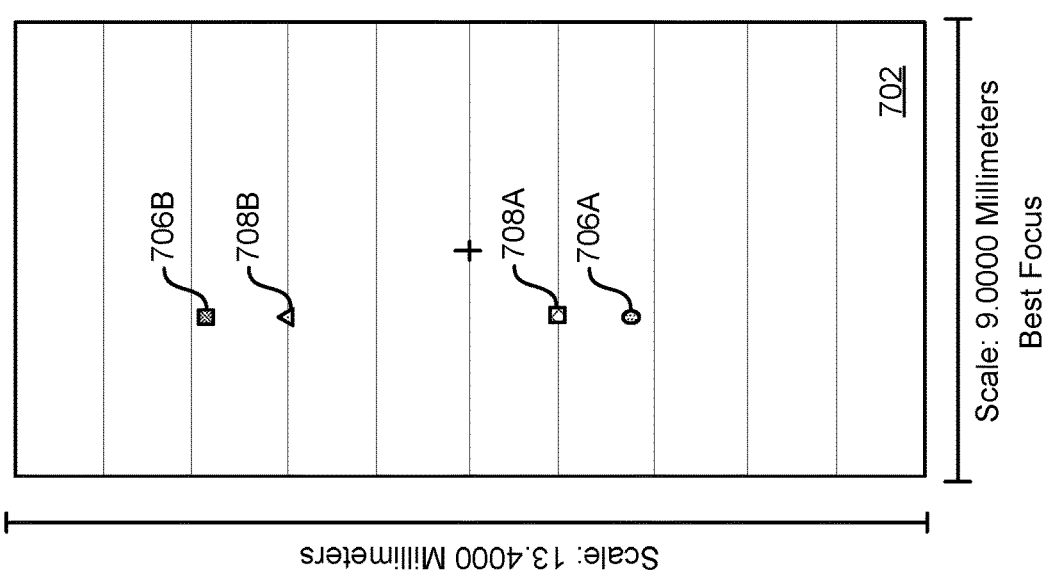
Figure 7A:
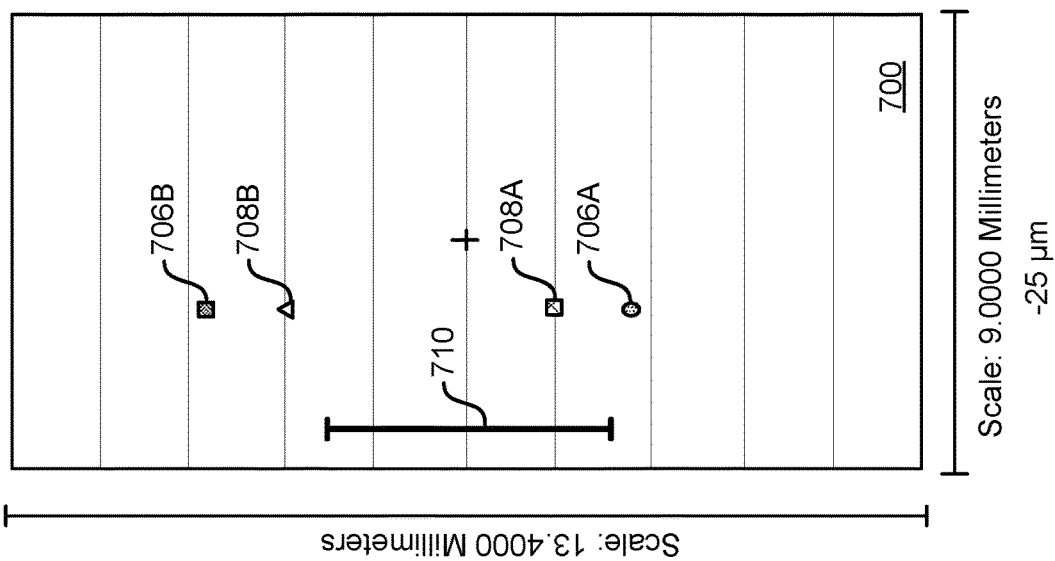

FIGS. 7A-7C shows autofocus light registered at a sensor. The registration of autofocus light is illustrated using graphs 700, 702, and 704. The graphs 700, 702, and 704 can be created using one or more embodiments described herein. In some implementations, the graphs 700, 702, and 704 can be created using the system 100 in FIG. 1. In some implementations, the graphs 700, 702, and 704 can be created using the optical system 200 in FIG. 2. In some implementations, the graphs 700, 702, and 704 can be created using the optical system 500 in FIG. 5. In some implementations, the graphs 700, 702, and 704 can be created using the optical system 800 in FIG. 8A. In some implementations, the graphs 700, 702, and 704 can be created using the optical system 820 in FIG. 8B. In some implementations, the graphs 700, 702, and 704 can be created using the optical system 1100 in FIG. 11. In some implementations, the graphs 700, 702, and 704 can be created using the optical system 1200 in FIG. 12. In some implementations, the graphs 700, 702, and 704 can be created using the optical system 1300 in FIG. 13. In some implementations, the graphs 700, 702, and 704 can be created using the optical system 1400 in FIG. 14. In some implementations, the graphs 700, 702, and 704 can be created using the imaging module 1800 in FIGS. 18 and 19A-19B. In some implementations, the graphs 700, 702, and 704 can be created using the SIM assembly 2000 in FIG. 20. In some implementations, the graphs 700, 702, and 704 can be created using the imaging module 2100 in FIG. 21. In some implementations, the graphs 700, 702, and 704 can be created using the imaging module 2200 in FIG. 22. In some implementations, the graphs 700, 702, and 704 can be created using the imaging module 2400 in FIG. 24. In some implementations, the graphs 700, 702, and 704 can be created using the optical system 2500 in FIG. 25. In some implementations, the graphs 700, 702, and 704 can be created using the optical system 2600 in FIG. 26. In some implementations, the graphs 700, 702, and 704 can be created using the reflective component 2700 in FIG. 27. In some implementations, the graphs 700, 702, and 704 can be created using the reflective component 2800 in FIG. 28. In some implementations, the graphs 700, 702, and 704 can be created using the SIM assembly 3400 in FIG. 34. In some implementations, the graphs 700, 702, and 704 can be created using the RIGS 3500 in FIG. 35. In some implementations, the graphs 700, 702, and 704 can be created using the RIGS 3600 in FIG. 36. In some implementations, the graphs 700, 702, and 704 can be created using the piezo phase shifter 3700 in FIG. 37. In some implementations, the graphs 700, 702, and 704 can be created using the piezo phase shifter 3800 in FIG. 38. In some implementations, the graphs 700, 702, and 704 can be created using the projection lens 3900 in FIG. 39. In some implementations, the graphs 700, 702, and 704 can be created using the projection lens 4000 in FIG. 40. In some implementations, the graphs 700, 702, and 704 can be created using the field of view 4100 in FIG. 41.

In the graphs 700, 702, and 704, a spot 706A corresponds to a reflection of one autofocus light beam (e.g., left autofocus light) off one substrate surface (e.g., the S2 surface in FIG. 3), and a spot 706B corresponds to a reflection of another autofocus light beam (e.g., right autofocus light) off the substrate surface (e.g., the S2 surface in FIG. 3). In the graphs 700, 702, and 704, a spot 708A corresponds to a reflection of the one autofocus light beam (e.g., left autofocus light) off another substrate surface (e.g., the S3 surface in FIG. 3), and a spot 708B corresponds to a reflection of another autofocus light beam (e.g., right autofocus light) off the other substrate surface (e.g., the S3 surface in FIG. 3).

Here, the graphs 700, 702, and 704 are labeled according to whether the S3 surface (FIG. 3) is currently in focus; that is, according to whether a distance between the spots 708A-708B in the graphs 700, 702, and 704 is equal to the predefined separation 710 associated with the optical system. In the graph 700, the distance between the spots 708A-708B is greater than the predefined separation 710; that is, the graph 700 corresponds to an adjustment of the optical system that is out of focus, wherein the z-distance between the objective and the substrate is 25 micrometers (μm) less than optimal. In the graph 702, the distance between the spots 708A-708B is equal to the predefined separation 710; that is, the graph 702 corresponds to an adjustment of the optical system that is at best focus, wherein the z-distance between the objective and the substrate is optimal. In the graph 704, the distance between the spots 708A-708B is shorter than the predefined separation 710; that is, the graph 704 corresponds to an adjustment of the optical system that is out of focus, wherein the z-distance between the objective and the substrate is 25 μm more than optimal.

However, the above focus circumstances (i.e., whether the objective is −25 μm from best focus, or is at best focus, or is at +25 μm from best focus) may not be known during the autofocus process. Rather, the autofocus process seeks to identify when the optical system is, or is not, in best focus. The optical system based on which the graphs 700, 702, and 704 were generated has the benefit of at least some aspects of the present subject matter. For example, the optical system is equipped to steer relevant autofocus light away from less relevant autofocus light. In each of the graphs 700, 702, and 704, the spots of the reflections off surfaces S4-S5 (FIG. 3) are not visible and therefore do not overlap with the spots of the reflections off surfaces S2-S3 (FIG. 3). The autofocus module can therefore more accurately determine when the distance between the spots 708A-708B is equal to the predefined separation 710. This can improve autofocus or other focus tracking processes.

Figure 8A:
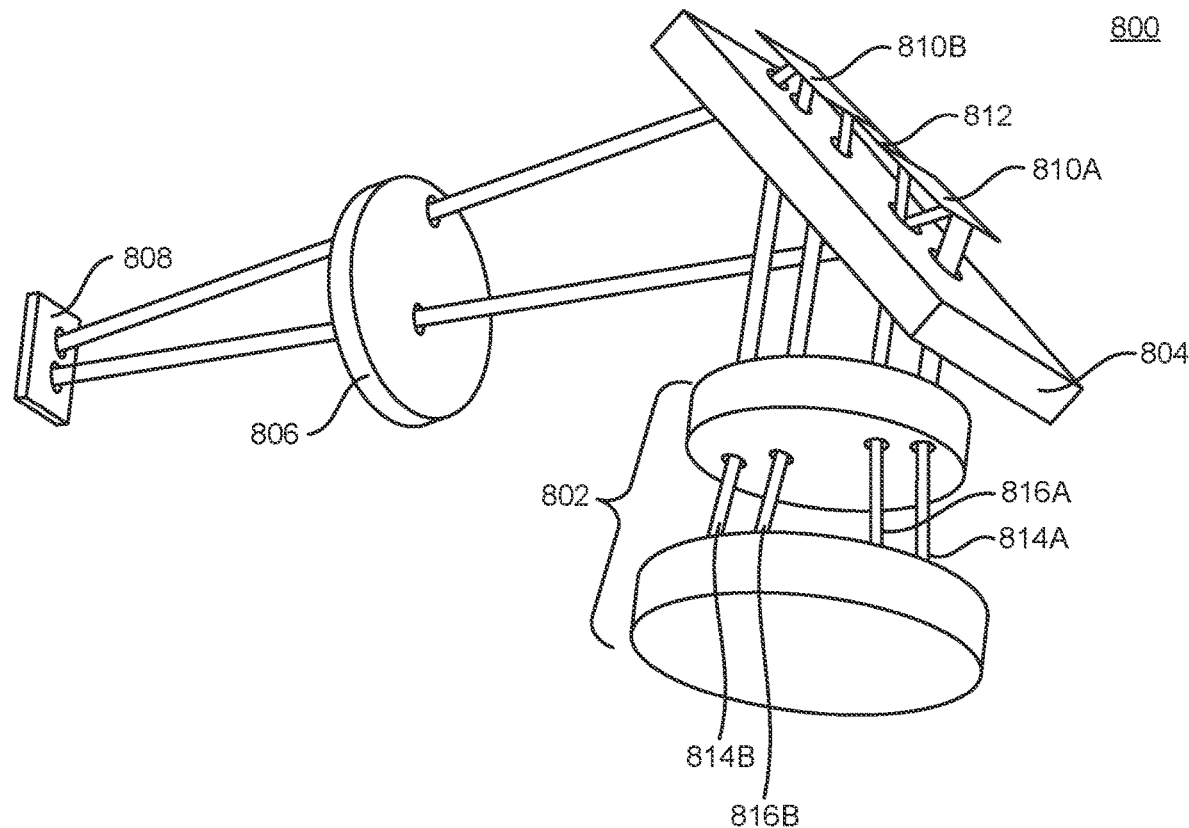
FIG. 8A shows an embodiment of an optical system.

FIG. 8A shows an embodiment of an optical system 800. The optical system 800 can include, or be used with, one or more other embodiments described herein. In some implementations, the optical system 800 can be included within the system 100 in FIG. 1. In some implementations, the optical system 800 can include, or be used with, the optical system 200 in FIG. 2. In some implementations, the optical system 800 can include, or be used with, the optical system 500 in FIG. 5. In some implementations, the optical system 800 can include, or be used with, the optical system 820 in FIG. 8B. In some implementations, the optical system 800 can include, or be used with, the lateral displacement prism 1000 in FIGS. 10A-10C. In some implementations, the optical system 800 can include, or be used with, the optical system 1100 in FIG. 11. In some implementations, the optical system 800 can include, or be used with, the optical system 1200 in FIG. 12. In some implementations, the optical system 800 can include, or be used with, the optical system 1300 in FIG. 13. In some implementations, the optical system 800 can include, or be used with, the optical system 1400 in FIG. 14. In some implementations, the optical system 800 can include, or be used with, the lateral displacement prism 1600 in FIGS. 16A-16B. In some implementations, the optical system 800 can include, or be used with, the beam splitter 1700 in FIG. 17. In some implementations, the optical system 800 can include, or be used with, the imaging module 1800 in FIGS. 18 and 19A-19B. In some implementations, the optical system 800 can include, or be used with, the SIM assembly 2000 in FIG. 20. In some implementations, the optical system 800 can include, or be used with, the imaging module 2100 in FIG. 21. In some implementations, the optical system 800 can include, or be used with, the imaging module 2200 in FIG. 22. In some implementations, the optical system 800 can include, or be used with, the imaging module 2400 in FIG. 24. In some implementations, the optical system 800 can include, or be used with, the optical system 2500 in FIG. 25. In some implementations, the optical system 800 can include, or be used with, the optical system 2600 in FIG. 26. In some implementations, the optical system 800 can include, or be used with, the reflective component 2700 in FIG. 27. In some implementations, the optical system 800 can include, or be used with, the reflective component 2800 in FIG. 28. In some implementations, the optical system 800 can generate the autofocus light 2900 in FIG. 29. In some implementations, the optical system 800 can generate the autofocus light 3000 in FIG. 30. In some implementations, the optical system 800 can generate the autofocus light 3100 in FIGS. 31A-31C. In some implementations, the optical system 800 can include, or be used with, the laser engine heat sink 3200 in FIGS. 32A-32C. In some implementations, the optical system 800 can include, or be used with, the laser engine heat sink 3300 in FIGS. 33A-33C. In some implementations, the optical system 800 can include, or be used with, the SIM assembly 3400 in FIG. 34. In some implementations, the optical system 800 can include, or be used with, the RIGS 3500 in FIG. 35. In some implementations, the optical system 800 can include, or be used with, the RIGS 3600 in FIG. 36. In some implementations, the optical system 800 can include, or be used with, the piezo phase shifter 3700 in FIG. 37. In some implementations, the optical system 800 can include, or be used with, the piezo phase shifter 3800 in FIG. 38. In some implementations, the optical system 800 can include, or be used with, the projection lens 3900 in FIG. 39. In some implementations, the optical system 800 can include, or be used with, the projection lens 4000 in FIG. 40. In some implementations, the optical system 800 can generate the field of view 4100 in FIG. 41.

Only a portion of the optical system 800 is shown for clarity. The optical system 800 includes at least one tube lens 802. In some implementations, the tube lens 802 can serve to focus incident light in preparation for detection thereof. For example, the tube lens 802 can focus autofocus light for detection as part of an autofocus process. As another example, the tube lens 802 can focus emission light for detection as part of an analysis process.

The optical system 800 includes a filter 804. The filter 804 can be the component directly upstream of the tube lens 802. The filter 804 can be a dichroic filter. The filter 804 can, alone or together with at least one other component, facilitate steering of one or more types of light. In some implementations, the filter 804 can reflect emission light and transmit autofocus light. For example, the filter 804 can have an antireflective coating that prevents reflection (i.e., facilitates transmission) of autofocus light, and that does reflect emission light. In other implementations, the filter 804 can be configured to prevent reflection (i.e., facilitate transmission) of emission light, and reflect autofocus light.

The optical system 800 includes a filter 806. The filter 806 can be the component directly upstream of the filter 804. The filter 806 can be a dichroic filter. In some implementations, the filter 806 can condition light in one or more regards in preparation for detection. For example, the filter 806 can provide bandpass filtering based on the wavelength(s) of reflected autofocus light and on the wavelength(s) of emission light so as to eliminate noise.

The optical system 800 includes a sensor 808. The sensor 808 can be the component directly upstream of the filter 806. The sensor 808 can detect reflected autofocus light during an autofocus procedure, and/or detect emission light during an analysis procedure. For example, the sensor 808 includes a rectangular array of light-sensitive elements that can detect the respective locations of one or more portions of light incident at the sensor 808.

The optical system 800 can include a substrate (not shown). The substrate can be used for holding one or more samples to be analyzed. In some implementations, the sample at the substrate can include nucleic material. For example, the substrate can include a flow cell for imaging nucleic matter. The optical system 800 can include one or more other optical components (not shown). The other optical components can include, but are not limited to, one or more of an objective, a filter, a structure to block one or more beams, a source of autofocus light, or a beam splitter.

The optical system 800 includes one or more reflective component. Here, the optical system 800 includes a reflective component 810A and a reflective component 810B. Each of the reflective components 810A-810B can include one or more reflective surfaces and can be positioned behind the filter 804 in the travel direction of light arriving from the tube lens 802. In some implementations, either or both of the reflective components 810A-810B reflects light that was transmitted through the filter 804, the reflection causing the light to be directed toward the sensor 808. For example, either or both of the reflective components 810A-810B can reflect some (but not all) autofocus light that has been reflected at a substrate. Each of the reflective components 810A-810B can have optical properties based on the type of autofocus light being used. In some implementations, each of the reflective components 810A-810B is reflective in at least part of the near infrared wavelength range (e.g., reflection somewhere between about 750 nm and about 1400 nm.)

One or more of the reflective components 810A-810B can be movable. Movability can include one or more of translation or rotation of at least one of the reflective components 810A-810B. The reflective component 810A can be separate from the filter 804. In some implementations, the reflective component 810A can be oriented independently of an orientation of the filter 804. For example, the reflective component 810A can be coupled to a motor or an actuator that controls the orientation of the reflective component 810A without affecting the orientation of the filter 804. The reflective component 810B can be separate from the filter 804. The reflective component 810B can be separate from the reflective component 810A. In some implementations, the reflective component 810B can be oriented independently of an orientation of the filter 804. For example, the reflective component 810B can be coupled to a motor or an actuator that controls the orientation of the reflective component 810B without affecting the orientation of the filter 804.

The optical system 800 includes one or more structure 812. The structure 812 can be positioned behind the filter 804 in the travel direction of light arriving from the tube lens 802. In some implementations, the structure 812 absorbs light that was transmitted through the filter 804, the absorption preventing the light from reaching the sensor 808 or another region of the optical system 800. For example, the structure 812 can absorb some (but not all) autofocus light that has been reflected at the substrate.

In operation of the optical system 800, left autofocus light and right autofocus light can be formed by the beam splitter. The left autofocus light and the right autofocus light diverge at a predetermined angle from each other. Each of the left autofocus light and the right autofocus light can be conveyed through one or more optical components and impinge on the substrate. In some implementations, reflection of the left autofocus light and the right autofocus light at the substrate can form autofocus light 814A, autofocus light 814B, autofocus light 816A, and autofocus light 816B. For example, the autofocus lights 814A-814B can result from reflection of the left autofocus light and the right autofocus light, respectively, at a first layer or other surface at the substrate (e.g., the S2 surface and/or the S3 surface in FIG. 3). As such, the optical system 800 can direct the autofocus lights 814A-814B toward the filter 804. As another example, the autofocus lights 816A-816B can result from reflection of the left autofocus light and the right autofocus light, respectively, at a second layer or other surface at the substrate (e.g., the S4 surface and/or the S5 surface in FIG. 3). As such, the optical system 800 can direct the autofocus lights 816A-816B toward the filter 804.

The autofocus lights 814A-814B and the autofocus lights 816A-816B can be transmitted through the filter 804. For example, the autofocus lights 814A-814B and the autofocus lights 816A-816B can have wavelengths outside the wavelength range(s) for which the filter 804 is reflective. The reflective component 810A can be positioned at a spatial location such that the autofocus light 814A, but not the autofocus lights 814B or the autofocus lights 816A-816B will be incident at the reflective component 810A. As such, the reflective component 810A can direct the autofocus light 814A toward the sensor 808. For example, movement (e.g., rotation) of the reflective component 810A can steer the autofocus light 814A at the sensor 808. The reflective component 810B can be positioned at a spatial location such that the autofocus light 814B, but not the autofocus lights 814A or the autofocus lights 816A-816B will be incident at the reflective component 810B. As such, the reflective component 810B can direct the autofocus light 814B toward the sensor 808. For example, movement (e.g., rotation) of the reflective component 810B can steer the autofocus light 814B at the sensor 808. The autofocus light 816A and the autofocus light 816B may be incident at the structure 812. In some implementations, the structure 812 absorbs the autofocus light 816A and the autofocus light 816B. For example, this can prevent the autofocus light 816A and the autofocus light 816B from reaching the sensor 808.

An autofocus process can be performed based on one or more portions of autofocus light detected by the sensor 808. In some implementations, a distance between the autofocus light 814A and the autofocus light 814B at the sensor 808 can indicate a distance between an objective of the optical system 800 and the substrate. For example, a predefined distance on the sensor 808 can be specified that corresponds to the substrate being in focus of the objective. The optical system 800 can therefore automatically adjust the distance between the objective and the substrate based on the detected distance between the autofocus light 814A and the autofocus light 814B at the sensor 808.

Figure 8B:
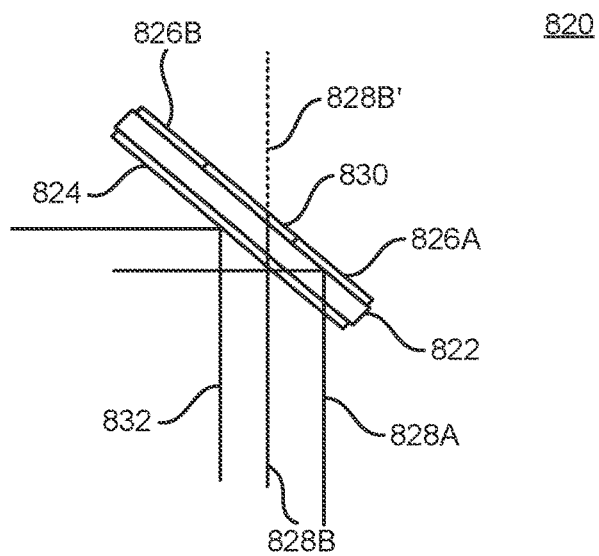
FIG. 8B shows an embodiment of an optical system.

FIG. 8B shows an embodiment of an optical system 820. The optical system 820 can be used with, or be included within, one or more other embodiments described herein. In some implementations, the optical system 820 can be included within the system 100 in FIG. 1. In some implementations, the optical system 820 can be used with, or be included within, the optical system 200 in FIG. 2. In some implementations, the optical system 820 can be used with, or be included within, the optical system 500 in FIG. 5. In some implementations, the optical system 820 can be used with, or be included within, the optical system 820 in FIG. 8B. In some implementations, the optical system 820 can be used with, or be included within, the optical system 1100 in FIG. 11. In some implementations, the optical system 820 can be used with, or be included within, the optical system 1200 in FIG. 12. In some implementations, the optical system 820 can be used with, or be included within, the optical system 1300 in FIG. 13. In some implementations, the optical system 820 can be used with, or be included within, the optical system 1400 in FIG. 14. In some implementations, the optical system 820 can be used with, or be included within, the imaging module 1800 in FIGS. 18 and 19A-19B. In some implementations, the optical system 820 can be used with, or be included within, the imaging module 2100 in FIG. 21. In some implementations, the optical system 820 can be used with, or be included within, the imaging module 2200 in FIG. 22. In some implementations, the optical system 820 can be used with, or be included within, the imaging module 2400 in FIG. 24. In some implementations, the optical system 820 can be used with, or be included within, the optical system 2500 in FIG. 25. In some implementations, the optical system 820 can be used with, or be included within, the optical system 2600 in FIG. 26. In some implementations, the optical system 820 can include, or be used with, the reflective component 2700 in FIG. 27. In some implementations, the optical system 820 can include, or be used with, the reflective component 2800 in FIG. 28. In some implementations, the optical system 820 can generate the autofocus light 2900 in FIG. 29. In some implementations, the optical system 820 can generate the autofocus light 3000 in FIG. 30. In some implementations, the optical system 820 can generate the autofocus light 3100 in FIGS. 31A-31C. In some implementations, the optical system 820 can be used with the laser engine heat sink 3200 in FIGS. 32A-32C. In some implementations, the optical system 820 can be used with the laser engine heat sink 3300 in FIGS. 33A-33C. In some implementations, the optical system 820 can be used with the SIM assembly 3400 in FIG. 34. In some implementations, the optical system 820 can be used with the RIGS 3500 in FIG. 35. In some implementations, the optical system 820 can be used with the RIGS 3600 in FIG. 36. In some implementations, the optical system 820 can be used with the piezo phase shifter 3700 in FIG. 37. In some implementations, the optical system 820 can be used with the piezo phase shifter 3800 in FIG. 38. In some implementations, the optical system 820 can be used with the projection lens 3900 in FIG. 39. In some implementations, the optical system 820 can be used with the projection lens 4000 in FIG. 40. In some implementations, the optical system 820 can generate the field of view 4100 in FIG. 41.

Only a portion of the optical system 820 is shown for clarity. The optical system 820 includes a filter 822. The filter 822 can be a dichroic filter. The filter 822 can, alone or together with at least one other component, facilitate steering of one or more types of light. In some implementations, the filter 822 can have an antireflective coating 824 that prevents reflection (i.e., facilitates transmission) of autofocus light, and that does reflect emission light. For example, the antireflective coating 824 can be positioned at a front surface of the filter 822 in the travel direction of light arriving at the filter 822. In other implementations, the antireflective coating 824 can be configured to prevent reflection (i.e., facilitate transmission) of emission light, and reflect autofocus light.

The optical system 820 includes one or more reflective component. Here, the optical system 820 includes a reflective component 826A and a reflective component 826B. Each of the reflective components 826A-826B can include one or more reflective surfaces and can be positioned at a surface of the filter 822. For example, the reflective components 826A-826B can be positioned at a rear surface of the filter 822 in the travel direction of light arriving at the filter 822. In some implementations, either or both of the reflective components 826A-826B reflects light that was transmitted through the filter 822, the reflection causing the light to be directed toward another part of the optical system 820 (e.g., toward a sensor). For example, the reflective component 826A can reflect autofocus light 828A. Each of the reflective components 826A-826B can have optical properties based on the type of autofocus light being used. In some implementations, each of the reflective components 826A-826B is reflective in at least part of the near infrared wavelength range (e.g., reflection somewhere between about 750 nm and about 1400 nm.)

The optical system 820 includes one or more structure 830. The structure 830 can be positioned at the rear surface of the filter 822 in the travel direction of the autofocus light 828A. In some implementations, the structure 830 absorbs light that was transmitted through the filter 822, the absorption preventing the light from reaching a sensor or another region of the optical system 820. For example, the structure 830 can absorb some (but not all) autofocus light 828B. As another example, the structure 830 can transmit the autofocus light 828B, as schematically indicated by autofocus light 828B'. In some implementations, the structure 830 can be omitted from the optical system 820.

That is, in operation of the optical system 820, the reflective component 826A can reflect autofocus light 828A, thereby allowing steering of the autofocus light 828A at a sensor of the optical system 820. As another example, the reflective component 826B can reflect other autofocus light (not shown), thereby allowing steering of the other autofocus light at a sensor of the optical system 820. Simultaneously with the just mentioned reflection(s), and/or at another time, the antireflective coating 824 can reflect emission light 832 toward another part of the optical system 820 (e.g., toward a sensor). For example, the emission light 832 can include fluorescence generated at a sample for purpose of imaging the sample for analysis.

Figure 9A:
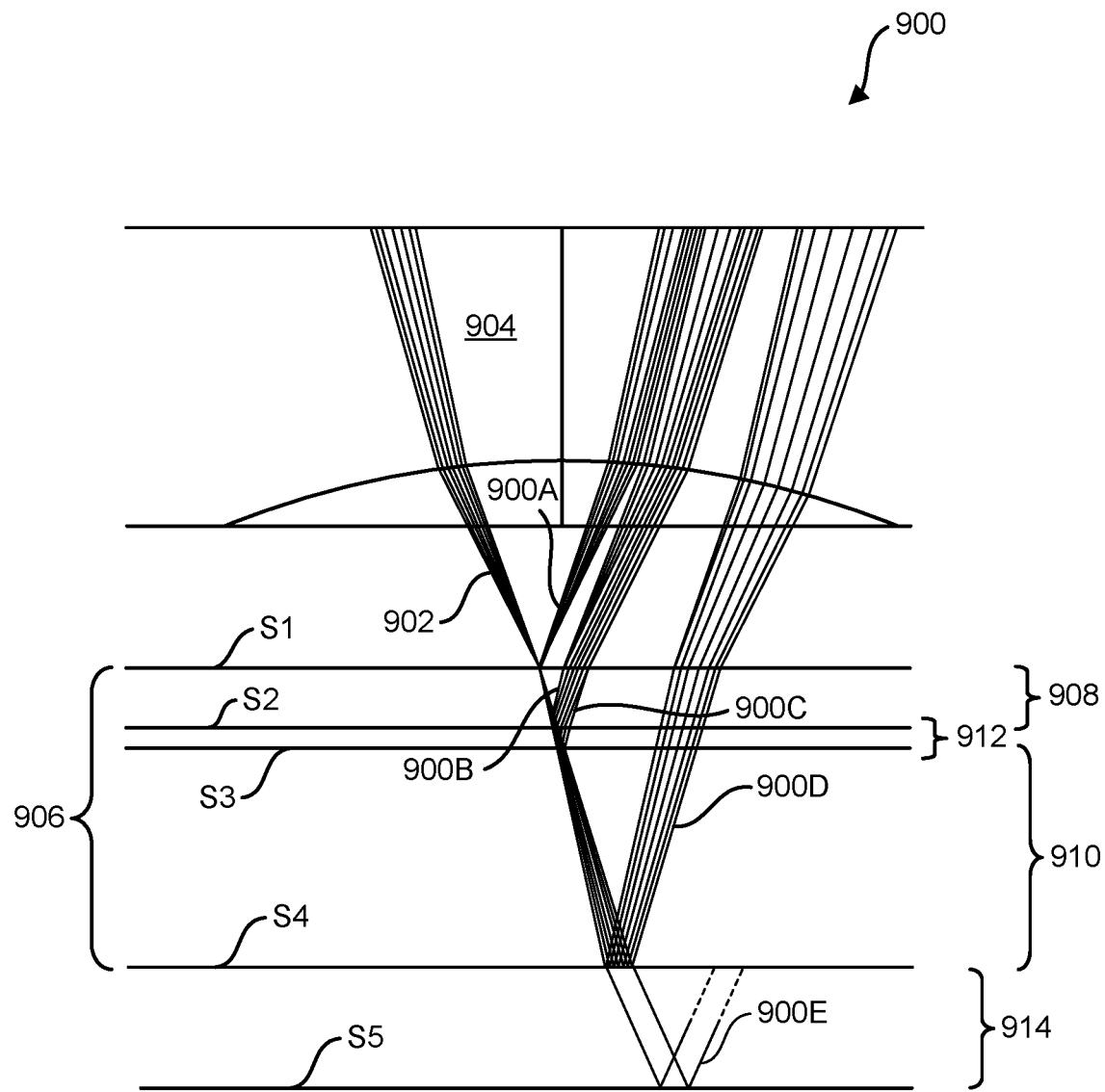
FIGS. 9A-9B are diagrams illustrating examples of creation of desired and unwanted reflections off of multiple surfaces of a multilayer sample substrate in some embodiments.
Figure 9B:
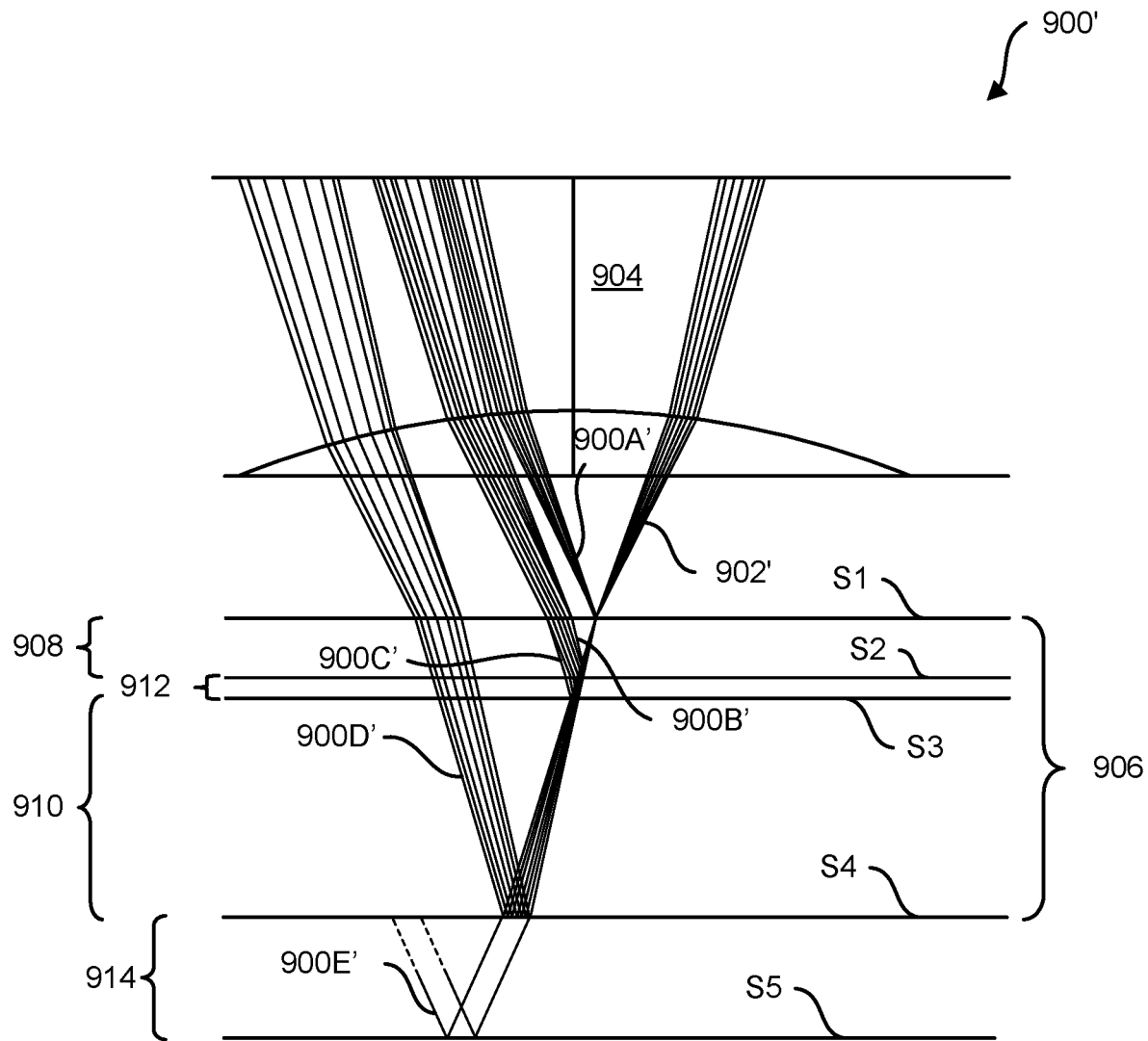

FIGS. 9A-9B are diagrams illustrating examples of creation of desired and unwanted reflections 900 and 900' off of multiple surfaces of a sample substrate in some embodiments. The reflections 900 and 900' can be created by one or more embodiments described herein. In some implementations, the reflections 900 and 900' can be created using the system 100 in FIG. 1. In some implementations, the reflections 900 and 900' can be created using the optical system 200 in FIG. 2. In some implementations, the reflections 900 and 900' can be created using the optical system 500 in FIG. 5. In some implementations, the reflections 900 and 900' can be created using the optical system 800 in FIG. 8A. In some implementations, the reflections 900 and 900' can be created using the optical system 820 in FIG. 8B. In some implementations, the reflections 900 and 900' can be created using the optical system 1100 in FIG. 11. In some implementations, the reflections 900 and 900' can be created using the optical system 1200 in FIG. 12. In some implementations, the reflections 900 and 900' can be created using the optical system 1300 in FIG. 13. In some implementations, the reflections 900 and 900' can be created using the optical system 1400 in FIG. 14. In some implementations, the reflections 900 and 900' can be created using the imaging module 1800 in FIGS. 18 and 19A-19B. In some implementations, the reflections 900 and 900' can be created using the SIM assembly 2000 in FIG. 20. In some implementations, the reflections 900 and 900' can be created using the imaging module 2100 in FIG. 21. In some implementations, the reflections 900 and 900' can be created using the imaging module 2200 in FIG. 22. In some implementations, the reflections 900 and 900' can be created using the imaging module 2400 in FIG. 24. In some implementations, the reflections 900 and 900' can be created using the optical system 2500 in FIG. 25. In some implementations, the reflections 900 and 900' can be created using the optical system 2600 in FIG. 26. In some implementations, the reflections 900 and 900' can be created using the reflective component 2700 in FIG. 27. In some implementations, the reflections 900 and 900' can be created using the reflective component 2800 in FIG. 28. In some implementations, the reflections 900 and 900' can be created using the SIM assembly 3400 in FIG. 34. In some implementations, the reflections 900 and 900' can be created using the RIGS 3500 in FIG. 35. In some implementations, the reflections 900 and 900' can be created using the RIGS 3600 in FIG. 36. In some implementations, the reflections 900 and 900' can be created using the piezo phase shifter 3700 in FIG. 37. In some implementations, the reflections 900 and 900' can be created using the piezo phase shifter 3800 in FIG. 38. In some implementations, the reflections 900 and 900' can be created using the projection lens 3900 in FIG. 39. In some implementations, the reflections 900 and 900' can be created using the projection lens 4000 in FIG. 40. In some implementations, the reflections 900 and 900' can be created using the field of view 4100 in FIG. 41.

In some implementations, the reflections 900 and 900' can be generated by respective portions of autofocus light incident at a substrate. For example, the reflections 900 are created as a result of light 902 being conveyed from an objective 904 toward a flow cell 906, wherein the light 902 is a left autofocus light (e.g., one part of the output from a beam splitter). For example, the reflections 900' are created as a result of light 902' being conveyed from the objective 904 toward the flow cell 906, wherein the light 902' is a right autofocus light (e.g., another part of the output from the beam splitter). The light 902 and the light 902' can diverge from each other by a predetermined angle. The objective 904 and the flow cell 906 are schematically illustrated for simplicity.

In some implementations, the flow cell 906 includes a substrate 908 (e.g., cladding of a transparent material), a substrate 910 (e.g., cladding of a transparent material), and a channel 912 (e.g., a fluidic channel) formed between the substrates 908 and 910. For example, a sample (e.g., of nucleic material) and/or one or more chemical substances (e.g., sequencing reagent) can be located in, and/or flowed through, the channel 912. One or more additional layers or other surfaces can be associated with the flow cell 906. A layer 914 is here positioned at one side of the substrate 910, opposite from the channel 912. In some implementations, the layer 914 bonds the flow cell 906 to another structure. For example, the layer 914 can include a pressure-sensitive adhesive that bonds the flow cell 906 to a carrier plate.

The flow cell 906 includes multiple layers or other surfaces. Here, a surface S1 can be characterized as a top surface of the substrate 908. A surface S2 can be referred to as a bottom surface of the substrate 908, or as a top surface of the channel 912, or both. A surface S3 can be referred to as a bottom surface of the channel 912, or as a top surface of the substrate 910, or both. A surface S4 can be characterized as a bottom surface of the substrate 910. A surface S5 can be characterized as a bottom surface of the layer 914.

As the light 902 is incident on the flow cell 906, the light 902 can be reflected by one or more of the surfaces S1-S5, the reflection giving rise to a corresponding one of the reflections 900. In some implementations, a reflection 900A is formed by reflection of the light 902 off the surface S1. In some implementations, a reflection 900B is formed by reflection of the light 902 off the surface S2. In some implementations, a reflection 900C is formed by reflection of the light 902 off the surface S3. In some implementations, a reflection 900D is formed by reflection of the light 902 off the surface S4. In some implementations, a reflection 900E is formed by reflection of the light 902 off the surface S5.

One or more reflected portions of autofocus light can be deemed more relevant than another portion. In some implementations, autofocus light reflected from a surface where sample material is located, or is intended to be located, can be relatively more relevant than a surface where sample material should not be located. For example, the reflections 900B-900C (i.e., from the surfaces S2 and S3) can here be considered relatively more relevant than the reflection 900A (i.e., from S1), the reflection 900D (i.e., from S4), or the reflection 900E (i.e., from S5).

As the light 902' is incident on the flow cell 906, the light 902' can be reflected by one or more of the surfaces S1-S5, the reflection giving rise to a corresponding one of the reflections 900'. In some implementations, a reflection 900A' is formed by reflection of the light 902' off the surface S1. In some implementations, a reflection 900B' is formed by reflection of the light 902' off the surface S2. In some implementations, a reflection 900C' is formed by reflection of the light 902' off the surface S3. In some implementations, a reflection 900D' is formed by reflection of the light 902' off the surface S4. In some implementations, a reflection 900E' is formed by reflection of the light 902' off the surface S5.

One or more reflected portions of autofocus light can be deemed more relevant than another portion. In some implementations, autofocus light reflected from a surface where sample material is located, or is intended to be located, can be relatively more relevant than a surface where sample material should not be located. For example, the reflections 900B'-900C' (i.e., from the surfaces S2 and S3) can here be considered relatively more relevant than the reflection 900A' (i.e., from S1), the reflection 900D' (i.e., from S4), or the reflection 900E' (i.e., from S5).

Figure 10A:
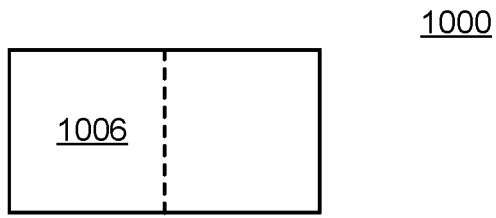
FIGS. 10A-10C show embodiments of a lateral displacement prism.
Figure 10B:
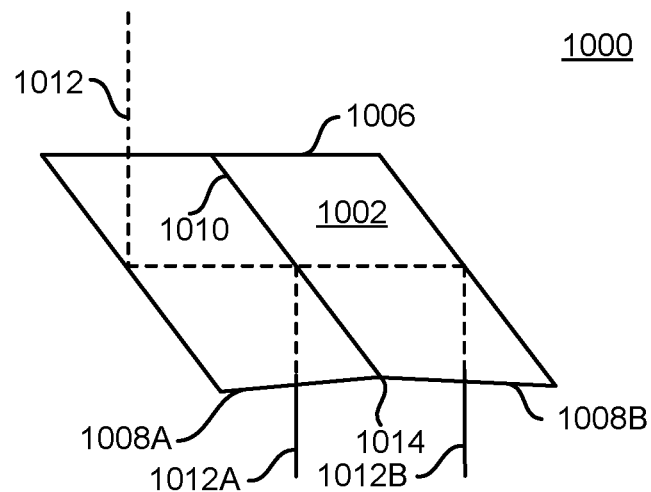
Figure 10C:
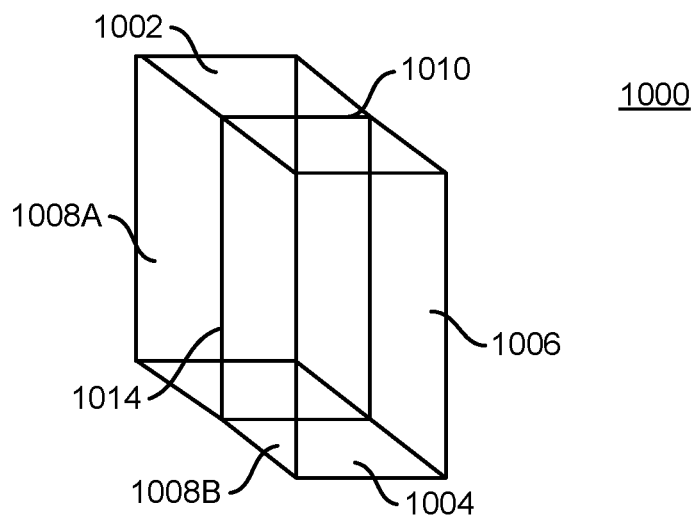

FIGS. 10A-10C show embodiments of a lateral displacement prism 1000. The lateral displacement prism 1000 can be used with, or be included within, one or more other embodiments described herein. In some implementations, the lateral displacement prism 1000 can be used with, or be included within, the system 100 in FIG. 1. In some implementations, the lateral displacement prism 1000 can be used with, or be included within, the optical system 200 in FIG. 2. In some implementations, the lateral displacement prism 1000 can be used with, or be included within, the optical system 500 in FIG. 5. In some implementations, the lateral displacement prism 1000 can be used with, or be included within, the optical system 800 in FIG. 8A. In some implementations, the lateral displacement prism 1000 can be used with, or be included within, the optical system 820 in FIG. 8B. In some implementations, the lateral displacement prism 1000 can be used with, or be included within, the optical system 1100 in FIG. 11. In some implementations, the lateral displacement prism 1000 can be used with, or be included within, the optical system 1200 in FIG. 12. In some implementations, the lateral displacement prism 1000 can be used with, or be included within, the optical system 1300 in FIG. 13. In some implementations, the lateral displacement prism 1000 can be used with, or be included within, the optical system 1400 in FIG. 14. In some implementations, the lateral displacement prism 1000 can be used with, or be included within, the imaging module 1800 in FIGS. 18 and 19A-19B. In some implementations, the lateral displacement prism 1000 can be used with, or be included within, the imaging module 2100 in FIG. 21. In some implementations, the lateral displacement prism 1000 can be used with, or be included within, the imaging module 2200 in FIG. 22. In some implementations, the lateral displacement prism 1000 can be used with, or be included within, the imaging module 2400 in FIG. 24. In some implementations, the lateral displacement prism 1000 can be used with, or be included within, the optical system 2500 in FIG. 25. In some implementations, the lateral displacement prism 1000 can be used with, or be included within, the optical system 2600 in FIG. 26. In some implementations, the lateral displacement prism 1000 can be used with the reflective component 2700 in FIG. 27. In some implementations, the lateral displacement prism 1000 can be used with the reflective component 2800 in FIG. 28. In some implementations, the lateral displacement prism 1000 can generate the autofocus light 2900 in FIG. 29. In some implementations, the lateral displacement prism 1000 can generate the autofocus light 3000 in FIG. 30. In some implementations, the lateral displacement prism 1000 can generate the autofocus light 3100 in FIGS. 31A-31C. In some implementations, the lateral displacement prism 1000 can be used with the laser engine heat sink 3200 in FIGS. 32A-32C. In some implementations, the lateral displacement prism 1000 can be used with the laser engine heat sink 3300 in FIGS. 33A-33C. In some implementations, the lateral displacement prism 1000 can be used with the SIM assembly 3400 in FIG. 34. In some implementations, the lateral displacement prism 1000 can be used with the RIGS 3500 in FIG. 35. In some implementations, the lateral displacement prism 1000 can be used with the RIGS 3600 in FIG. 36. In some implementations, the lateral displacement prism 1000 can be used with the piezo phase shifter 3700 in FIG. 37. In some implementations, the lateral displacement prism 1000 can be used with the piezo phase shifter 3800 in FIG. 38. In some implementations, the lateral displacement prism 1000 can be used with the projection lens 3900 in FIG. 39. In some implementations, the lateral displacement prism 1000 can be used with the projection lens 4000 in FIG. 40.

The lateral displacement prism 1000 includes a surface 1002. In some implementations, the surface 1002 can be considered a top surface of the lateral displacement prism 1000. The lateral displacement prism 1000 includes a surface 1004 that is parallel to the surface 1002. In some implementations, the surface 1004 can be considered a bottom surface of the lateral displacement prism 1000. The lateral displacement prism 1000 includes a surface 1006. In some implementations, the surface 1006 can be considered a side surface of the lateral displacement prism 1000. For example, the surface 1006 can be an entry surface of the lateral displacement prism 1000. The lateral displacement prism 1000 includes a surface 1008A. In some implementations, the surface 1008A can be considered an exit surface of the lateral displacement prism 1000. The lateral displacement prism 1000 includes a surface 1008B. In some implementations, the surface 1008B can be considered an exit surface of the lateral displacement prism 1000. Each of the surfaces 1008A-1008B forms a common angle with the surface 1006. In some implementations, the surfaces 1008A-1008B can have a non-zero angle relative to each other. The lateral displacement prism 1000 includes a partially reflective layer 1010. In some implementations, the lateral displacement prism 1000 can be manufactured by assembling two prism pieces that are at least substantially identical to each other, with the partially reflective layer 1010 positioned at the joint between the two prism pieces. The surface 1002 can have boundaries with at least the surfaces 1006, 1008A, and 1008B. The surface 1004 can have boundaries with at least the surfaces 1006, 1008A, and 1008B.

Light 1012 can enter the lateral displacement prism 1000 through the surface 1006. For example, the light 1012 is autofocus light generated by a light source (e.g., a laser diode). After at least one reflection within the lateral displacement prism 1000, or after no reflection within the lateral displacement prism 1000, the light 1012 can be incident on the partially reflective layer 1010. As a result, light 1012A reflected at the partially reflective layer 1010 can exit the lateral displacement prism 1000 through the surface 1008A. Also, light 1012B transmitted at the partially reflective layer 1010 can exit the lateral displacement prism 1000 through the surface 1008B after at least one reflection within the lateral displacement prism 1000, or after no reflection within the lateral displacement prism 1000. The light 1012A and the light 1012B diverge at a predetermined angle from each other. In some implementations, each of the lights 1012A-1012B diverges from a normal of the surface 1006 by an angle between about one degree and about three degrees. For example, each of the lights 1012A-1012B can diverge from the normal of the surface 1006 by an angle of about 1.4 degrees (e.g., about 1.464 degrees). As such, the lights 1012A-1012B can diverge from each other by an angle between about two degrees and about six degrees. For example, the lights 1012A-1012B can diverge from each other by an angle of about 2.9 degrees (e.g., about 2.928 degrees). The surfaces 1008A-1008B can have a boundary 1014 with each other. In some implementations, the partially reflective layer 1010 can extend between the surface 1006 and the boundary 1014. For example, the partially reflective layer 1010 can divide the surface 1006 in two parts that are at least substantially of equal size. As another example, the surfaces 1008A-1008B can be of at least substantially of equal size as each other.

The lateral displacement prism 1000 can be included in an autofocus assembly. In some implementations, an autofocus assembly includes at least the lateral displacement prism 1000 and a light source to direct light (e.g., the light 1012) at the lateral displacement prism 1000. For example, the light source can be part of the autofocus component 106 (FIG. 1). In such an autofocus assembly, the lateral displacement prism 1000 can form first autofocus light (e.g., the light 1012A) and second autofocus light (e.g., the light 1012B) from the light, such that the first autofocus light and the second autofocus light diverge at a predetermined angle from each other.

Figure 11:
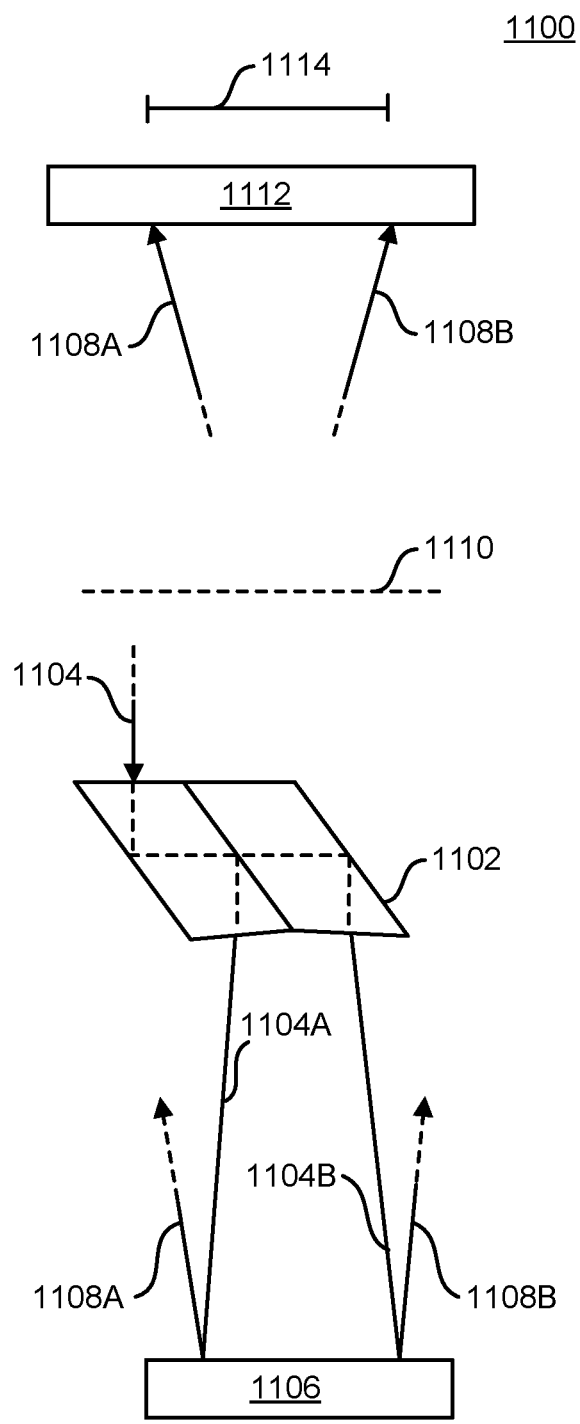
FIG. 11 schematically shows an optical system with a lateral displacement prism.

FIG. 11 schematically shows an optical system 1100 with a lateral displacement prism 1102. The optical system 1100 can include, or be used with, one or more other embodiments described herein. In some implementations, the optical system 1100 can be included within the system 100 in FIG. 1. In some implementations, the optical system 1100 can include, or be used with, the optical system 200 in FIG. 2. In some implementations, the optical system 1100 can include, or be used with, the optical system 500 in FIG. 5. In some implementations, the optical system 1100 can include, or be used with, the optical system 800 in FIG. 8A. In some implementations, the optical system 1100 can include, or be used with, the optical system 820 in FIG. 8B. In some implementations, the optical system 1100 can include, or be used with, the lateral displacement prism 1000 in FIGS. 10A-10C. In some implementations, the optical system 1100 can include, or be used with, the optical system 1200 in FIG. 12. In some implementations, the optical system 1100 can include, or be used with, the optical system 1300 in FIG. 13. In some implementations, the optical system 1100 can include, or be used with, the optical system 1400 in FIG. 14. In some implementations, the optical system 1100 can include, or be used with, the lateral displacement prism 1600 in FIGS. 16A-16B. In some implementations, the optical system 1100 can include, or be used with, the beam splitter 1700 in FIG. 17. In some implementations, the optical system 1100 can be included within the imaging module 1800 in FIGS. 18 and 19A-19B. In some implementations, the optical system 1100 can be used with the SIM assembly 2000 in FIG. 20. In some implementations, the optical system 1100 can be included within the imaging module 2100 in FIG. 21. In some implementations, the optical system 1100 can be included within the imaging module 2200 in FIG. 22. In some implementations, the optical system 1100 can be included within the imaging module 2400 in FIG. 24. In some implementations, the optical system 1100 can be included within the optical system 2500 in FIG. 25. In some implementations, the optical system 1100 can be included within the optical system 2600 in FIG. 26. In some implementations, the optical system 1100 can include, or be used with, the reflective component 2700 in FIG. 27. In some implementations, the optical system 1100 can include, or be used with, the reflective component 2800 in FIG. 28. In some implementations, the optical system 1100 can generate the autofocus light 2900 in FIG. 29. In some implementations, the optical system 1100 can generate the autofocus light 3000 in FIG. 30. In some implementations, the optical system 1100 can generate the autofocus light 3100 in FIGS. 31A-31C. In some implementations, the optical system 1100 can include, or be used with, the laser engine heat sink 3200 in FIGS. 32A-32C. In some implementations, the optical system 1100 can include, or be used with, the laser engine heat sink 3300 in FIGS. 33A-33C. In some implementations, the optical system 1100 can include, or be used with, the SIM assembly 3400 in FIG. 34. In some implementations, the optical system 1100 can include, or be used with, the RIGS 3500 in FIG. 35. In some implementations, the optical system 1100 can include, or be used with, the RIGS 3600 in FIG. 36. In some implementations, the optical system 1100 can include, or be used with, the piezo phase shifter 3700 in FIG. 37. In some implementations, the optical system 1100 can include, or be used with, the piezo phase shifter 3800 in FIG. 38. In some implementations, the optical system 1100 can include, or be used with, the projection lens 3900 in FIG. 39. In some implementations, the optical system 1100 can include, or be used with, the projection lens 4000 in FIG. 40. In some implementations, the optical system 1100 can generate the field of view 4100 in FIG. 41.

Light 1104 can enter the lateral displacement prism 1102 through an entry surface. For example, the light 1104 is autofocus light generated by a light source (e.g., a laser diode). Light 1104A can exit the lateral displacement prism 1102 through an exit surface. Light 1104B can exit the lateral displacement prism 1102 through another exit surface. The light 1104A and the light 1104B diverge at a predetermined angle from each other.

The optical system 1100 includes a substrate 1106. The substrate 1106 can be used for holding one or more samples to be analyzed. In some implementations, the sample at the substrate 1106 can include nucleic material. For example, the substrate 1106 can include a flow cell for imaging nucleic matter. Reflection of the light 1104A at a surface of the substrate 1106 can form light 1108A. Reflection of the light 1104B at a surface of the substrate 1106 can form light 1108B.

The lights 1108A-1108B can be transmitted and/or reflected and/or refracted by at least one other component (not shown) in the optical system 1100. Here, a line 1110 schematically illustrates the additional component(s) of the optical system 1100, and the processing of the lights 1108A-1108B performed at the additional component(s).

The optical system 1100 includes a sensor 1112. The sensor 1112 can detect reflected autofocus light during an autofocus procedure, and/or detect emission light during an analysis procedure. In some implementations, the sensor 1112 includes a rectangular array of light-sensitive elements that can detect the respective locations of one or more portions of light incident at the sensor 1112. For example, the lights 1108A-1108B can be incident at the sensor 1112.

The sensor 1112 can be used for determining one or more characteristics of the lights 1108A-1108B. In some implementations, a distance 1114 between the lights 1108A-1108B at the sensor 1112 can indicate a distance between an objective of the optical system 1100 and the substrate 1106. For example, a predefined distance on the sensor 1112 can be specified that corresponds to the substrate 1106 being in focus of the objective.

The optical system 1100 illustrates an example of performing a method, the method including forming (e.g., by the lateral displacement prism 1102) left autofocus light (e.g., the light 1104A) and right autofocus light (e.g., the light 1104B) that diverge at a predetermined angle from each other. The method includes directing the left autofocus light and the right autofocus light through an objective toward a first surface of a substrate (e.g., the substrate 1106). The method includes, after reflection off the first surface, directing at least a first part of the left autofocus light and at least a first part of the right autofocus light toward a sensor (e.g., the sensor 1112). A predefined separation between the first part of the left autofocus light and the first part of the right autofocus light at the sensor indicates that the substrate is in focus of the objective. For example, the distance 1114 may or may not currently be equal to the predefined separation.

Figure 12:
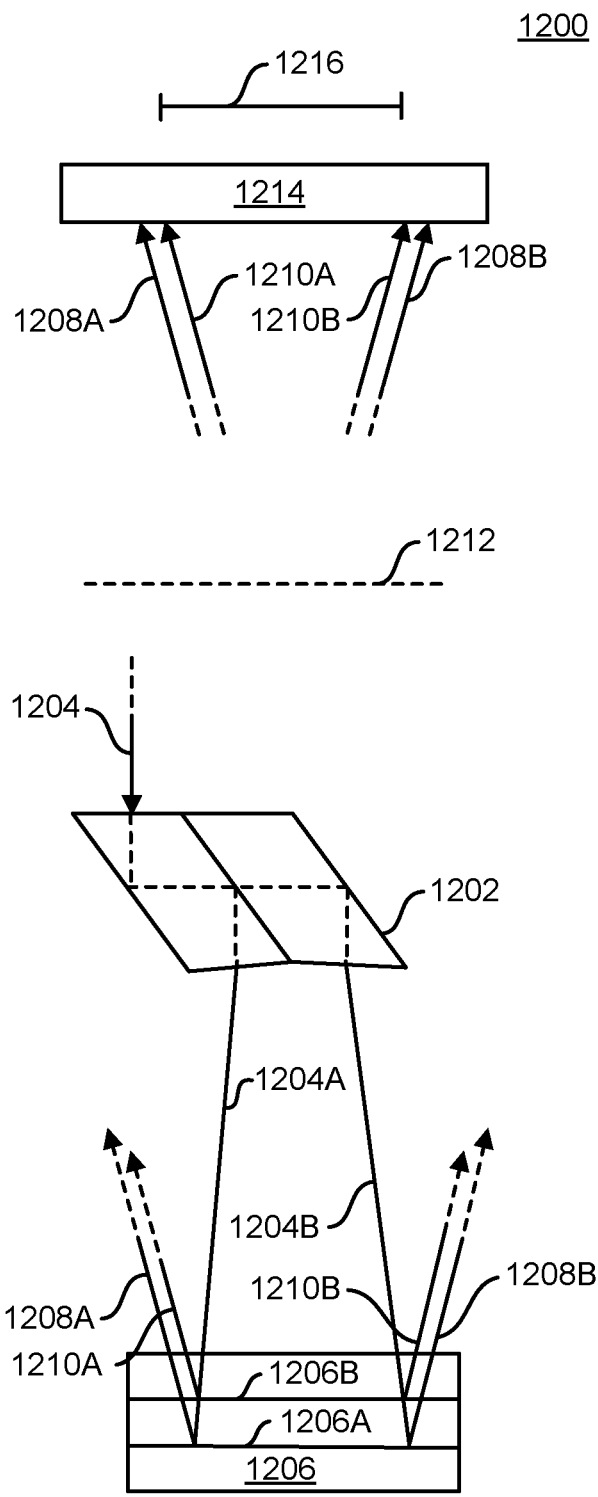
FIG. 12 schematically shows an optical system with a lateral displacement prism.

FIG. 12 schematically shows an optical system 1200 with a lateral displacement prism 1202. The optical system 1200 can include, or be used with, one or more other embodiments described herein. In some implementations, the optical system 1200 can be included within the system 100 in FIG. 1. In some implementations, the optical system 1200 can include, or be used with, the optical system 200 in FIG. 2. In some implementations, the optical system 1200 can include, or be used with, the optical system 500 in FIG. 5. In some implementations, the optical system 1200 can include, or be used with, the optical system 800 in FIG. 8A. In some implementations, the optical system 1200 can include, or be used with, the optical system 820 in FIG. 8B. In some implementations, the optical system 1200 can include, or be used with, the lateral displacement prism 1000 in FIGS. 10A-10C. In some implementations, the optical system 1200 can include, or be used with, the optical system 1100 in FIG. 11. In some implementations, the optical system 1200 can include, or be used with, the optical system 1300 in FIG. 13. In some implementations, the optical system 1200 can include, or be used with, the optical system 1400 in FIG. 14. In some implementations, the optical system 1200 can include, or be used with, the lateral displacement prism 1600 in FIGS. 16A-16B. In some implementations, the optical system 1200 can include, or be used with, the beam splitter 1700 in FIG. 17. In some implementations, the optical system 1200 can be included within the imaging module 1800 in FIGS. 18 and 19A-19B. In some implementations, the optical system 1200 can be used with the SIM assembly 2000 in FIG. 20. In some implementations, the optical system 1200 can be included within the imaging module 2100 in FIG. 21. In some implementations, the optical system 1200 can be included within the imaging module 2200 in FIG. 22. In some implementations, the optical system 1200 can be included within the imaging module 2400 in FIG. 24. In some implementations, the optical system 1200 can be included within the optical system 2500 in FIG. 25. In some implementations, the optical system 1200 can be included within the optical system 2600 in FIG. 26. In some implementations, the optical system 1200 can include, or be used with, the reflective component 2700 in FIG. 27. In some implementations, the optical system 1200 can include, or be used with, the reflective component 2800 in FIG. 28. In some implementations, the optical system 1200 can generate the autofocus light 2900 in FIG. 29. In some implementations, the optical system 1200 can generate the autofocus light 3000 in FIG. 30. In some implementations, the optical system 1200 can generate the autofocus light 3100 in FIGS. 31A-31C. In some implementations, the optical system 1200 can include, or be used with, the laser engine heat sink 3200 in FIGS.

32A-32C. In some implementations, the optical system 1200 can include, or be used with, the laser engine heat sink 3300 in FIGS. 33A-33C. In some implementations, the optical system 1200 can include, or be used with, the SIM assembly 3400 in FIG. 34. In some implementations, the optical system 1200 can include, or be used with, the RIGS 3500 in FIG. 35. In some implementations, the optical system 1200 can include, or be used with, the RIGS 3600 in FIG. 36. In some implementations, the optical system 1200 can include, or be used with, the piezo phase shifter 3700 in FIG. 37. In some implementations, the optical system 1200 can include, or be used with, the piezo phase shifter 3800 in FIG. 38. In some implementations, the optical system 1200 can include, or be used with, the projection lens 3900 in FIG. 39. In some implementations, the optical system 1200 can include, or be used with, the projection lens 4000 in FIG. 40. In some implementations, the optical system 1200 can generate the field of view 4100 in FIG. 41.

Light 1204 can enter the lateral displacement prism 1202 through an entry surface. For example, the light 1204 is autofocus light generated by a light source (e.g., a laser diode). Light 1204A can exit the lateral displacement prism 1202 through an exit surface. Light 1204B can exit the lateral displacement prism 1202 through another exit surface. The light 1204A and the light 1204B diverge at a predetermined angle from each other.

The optical system 1200 includes a substrate 1206. The substrate 1206 can be used for holding one or more samples to be analyzed. In some implementations, the sample at the substrate 1206 can include nucleic material. For example, the substrate 1206 can include a flow cell for imaging nucleic matter. The substrate 1206 can include at least a surface 1206A and a surface 1206B. Reflection of the light 1204A at the surface 1206A can form light 1208A. Reflection of the light 1204A at the surface 1206B can form light 1210A. Reflection of the light 1204B at the surface 1206A can form light 1208B. Reflection of the light 1204B at the surface 1206B can form light 1210B.

The lights 1208A-1208B and 1210A-1210B can be transmitted and/or reflected and/or refracted by at least one other component (not shown) in the optical system 1200. Here, a line 1212 schematically illustrates the additional component(s) of the optical system 1200, and the processing of the lights 1208A-1208B and 1210A-1210B performed at the additional component(s).

The optical system 1200 includes a sensor 1214. The sensor 1214 can detect reflected autofocus light during an autofocus procedure, and/or detect emission light during an analysis procedure. In some implementations, the sensor 1214 includes a rectangular array of light-sensitive elements that can detect the respective locations of one or more portions of light incident at the sensor 1214. For example, the lights 1208A-1208B and 1210A-1210B can be incident at the sensor 1214.

The sensor 1214 can be used for determining one or more characteristics of the lights 1208A-1208B and 1210A-1210B. In some implementations, a predefined separation 1216 can be specified that corresponds to the substrate 1206 being in focus of an objective of the optical system 1200. For example, the optical system 1200 can determine whether a distance between the lights 1208A-1208B at the sensor 1214 is at least substantially equal to the predefined separation 1216, indicating that the surface 1206A is currently in focus. As another example, the optical system 1200 can determine whether a distance between the lights 1210A-1210B at the sensor 1214 is at least substantially equal to the predefined separation 1216, indicating that the surface 1206B is currently in focus.

Figure 13:
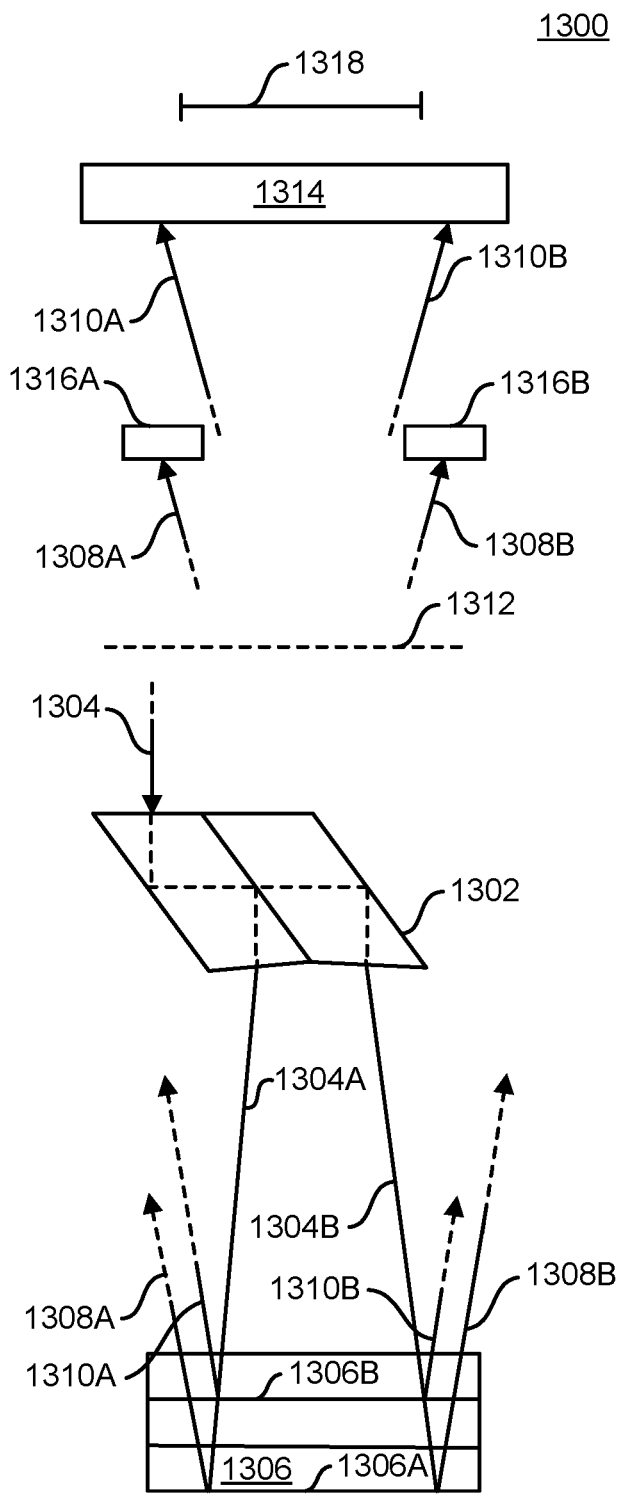
FIG. 13 schematically shows an optical system with a lateral displacement prism.

FIG. 13 schematically shows an optical system 1300 with a lateral displacement prism 1302. The optical system 1300 can include, or be used with, one or more other embodiments described herein. In some implementations, the optical system 1300 can be included within the system 100 in FIG. 1. In some implementations, the optical system 1300 can include, or be used with, the optical system 200 in FIG. 2. In some implementations, the optical system 1300 can include, or be used with, the optical system 500 in FIG. 5. In some implementations, the optical system 1300 can include, or be used with, the optical system 800 in FIG. 8A. In some implementations, the optical system 1300 can include, or be used with, the optical system 820 in FIG. 8B. In some implementations, the optical system 1300 can include, or be used with, the lateral displacement prism 1000 in FIGS. 10A-10C. In some implementations, the optical system 1300 can include, or be used with, the optical system 1100 in FIG. 11. In some implementations, the optical system 1300 can include, or be used with, the optical system 1200 in FIG. 12. In some implementations, the optical system 1300 can include, or be used with, the optical system 1400 in FIG. 14. In some implementations, the optical system 1300 can include, or be used with, the lateral displacement prism 1600 in FIGS. 16A-16B. In some implementations, the optical system 1300 can include, or be used with, the beam splitter 1700 in FIG. 17. In some implementations, the optical system 1300 can be included within the imaging module 1800 in FIGS. 18 and 19A-19B. In some implementations, the optical system 1300 can be used with the SIM assembly 2000 in FIG. 20. In some implementations, the optical system 1300 can be included within the imaging module 2100 in FIG. 21. In some implementations, the optical system 1300 can be included within the imaging module 2200 in FIG. 22. In some implementations, the optical system 1300 can be included within the imaging module 2400 in FIG. 24. In some implementations, the optical system 1300 can be included within the optical system 2500 in FIG. 25. In some implementations, the optical system 1300 can be included within the optical system 2600 in FIG. 26. In some implementations, the optical system 1300 can include, or be used with, the reflective component 2700 in FIG. 27. In some implementations, the optical system 1300 can include, or be used with, the reflective component 2800 in FIG. 28. In some implementations, the optical system 1300 can generate the autofocus light 2900 in FIG. 29. In some implementations, the optical system 1300 can generate the autofocus light 3000 in FIG. 30. In some implementations, the optical system 1300 can generate the autofocus light 3100 in FIGS. 31A-31C. In some implementations, the optical system 1300 can include, or be used with, the laser engine heat sink 3200 in FIGS. 32A-32C. In some implementations, the optical system 1300 can include, or be used with, the laser engine heat sink 3300 in FIGS. 33A-33C. In some implementations, the optical system 1300 can include, or be used with, the SIM assembly 3400 in FIG. 34. In some implementations, the optical system 1300 can include, or be used with, the RIGS 3500 in FIG. 35. In some implementations, the optical system 1300 can include, or be used with, the RIGS 3600 in FIG. 36. In some implementations, the optical system 1300 can include, or be used with, the piezo phase shifter 3700 in FIG. 37. In some implementations, the optical system 1300 can include, or be used with, the piezo phase shifter 3800 in FIG. 38. In some implementations, the optical system 1300 can include, or be used with, the projection lens 3900 in FIG. 39. In some implementations, the optical system 1300 can include, or be used with, the projection lens 4000 in FIG. 40. In some implementations, the optical system 1300 can generate the field of view 4100 in FIG. 41.

Light 1304 can enter the lateral displacement prism 1302 through an entry surface. For example, the light 1304 is autofocus light generated by a light source (e.g., a laser diode). Light 1304A can exit the lateral displacement prism 1302 through an exit surface. Light 1304B can exit the lateral displacement prism 1302 through another exit surface. The light 1304A and the light 1304B diverge at a predetermined angle from each other.

The optical system 1300 includes a substrate 1306. The substrate 1306 can be used for holding one or more samples to be analyzed. In some implementations, the sample at the substrate 1306 can include nucleic material. For example, the substrate 1306 can include a flow cell for imaging nucleic matter. The substrate 1306 can include at least a surface 1306A and a surface 1306B. Reflection of the light 1304A at the surface 1306A can form light 1308A. Reflection of the light 1304A at the surface 1306B can form light 1310A. Reflection of the light 1304B at the surface 1306A can form light 1308B. Reflection of the light 1304B at the surface 1306B can form light 1310B.

The lights 1308A-1308B and 1310A-1310B can be transmitted and/or reflected and/or refracted by at least one other component (not shown) in the optical system 1300. Here, a line 1312 schematically illustrates the additional component(s) of the optical system 1300, and the processing of the lights 1308A-1308B and 1310A-1310B performed at the additional component(s).

The optical system 1300 includes a sensor 1314. The sensor 1314 can detect reflected autofocus light during an autofocus procedure, and/or detect emission light during an analysis procedure. In some implementations, the sensor 1314 includes a rectangular array of light-sensitive elements that can detect the respective locations of one or more portions of light incident at the sensor 1314. For example, the lights 1310A-1310B can be incident at the sensor 1214.

The optical system 1300 can include one or more structures. Here, the optical system 1300 includes a structure 1316A and a structure 1316B. The structure 1316A can serve to block one or more beams from being conveyed to the sensor 1314. In some implementations, the structure 1316A can block one or more aspects of autofocus light that have been reflected at the substrate 1306. For example, the structure 1316A can block the light 1308A. The structure 1316B can serve to block one or more beams from being conveyed to the sensor 1314. In some implementations, the structure 1316B can block one or more aspects of autofocus light that have been reflected at the substrate 1306. For example, the structure 1316B can block the light 1308B.

The sensor 1314 can be used for determining one or more characteristics of the lights 1310A-1310B. In some implementations, a predefined separation 1318 can be specified that corresponds to the substrate 1306 being in focus of an objective of the optical system 1300. For example, the optical system 1300 can determine whether a distance between the lights 1310A-1310B at the sensor 1314 is at least substantially equal to the predefined separation 1216, indicating that the surface 1306B is currently in focus.

Figure 14:
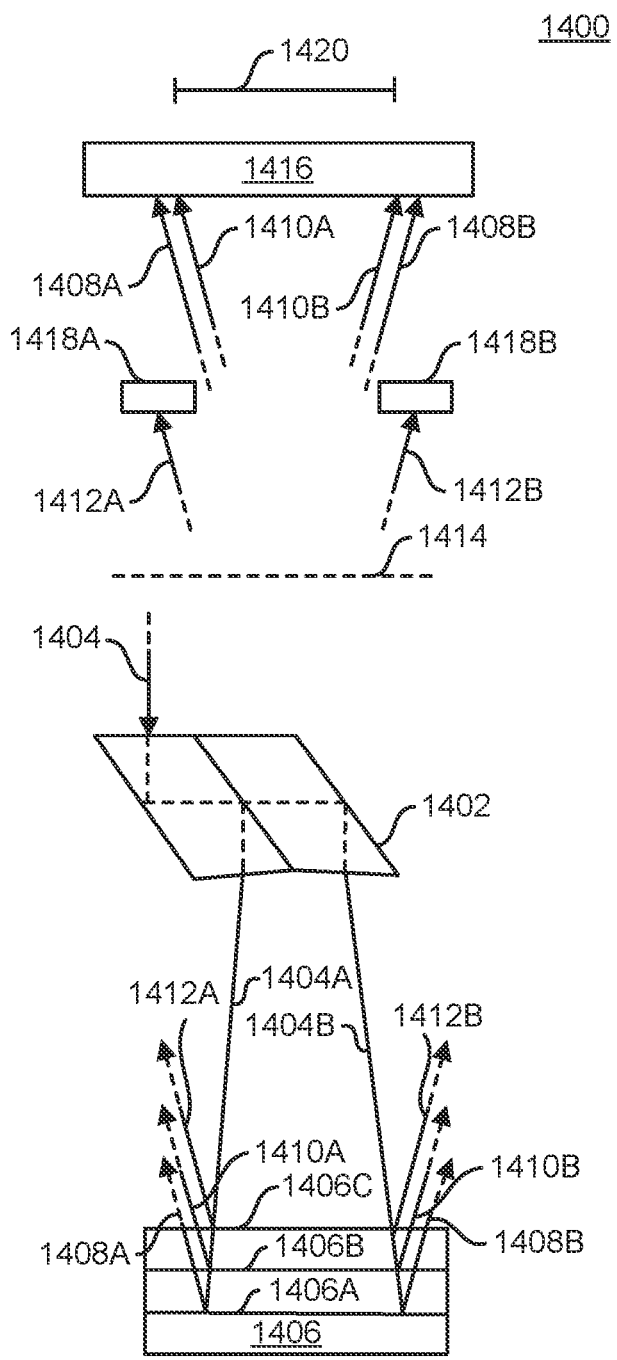
FIG. 14 schematically shows an optical system with a lateral displacement prism.

FIG. 14 schematically shows an optical system 1400 with a lateral displacement prism 1402. The optical system 1400 can include, or be used with, one or more other embodiments described herein. In some implementations, the optical system 1400 can be included within the system 100 in FIG. 1. In some implementations, the optical system 1400 can include, or be used with, the optical system 200 in FIG. 2. In some implementations, the optical system 1400 can include, or be used with, the optical system 500 in FIG. 5. In some implementations, the optical system 1400 can include, or be used with, the optical system 800 in FIG. 8A. In some implementations, the optical system 1400 can include, or be used with, the optical system 820 in FIG. 8B. In some implementations, the optical system 1400 can include, or be used with, the lateral displacement prism 1000 in FIGS. 10A-10C. In some implementations, the optical system 1400 can include, or be used with, the optical system 1100 in FIG. 11. In some implementations, the optical system 1400 can include, or be used with, the optical system 1200 in FIG. 12. In some implementations, the optical system 1400 can include, or be used with, the optical system 1300 in FIG. 13. In some implementations, the optical system 1400 can include, or be used with, the lateral displacement prism 1600 in FIGS. 16A-16B. In some implementations, the optical system 1400 can include, or be used with, the beam splitter 1700 in FIG. 17. In some implementations, the optical system 1400 can be included within the imaging module 1800 in FIGS. 18 and 19A-19B. In some implementations, the optical system 1400 can be used with the SIM assembly 2000 in FIG. 20. In some implementations, the optical system 1400 can be included within the imaging module 2100 in FIG. 21. In some implementations, the optical system 1400 can be included within the imaging module 2200 in FIG. 22. In some implementations, the optical system 1400 can be included within the imaging module 2400 in FIG. 24. In some implementations, the optical system 1400 can be included within the optical system 2500 in FIG. 25. In some implementations, the optical system 1400 can be included within the optical system 2600 in FIG. 26. In some implementations, the optical system 1400 can include, or be used with, the reflective component 2700 in FIG. 27. In some implementations, the optical system 1400 can include, or be used with, the reflective component 2800 in FIG. 28. In some implementations, the optical system 1400 can generate the autofocus light 2900 in FIG. 29. In some implementations, the optical system 1400 can generate the autofocus light 3000 in FIG. 30. In some implementations, the optical system 1400 can generate the autofocus light 3100 in FIGS. 31A-31C. In some implementations, the optical system 1400 can include, or be used with, the laser engine heat sink 3200 in FIGS. 32A-32C. In some implementations, the optical system 1400 can include, or be used with, the laser engine heat sink 3300 in FIGS. 33A-33C. In some implementations, the optical system 1400 can include, or be used with, the SIM assembly 3400 in FIG. 34. In some implementations, the optical system 1400 can include, or be used with, the RIGS 3500 in FIG. 35. In some implementations, the optical system 1400 can include, or be used with, the RIGS 3600 in FIG. 36. In some implementations, the optical system 1400 can include, or be used with, the piezo phase shifter 3700 in FIG. 37. In some implementations, the optical system 1400 can include, or be used with, the piezo phase shifter 3800 in FIG. 38. In some implementations, the optical system 1400 can include, or be used with, the projection lens 3900 in FIG. 39. In some implementations, the optical system 1400 can include, or be used with, the projection lens 4000 in FIG. 40. In some implementations, the optical system 1400 can generate the field of view 4100 in FIG. 41.

Light 1404 can enter the lateral displacement prism 1402 through an entry surface. For example, the light 1404 is autofocus light generated by a light source (e.g., a laser diode). Light 1404A can exit the lateral displacement prism 1402 through an exit surface. Light 1404B can exit the lateral displacement prism 1402 through another exit surface. The light 1404A and the light 1404B diverge at a predetermined angle from each other.

The optical system 1400 includes a substrate 1406. The substrate 1406 can be used for holding one or more samples to be analyzed. In some implementations, the sample at the substrate 1406 can include nucleic material. For example, the substrate 1406 can include a flow cell for imaging nucleic matter. The substrate 1406 can include at least a surface 1406A, a surface 1406B, and a surface 1406C. Reflection of the light 1404A at the surface 1406A can form light 1408A. Reflection of the light 1404A at the surface 1406B can form light 1410A. Reflection of the light 1404A at the surface 1406C can form light 1412A. Reflection of the light 1404B at the surface 1406A can form light 1408B. Reflection of the light 1404B at the surface 1406B can form light 1410B. Reflection of the light 1404B at the surface 1406C can form light 1412B.

The lights 1408A-1408B, 1410A-1410B, and 1412A-1412B can be transmitted and/or reflected and/or refracted by at least one other component (not shown) in the optical system 1400. Here, a line 1414 schematically illustrates the additional component(s) of the optical system 1400, and the processing of the lights 1408A-1408B, 1410A-1410B, and 1412A-1412B performed at the additional component(s).

The optical system 1400 includes a sensor 1416. The sensor 1416 can detect reflected autofocus light during an autofocus procedure, and/or detect emission light during an analysis procedure. In some implementations, the sensor 1416 includes a rectangular array of light-sensitive elements that can detect the respective locations of one or more portions of light incident at the sensor 1416. For example, the lights 1408A-1408B and 1410A-1410B can be incident at the sensor 1416.

The optical system 1400 can include one or more structures. Here, the optical system 1400 includes a structure 1418A and a structure 1418B. The structure 1418A can serve to block one or more beams from being conveyed to the sensor 1416. In some implementations, the structure 1418A can block one or more aspects of autofocus light that have been reflected at the substrate 1406. For example, the structure 1418A can block the light 1412A. The structure 1418B can serve to block one or more beams from being conveyed to the sensor 1416. In some implementations, the structure 1418B can block one or more aspects of autofocus light that have been reflected at the substrate 1406. For example, the structure 1418B can block the light 1412B.

The sensor 1416 can be used for determining one or more characteristics of the lights 1408A-1408B and 1410A-1410B. In some implementations, a predefined separation 1420 can be specified that corresponds to the substrate 1406 being in focus of an objective of the optical system 1400. For example, the optical system 1400 can determine whether a distance between the lights 1408A-1408B at the sensor 1416 is at least substantially equal to the predefined separation 1420, indicating that the surface 1406A is currently in focus. As another example, the optical system 1400 can determine whether a distance between the lights 1410A-1410B at the sensor 1416 is at least substantially equal to the predefined separation 1420, indicating that the surface 1406B is currently in focus.

Figure 15:
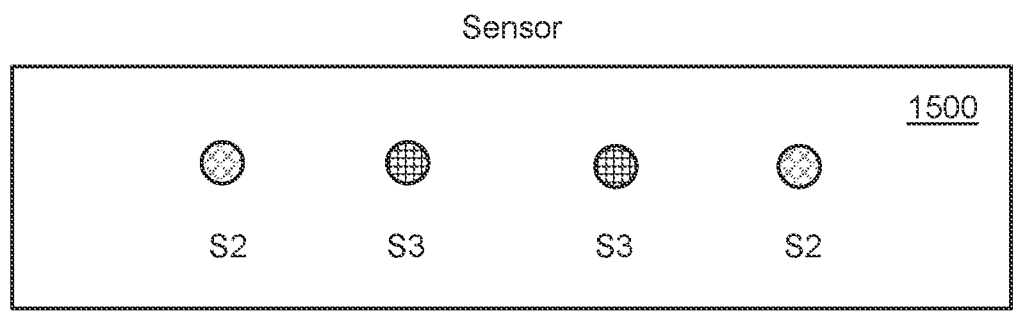
FIG. 15 illustrates an embodiment of autofocus light at a sensor.

FIG. 15 illustrates an embodiment of autofocus light at a sensor 1500. The sensor 1500 can be used with, or be included within, one or more other embodiments described herein. In some implementations, the sensor 1500 can be included within the system 100 in FIG. 1. In some implementations, the sensor 1500 can be used with, or be included within, the optical system 200 in FIG. 2. In some implementations, the sensor 1500 can be used with, or be included within, the optical system 500 in FIG. 5. In some implementations, the sensor 1500 can be used with, or be included within, the optical system 800 in FIG. 8A. In some implementations, the sensor 1500 can be used with, or be included within, the optical system 820 in FIG. 8B. In some implementations, the sensor 1500 can be used with, or be included within, the optical system 1100 in FIG. 11. In some implementations, the sensor 1500 can be used with, or be included within, the optical system 1200 in FIG. 12. In some implementations, the sensor 1500 can be used with, or be included within, the optical system 1300 in FIG. 13. In some implementations, the sensor 1500 can be used with, or be included within, the optical system 1400 in FIG. 14. In some implementations, the sensor 1500 can be used with, or be included within, the imaging module 1800 in FIGS. 18 and 19A-19B. In some implementations, the sensor 1500 can be used with, or be included within, the imaging module 2100 in FIG. 21. In some implementations, the sensor 1500 can be used with, or be included within, the imaging module 2200 in FIG. 22. In some implementations, the sensor 1500 can be used with, or be included within, the imaging module 2400 in FIG. 24. In some implementations, the sensor 1500 can be used with, or be included within, the optical system 2500 in FIG. 25. In some implementations, the sensor 1500 can be used with, or be included within, the optical system 2600 in FIG. 26. In some implementations, the sensor 1500 can be used with the reflective component 2700 in FIG. 27. In some implementations, the sensor 1500 can be used with the reflective component 2800 in FIG. 28. In some implementations, the sensor 1500 can receive the autofocus light 2900 in FIG. 29. In some implementations, the sensor 1500 can receive the autofocus light 3000 in FIG. 30. In some implementations, the sensor 1500 can receive the autofocus light 3100 in FIGS. 31A-31C. In some implementations, the sensor 1500 can be used with the laser engine heat sink 3200 in FIGS. 32A-32C. In some implementations, the sensor 1500 can be used with the laser engine heat sink 3300 in FIGS. 33A-33C. In some implementations, the sensor 1500 can be used with the SIM assembly 3400 in FIG. 34. In some implementations, the sensor 1500 can be used with the RIGS 3500 in FIG. 35. In some implementations, the sensor 1500 can be used with the RIGS 3600 in FIG. 36. In some implementations, the sensor 1500 can be used with the piezo phase shifter 3700 in FIG. 37. In some implementations, the sensor 1500 can be used with the piezo phase shifter 3800 in FIG. 38. In some implementations, the sensor 1500 can be used with the projection lens 3900 in FIG. 39. In some implementations, the sensor 1500 can be used with the projection lens 4000 in FIG. 40. In some implementations, the sensor 1500 can capture the field of view 4100 in FIG. 41.

The sensor 1500 shows light spots corresponding to registration by the sensor 1500 of incident light. In some implementations, the light spots correspond to parts of autofocus light that have been reflected off respective surfaces of a substrate. For example, the spots labeled "S2" may have been reflected from a top surface of a fluidic channel in a flow cell. As another example, the spots labeled "S3" may have been reflected from a bottom surface of a fluidic channel in a flow cell. The separation between the two S2 spots tracks the distance between the S2 surface and an objective of an optical system. The separation between the two S3 spots tracks the distance between the S3 surface and an objective of an optical system. The sensor 1500 illustrates that forming divergence between beams of autofocus light (e.g., using a lateral displacement prism), and/or steering of at least one of a desired autofocus reflection or an unwanted autofocus reflection, can provide a clear image that facilitates efficient and precise tracking of focus in an optical system.

Figure 16A:
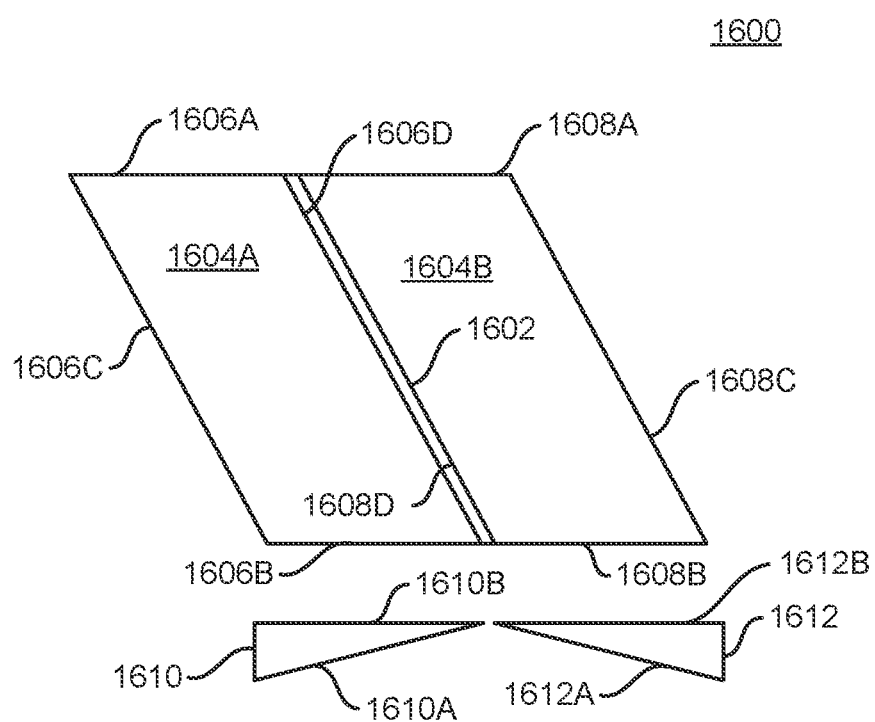
FIGS. 16A-16B show embodiments of a lateral displacement prism.
Figure 16B:
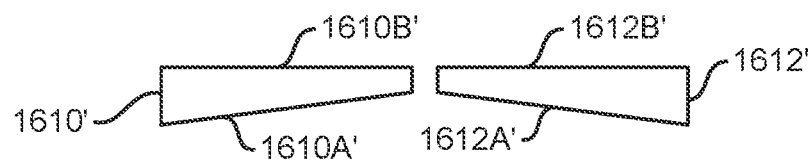

FIGS. 16A-16B show embodiments of a lateral displacement prism 1600. The lateral displacement prism 1600 can be used with, or be included within, one or more other embodiments described herein. In some implementations, the lateral displacement prism 1600 can be used with, or be included within, the system 100 in FIG. 1. In some implementations, the lateral displacement prism 1600 can be used with, or be included within, the optical system 200 in FIG. 2. In some implementations, the lateral displacement prism 1600 can be used with, or be included within, the optical system 500 in FIG. 5. In some implementations, the lateral displacement prism 1600 can be used with, or be included within, the optical system 800 in FIG. 8A. In some implementations, the lateral displacement prism 1600 can be used with, or be included within, the optical system 820 in FIG. 8B. In some implementations, the lateral displacement prism 1600 can be used with, or be included within, the optical system 1100 in FIG. 11. In some implementations, the lateral displacement prism 1600 can be used with, or be included within, the optical system 1200 in FIG. 12. In some implementations, the lateral displacement prism 1600 can be used with, or be included within, the optical system 1300 in FIG. 13. In some implementations, the lateral displacement prism 1600 can be used with, or be included within, the optical system 1400 in FIG. 14. In some implementations, the lateral displacement prism 1600 can be used with, or be included within, the imaging module 1800 in FIGS. 18 and 19A-19B. In some implementations, the lateral displacement prism 1600 can be used with, or be included within, the imaging module 2100 in FIG. 21. In some implementations, the lateral displacement prism 1600 can be used with, or be included within, the imaging module 2200 in FIG. 22. In some implementations, the lateral displacement prism 1600 can be used with, or be included within, the imaging module 2400 in FIG. 24. In some implementations, the lateral displacement prism 1600 can be used with, or be included within, the optical system 2500 in FIG. 25. In some implementations, the lateral displacement prism 1600 can be used with, or be included within, the optical system 2600 in FIG. 26. In some implementations, the lateral displacement prism 1600 can be used with the reflective component 2700 in FIG. 27. In some implementations, the lateral displacement prism 1600 can be used with the reflective component 2800 in FIG. 28. In some implementations, the lateral displacement prism 1600 can generate the autofocus light 2900 in FIG. 29. In some implementations, the lateral displacement prism 1600 can generate the autofocus light 3000 in FIG. 30. In some implementations, the lateral displacement prism 1600 can generate the autofocus light 3100 in FIGS. 31A-31C. In some implementations, the lateral displacement prism 1600 can be used with the laser engine heat sink 3200 in FIGS. 32A-32C. In some implementations, the lateral displacement prism 1600 can be used with the laser engine heat sink 3300 in FIGS. 33A-33C. In some implementations, the lateral displacement prism 1600 can be used with the SIM assembly 3400 in FIG. 34. In some implementations, the lateral displacement prism 1600 can be used with the RIGS 3500 in FIG. 35. In some implementations, the lateral displacement prism 1600 can be used with the RIGS 3600 in FIG. 36. In some implementations, the lateral displacement prism 1600 can be used with the piezo phase shifter 3700 in FIG. 37. In some implementations, the lateral displacement prism 1600 can be used with the piezo phase shifter 3800 in FIG. 38. In some implementations, the lateral displacement prism 1600 can be used with the projection lens 3900 in FIG. 39. In some implementations, the lateral displacement prism 1600 can be used with the projection lens 4000 in FIG. 40.

The lateral displacement prism 1600 includes a partially reflective layer 1602. In some implementations, the lateral displacement prism 1600 can be manufactured by assembling a prism piece 1604A and a prism piece 1604B with each other with the partially reflective layer 1602 positioned at the joint between the two prism pieces, wherein the prism pieces 1604A-1604B are at least substantially identical to each other. Each of the prism pieces 1604A-1604B has a parallelogram profile as viewed in the current illustration. In some implementations, the prism piece 1604A is a quadrilateral having a side 1606A and a side 1606B that are parallel to each other, and having a side 1606C and a side 1606D that are parallel to each other. In some implementations, the prism piece 1604B is a quadrilateral having a side 1608A and a side 1608B that are parallel to each other, and having a side 1608C and a side 1608D that are parallel to each other. The assembly of the prism pieces 1604A-1604B with the partially reflective layer 1602 also has a parallelogram profile as viewed in the current illustration.

The lateral displacement prism 1600 includes a prism 1610 and a prism 1612. Each of the prisms 1610-1612 can have a wedge profile. For example, a wedge profile can include a triangle shape. In some implementations, the prism 1610 has a side 1610A that can be considered an exit side for the prism 1610. For example, a side 1610B can be opposite to the side 1610A in the prism 1610, and the sides 1610A-1610B can form a non-zero angle with regard to each other. In some implementations, the prism 1612 has a side 1612A that can be considered an exit side for the prism 1612. For example, a side 1612B can be opposite to the side 1612A in the prism 1612, and the sides 1612A-1612B can form a non-zero angle with regard to each other. The lateral displacement prism 1600 can be assembled by placing the side 1610B of the prism 1610 against the side 1606B of the prism piece 1604A, and by placing the side 1612B of the prism 1612 against the side 1608B of the prism piece 1604B. In some implementations, this facilitates that the sides 1610A and 1612A can serve as exit surfaces of the lateral displacement prism 1600. For example, this arrangement can provide the lateral displacement prism 1600 with exit surfaces having a non-zero angle relative to each other.

The lateral displacement prism 1600 can also or instead include a prism 1610' and a prism 1612', for example as illustrated in FIG. 16B. Each of the prisms 1610' and 1612' can have a wedge profile. For example, a wedge profile can include a truncated triangle shape. In some implementations, the prism 1610' has a side 1610A' that can be considered an exit side for the prism 1610'. For example, a side 1610B' can be opposite to the side 1610A' in the prism 1610', and the sides 1610A' and 1610B' can form a non-zero angle with regard to each other. In some implementations, the prism 1612' has a side 1612A' that can be considered an exit side for the prism 1612'. For example, a side 1612B' can be opposite to the side 1612A' in the prism 1612', and the sides 1612A' and 1612B' can form a non-zero angle with regard to each other. The lateral displacement prism 1600 can be assembled by placing the side 1610B' of the prism 1610' against the side 1606B of the prism piece 1604A, and by placing the side 1612B' of the prism 1612' against the side 1608B of the prism piece 1604B. In some implementations, this facilitates that the sides 1610A' and 1612A' can serve as exit surfaces of the lateral displacement prism 1600. For example, this arrangement can provide the lateral displacement prism 1600 with exit surfaces having a non-zero angle relative to each other.

Figure 17:
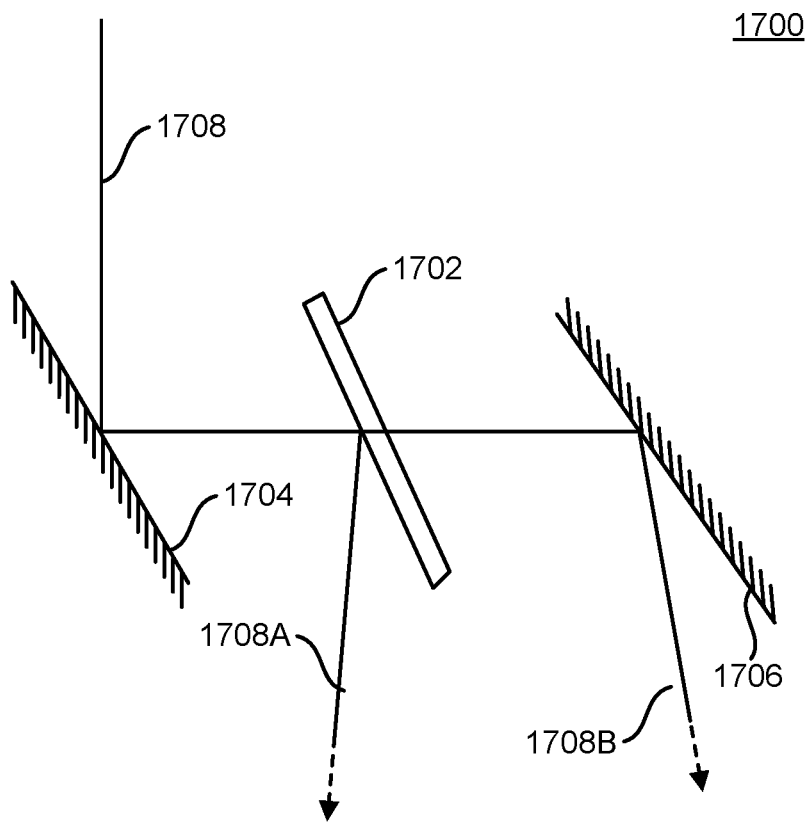
FIG. 17 shows an embodiment of a beam splitter.

FIG. 17 shows an embodiment of a beam splitter 1700. The beam splitter 1700 can be used with, or be included within, one or more other embodiments described herein. In some implementations, the beam splitter 1700 can be used with, or be included within, the system 100 in FIG. 1. In some implementations, the beam splitter 1700 can be used with, or be included within, the optical system 200 in FIG. 2. In some implementations, the beam splitter 1700 can be used with, or be included within, the optical system 500 in FIG. 5. In some implementations, the beam splitter 1700 can be used with, or be included within, the optical system 800 in FIG. 8A. In some implementations, the beam splitter 1700 can be used with, or be included within, the optical system 820 in FIG. 8B. In some implementations, the beam splitter 1700 can be used with, or be included within, the optical system 1100 in FIG. 11. In some implementations, the beam splitter 1700 can be used with, or be included within, the optical system 1200 in FIG. 12. In some implementations, the beam splitter 1700 can be used with, or be included within, the optical system 1300 in FIG. 13. In some implementations, the beam splitter 1700 can be used with, or be included within, the optical system 1400 in FIG. 14. In some implementations, the beam splitter 1700 can be used with, or be included within, the imaging module 1800 in FIGS. 18 and 19A-19B. In some implementations, the beam splitter 1700 can be used with, or be included within, the imaging module 2100 in FIG. 21. In some implementations, the beam splitter 1700 can be used with, or be included within, the imaging module 2200 in FIG. 22. In some implementations, the beam splitter 1700 can be used with, or be included within, the imaging module 2400 in FIG. 24. In some implementations, the beam splitter 1700 can be used with, or be included within, the optical system 2500 in FIG. 25. In some implementations, the beam splitter 1700 can be used with, or be included within, the optical system 2600 in FIG. 26. In some implementations, the beam splitter 1700 can be used with the reflective component 2700 in FIG. 27. In some implementations, the beam splitter 1700 can be used with the reflective component 2800 in FIG. 28. In some implementations, the beam splitter 1700 can generate the autofocus light 2900 in FIG. 29. In some implementations, the beam splitter 1700 can generate the autofocus light 3000 in FIG. 30. In some implementations, the beam splitter 1700 can generate the autofocus light 3100 in FIGS. 31A-31C. In some implementations, the beam splitter 1700 can be used with the laser engine heat sink 3200 in FIGS. 32A-32C. In some implementations, the beam splitter 1700 can be used with the laser engine heat sink 3300 in FIGS. 33A-33C. In some implementations, the beam splitter 1700 can be used with the SIM assembly 3400 in FIG. 34. In some implementations, the beam splitter 1700 can be used with the RIGS 3500 in FIG. 35. In some implementations, the beam splitter 1700 can be used with the RIGS 3600 in FIG. 36. In some implementations, the beam splitter 1700 can be used with the piezo phase shifter 3700 in FIG. 37. In some implementations, the beam splitter 1700 can be used with the piezo phase shifter 3800 in FIG. 38. In some implementations, the beam splitter 1700 can be used with the projection lens 3900 in FIG. 39. In some implementations, the beam splitter 1700 can be used with the projection lens 4000 in FIG. 40.

The beam splitter 1700 includes a partially reflective layer 1702. The beam splitter 1700 includes a reflective surface 1704 and a reflective surface 1706. Light 1708 can enter the beam splitter 1700. For example, the light 1708 is autofocus light generated by a light source (e.g., a laser diode). After reflection at the reflective surface 1704, the light 1708 can be incident on the partially reflective layer 1702. As a result, light 1708A reflected at the partially reflective layer 1702 can be formed by the beam splitter 1700. Also, light 1708B can be transmitted at the partially reflective layer 1702 and reflected at the reflective surface 1706. The light 1708A and the light 1708B diverge at a predetermined angle from each other.

Figure 18:
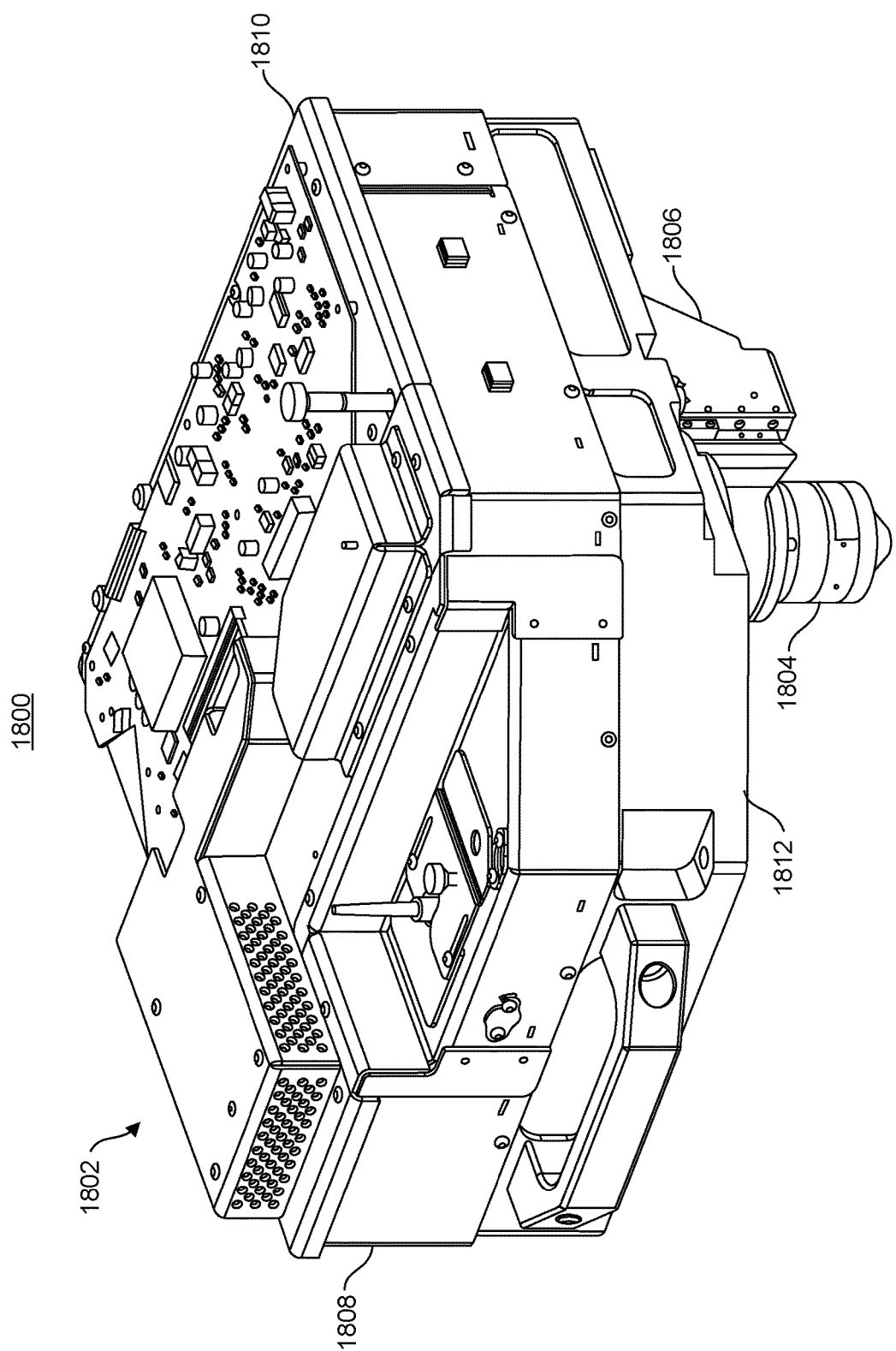
FIG. 18 shows an embodiment of an imaging module.

FIG. 18 shows an embodiment of an imaging module 1800. The imaging module 1800 can include, or be used with, one or more other embodiments described herein. In some implementations, the imaging module 1800 can include, or be used with, the system 4200 in FIG. 42. In some implementations, the imaging module 1800 can include, or be used with, at least some components of the computing device 4300 in FIG. 43. In some implementations, the imaging module 1800 can be included within the system 100 in FIG. 1. In some implementations, the imaging module 1800 can include, or be used with, the optical system 200 in FIG. 2. In some implementations, the imaging module 1800 can include, or be used with, the optical system 500 in FIG. 5. In some implementations, the imaging module 1800 can include, or be used with, the optical system 800 in FIG. 8A. In some implementations, the imaging module 1800 can include, or be used with, the optical system 820 in FIG. 8B. In some implementations, the imaging module 1800 can include, or be used with, the lateral displacement prism 1000 in FIGS. 10A-10C. In some implementations, the imaging module 1800 can include, or be used with, the optical system 1100 in FIG. 11. In some implementations, the imaging module 1800 can include, or be used with, the optical system 1200 in FIG. 12. In some implementations, the imaging module 1800 can include, or be used with, the optical system 1300 in FIG. 13. In some implementations, the imaging module 1800 can include, or be used with, the optical system 1400 in FIG. 14. In some implementations, the imaging module 1800 can include, or be used with, the lateral displacement prism 1600 in FIGS. 16A-16B. In some implementations, the imaging module 1800 can include, or be used with, the beam splitter 1700 in FIG. 17. In some implementations, the imaging module 1800 can include, or be used with, the imaging module 1800 in FIGS. 18 and 19A-19B. In some implementations, the imaging module 1800 can include, or be used with, the SIM assembly 2000 in FIG. 20. In some implementations, the imaging module 1800 can include, or be used with, the imaging module 2100 in FIG. 21. In some implementations, the imaging module 1800 can include, or be used with, the imaging module 2200 in FIG. 22. In some implementations, the imaging module 1800 can include, or be used with, the imaging module 2400 in FIG. 24. In some implementations, the imaging module 1800 can include, or be used with, the optical system 2500 in FIG. 25. In some implementations, the imaging module 1800 can include, or be used with, the optical system 2600 in FIG. 26. In some implementations, the imaging module 1800 can include, or be used with, the reflective component 2700 in FIG. 27. In some implementations, the imaging module 1800 can include, or be used with, the reflective component 2800 in FIG. 28. In some implementations, the imaging module 1800 can generate the autofocus light 2900 in FIG. 29. In some implementations, the imaging module 1800 can generate the autofocus light 3000 in FIG. 30. In some implementations, the imaging module 1800 can generate the autofocus light 3100 in FIGS.

31A-31C. In some implementations, the imaging module 1800 can include, or be used with, the laser engine heat sink 3200 in FIGS. 32A-32C. In some implementations, the imaging module 1800 can include, or be used with, the laser engine heat sink 3300 in FIGS. 33A-33C. In some implementations, the imaging module 1800 can include, or be used with, the SIM assembly 3400 in FIG. 34. In some implementations, the imaging module 1800 can include, or be used with, the RIGS 3500 in FIG. 35. In some implementations, the imaging module 1800 can include, or be used with, the RIGS 3600 in FIG. 36. In some implementations, the imaging module 1800 can include, or be used with, the piezo phase shifter 3700 in FIG. 37. In some implementations, the imaging module 1800 can include, or be used with, the piezo phase shifter 3800 in FIG. 38. In some implementations, the imaging module 1800 can include, or be used with, the projection lens 3900 in FIG. 39. In some implementations, the imaging module 1800 can include, or be used with, the projection lens 4000 in FIG. 40. In some implementations, the imaging module 1800 can generate the field of view 4100 in FIG. 41.

The imaging module 1800 includes multiple components and/or devices that can be integrated to operate coherently as a system to perform one or more tasks. In some implementations, the imaging module 1800 performs imaging as part of analyzing a sample. For example, the imaging module 1800 can detect fluorescence emitted from a sample of genetic material. The imaging module 1800 includes a SIM assembly 1802, which is only partially visible in the present view. For example, the SIM assembly can generate spatially structured light for illuminating a sample material. The imaging module 1800 includes an objective 1804. In some implementations, the objective 1804 can convey SIM light from the SIM assembly 1802 and apply the SIM light to a substrate (not shown) holding a sample. The imaging module 1800 includes a z-stage 1806. In some implementations, the z-stage 1806 can alter (e.g., increase or decrease) a distance (referred to here as a z-distance) between the objective 1804 and the substrate holding the sample.

The imaging module 1800 can include one or more portions of housing. In some implementations, the housing can substantially enclose components of the imaging module 1800. For example, a housing 1808 can at least partially enclose the SIM assembly 1802. As another example, a housing 1810 can at least partially enclose emission optics of the imaging module 1800 (e.g., one or more tube lenses and/or a sensor.) As another example, a housing 1812 can at least partially enclose the SIM assembly 1802 and/or at least partially enclose the detection optics.

Figure 19A:
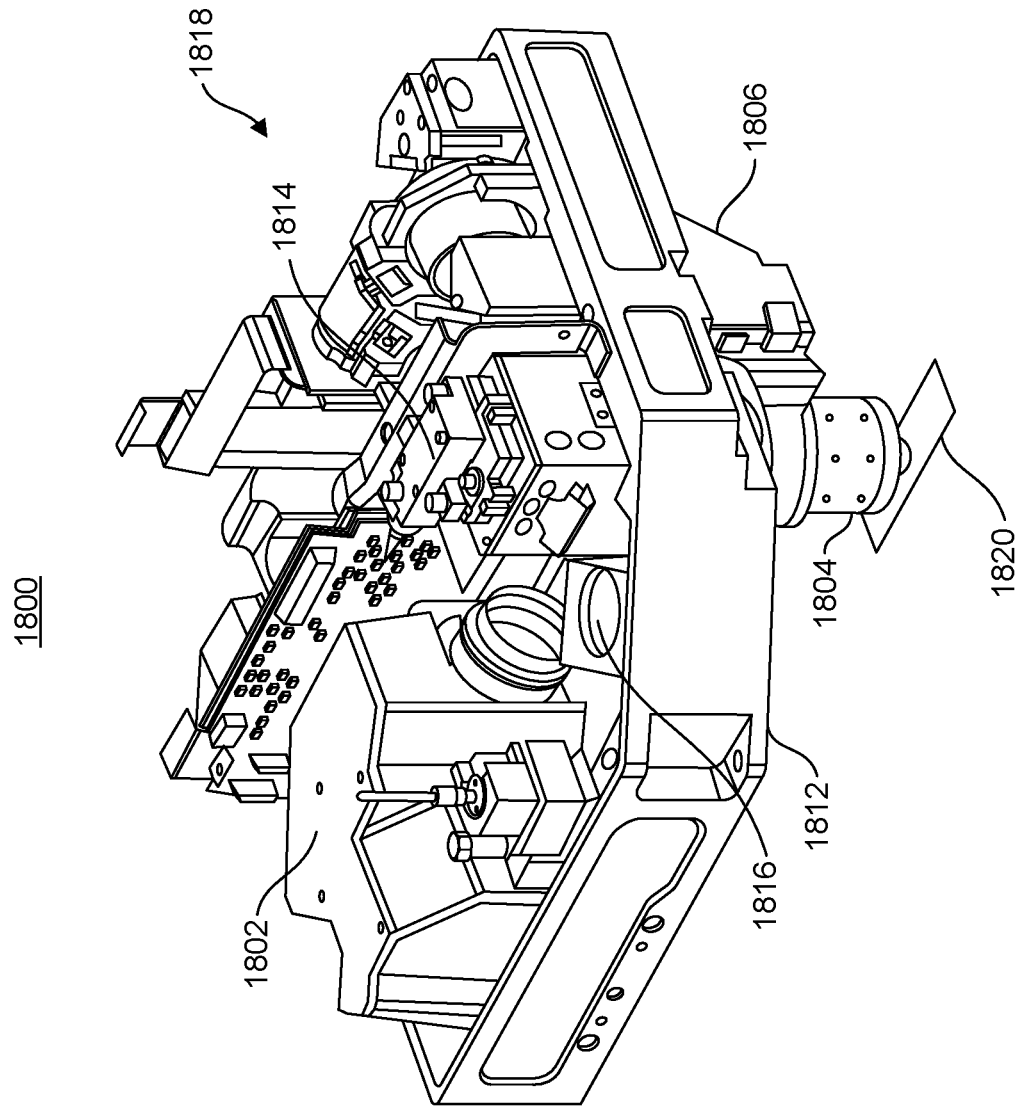
FIGS. 19A-19B show an embodiment of the imaging module of FIG. 18.
Figure 19B:
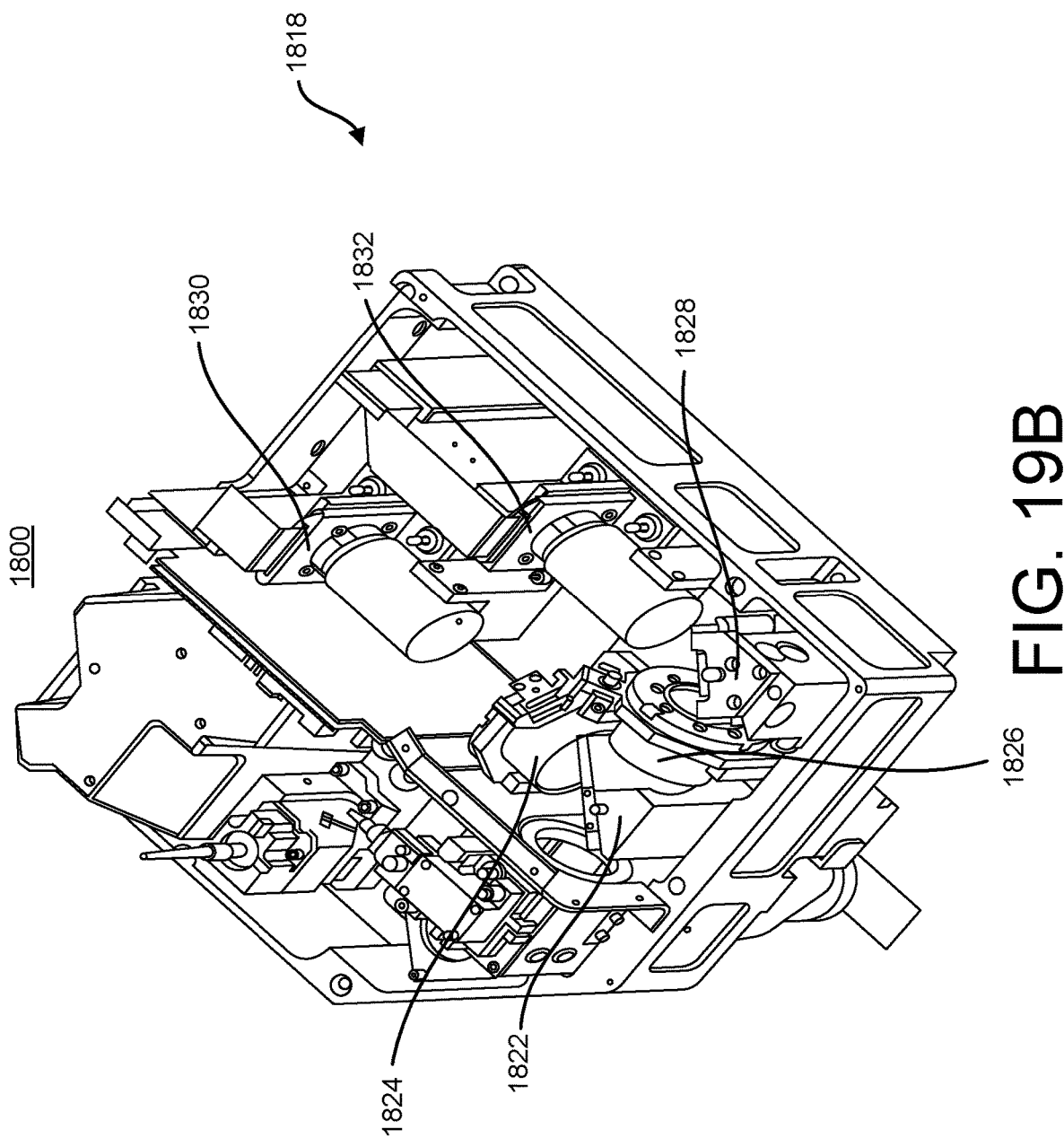

One or more of the housings can be absent from the imaging module 1800, which can make some of the components visible. This can occur during an assembly process and/or during maintenance or repair, to name just a few examples. FIGS. 19A-19B show an embodiment of the imaging module 1800 of FIG. 18. The imaging module 1800 is shown in a partially unassembled or disassembled state. For example, the housings 1808 and 1810 (FIG. 18) are currently not present at the imaging module 1800. Visible at least partly in the present view are the SIM assembly 1802, an autofocus module 1814, a compensator 1816, and emission optics 1818. The SIM assembly 1802, the autofocus module 1814, the compensator 1816, and the emission optics 1818, as well as the objective 1804, can be used when the imaging module 1800 (in an operative state) performs imaging of a substrate 1820, shown for illustrative purposes. For example, the autofocus module 1814 can perform one or more autofocus functions described elsewhere herein.

In some implementations, the emission optics 1818 includes a filter assembly 1822. The filter assembly 1822 can include at least one filter. For example, the filter assembly 1822 can include one or more of the filter 212 in FIG. 2 or the filter 506 in FIG. 5. In some implementations, the emission optics 1818 includes a tube lens 1824. For example, the tube lens 1824 can be one or more of the tube lens 214 in FIG. 2, the tube lens 508 in FIG. 5, or the tube lens 802 in FIG. 8A. The tube lens 1824 can be assigned to a blue detector channel. In some implementations, the emission optics 1818 includes a tube lens 1826. The tube lens 1826 can be assigned to a green detector channel. For example, the tube lens 1826 can be one or more of the tube lens 214 in FIG. 2, the tube lens 508 in FIG. 5, or the tube lens 802 in FIG. 8A. In some implementations, the emission optics 1818 includes a filter assembly 1828. For example, the filter assembly 1828 can include one or more of: the filter 216, the reflective component 226, or the structure 228 of FIG. 2. As another example, the filter assembly 1828 can include one or more of: the filter 510, the reflective component 516, or the structure 518 of FIG. 5. As another example, the filter assembly 1828 can include one or more of: the filter 804, the reflective components 810A-810B, or the structure 812 of FIG. 8A.

In some implementations, the emission optics 1818 includes a sensor assembly 1830. The sensor assembly 1830 can be assigned to a blue detector channel. The sensor assembly 1830 can include one or more sensors for emission light and/or autofocus light. For example, the sensor assembly 1830 can include one or more of the sensor 120 in FIG. 1; the sensor 220 in FIG. 2; the sensor 514 in FIG. 5; the sensor 808 in FIG. 5; the sensor 1112 in FIG. 11; the sensor 1214 in FIG. 12; the sensor 1314 in FIG. 13; or the sensor 1416 in FIG. 14. In some implementations, the emission optics 1818 includes a sensor assembly 1832. The sensor assembly 1832 can be assigned to a green detector channel. The sensor assembly 1832 can include one or more sensors for emission light and/or autofocus light. For example, the sensor assembly 1832 can include one or more of the sensor 120 in FIG. 1; the sensor 220 in FIG. 2; the sensor 514 in FIG. 5; the sensor 808 in FIG. 5; the sensor 1112 in FIG. 11; the sensor 1214 in FIG. 12; the sensor 1314 in FIG. 13; or the sensor 1416 in FIG. 14.

Figure 20:
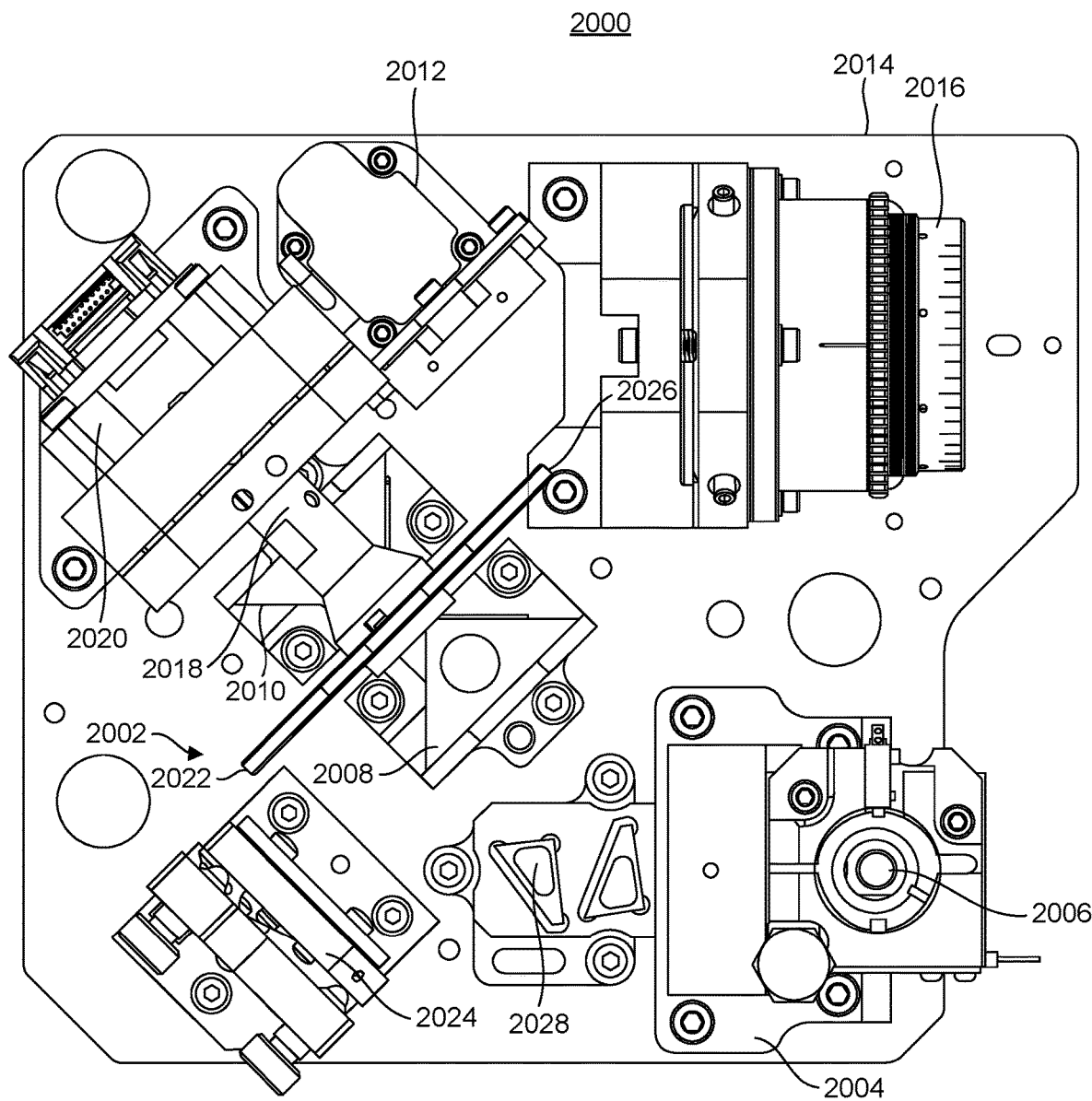
FIG. 20 shows an embodiment of a structured illumination microscopy (SIM) assembly.

FIG. 20 shows an embodiment of a SIM assembly 2000. The SIM assembly 2000 can be used with, or be included within, one or more other embodiments described herein. In some implementations, the SIM assembly 2000 can be used with, or be included within, the system 100 in FIG. 1. In some implementations, the SIM assembly 2000 can be used with, or be included within, the optical system 200 in FIG. 2. In some implementations, the SIM assembly 2000 can be used with, or be included within, the optical system 500 in FIG. 5. In some implementations, the SIM assembly 2000 can be used with, or be included within, the optical system 820 in FIG. 8B. In some implementations, the SIM assembly 2000 can be used with, or be included within, the optical system 1100 in FIG. 11. In some implementations, the SIM assembly 2000 can be used with, or be included within, the optical system 1200 in FIG. 12. In some implementations, the SIM assembly 2000 can be used with, or be included within, the optical system 1300 in FIG. 13. In some implementations, the SIM assembly 2000 can be used with, or be included within, the optical system 1400 in FIG. 14. In some implementations, the SIM assembly 2000 can be used with, or be included within, the imaging module 1800 in FIG. 18 or 19A-19B. In some implementations, the SIM assembly 2000 can be used with, or be included within, the imaging module 2100 in FIG. 21. In some implementations, the SIM assembly 2000 can be used with, or be included within, the imaging module 2200 in FIG. 22. In some implementations, the SIM assembly 2000 can include, or be used with, the imaging module 2400 in FIG. 24. In some implementations, the SIM assembly 2000 can include, or be used with, the optical system 2500 in FIG. 25. In some implementations, the SIM assembly 2000 can include, or be used with, the optical system 2600 in FIG. 26. In some implementations, the SIM assembly 2000 can include, or be used with, the reflective component 2700 in FIG. 27. In some implementations, the SIM assembly 2000 can include, or be used with, the reflective component 2800 in FIG. 28. In some implementations, the SIM assembly 2000 can generate the autofocus light 2900 in FIG. 29. In some implementations, the SIM assembly 2000 can generate the autofocus light 3000 in FIG. 30. In some implementations, the SIM assembly 2000 can generate the autofocus light 3100 in FIGS. 31A-31C. In some implementations, the SIM assembly 2000 can be used with the laser engine heat sink 3200 in FIGS. 32A-32C. In some implementations, the SIM assembly 2000 can be used with the laser engine heat sink 3300 in FIGS. 33A-33C. In some implementations, the SIM assembly 2000 can include, or be used with, the SIM assembly 3400 in FIG. 34. In some implementations, the SIM assembly 2000 can include, or be used with, the RIGS 3500 in FIG. 35. In some implementations, the SIM assembly 2000 can include, or be used with, the RIGS 3600 in FIG. 36. In some implementations, the SIM assembly 2000 can include, or be used with, the piezo phase shifter 3700 in FIG. 37. In some implementations, the SIM assembly 2000 can include, or be used with, the piezo phase shifter 3800 in FIG. 38. In some implementations, the SIM assembly 2000 can include, or be used with, the projection lens 3900 in FIG. 39. In some implementations, the SIM assembly 2000 can include, or be used with, the projection lens 4000 in FIG. 40. In some implementations, the SIM assembly 2000 can generate the field of view 4100 in FIG. 41.

The SIM assembly 2000 includes a rotatable mirror 2002. The SIM assembly 2000 includes a light source 2004. In some implementations, the light source 2004 provides light that it in turn receives through at least one fiber optic cable 2006. For example, the light source 2004 and the fiber optic cable 2006 can collectively be considered a fiber launch module. The SIM assembly 2000 includes a grating 2008 and a grating 2010. In some implementations, the grating 2008 and/or 2010 can serve as a diffractive component with regard to light from the light source 2004. For example, the grating 2008 and/or 2010 can comprise a substrate with a periodic structure, the substrate combined with a prism. The gratings 2008 and 2010 can be positioned relative to each other according to one or more arrangements. Here, the gratings 2008 and 2010 face each other in the SIM assembly 2000. The gratings 2008 and 2010 can be substantially identical to each other or can have one or more differences. The size, periodicity or other spatial aspect of one of the gratings 2008 and 2010 can differ from that/those of the other. The grating orientation (i.e., the spatial orientation of the periodic structure) of one of the gratings 2008 and 2010 can differ from that/those of the other. In some implementations, the respective grating orientations of the gratings 2008 and 2010, which gratings themselves face toward each other, can be substantially perpendicular to each other or at any other angle relative to each other. In some implementations, the gratings 2008 and 2010 can be at offset positions relative to the rotatable mirror 2002. In some implementations, the gratings 2008 and/or 2010 can be in a fixed position relative to the light source 2004.

The SIM assembly 2000 can include one or more components (e.g., as a phase selector) to facilitate phase selection with regard to the light that should be applied to a sample. Here, the SIM assembly 2000 includes a phase shifter 2012. In some implementations, the phase shifter 2012 includes a piezo fringe shifter. For example, the phase shifter 2012 can receive light from the grating 2008 and/or 2010 and can perform phase selection with regard to some or all of that light. For example, the phase shifter 2012 can be used for controlling the pattern phase of the structured light using which a particular image should be captured. The phase shifter 2012 can include a piezo actuator. For example, a piezo piston system can be used to effectuate phase selection. Other approaches can be used. For example, a tilting optical plate can be used for phase selection. For example, the SIM assembly 2000 is here implemented on a board 2014, and one or more areas of the board 2014 can be tilted to accomplish phase selection. As another example, one or more of the gratings 2008 and 2010 can be moved (e.g., translated) for the phase selection, such as by a piezo actuator. Light emanating from the phase shifter 2012 is sometimes referred to as phase-selected light, to indicate that the light has been conditioned according to a particular phase selection. In some implementations, the gratings 2008 and/or 2010 can be in a fixed position relative to the light source 2004.

The SIM assembly 2000 includes a projection lens 2016 that can include one or more optical components (e.g., a lens) to condition light that is received from the phase shifter 2012. For example, the projection lens 2016 can control the characteristics of the light before the light enters an objective lens (e.g., the objective 204 in FIG. 2).

The rotatable mirror 2002 can be used to redirect at least one beam of light toward, and/or arriving from, one or more of the gratings 2008 or 2010. The rotatable mirror 2002 can include one or more materials so as to be sufficiently reflective of the electromagnetic waves with which the sample is to be illuminated. In some implementations, the light from the light source 2004 includes a laser beam of one or more wavelengths. For example, a metal-coated mirror and/or a dielectric mirror can be used. The rotatable mirror 2002 can be double-sided. For example, the rotatable mirror 2002 can be considered double-sided if it is capable of performing reflection on at least part of both its sides (e.g., reflective at a first end for a first beam path and reflective at a second end, opposite the first end, for a second beam path).

The rotatable mirror 2002 can include an elongate member. The rotatable mirror 2002 can have any of a variety of form factors or other shape characteristics. The rotatable mirror 2002 can have a generally flat configuration. The rotatable mirror 2002 can have a substantially square or otherwise rectangular shape. The rotatable mirror 2002 can have rounded corners. The rotatable mirror 2002 can have a substantially constant thickness. The reflective surfaces of the rotatable mirror 2002 can be substantially planar.

The rotatable mirror 2002 can be supported by an axle 2018 of the SIM assembly 2000. The axle 2018 can allow the rotatable mirror 2002 to be rotated about the axle 2018 in either or both directions. The axle 2018 can be made of a material with sufficient rigidity to hold and manipulate the rotatable mirror 2002, such material(s) including, but not limited to, metal. The axle 2018 can be coupled substantially at a center of the rotatable mirror 2002. For example, the rotatable mirror 2002 can have an opening at the center, or a cutout from one side that reaches the center, so as to facilitate coupling with the axle 2018. The axle 2018 can extend at least substantially to one side of the rotatable mirror 2002. As another example, the axle 2018 can include separate axle portions that are coupled to respective faces of the rotatable mirror 2002, without the need for any opening in the rotatable mirror 2002. The axle 2018 can have at least one suspension relative to the board 2014. The suspension can be positioned at the ends of the axle 2018 on both sides of the rotatable mirror 2002. The suspension can include a bearing or other feature that facilitates low-friction operation.

The rotatable mirror 2002 can be actuated to assume one or more positions. Any form of motor or other actuator can be used for controlling the rotatable mirror 2002. In some implementations, a stepper motor 2020 is used. The stepper motor 2020 can be coupled to the axle 2018 and be used for causing the axle 2018, and thereby the rotatable mirror 2002, to rotate and assume the desired position(s). In some implementations, the rotatable mirror 2002 rotates in the same direction toward the new positions (e.g., always clockwise, or always counter-clockwise, about the rotation axis of the axle 2018). In some implementations, the rotatable mirror 2002 reciprocates between two or more positions (e.g., alternatingly clockwise or counter-clockwise, about the rotation axis of the axle 2018).

In some implementations, the light source 2004 can generate light that initially propagates toward a mirror 2024. After reflection at the mirror 2024, the light propagates toward the grating 2010. The rotatable mirror 2002 can currently be positioned (e.g., oriented about the rotational axis of the axle 2018) so that a first end 2022 of the rotatable mirror 2002 does not interrupt the light. Currently, the first end 2022 may be positioned closer to the viewer than is the light which may propagate in the plane of the drawing. That is, a reflective surface of the rotatable mirror 2002 that faces toward the light source 2004 currently does not interrupt the light because the first end 2022 does not block the path of the light. The light therefore propagates (through air, vacuum, or another fluid) until reaching the grating 2010.

The light interacts with the grating 2010 in one or more ways. In some implementations, the light undergoes diffraction based on the grating 2010. Here, light that emanates from the grating 2010 can be structured light (e.g., light having one or more pattern fringes) based on the interaction therewith by the light. The light that emanates from the grating 2010 initially propagates substantially in a direction generally toward the projection lens 2016. However, the position of the rotatable mirror 2002 is such that a second end 2026 of the rotatable mirror 2002 does interrupt the light. The second end 2026 can be opposite the first end 2022. In some implementations, the first end 2022 and the second end 2026 can be positioned at any angle relative to each other, such as any angle between 0 degrees and 180 degrees. Currently, the second end 2026 may be positioned about as close to the viewer as is the light. That is, a reflective surface of the rotatable mirror 2002 that faces toward the grating 2010 does interrupt the light that emanates from the grating 2010 because the second end 2026 blocks the path of the light. From the light, the rotatable mirror 2002 therefore directs light toward the phase shifter 2012.

The phase shifter 2012 performs phase selection on the light. For example, the phase shifter 2012 selects the pattern phase to which the sample is to be subjected in the present illumination (e.g., for purposes of capturing one or more particular images). Light emanates from the phase shifter 2012 and propagates toward, and enters, the projection lens 2016. The light corresponds to a specific phase selection made using the phase shifter 2012. The light can therefore be characterized as phase-selected light. The light can then continue to propagate through the system, for example to illuminate a sample.

Here, the characteristics of the phase-selected electromagnetic waves of the light entering the projection lens 2016 correspond to the fact that the light is diffracted by the grating 2010 and that phase-selection is performed by the phase shifter 2012. The involvement of the grating 2010, moreover, was here a result of the positioning of the rotatable mirror 2002 so that the second end 2026 thereof interrupted the light, whereas the first end 2022 did not interrupt the light.

Assume now that the rotatable mirror 2002 instead is placed in a different position. The light source 2004 here generates light that initially is reflected by the mirror 2024, and thereafter propagates toward the grating 2010. The rotatable mirror 2002 is positioned (e.g., oriented about the rotational axis of the axle 2018) so that the first end 2022 of the rotatable mirror 2002 does interrupt the light. The first end 2022 may be positioned about as close to the viewer as is the light. That is, the reflective surface of the rotatable mirror 2002 that faces toward the light source 2004 does interrupt the light because the first end 2022 blocks the path of the light. Light therefore propagates (through air, vacuum, or another fluid) until reaching the grating 2008.

The light interacts with the grating 2008 in one or more ways. In some implementations, the light undergoes diffraction based on the grating 2008. Here, light is structured light (e.g., having one or more pattern fringes) that emanates from the grating 2008 based on the interaction therewith by the light. The light propagates substantially in a direction toward the phase shifter 2012. The position of the rotatable mirror 2002 is such that the second end 2026 of the rotatable mirror 2002 does not interrupt the light. Currently, the second end 2026 may be positioned closer to the viewer than is the light. That is, no reflective surface of the rotatable mirror 2002 currently interrupts the light because the second end 2026 does not block the path of the light. The light therefore propagates until reaching the phase shifter 2012.

The phase shifter 2012 performs phase selection on the light. For example, the phase shifter 2012 selects the pattern phase to which the sample is to be subjected in the present illumination (e.g., for purposes of capturing one or more particular images). Light emanates from the phase shifter 2012 and propagates toward, and enters, the projection lens 2016. The light corresponds to a specific phase selection made using the phase shifter 2012. The light can therefore be characterized as phase-selected light. The light can then continue to propagate through the system, for example to illuminate a sample.

Here, the characteristics of the phase-selected electromagnetic waves of the light correspond to the fact that the light is diffracted by the grating 2008 and that phase-selection is performed by the phase shifter 2012. The involvement of the grating 2008, moreover, was here a result of the positioning of the rotatable mirror 2002 so that the first end 2022 thereof interrupted the light, whereas the second end 2026 did not interrupt the light. The rotatable mirror 2002 can be caused to repeatedly assume different positions by various rotations. For example, the rotatable mirror 2002 can reciprocate between positions. As another example, the rotatable mirror 2002 can rotate in the same direction (e.g., clockwise or counter-clockwise, from the perspective of the stepper motor 2020) to repeatedly assume positions.

The SIM assembly 2000 can include one or more anamorphic prisms 2028. When a single anamorphic prims is used, the light can exit the prism at an angle. A pair of anamorphic prisms can be arranged so that the exiting light is parallel to the incoming light. In some implementations, the anamorphic prism(s) 2028 can transform light from the light source 2004 in one or more regards. The light from the light source 2004 (e.g., the exit face of the fiber optic cable 2006) can have a specific geometry (e.g., a square shape), and this light is to be imaged onto the flow cell and thereafter the sensor of the system. The sensor, moreover, may have a different geometry (e.g., a rectangular shape) than the light from the light source 2004, and the anamorphic prism(s) can change the shape of the light based on the sensor geometry. For example, the anamorphic prism(s) 2028 can stretch the square fiber face into a rectangle. As another example, the anamorphic prism(s) 2028 can convert an elliptical beam into a circular light beam, and/or can convert a circular light beam into an elliptical beam. Inadequate irradiance on the sample plane can result from challenges of generating a rectangular illumination footprint using a square multimode laser fiber for the excitation source. Such technical challenges may result in reduced sequencing performance originating from less signal from DNA clusters reaching the sensor. This is solved by demagnifying a square fiber in one axis through the use of at least one anamorphic prism, including, but not limited to, one or more Anamorphic Prism Pairs. While a custom rectangular laser fiber may be implemented in some instances, a square fiber may be preferable due to manufacturability and/or serviceability. That is, the issue with a custom fiber may be due to tolerancing. Matching the required numerical aperture may be difficult and/or less reliable during the fiber pre-form phase. In addition, a custom rectangular fiber may also be difficult to form the core dimensions needed to produce the required illumination footprint. Lastly, the fiber bend radii with respect to both axis of a custom rectangular fiber may be less known than a square fiber.

The rectangular illumination footprint guarantees all laser power reaches the sample, with all transmission losses through the excitation path considered. The Laser illumination footprint using the A.P.P for this project converts a square to a rectangle. The square footprint did not match the sample plane tile dimensions. Allowing the full square illumination to reach the sensor would cause unnecessary illumination of neighboring tiles which can prematurely degrade intensity in the process. During early prototype phases, a baffle was included in the excitation path to clip the top and bottom portion of the square illumination footprint, but this resulted in a reduction of irradiance with the square fiber. Instead, the anamorphic prism pair set are included within the SIM beam path. The sample tile dimensions of 0.9 mm×1.2 mm are meant to match the aspect ratio for the Integrated Imaging Module's Sensor. The introduction of the anamorphic prism pair demagnifies the square fiber output and shapes it into a rectangle. This allows the instrument to optimize the amount of laser power that excites the sample. This is demonstrated by comparing the rectangular FOV to the square FOV with respect to the imaging tile area. This is to determine how much more laser power the rectangular footprint can provide over the square footprint:

Overlap of Barrel to Rectangle [%]=(Area_barrel)/(Area_rect)=0.968/1.08=0.896=89.6%

Overlap of Barrel to Square [%]=(Area_barrel)/(Area_square)=0.968/1.44=0.672=67.2%.

That is, by using an anamorphic prism pair to reshape the square fiber output, the power increase in percentage is (Rectangle to Barrel Overlap %)/(Square to Barrel Overlap %)=89.6/67.2=1.3333%. As a result of implementing the anamorphic prism pair, clipping the top and bottom sections of the laser is no longer necessary, while also increasing irradiance at the sample plane by 33%.

The stepper motor 2020 can be referred to as a rotating in-plane grating switcher (RIGS). In some implementations, the stepper motor 2020 actuates the axle 2018 which causes the rotatable mirror 2002 to be rotated (i.e., the "rotating" in RIGS). The rotatable mirror 2002 rotates within a plane (i.e., the "in-plane" of RIGS). The rotation of the rotatable mirror 2002 causes either the grating 2008 or the grating 2010 to be used (i.e., the "grating switcher" of RIGS).

Figure 21:
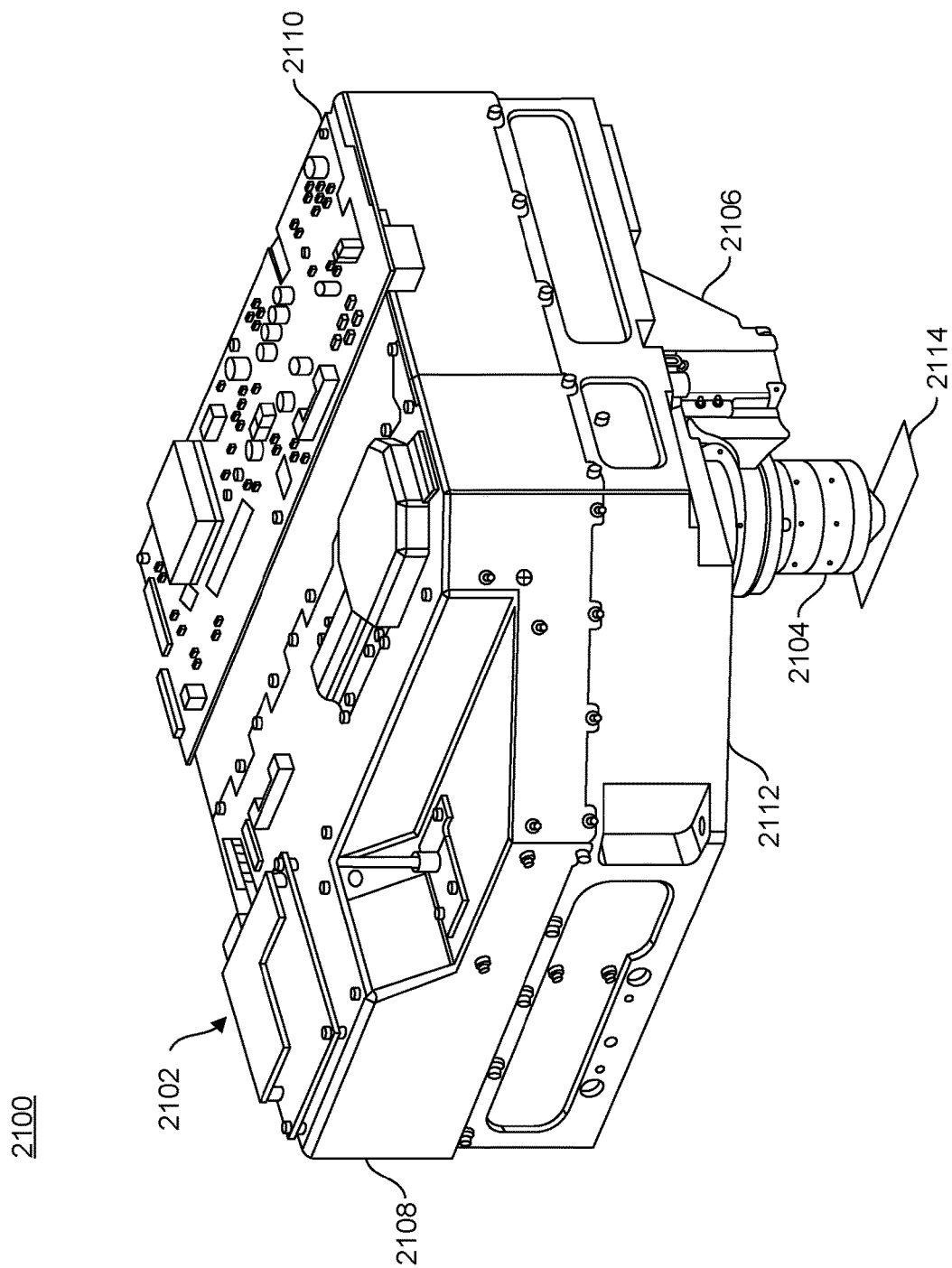
FIG. 21 shows an embodiment of an imaging module.

FIG. 21 shows an embodiment of an imaging module 2100. The imaging module 2100 can be used with, or be included within, one or more other embodiments described herein. In some implementations, the imaging module 2100 can include, or be used with, the system 4200 in FIG. 42. In some implementations, the imaging module 2100 can include, or be used with, at least some components of the computing device 4300 in FIG. 43. In some implementations, the imaging module 2100 can be used with, or be included within, the system 100 in FIG. 1. In some implementations, the imaging module 2100 can be used with, or be included within, the optical system 200 in FIG. 2. In some implementations, the imaging module 2100 can be used with, or be included within, the optical system 500 in FIG. 5. In some implementations, the imaging module 2100 can be used with, or be included within, the optical system 820 in FIG. 8B. In some implementations, the imaging module 2100 can be used with, or be included within, the optical system 1100 in FIG. 11. In some implementations, the imaging module 2100 can be used with, or be included within, the optical system 1200 in FIG. 12. In some implementations, the imaging module 2100 can be used with, or be included within, the optical system 1300 in FIG. 13. In some implementations, the imaging module 2100 can be used with, or be included within, the optical system 1400 in FIG. 14. In some implementations, the imaging module 2100 can be used with, or be included within, the imaging module 1800 in FIG. 18 or 19A-19B. In some implementations, the imaging module 2100 can be used with the SIM assembly 2000 in FIG. 20. In some implementations, the imaging module 2100 can be used with the imaging module 2200 in FIG. 22. In some implementations, the imaging module 2100 can include, or be used with, the imaging module 2400 in FIG. 24. In some implementations, the imaging module 2100 can include, or be used with, the optical system 2500 in FIG. 25. In some implementations, the imaging module 2100 can include, or be used with, the optical system 2600 in FIG. 26. In some implementations, the imaging module 2100 can include, or be used with, the reflective component 2700 in FIG. 27. In some implementations, the imaging module 2100 can include, or be used with, the reflective component 2800 in FIG. 28. In some implementations, the imaging module 2100 can generate the autofocus light 2900 in FIG. 29. In some implementations, the imaging module 2100 can generate the autofocus light 3000 in FIG. 30. In some implementations, the imaging module 2100 can generate the autofocus light 3100 in FIGS. 31A-31C. In some implementations, the imaging module 2100 can be used with the laser engine heat sink 3200 in FIGS. 32A-32C. In some implementations, the imaging module 2100 can be used with the laser engine heat sink 3300 in FIGS. 33A-33C. In some implementations, the imaging module 2100 can include, or be used with, the SIM assembly 3400 in FIG. 34. In some implementations, the imaging module 2100 can include, or be used with, the RIGS 3500 in FIG. 35. In some implementations, the imaging module 2100 can include, or be used with, the RIGS 3600 in FIG. 36. In some implementations, the imaging module 2100 can include, or be used with, the piezo phase shifter 3700 in FIG. 37. In some implementations, the imaging module 2100 can include, or be used with, the piezo phase shifter 3800 in FIG. 38. In some implementations, the imaging module 2100 can include, or be used with, the projection lens 3900 in FIG. 39. In some implementations, the imaging module 2100 can include, or be used with, the projection lens 4000 in FIG. 40. In some implementations, the imaging module 2100 can generate the field of view 4100 in FIG. 41.

The imaging module 2100 includes multiple components and/or devices that can be integrated to operate coherently as a system to perform one or more tasks. In some implementations, the imaging module 2100 performs imaging as part of analyzing a sample. For example, the imaging module 2100 can detect fluorescence emitted from a sample of genetic material. The imaging module 2100 includes a SIM assembly 2102, which is only partially visible in the present view. For example, the SIM assembly 2102 can generate spatially structured light for illuminating a sample material. The imaging module 2100 includes an objective 2104. In some implementations, the objective 2104 can convey SIM light from the SIM assembly 2102 and apply the SIM light to a substrate 2114 holding a sample. The imaging module 2100 includes a z-stage 2106. In some implementations, the z-stage 2106 can alter (e.g., increase or decrease) a distance (referred to here as a z-distance) between the objective 2104 and the substrate holding the sample.

The imaging module 2100 can include one or more portions of housing. In some implementations, the housing can substantially enclose components of the imaging module 2100. For example, a housing 2108 can at least partially enclose the SIM assembly 2102. As another example, a housing 2110 can at least partially enclose emission optics of the imaging module 2100 (e.g., one or more tube lenses and/or a sensor.) As another example, a housing 2112 can at least partially enclose the SIM assembly 2102 and/or at least partially enclose the detection optics.

One or more of the housings can be absent from the imaging module 2100, which can make some of the components visible. This can occur during an assembly process and/or during maintenance or repair, to name just a few examples.

In some implementations, one or more of the housings 2108, 2110, or 2112 of the imaging module 2100 can include aluminum. For example, the housings 2108, 2110, or 2112 can include two pieces of welded aluminum can be assembled using side fasteners. Tolerances can be defined for mounting holes, and assembly can include match drilling as applicable. Implementations can be designed to reduce or eliminate absolute camera tilts that might otherwise result doe to unit-to-unit variations in forces applied to a main baseplate in the imaging module 2100.

Figure 22:
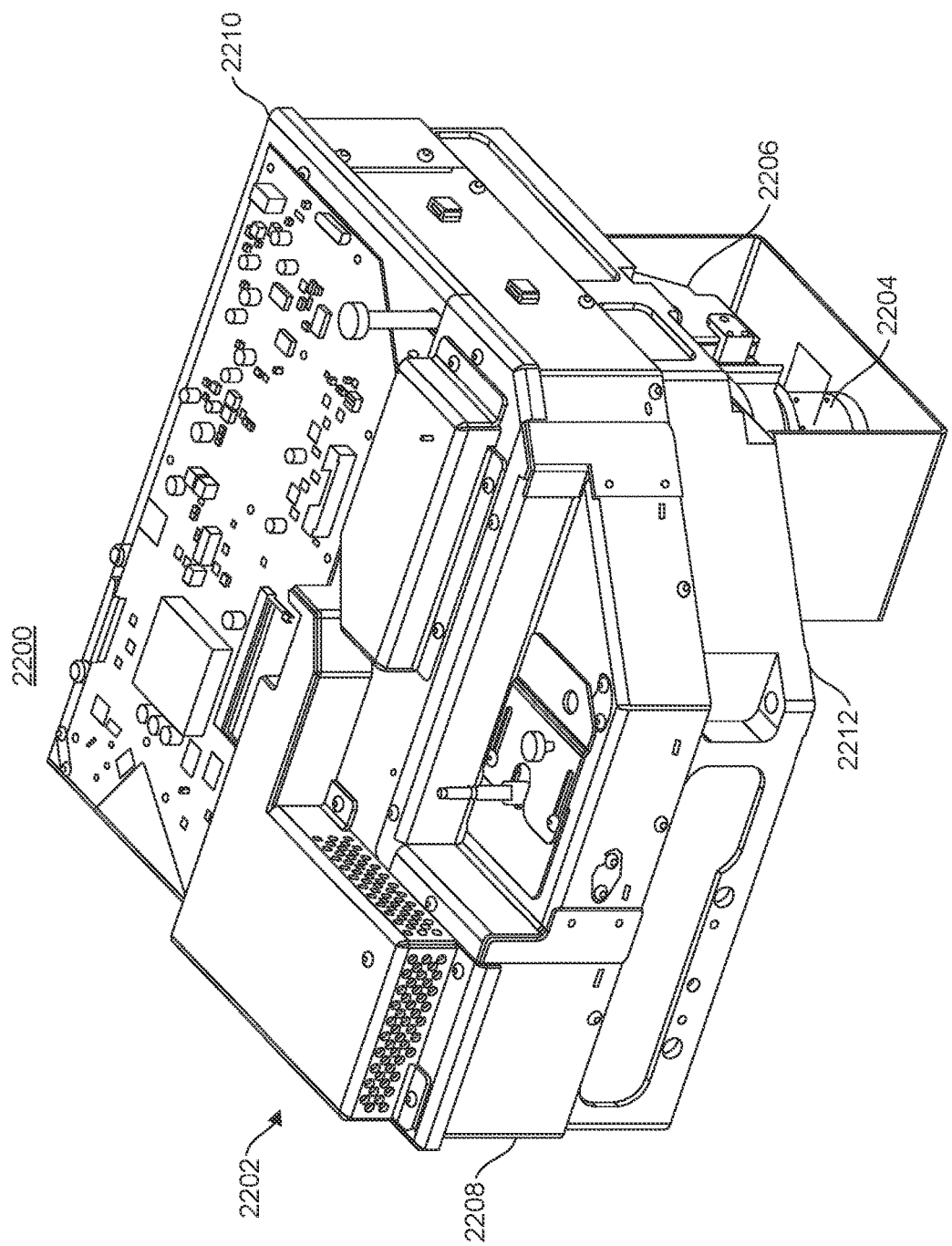
FIG. 22 shows an embodiment of an imaging module.

FIG. 22 shows an embodiment of an imaging module 2200. The imaging module 2200 can be used with, or be included within, one or more other embodiments described herein. In some implementations, the imaging module 2200 can include, or be used with, the system 4200 in FIG. 42. In some implementations, the imaging module 2200 can include, or be used with, at least some components of the computing device 4300 in FIG. 43. In some implementations, the imaging module 2200 can be used with, or be included within, the system 100 in FIG. 1. In some implementations, the imaging module 2200 can be used with, or be included within, the optical system 200 in FIG. 2. In some implementations, the imaging module 2200 can be used with, or be included within, the optical system 500 in FIG. 5. In some implementations, the imaging module 2200 can be used with, or be included within, the optical system 820 in FIG. 8B. In some implementations, the imaging module 2200 can be used with, or be included within, the optical system 1100 in FIG. 11. In some implementations, the imaging module 2200 can be used with, or be included within, the optical system 1200 in FIG. 12. In some implementations, the imaging module 2200 can be used with, or be included within, the optical system 1300 in FIG. 13. In some implementations, the imaging module 2200 can be used with, or be included within, the optical system 1400 in FIG. 14. In some implementations, the imaging module 2200 can be used with, or be included within, the imaging module 1800 in FIG. 18 or 19A-19B. In some implementations, the imaging module 2200 can be used with, or be included within, the SIM assembly 2000 in FIG. 20. In some implementations, the imaging module 2200 can be used with, or be included within, the imaging module 2100 in FIG. 21. In some implementations, the imaging module 2200 can include, or be used with, the imaging module 2400 in FIG. 24. In some implementations, the imaging module 2200 can include, or be used with, the optical system 2500 in FIG. 25. In some implementations, the imaging module 2200 can include, or be used with, the optical system 2600 in FIG. 26. In some implementations, the imaging module 2200 can include, or be used with, the reflective component 2700 in FIG. 27. In some implementations, the imaging module 2200 can include, or be used with, the reflective component 2800 in FIG. 28. In some implementations, the imaging module 2200 can generate the autofocus light 2900 in FIG. 29. In some implementations, the imaging module 2200 can generate the autofocus light 3000 in FIG. 30. In some implementations, the imaging module 2200 can generate the autofocus light 3100 in FIGS. 31A-31C. In some implementations, the imaging module 2200 can be used with the laser engine heat sink 3200 in FIGS. 32A-32C. In some implementations, the imaging module 2200 can be used with the laser engine heat sink 3300 in FIGS. 33A-33C. In some implementations, the imaging module 2200 can include, or be used with, the SIM assembly 3400 in FIG. 34. In some implementations, the imaging module 2200 can include, or be used with, the RIGS 3500 in FIG. 35. In some implementations, the imaging module 2200 can include, or be used with, the RIGS 3600 in FIG. 36. In some implementations, the imaging module 2200 can include, or be used with, the piezo phase shifter 3700 in FIG. 37. In some implementations, the imaging module 2200 can include, or be used with, the piezo phase shifter 3800 in FIG. 38. In some implementations, the imaging module 2200 can include, or be used with, the projection lens 3900 in FIG. 39. In some implementations, the imaging module 2200 can include, or be used with, the projection lens 4000 in FIG. 40. In some implementations, the imaging module 2200 can generate the field of view 4100 in FIG. 41.

The imaging module 2200 includes multiple components and/or devices that can be integrated to operate coherently as a system to perform one or more tasks. In some implementations, the imaging module 2200 performs imaging as part of analyzing a sample. For example, the imaging module 2200 can detect fluorescence emitted from a sample of genetic material. The imaging module 2200 includes a SIM assembly 2202, which is only partially visible in the present view. For example, the SIM assembly 2202 can generate spatially structured light for illuminating a sample material. The imaging module 2200 includes an objective 2204. In some implementations, the objective 2204 can convey SIM light from the SIM assembly 2202 and apply the SIM light to a substrate (not shown) holding a sample. The imaging module 2200 includes a z-stage 2206. In some implementations, the z-stage 2206 can alter (e.g., increase or decrease) a distance (referred to here as a z-distance) between the objective 2204 and the substrate holding the sample.

The imaging module 2200 can include one or more portions of housing. In some implementations, the housing can substantially enclose components of the imaging module 2200. For example, a housing 2208 can at least partially enclose the SIM assembly 2202. As another example, a housing 2210 can at least partially enclose emission optics of the imaging module 2200 (e.g., one or more tube lenses and/or a sensor.) As another example, a housing 2212 can at least partially enclose the SIM assembly 2202 and/or at least partially enclose the detection optics.

One or more of the housings can be absent from the imaging module 2200, which can make some of the components visible. This can occur during an assembly process and/or during maintenance or repair, to name just a few examples.

In some implementations, one or more of the housings 2208, 2210, or 2212 of the imaging module 2200 can include aluminum. The housings 2208, 2210, or 2212 can include aluminum components that are assembled (e.g., bolted together) without welding. For example, such an approach can allow more tolerance of component variability. In some implementations, sealing against light intrusion and/or escape, and/or sealing against particulate intrusion and/or escape, can be provided. For example, adhesive tape can be used for sealing.

Figure 23:
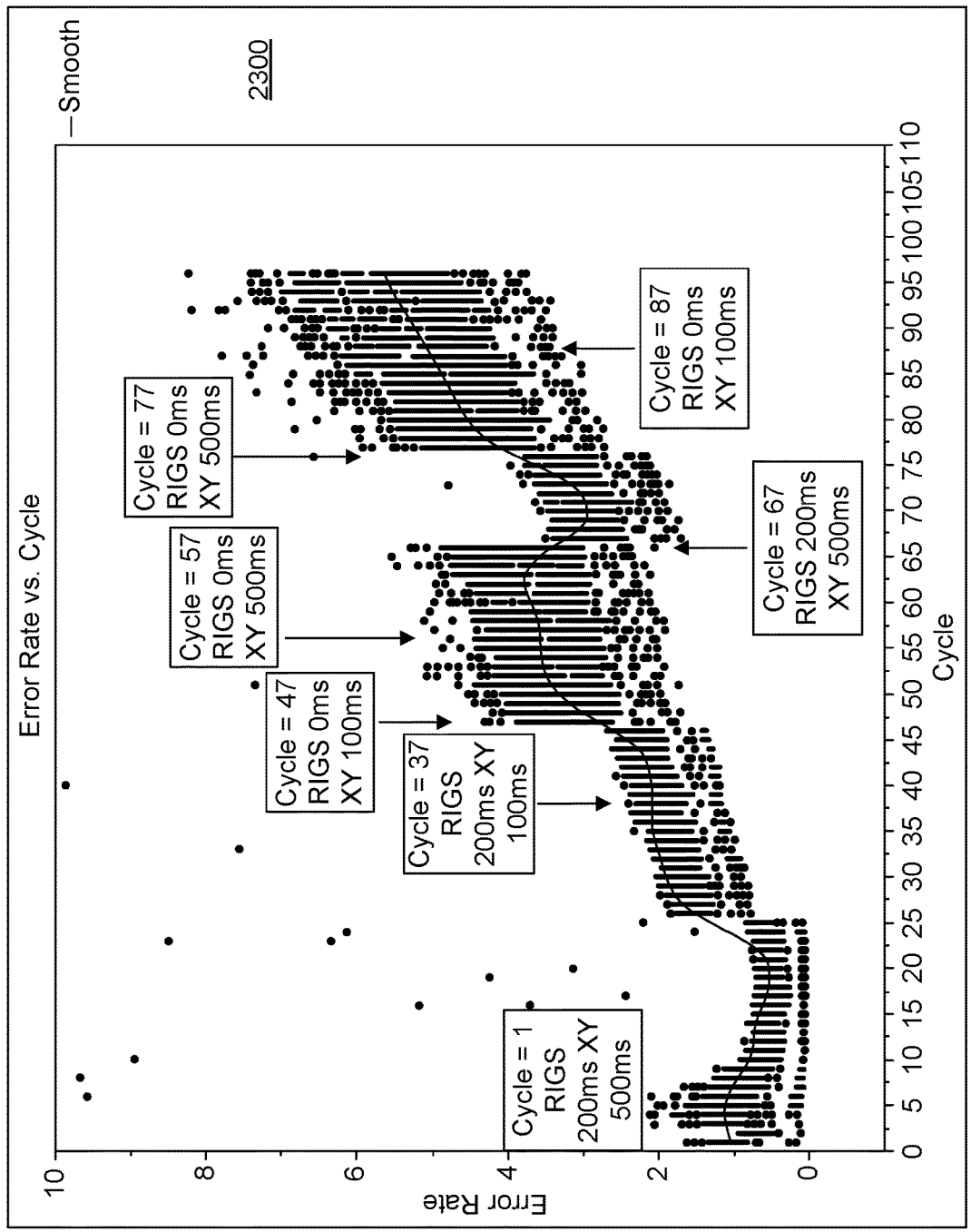
FIG. 23 shows a chart of error rates.

FIG. 23 shows a chart 2300 of error rates. The error rate (e.g., measured as a positive number) is shown against the vertical axis, which here has a scaling ranging between 0 and 10. The number of the cycle is shown against the horizontal axis, which here has a scaling ranging between 0 and 110. In some implementations, the impact of vibration of an optical component caused by motion of a RIGS (e.g., the stepper motor 2020 in FIG. 20) can be reduced or eliminated. For example, such vibration could otherwise impact fringe stability and thereby the quality of imaging. A RIGS can be operated according to an S-curve move profile. For example, this can prevent sudden accelerations or decelerations of the RIGS. In some implementations, the S-curve move profile can be optimized to minimize generation of vibrations. In some implementations, the order in which the RIGS assumes its states can be specified to reduce the impact of vibrations. For example, in one state of the RIGS a reflective component subject to vibration may be downstream of (e.g., behind) the applicable grating in the flow of light, whereas in another state of the RIGS the reflective component (or another reflective component) subject to vibration may be upstream (e.g., in front) of the grating. The upstream position may be more sensitive to vibrations in the reflective component than is the downstream position. In some implementations, the impact of the vibration can be eliminated or reduced by designing the timing and/or the order that the RIGS assumes the respective states. For example, the upstream position can be processed before the downstream position in the operation of the RIGS, or vice versa. As another example, a delay can be implemented after a RIGS move or a RIGS reset sequence. In some implementations, one or more approaches regarding the RIGS can reduce or eliminate the impact of vibrations on the imaging process. For example, the error rate can be reduced.

Figure 24:
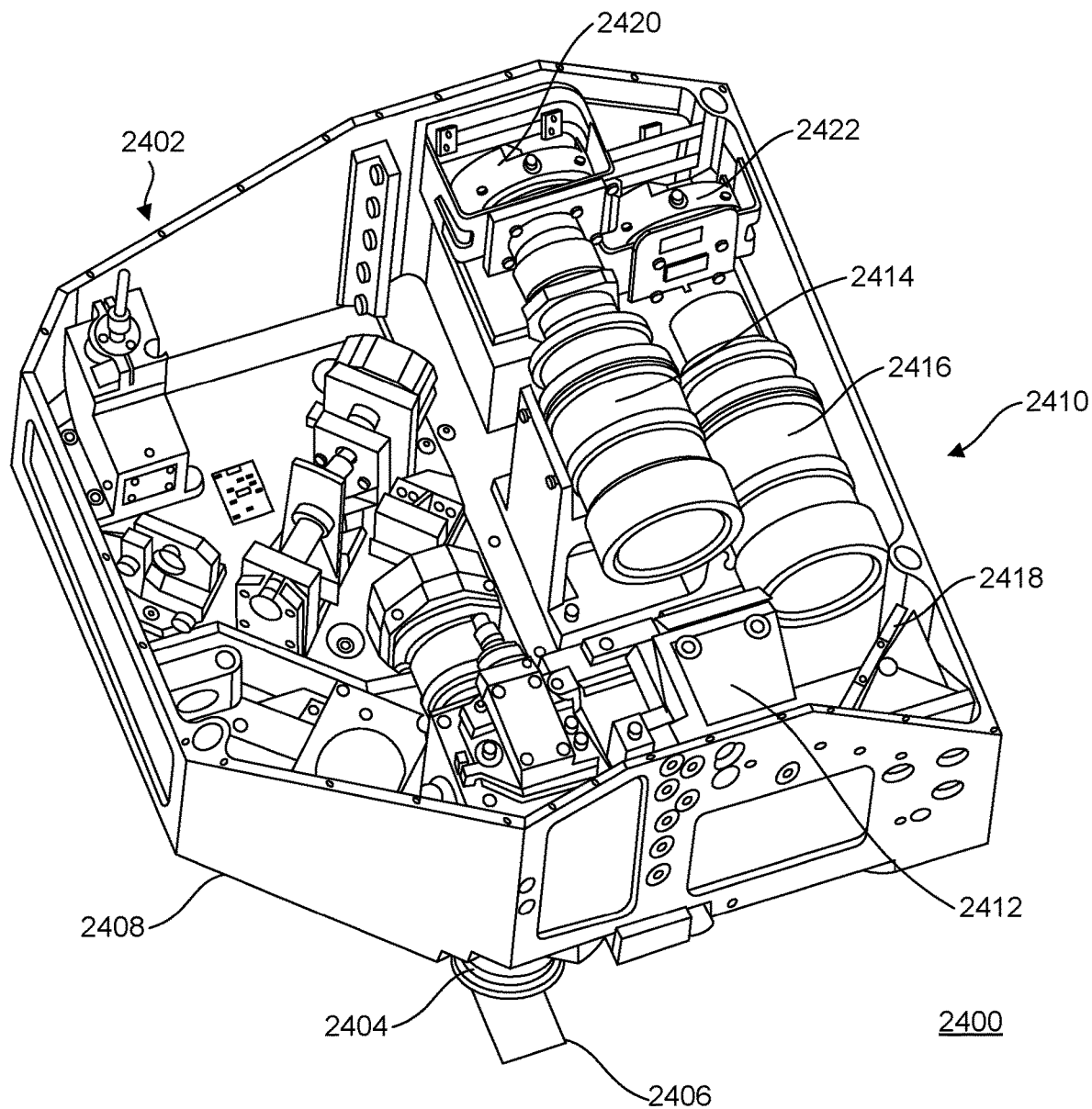
FIG. 24 shows an embodiment of an imaging module.

FIG. 24 shows an embodiment of an imaging module 2400. The imaging module 2400 can be used with, or be included within, one or more other embodiments described herein. In some implementations, the imaging module 2400 can include, or be used with, the system 4200 in FIG. 42. In some implementations, the imaging module 2400 can include, or be used with, at least some components of the computing device 4300 in FIG. 43. In some implementations, the imaging module 2400 can be used with, or be included within, the system 100 in FIG. 1. In some implementations, the imaging module 2400 can be used with, or be included within, the optical system 200 in FIG. 2. In some implementations, the imaging module 2400 can be used with, or be included within, the optical system 500 in FIG. 5. In some implementations, the imaging module 2400 can be used with, or be included within, the optical system 820 in FIG. 8B. In some implementations, the imaging module 2400 can be used with, or be included within, the optical system 1100 in FIG. 11. In some implementations, the imaging module 2400 can be used with, or be included within, the optical system 1200 in FIG. 12. In some implementations, the imaging module 2400 can be used with, or be included within, the optical system 1300 in FIG. 13. In some implementations, the imaging module 2400 can be used with, or be included within, the optical system 1400 in FIG. 14. In some implementations, the imaging module 2400 can be used with, or be included within, the imaging module 1800 in FIG. 18 or 19A-19B. In some implementations, the imaging module 2400 can be used with the SIM assembly 2000 in FIG. 20. In some implementations, the imaging module 2400 can include, or be used with, the imaging module 2100 in FIG. 21. In some implementations, the imaging module 2400 can be used with the imaging module 2200 in FIG. 22. In some implementations, the imaging module 2400 can include, or be used with, the optical system 2500 in FIG. 25. In some implementations, the imaging module 2400 can include, or be used with, the optical system 2600 in FIG. 26. In some implementations, the imaging module 2400 can include, or be used with, the reflective component 2700 in FIG. 27. In some implementations, the imaging module 2400 can include, or be used with, the reflective component 2800 in FIG. 28. In some implementations, the imaging module 2400 can generate the autofocus light 2900 in FIG. 29. In some implementations, the imaging module 2400 can generate the autofocus light 3000 in FIG. 30. In some implementations, the imaging module 2400 can generate the autofocus light 3100 in FIGS. 31A-31C. In some implementations, the imaging module 2400 can be used with the laser engine heat sink 3200 in FIGS. 32A-32C. In some implementations, the imaging module 2400 can be used with the laser engine heat sink 3300 in FIGS. 33A-33C. In some implementations, the imaging module 2400 can include, or be used with, the SIM assembly 3400 in FIG. 34. In some implementations, the imaging module 2400 can include, or be used with, the RIGS 3500 in FIG. 35. In some implementations, the imaging module 2400 can include, or be used with, the RIGS 3600 in FIG. 36. In some implementations, the imaging module 2400 can include, or be used with, the piezo phase shifter 3700 in FIG. 37. In some implementations, the imaging module 2400 can include, or be used with, the piezo phase shifter 3800 in FIG. 38. In some implementations, the imaging module 2400 can include, or be used with, the projection lens 3900 in FIG. 39. In some implementations, the imaging module 2400 can include, or be used with, the projection lens 4000 in FIG. 40. In some implementations, the imaging module 2400 can generate the field of view 4100 in FIG. 41.

The imaging module 2400 includes multiple components and/or devices that can be integrated to operate coherently as a system to perform one or more tasks. In some implementations, the imaging module 2400 performs imaging as part of analyzing a sample. For example, the imaging module 2400 can detect fluorescence emitted from a sample of genetic material. The imaging module 2400 includes a SIM assembly 2402, which is only partially visible in the present view. In some implementations, the SIM assembly 2402 can generate spatially structured light for illuminating a sample material. For example, the SIM assembly 2402 can include a RIGS. The imaging module 2400 includes an objective 2404. In some implementations, the objective 2404 can convey SIM light from the SIM assembly 2402 and apply the SIM light to a substrate 2406 holding a sample. The imaging module 2400 can include a z-stage. In some implementations, the z-stage can alter (e.g., increase or decrease) a distance (referred to here as a z-distance) between the objective 2404 and the substrate 2406.

The imaging module 2400 can include one or more portions of housing. In some implementations, the housing can substantially enclose components of the imaging module 2400. For example, a housing 2408 can at least partially enclose the SIM assembly 2402. One or more of the housings can be absent from the imaging module 2400, which can make some of the components visible. This can occur during an assembly process and/or during maintenance or repair, to name just a few examples.

The imaging module 2400 can include emission optics 2410. In some implementations, the emission optics 2410 includes a filter assembly 2412. The filter assembly 2412 can include at least one filter. For example, the filter assembly 2412 can include one or more of the filter 212 in FIG. 2 or the filter 506 in FIG. 5. In some implementations, the emission optics 2410 includes a tube lens 2414. For example, the tube lens 2414 can be one or more of the tube lens 214 in FIG. 2, the tube lens 508 in FIG. 5, or the tube lens 802 in FIG. 8A. The tube lens 2414 can be assigned to a blue detector channel. In some implementations, the emission optics 2410 includes a tube lens 2416. The tube lens 2416 can be assigned to a green detector channel. For example, the tube lens 2416 can be one or more of the tube lens 214 in FIG. 2, the tube lens 508 in FIG. 5, or the tube lens 802 in FIG. 8A. In some implementations, the emission optics 2410 includes a filter assembly 2418. For example, the filter assembly 2418 can include one or more of: the filter 216, the reflective component 226, or the structure 228 of FIG. 2. As another example, the filter assembly 2418 can include one or more of: the filter 510, the reflective component 516, or the structure 518 of FIG. 5. As another example, the filter assembly 2418 can include one or more of: the filter 804, the reflective components 810A-810B, or the structure 812 of FIG. 8A.

In some implementations, the emission optics 2410 includes a sensor assembly 2420. The sensor assembly 2420 can be assigned to a blue detector channel. The sensor assembly 2420 can include one or more sensors for emission light and/or autofocus light. For example, the sensor assembly 2420 can include one or more of the sensor 120 in FIG. 1; the sensor 220 in FIG. 2; the sensor 514 in FIG. 5; the sensor 808 in FIG. 5; the sensor 1112 in FIG. 11; the sensor 1214 in FIG. 12; the sensor 1314 in FIG. 13; or the sensor 1416 in FIG. 14. In some implementations, the emission optics 2410 includes a sensor assembly 2422. The sensor assembly 2422 can be assigned to a green detector channel. The sensor assembly 2422 can include one or more sensors for emission light and/or autofocus light. For example, the sensor assembly 2422 can include one or more of the sensor 120 in FIG. 1; the sensor 220 in FIG. 2; the sensor 514 in FIG. 5; the sensor 808 in FIG. 5; the sensor 1112 in FIG. 11; the sensor 1214 in FIG. 12; the sensor 1314 in FIG. 13; or the sensor 1416 in FIG. 14.

Figure 25:
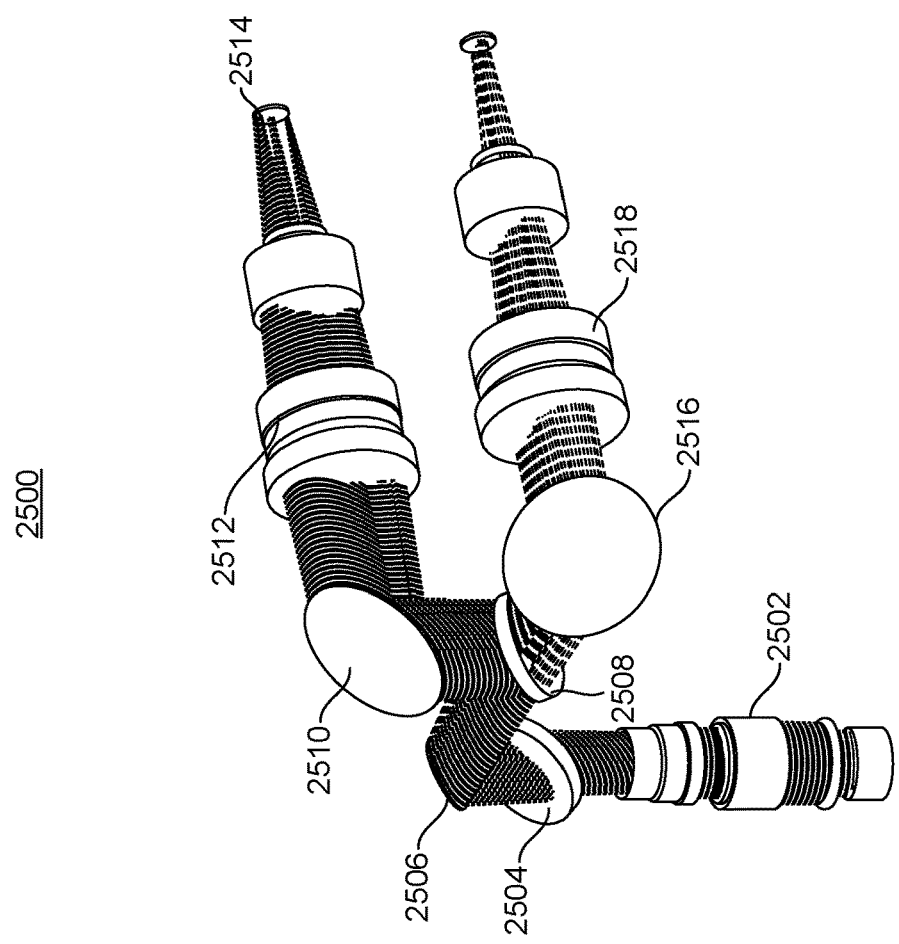
FIG. 25 shows an embodiment of an optical system.

FIG. 25 shows an embodiment of an optical system 2500. The optical system 2500 can include, or be used with, one or more other embodiments described herein. In some implementations, the optical system 2500 can include, or be used with, the system 4200 in FIG. 42. In some implementations, the optical system 2500 can include, or be used with, at least some components of the computing device 4300 in FIG. 43. In some implementations, the optical system 2500 can be used with, or be included within, the system 100 in FIG. 1. In some implementations, the optical system 2500 can include, or be used with, the optical system 200 in FIG. 2. In some implementations, the optical system 2500 can include, or be used with, the optical system 500 in FIG. 5. In some implementations, the optical system 2500 can include, or be used with, the optical system 800 in FIG. 8A. In some implementations, the optical system 2500 can include, or be used with, the optical system 820 in FIG. 8B. In some implementations, the optical system 2500 can include, or be used with, the lateral displacement prism 1000 in FIGS. 10A-10C. In some implementations, the optical system 2500 can include, or be used with, the optical system 1100 in FIG. 11. In some implementations, the optical system 2500 can include, or be used with, the optical system 1200 in FIG. 12. In some implementations, the optical system 2500 can include, or be used with, the optical system 1300 in FIG. 13. In some implementations, the optical system 2500 can include, or be used with, the optical system 1400 in FIG. 14. In some implementations, the optical system 2500 can include, or be used with, the lateral displacement prism 1600 in FIGS. 16A-16B. In some implementations, the optical system 2500 can include, or be used with, the beam splitter 1700 in FIG. 17. In some implementations, the optical system 2500 can be used with, or be included within, the imaging module 1800 in FIG. 18 or 19A-19B. In some implementations, the optical system 2500 can be used with the SIM assembly 2000 in FIG. 20. In some implementations, the optical system 2500 can include, or be used with, the imaging module 2100 in FIG. 21. In some implementations, the optical system 2500 can be used with the imaging module 2200 in FIG. 22. In some implementations, the optical system 2500 can include, or be used with, the imaging module 2400 in FIG. 24. In some implementations, the optical system 2500 can include, or be used with, the optical system 2600 in FIG. 26. In some implementations, the optical system 2500 can include, or be used with, the reflective component 2700 in FIG. 27. In some implementations, the optical system 2500 can include, or be used with, the reflective component 2800 in FIG. 28. In some implementations, the optical system 2500 can generate the autofocus light 2900 in FIG. 29. In some implementations, the optical system 2500 can generate the autofocus light 3000 in FIG. 30. In some implementations, the optical system 2500 can generate the autofocus light 3100 in FIGS. 31A-31C. In some implementations, the optical system 2500 can be used with the laser engine heat sink 3200 in FIGS. 32A-32C. In some implementations, the optical system 2500 can be used with the laser engine heat sink 3300 in FIGS. 33A-33C. In some implementations, the optical system 2500 can include, or be used with, the SIM assembly 3400 in FIG. 34. In some implementations, the optical system 2500 can include, or be used with, the RIGS 3500 in FIG. 35. In some implementations, the optical system 2500 can include, or be used with, the RIGS 3600 in FIG. 36. In some implementations, the optical system 2500 can include, or be used with, the piezo phase shifter 3700 in FIG. 37. In some implementations, the optical system 2500 can include, or be used with, the piezo phase shifter 3800 in FIG. 38. In some implementations, the optical system 2500 can include, or be used with, the projection lens 3900 in FIG. 39. In some implementations, the optical system 2500 can include, or be used with, the projection lens 4000 in FIG. 40. In some implementations, the optical system 2500 can generate the field of view 4100 in FIG. 41.

The optical system 2500 includes an objective 2502. In some implementations, the objective 2502 can be used for directing excitation light toward, and receiving emission light from, a sample at a substrate. The optical system 2500 includes a filter 2504. In some implementations, the filter 2504 can be used for adding one or more types of light to conveyed light, and/or for removing one or more types of light from conveyed light. For example, the filter 2504 can allow excitation light (e.g., from the SIM assembly 2402 in FIG. 24) to be introduced and conveyed toward the objective 2502. The optical system 2500 includes a filter 2506. The filter 2506 can redirect light into another level of the optical system 2500. For example, the filter 2506 can redirect emission light in a horizontal direction. The optical system 2500 includes a filter 2508. The filter 2508 can redirect light into another level of the optical system 2500. In some implementations, the filter 2508 can redirect emission light in a vertical direction. For example, the filter 2508 can branch off light of a blue color channel from light of a green color channel, or vice versa. The optical system 2500 includes a filter 2510. The filter 2510 can redirect light in a horizontal direction. The optical system 2500 includes a tube lens 2512. For example, the tube lens 2512 can condition light for detection. The optical system 2500 includes a sensor 2514. In some implementations, the sensor 2514 can be used for receiving emission light and/or autofocus light. The optical system 2500 includes a filter 2516. The filter 2516 can redirect light in a horizontal direction. The optical system 2500 includes a tube lens 2518. For example, the tube lens 2518 can condition light for detection. The optical system 2500 includes a sensor 2520. In some implementations, the sensor 2520 can be used for receiving emission light and/or autofocus light. In some implementations, the optical system 2500 corresponds to a system layout for the imaging module 2400 in FIG. 24.

Figure 26:
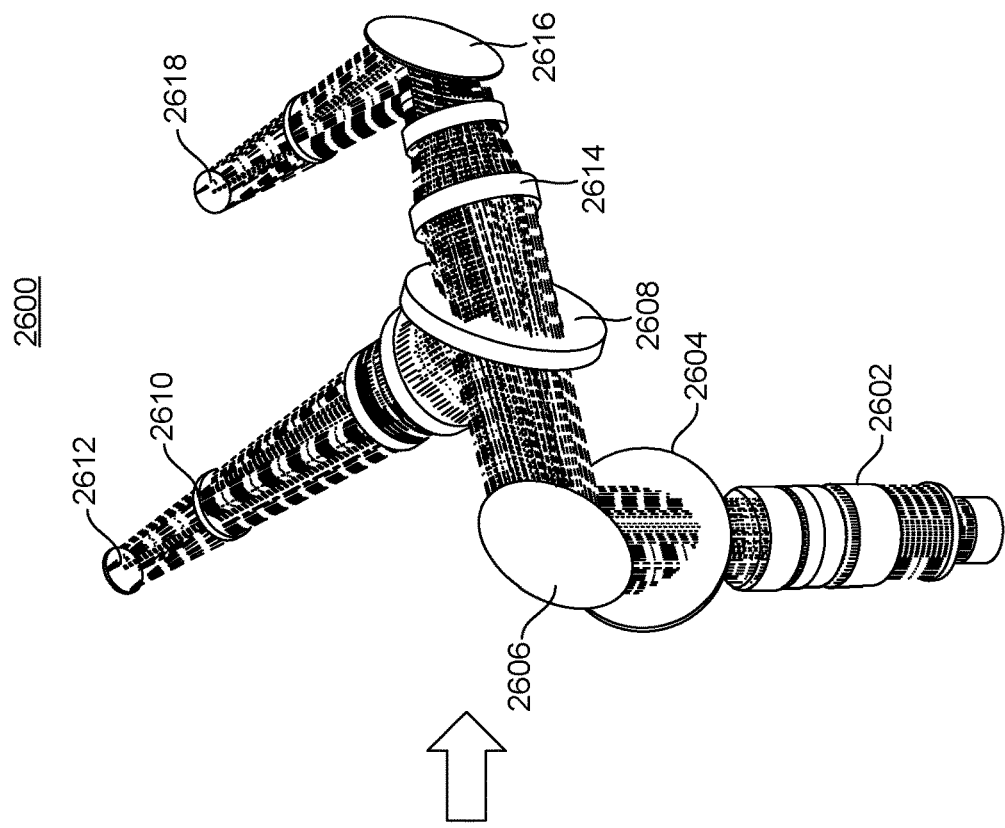
FIG. 26 shows an embodiment of an optical system.

FIG. 26 shows an embodiment of an optical system 2600. The optical system 2600 can include, or be used with, one or more other embodiments described herein. In some implementations, the optical system 2600 can include, or be used with, the system 4200 in FIG. 42. In some implementations, the optical system 2600 can include, or be used with, at least some components of the computing device 4300 in FIG. 43. In some implementations, the optical system 2600 can be used with, or be included within, the system 100 in FIG. 1. In some implementations, the optical system 2600 can include, or be used with, the optical system 200 in FIG. 2. In some implementations, the optical system 2600 can include, or be used with, the optical system 500 in FIG. 5. In some implementations, the optical system 2600 can include, or be used with, the optical system 800 in FIG. 8A. In some implementations, the optical system 2600 can include, or be used with, the optical system 820 in FIG. 8B. In some implementations, the optical system 2600 can include, or be used with, the lateral displacement prism 1000 in FIGS. 10A-10C. In some implementations, the optical system 2600 can include, or be used with, the optical system 1100 in FIG. 11. In some implementations, the optical system 2600 can include, or be used with, the optical system 1200 in FIG. 12. In some implementations, the optical system 2600 can include, or be used with, the optical system 1300 in FIG. 13. In some implementations, the optical system 2600 can include, or be used with, the optical system 1400 in FIG. 14. In some implementations, the optical system 2600 can include, or be used with, the lateral displacement prism 1600 in FIGS. 16A-16B. In some implementations, the optical system 2600 can include, or be used with, the beam splitter 1700 in FIG. 17. In some implementations, the optical system 2600 can be used with, or be included within, the imaging module 1800 in FIG. 18 or 19A-19B. In some implementations, the optical system 2600 can be used with the SIM assembly 2000 in FIG. 20. In some implementations, the optical system 2600 can include, or be used with, the imaging module 2100 in FIG. 21. In some implementations, the optical system 2600 can be used with the imaging module 2200 in FIG. 22. In some implementations, the optical system 2600 can include, or be used with, the imaging module 2400 in FIG. 24. In some implementations, the optical system 2600 can include, or be used with, the optical system 2500 in FIG. 25. In some implementations, the optical system 2600 can include, or be used with, the reflective component 2700 in FIG. 27. In some implementations, the optical system 2600 can include, or be used with, the reflective component 2800 in FIG. 28. In some implementations, the optical system 2600 can generate the autofocus light 2900 in FIG. 29. In some implementations, the optical system 2600 can generate the autofocus light 3000 in FIG. 30. In some implementations, the optical system 2600 can generate the autofocus light 3100 in FIGS. 31A-31C. In some implementations, the optical system 2600 can be used with the laser engine heat sink 3200 in FIGS. 32A-32C. In some implementations, the optical system 2600 can be used with the laser engine heat sink 3300 in FIGS. 33A-33C. In some implementations, the optical system 2600 can include, or be used with, the SIM assembly 3400 in FIG. 34. In some implementations, the optical system 2600 can include, or be used with, the RIGS 3500 in FIG. 35. In some implementations, the optical system 2600 can include, or be used with, the RIGS 3600 in FIG. 36. In some implementations, the optical system 2600 can include, or be used with, the piezo phase shifter 3700 in FIG. 37. In some implementations, the optical system 2600 can include, or be used with, the piezo phase shifter 3800 in FIG. 38. In some implementations, the optical system 2600 can include, or be used with, the projection lens 3900 in FIG. 39. In some implementations, the optical system 2600 can include, or be used with, the projection lens 4000 in FIG. 40. In some implementations, the optical system 2600 can generate the field of view 4100 in FIG. 41.

The optical system 2600 includes an objective 2602. In some implementations, the objective 2602 can be used for directing excitation light toward, and receiving emission light from, a sample at a substrate. The optical system 2600 includes a filter 2604. In some implementations, the filter 2604 can be used for adding one or more types of light to conveyed light, and/or for removing one or more types of light from conveyed light. For example, the filter 2604 can allow excitation light (e.g., from the SIM assembly 2402 in FIG. 24) to be introduced and conveyed toward the objective 2602. The optical system 2600 includes a filter 2606. The filter 2606 can redirect light into another level of the optical system 2600. For example, the filter 2606 can redirect emission light in a horizontal direction. The optical system 2600 includes a filter 2608. The filter 2608 can redirect light into another level of the optical system 2600. In some implementations, the filter 2608 can redirect emission light in a horizontal direction. For example, the filter 2608 can branch off light of a blue color channel from light of a green color channel, or vice versa. The optical system 2500 includes a tube lens 2610. For example, the tube lens 2610 can condition light for detection. The optical system 2600 includes a sensor 2612. In some implementations, the sensor 2612 can be used for receiving emission light and/or autofocus light. The optical system 2600 includes a tube lens 2614. For example, the tube lens 2614 can condition light for detection. The optical system 2600 includes a filter 2616. The filter 2616 can redirect light in a horizontal direction. The optical system 2600 includes a sensor 2618. In some implementations, the sensor 2618 can be used for receiving emission light and/or autofocus light. In some implementations, the optical system 2600 corresponds to a system layout for the imaging module 1800 in FIG. 18 and FIGS. 19A-19B.

Optical performance between two or more systems can be compared. Comparison can involve one or more simulated measurements. The following table presents values regarding three systems labeled A, B, and C, respectively. In some implementations, the system A can correspond to an implementation involving the imaging module 1800 in FIGS. 18 and 19A-19B, the SIM assembly 2000 in FIG. 20, and the optical system 2600 in FIG. 26. In some implementations, the system B can correspond to a reference system. For example, the reference system can include an objective that supports DFC. In some implementations, the system C can correspond to an implementation involving the imaging module 2400 in FIG. 24 and the optical system 2500 in FIG. 25.

| Metric | System A | System B | System C |
|---|---|---|---|
| Emission spectrum | about 472-about 515 nm about 583-about 660 nm (188 nm spectrum) | about 462-about 515 nm about 583-about 660 nm (198 nm spectrum) | about 462-about 515 nm about 583-about 660 nm (198 nm spectrum) |
| Resolution | Numerical aperture 0.75 Magnification 10.63 Field 1.1 mm | Numerical aperture 0.75 Magnification 10.63 Field 1.1 mm | Numerical aperture 0.75 Magnification 10.63 Field 1.1 mm |
| Wavefront $90^{th}$ percentile | Nominal < 0.046 $\lambda$ As built < 0.077 $\lambda$ | Nominal < 0.045 $\lambda$ As built < 0.094 $\lambda$ | Nominal < 0.040 $\lambda$ As built < 0.073 $\lambda$ |
| Spatial distortion | Nominal < 0.4 pix As built < 0.6 pix | Nominal < 0.4 pix As built < 0.6 pix | Nominal < 0.3 pix As built < 0.5 pix |

Figure 27:
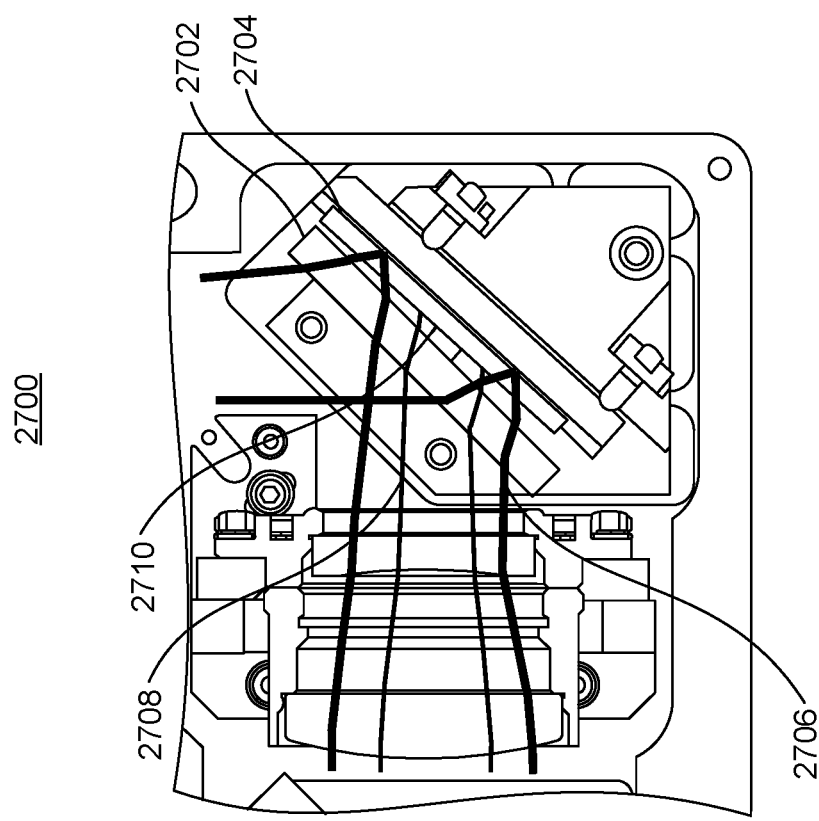
FIG. 27 shows an embodiment of a reflective component.

FIG. 27 shows an embodiment of a reflective component 2700. The reflective component 2700 can be used with, or be included within, one or more other embodiments described herein. In some implementations, the reflective component 2700 can be used with, or be included within, the system 100 in FIG. 1. In some implementations, the reflective component 2700 can be used with, or be included within, the optical system 200 in FIG. 2. In some implementations, the reflective component 2700 can be used with, or be included within, the optical system 500 in FIG. 5. In some implementations, the reflective component 2700 can be used with, or be included within, the optical system 800 in FIG. 8A. In some implementations, the reflective component 2700 can be used with, or be included within, the optical system 820 in FIG. 8B. In some implementations, the reflective component 2700 can be used with, or be included within, the optical system 1100 in FIG. 11. In some implementations, the reflective component 2700 can be used with, or be included within, the optical system 1200 in FIG. 12. In some implementations, the reflective component 2700 can be used with, or be included within, the optical system 1300 in FIG. 13. In some implementations, the reflective component 2700 can be used with, or be included within, the optical system 1400 in FIG. 14. In some implementations, the reflective component 2700 can be used with, or be included within, the imaging module 1800 in FIGS. 18 and 19A-19B. In some implementations, the reflective component 2700 can be used with, or be included within, the imaging module 2100 in FIG. 21. In some implementations, the reflective component 2700 can be used with, or be included within, the imaging module 2200 in FIG. 22. In some implementations, the reflective component 2700 can be used with, or be included within, the imaging module 2400 in FIG. 24. In some implementations, the reflective component 2700 can be used with, or be included within, the optical system 2500 in FIG. 25. In some implementations, the reflective component 2700 can be used with, or be included within, the optical system 2600 in FIG. 26. In some implementations, the reflective component 2700 can include, or be used with, the reflective component 2800 in FIG. 28. In some implementations, the reflective component 2700 can generate the autofocus light 2900 in FIG. 29. In some implementations, the reflective component 2700 can generate the autofocus light 3000 in FIG. 30. In some implementations, the reflective component 2700 can generate the autofocus light 3100 in FIGS. 31A-31C. In some implementations, the reflective component 2700 can be used with the laser engine heat sink 3200 in FIGS. 32A-32C. In some implementations, the reflective component 2700 can be used with the laser engine heat sink 3300 in FIGS. 33A-33C. In some implementations, the reflective component 2700 can be used with the SIM assembly 3400 in FIG. 34. In some implementations, the reflective component 2700 can be used with the RIGS 3500 in FIG. 35. In some implementations, the reflective component 2700 can be used with the RIGS 3600 in FIG. 36. In some implementations, the reflective component 2700 can be used with the piezo phase shifter 3700 in FIG. 37. In some implementations, the reflective component 2700 can be used with the piezo phase shifter 3800 in FIG. 38. In some implementations, the reflective component 2700 can be used with the projection lens 3900 in FIG. 39. In some implementations, the reflective component 2700 can be used with the projection lens 4000 in FIG. 40.

The reflective component 2700 includes a filter 2702. The filter 2702 can be a dichroic filter. The filter 2702 can, alone or together with at least one other component, facilitate steering of one or more types of light. In some implementations, the filter 2702 can reflect emission light and transmit autofocus light. For example, the filter 2702 can have an antireflective coating that prevents reflection (i.e., facilitates transmission) of autofocus light, and that does reflect emission light. In other implementations, the filter 2702 can be configured to prevent reflection (i.e., facilitate transmission) of emission light, and reflect autofocus light.

The reflective component 2700 includes a tent prism 2704. The tent prism 2704 can include one or more reflective surfaces and can be positioned behind the filter 2702 in the travel direction of arriving light. The tent prism can have a triangular shape. In some implementations, the tent prism 2704 reflects light that was transmitted through the filter 2702, the reflection causing the light to be directed toward a sensor. For example, the tent prism 2704 can reflect some (but not all) autofocus light that has been reflected at a substrate. The tent prism 2704 can have optical properties based on the type of autofocus light being used. In some implementations, the tent prism 2704 is reflective in at least part of the near infrared wavelength range (e.g., reflection somewhere between about 750 nm and about 1400 nm.) In some implementations, light 2706 passing through the filter 2702 is reflected by the tent prism 2704. For example, the light 2706 includes autofocus light reflected from an S1 surface and/or an S2 surface of a sample substrate. In some implementations, light 2708 passing through the filter 2702 is not reflected by (e.g., is absorbed by) the reflective component 2700. The reflective component 2700 can include an absorbing material 2710 at which the light 2708 is incident. For example, the light 2708 includes autofocus light reflected from an S4 surface and/or an S5 surface of a sample substrate.

Figure 28:
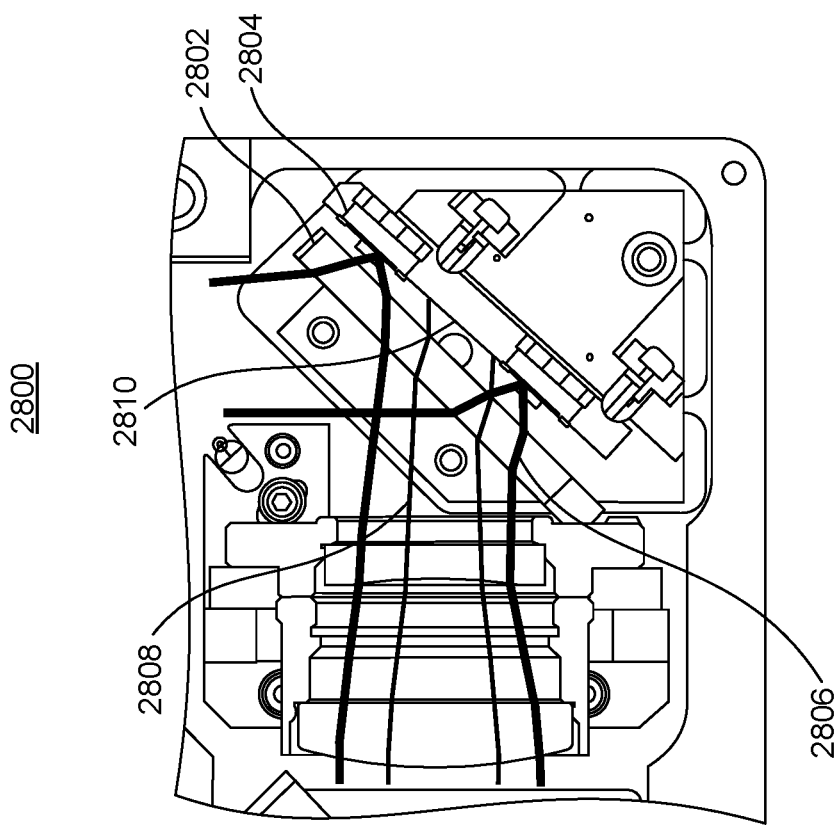
FIG. 28 shows an embodiment of a reflective component.

FIG. 28 shows an embodiment of a reflective component 2800. The reflective component 2800 can be used with, or be included within, one or more other embodiments described herein. In some implementations, the reflective component 2800 can be used with, or be included within, the system 100 in FIG. 1. In some implementations, the reflective component 2800 can be used with, or be included within, the optical system 200 in FIG. 2. In some implementations, the reflective component 2800 can be used with, or be included within, the optical system 500 in FIG. 5. In some implementations, the reflective component 2800 can be used with, or be included within, the optical system 800 in FIG. 8A. In some implementations, the reflective component 2800 can be used with, or be included within, the optical system 820 in FIG. 8B. In some implementations, the reflective component 2800 can be used with, or be included within, the optical system 1100 in FIG. 11. In some implementations, the reflective component 2800 can be used with, or be included within, the optical system 1200 in FIG. 12. In some implementations, the reflective component 2800 can be used with, or be included within, the optical system 1300 in FIG. 13. In some implementations, the reflective component 2800 can be used with, or be included within, the optical system 1400 in FIG. 14. In some implementations, the reflective component 2800 can be used with, or be included within, the imaging module 1800 in FIGS. 18 and 19A-19B. In some implementations, the reflective component 2800 can be used with, or be included within, the imaging module 2100 in FIG. 21. In some implementations, the reflective component 2800 can be used with, or be included within, the imaging module 2200 in FIG. 22. In some implementations, the reflective component 2800 can be used with, or be included within, the imaging module 2400 in FIG. 24. In some implementations, the reflective component 2800 can be used with, or be included within, the optical system 2500 in FIG. 25. In some implementations, the reflective component 2800 can be used with, or be included within, the optical system 2600 in FIG. 26. In some implementations, the reflective component 2800 can include, or be used with, the reflective component 2700 in FIG. 27. In some implementations, the reflective component 2800 can generate the autofocus light 2900 in FIG. 29. In some implementations, the reflective component 2800 can generate the autofocus light 3000 in FIG. 30. In some implementations, the reflective component 2800 can generate the autofocus light 3100 in FIGS. 31A-31C. In some implementations, the reflective component 2800 can be used with the laser engine heat sink 3200 in FIGS. 32A-32C. In some implementations, the reflective component 2800 can be used with the laser engine heat sink 3300 in FIGS. 33A-33C. In some implementations, the reflective component 2800 can be used with the SIM assembly 3400 in FIG. 34. In some implementations, the reflective component 2800 can be used with the RIGS 3500 in FIG. 35. In some implementations, the reflective component 2800 can be used with the RIGS 3600 in FIG. 36. In some implementations, the reflective component 2800 can be used with the piezo phase shifter 3700 in FIG. 37. In some implementations, the reflective component 2800 can be used with the piezo phase shifter 3800 in FIG. 38. In some implementations, the reflective component 2800 can be used with the projection lens 3900 in FIG. 39. In some implementations, the reflective component 2800 can be used with the projection lens 4000 in FIG. 40.

The reflective component 2800 includes a filter 2802. The filter 2802 can be a dichroic filter. The filter 2802 can, alone or together with at least one other component, facilitate steering of one or more types of light. In some implementations, the filter 2802 can reflect emission light and transmit autofocus light. For example, the filter 2802 can have an antireflective coating that prevents reflection (i.e., facilitates transmission) of autofocus light, and that does reflect emission light. In other implementations, the filter 2802 can be configured to prevent reflection (i.e., facilitate transmission) of emission light, and reflect autofocus light.

The reflective component 2800 includes a reflective surface 2804. The reflective surface 2804 can include one or more reflective surfaces and can be positioned behind the filter 2802 in the travel direction of arriving light. In some implementations, the reflective surface 2804 reflects light that was transmitted through the filter 2802, the reflection causing the light to be directed toward a sensor. For example, the reflective surface 2804 can reflect some (but not all) autofocus light that has been reflected at a substrate. The reflective surface 2804 can have optical properties based on the type of autofocus light being used. In some implementations, the reflective surface 2804 is reflective in at least part of the near infrared wavelength range (e.g., reflection somewhere between about 750 nm and about 1400 nm.) In some implementations, light 2806 passing through the filter 2802 is reflected by the reflective surface 2804. For example, the light 2806 includes autofocus light reflected from an S1 surface and/or an S2 surface of a sample substrate. In some implementations, light 2808 passing through the filter 2802 is not reflected by (e.g., is absorbed by) the reflective component 2800. The reflective component 2800 can include an absorbing material 2810 at which the light 2808 is incident. For example, the light 2808 includes autofocus light reflected from an S4 surface and/or an S5 surface of a sample substrate.

The reflective component 2800 can include one or more instances of the reflective surface 2804 positioned behind the filter 2802 in the travel direction of arriving light. In some implementations, two instances of the reflective surface 2804 are used (e.g., as shown in FIG. 28) so as to each reflect at least one respective beam of the light 2806. In other implementations, a single instance of the reflective surface 2804 is positioned behind the filter 2802 in the travel direction of arriving light. The reflective surface 2804 can then reflect one or more beams of the light 2806. For example, with reference again briefly to FIGS. 10B-10C, the angles of the surfaces 1008A-1008B (e.g., with regard to the surface 1006) can be adjusted so that two or more spots of autofocus light are relatively closer to each other on the flow cell, thereby allowing use of the single instance of the reflective surface 2804 for reflection.

Figure 29:
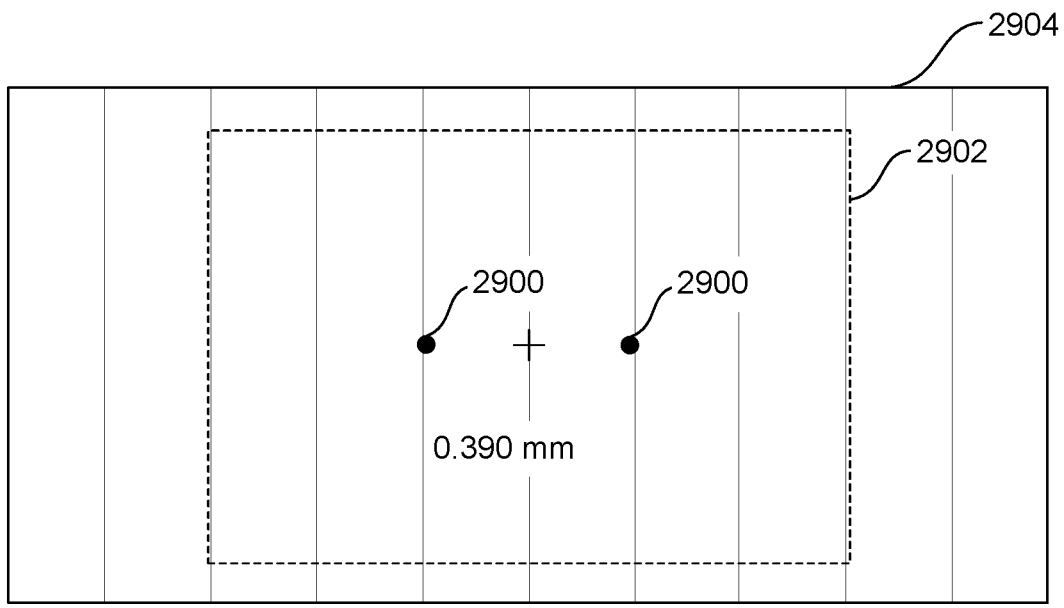
FIG. 29 shows an example of autofocus light detected by a sensor.

FIG. 29 shows an example of autofocus light 2900 detected by a sensor. The autofocus light 2900 can be detected using one or more embodiments described herein. In some implementations, the autofocus light 2900 can be detected using the system 100 in FIG. 1. In some implementations, the autofocus light 2900 can be detected using the optical system 200 in FIG. 2. In some implementations, the autofocus light 2900 can be detected using the optical system 500 in FIG. 5. In some implementations, the autofocus light 2900 can be detected using the optical system 800 in FIG. 8A. In some implementations, the autofocus light 2900 can be detected using the optical system 820 in FIG. 8B. In some implementations, the autofocus light 2900 can be detected using the optical system 1100 in FIG. 11. In some implementations, the autofocus light 2900 can be detected using the optical system 1200 in FIG. 12. In some implementations, the autofocus light 2900 can be detected using the optical system 1300 in FIG. 13. In some implementations, the autofocus light 2900 can be detected using the optical system 1400 in FIG. 14. In some implementations, the autofocus light 2900 can be detected using the imaging module 1800 in FIGS. 18 and 19A-19B. In some implementations, the autofocus light 2900 can be created using the SIM assembly 2000 in FIG. 20. In some implementations, the autofocus light 2900 can be detected using the imaging module 2100 in FIG. 21. In some implementations, the autofocus light 2900 can be detected using the imaging module 2200 in FIG. 22. In some implementations, the autofocus light 2900 can be detected using the imaging module 2400 in FIG. 24. In some implementations, the autofocus light 2900 can be detected using the optical system 2500 in FIG. 25. In some implementations, the autofocus light 2900 can be detected using the optical system 2600 in FIG. 26. In some implementations, the autofocus light 2900 can be detected using the reflective component 2700 in FIG. 27. In some implementations, the autofocus light 2900 can be detected using the reflective component 2800 in FIG. 28. In some implementations, the autofocus light 2900 can be created using the SIM assembly 3400 in FIG. 34. In some implementations, the autofocus light 2900 can be created using the RIGS 3500 in FIG. 35. In some implementations, the autofocus light 2900 can be created using the RIGS 3600 in FIG. 36. In some implementations, the autofocus light 2900 can be created using the piezo phase shifter 3700 in FIG. 37. In some implementations, the autofocus light 2900 can be created using the piezo phase shifter 3800 in FIG. 38. In some implementations, the autofocus light 2900 can be detected using the projection lens 3900 in FIG. 39. In some implementations, the autofocus light 2900 can be detected using the projection lens 4000 in FIG. 40. In some implementations, the autofocus light 2900 can be detected using the field of view 4100 in FIG. 41.

The autofocus light 2900 is here shown in a simulation as being detected within a tile 2902 that is defined with regard to a substrate 2904. For example, the autofocus light 2900 can be captured using an implementation involving the imaging module 2400 in FIG. 24 and the optical system 2500 in FIG. 25. The autofocus light 2900 can include two or more spots of autofocus light that correspond to reflections from a layer or other surface of a substrate. A distance between spots can indicate a distance between a substrate and an objective that captures the autofocus light 2900. For example, the distance between the spots of the autofocus light 2900 is here about 0.390 mm.

Figure 30:
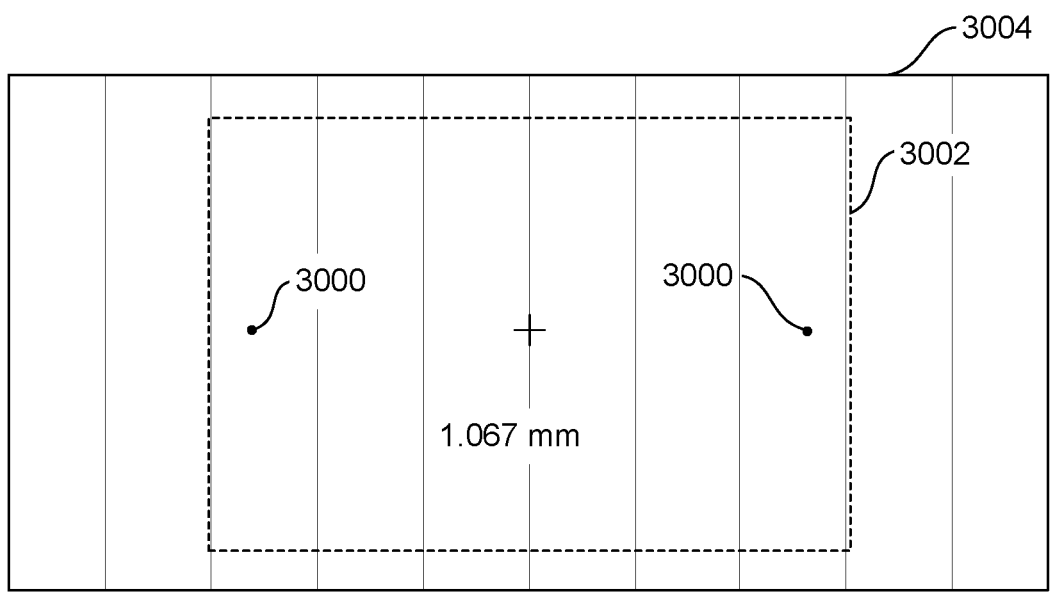
FIG. 30 shows an example of autofocus light detected by a sensor.

FIG. 30 shows an example of autofocus light 3000 detected by a sensor. The autofocus light 3000 can be detected using one or more embodiments described herein. In some implementations, the autofocus light 3000 can be detected using the system 100 in FIG. 1. In some implementations, the autofocus light 3000 can be detected using the optical system 200 in FIG. 2. In some implementations, the autofocus light 3000 can be detected using the optical system 500 in FIG. 5. In some implementations, the autofocus light 3000 can be detected using the optical system 800 in FIG. 8A. In some implementations, the autofocus light 3000 can be detected using the optical system 820 in FIG. 8B. In some implementations, the autofocus light 3000 can be detected using the optical system 1100 in FIG. 11. In some implementations, the autofocus light 3000 can be detected using the optical system 1200 in FIG. 12. In some implementations, the autofocus light 3000 can be detected using the optical system 1300 in FIG. 13. In some implementations, the autofocus light 3000 can be detected using the optical system 1400 in FIG. 14. In some implementations, the autofocus light 3000 can be detected using the imaging module 1800 in FIGS. 18 and 19A-19B. In some implementations, the autofocus light 3000 can be created using the SIM assembly 2000 in FIG. 20. In some implementations, the autofocus light 3000 can be detected using the imaging module 2100 in FIG. 21. In some implementations, the autofocus light 3000 can be detected using the imaging module 2200 in FIG. 22. In some implementations, the autofocus light 3000 can be detected using the imaging module 2400 in FIG. 24. In some implementations, the autofocus light 3000 can be detected using the optical system 2500 in FIG. 25. In some implementations, the autofocus light 3000 can be detected using the optical system 2600 in FIG. 26. In some implementations, the autofocus light 3000 can be detected using the reflective component 2700 in FIG. 27. In some implementations, the autofocus light 3000 can be detected using the reflective component 2800 in FIG. 28. In some implementations, the autofocus light 3000 can be created using the SIM assembly 3400 in FIG. 34. In some implementations, the autofocus light 3000 can be created using the RIGS 3500 in FIG. 35. In some implementations, the autofocus light 3000 can be created using the RIGS 3600 in FIG. 36. In some implementations, the autofocus light 3000 can be created using the piezo phase shifter 3700 in FIG. 37. In some implementations, the autofocus light 3000 can be created using the piezo phase shifter 3800 in FIG. 38. In some implementations, the autofocus light 3000 can be detected using the projection lens 3900 in FIG. 39. In some implementations, the autofocus light 3000 can be detected using the projection lens 4000 in FIG. 40. In some implementations, the autofocus light 3000 can be detected using the field of view 4100 in FIG. 41.

The autofocus light 3000 is here shown in a simulation as being detected within a tile 3002 that is defined with regard to a substrate 3004. For example, the autofocus light 3000 can be captured using an implementation involving the imaging module 1800 in FIGS. 18 and 19A-19B, the SIM assembly 2000 in FIG. 20, and the optical system 2600 in FIG. 26. As another example, the autofocus light 3000 can be captured using an implementation involving the imaging module 2200 in FIG. 22. The autofocus light 3000 can include two or more spots of autofocus light that correspond to reflections from a layer or other surface of a substrate. A distance between spots can indicate a distance between a substrate and an objective that captures the autofocus light 3000. For example, the distance between the spots of the autofocus light 3000 is here about 1.067 mm. In some implementations, the autofocus procedure can be tailored to eliminate or reduce incidents where one or more spots of the autofocus light 3000 fall outside the tile 3002.

Figure 31B:
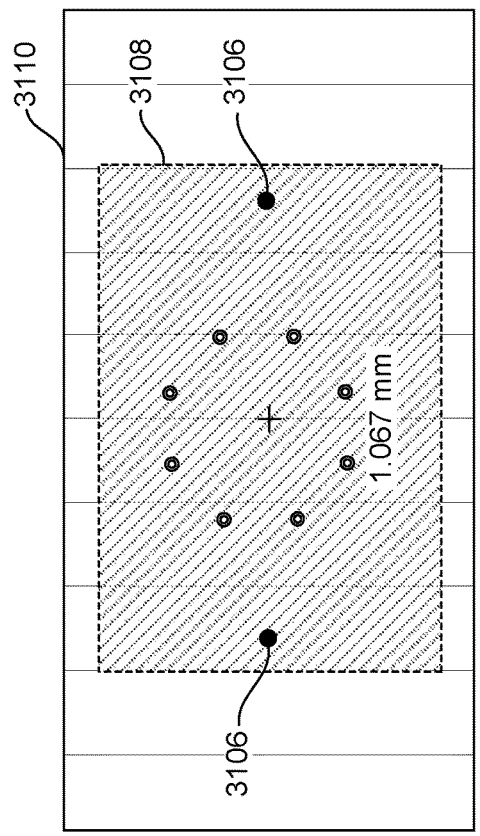
FIGS. 31A-31C show examples of autofocus light detected by a sensor.
Figure 31A:
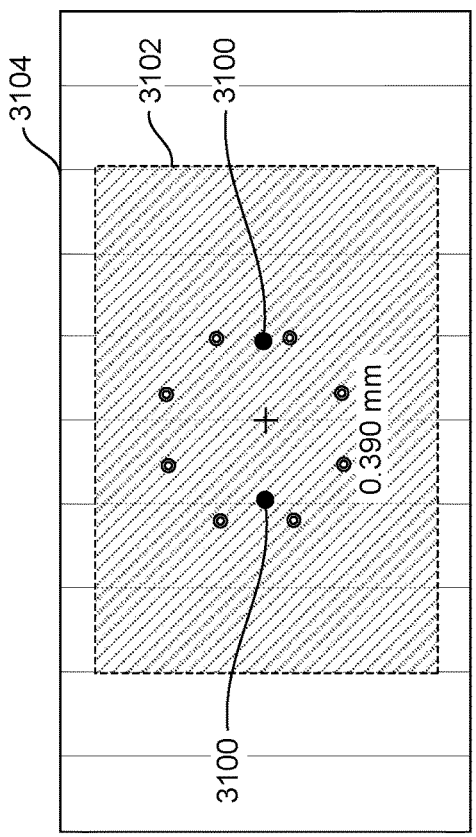
Figure 31C:
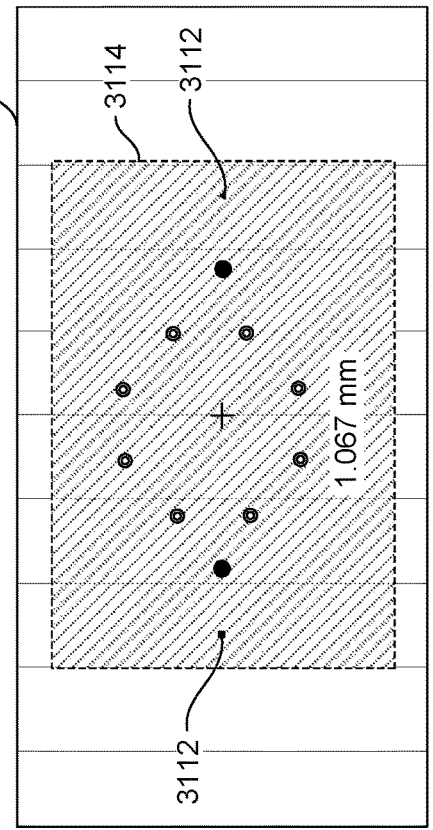

FIGS. 31A-31C show examples of autofocus light detected by a sensor. The autofocus light can be detected using one or more embodiments described herein. In some implementations, the autofocus light can be detected using the system 100 in FIG. 1. In some implementations, the autofocus light can be detected using the optical system 200 in FIG. 2. In some implementations, the autofocus light can be detected using the optical system 500 in FIG. 5. In some implementations, the autofocus light can be detected using the optical system 800 in FIG. 8A. In some implementations, the autofocus light can be detected using the optical system 820 in FIG. 8B. In some implementations, the autofocus light can be detected using the optical system 1100 in FIG. 11. In some implementations, the autofocus light can be detected using the optical system 1200 in FIG. 12. In some implementations, the autofocus light can be detected using the optical system 1300 in FIG. 13. In some implementations, the autofocus light can be detected using the optical system 1400 in FIG. 14. In some implementations, the autofocus light can be detected using the imaging module 1800 in FIGS. 18 and 19A-19B. In some implementations, the autofocus light can be created using the SIM assembly 2000 in FIG. 20. In some implementations, the autofocus light can be detected using the imaging module 2100 in FIG. 21. In some implementations, the autofocus light can be detected using the imaging module 2200 in FIG. 22. In some implementations, the autofocus light can be detected using the imaging module 2400 in FIG. 24. In some implementations, the autofocus light can be detected using the optical system 2500 in FIG. 25. In some implementations, the autofocus light can be detected using the optical system 2600 in FIG. 26. In some implementations, the autofocus light can be detected using the reflective component 2700 in FIG. 27. In some implementations, the autofocus light can be detected using the reflective component 2800 in FIG. 28. In some implementations, the autofocus light can be created using the SIM assembly 3400 in FIG. 34. In some implementations, the autofocus light can be created using the RIGS 3500 in FIG. 35. In some implementations, the autofocus light can be created using the RIGS 3600 in FIG. 36. In some implementations, the autofocus light can be created using the piezo phase shifter 3700 in FIG. 37. In some implementations, the autofocus light can be created using the piezo phase shifter 3800 in FIG. 38. In some implementations, the autofocus light can be detected using the projection lens 3900 in FIG. 39. In some implementations, the autofocus light can be detected using the projection lens 4000 in FIG. 40. In some implementations, the autofocus light can be detected using the field of view 4100 in FIG. 41.

FIG. 31A shows autofocus light 3100. The autofocus light 3100 is here shown in a simulation as being detected within a tile 3102 that is defined with regard to a substrate 3104. For example, the autofocus light can be captured using an implementation involving the imaging module 2400 in FIG. 24 and the optical system 2500 in FIG. 25. The autofocus light 3100 can include two or more spots of autofocus light that correspond to reflections from a layer or other surface of a substrate. A distance between spots can indicate a distance between a substrate and an objective that captures the autofocus light 3100. For example, the distance between the spots of the autofocus light 3100 is here about 0.390 mm.

FIG. 31B shows autofocus light 3106. The autofocus light 3106 is here shown in a simulation as being detected within a tile 3108 that is defined with regard to a substrate 3110. For example, the autofocus light 3106 can be captured using an implementation involving the imaging module 1800 in FIGS. 18 and 19A-19B, the SIM assembly 2000 in FIG. 20, and the optical system 2600 in FIG. 26. As another example, the autofocus light 3106 can be captured using an implementation involving the imaging module 2200 in FIG. 22. The autofocus light 3106 can include two or more spots of autofocus light that correspond to reflections from a layer or other surface of a substrate. A distance between spots can indicate a distance between a substrate and an objective that captures the autofocus light 3106. For example, the distance between the spots of the autofocus light 3106 is here about 1.067 mm. In some implementations, the autofocus procedure can be tailored to eliminate or reduce incidents where one or more spots of the autofocus light 3106 fall outside the tile 3108.

FIG. 31C shows autofocus light 3112. The autofocus light 3112 is here shown in a simulation as being detected within a tile 3114 that is defined with regard to a substrate 3116. For example, the autofocus light 3106 can be captured using an implementation involving the imaging module 1800 in FIGS. 18 and 19A-19B, the SIM assembly 2000 in FIG. 20, and the optical system 2600 in FIG. 26. As another example, the autofocus light 3106 can be captured using an implementation involving the imaging module 2200 in FIG. 22. The autofocus light 3106 can include two or more spots of autofocus light that correspond to reflections from a layer or other surface of a substrate. A distance between spots can indicate a distance between a substrate and an objective that captures the autofocus light 3106. For example, the distance between the spots of the autofocus light 3106 is here about 1.067 mm. In some implementations, the autofocus procedure can be tailored to eliminate or reduce incidents where one or more spots of the autofocus light 3112 fall outside the tile 3114.

Power management can be performed in one or more embodiments described herein. In some implementations, power management includes applying one or more power algorithms. A power algorithm can be associated with one or more color channels. For example, a combined green power algorithm for a laser engine can be defined as:

$$green_{combined} = G1 + G2$$

$$Green_{ratio} = \frac{G2}{G1}$$

$$G1_{set} = \frac{Green_{combined}}{(1 + Green_{ratio})}$$

$$G2_{set} = G1_{set} * Green_{ratio}$$

G1=max Green1 power read back by FW
G2=max Green2 power read back by FW.

Figure 32A:
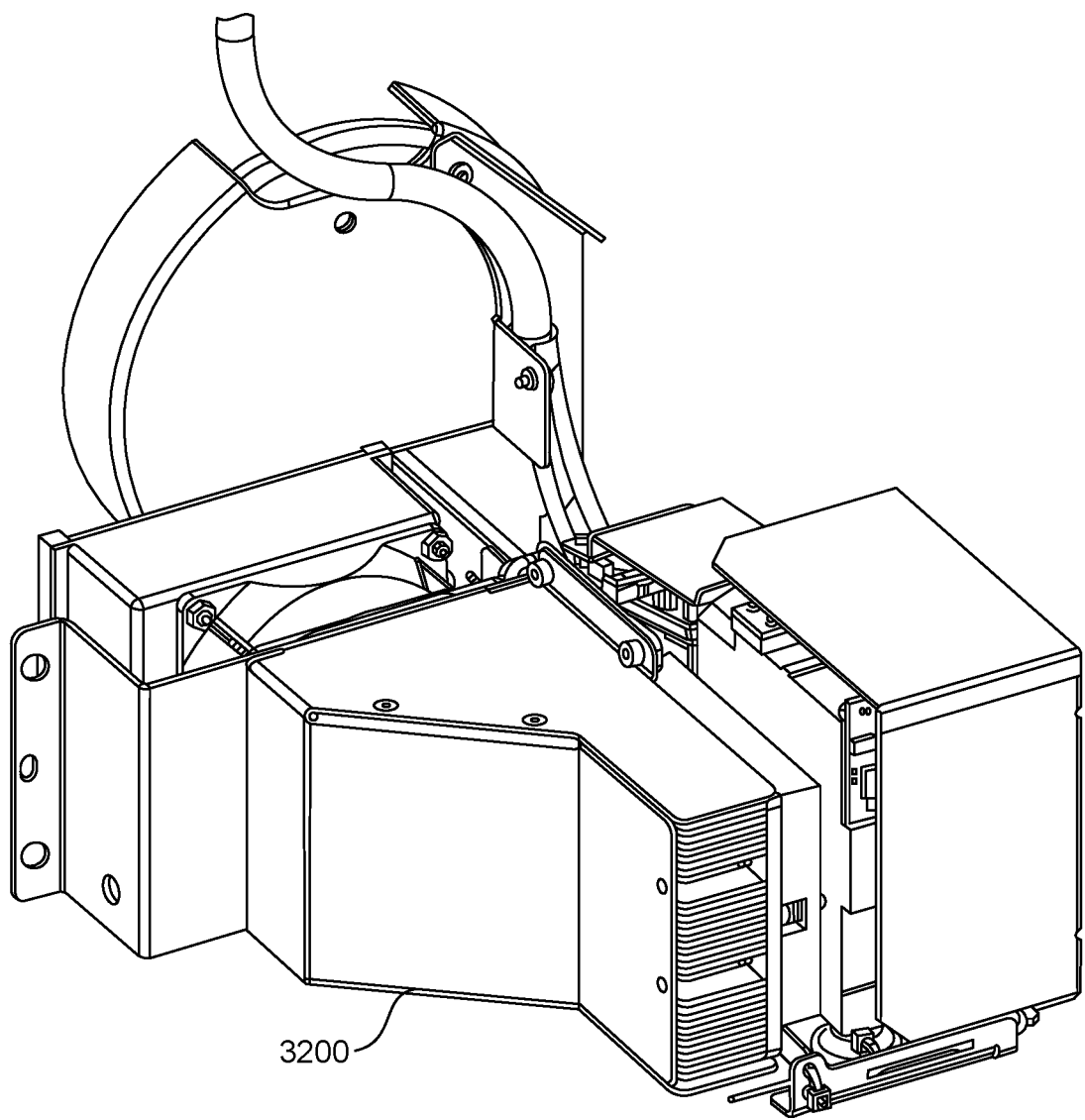
FIGS. 32A-32C show an embodiment of a laser engine heat sink.
Figure 32B:
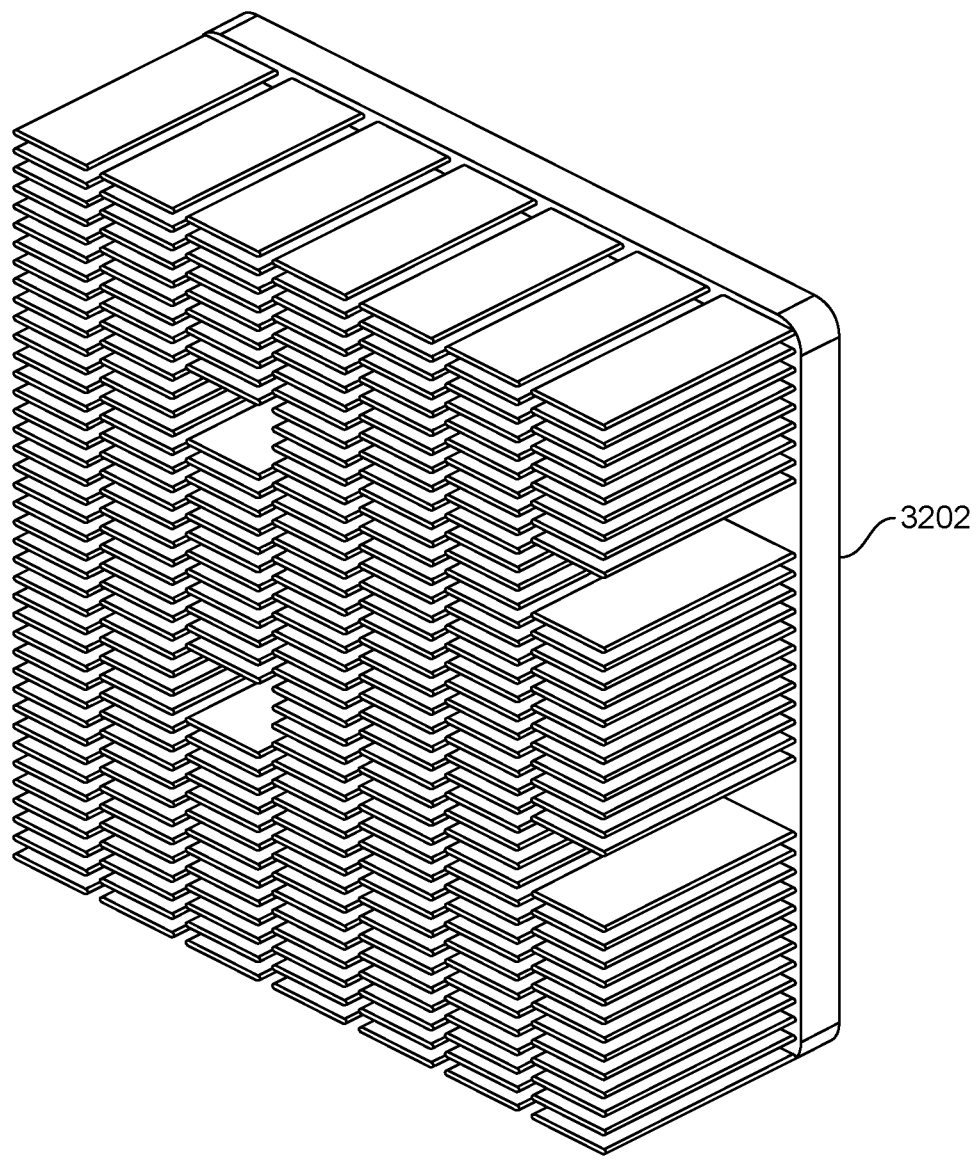
Figure 32C:
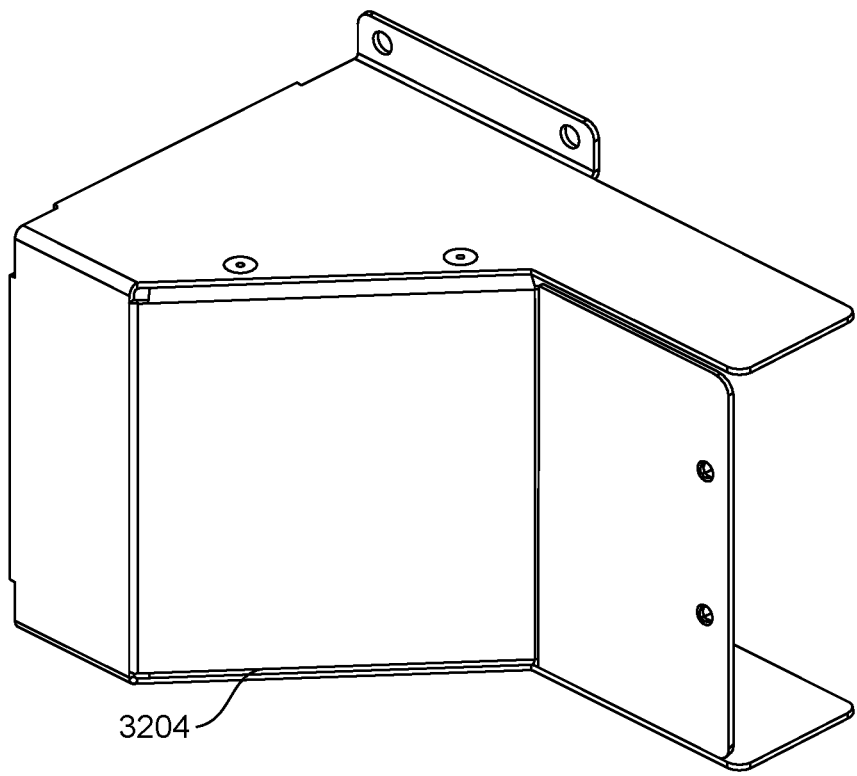
Figure 33A:
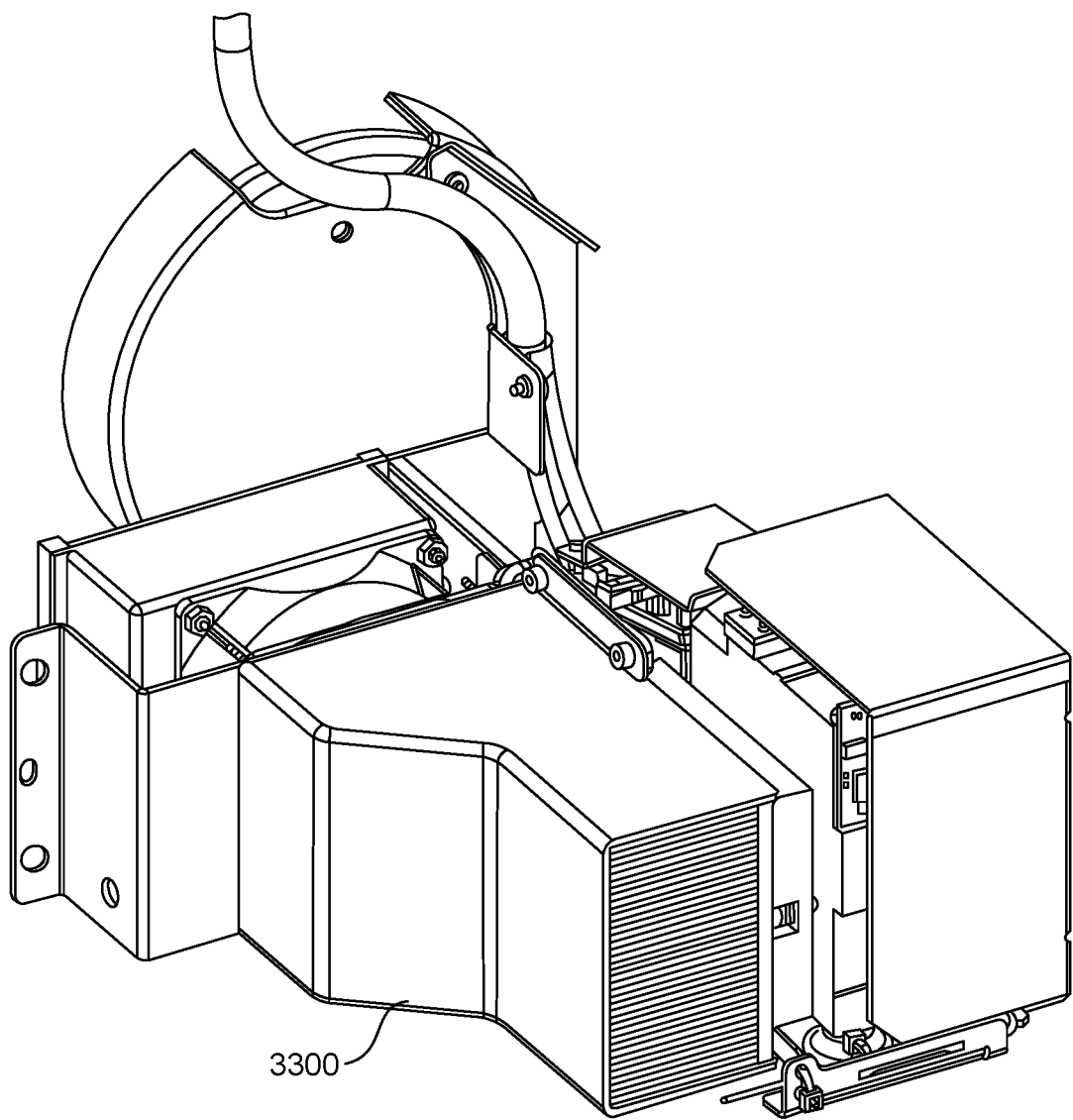
FIGS. 33A-33C show an embodiment of a laser engine heat sink.
Figure 33B:
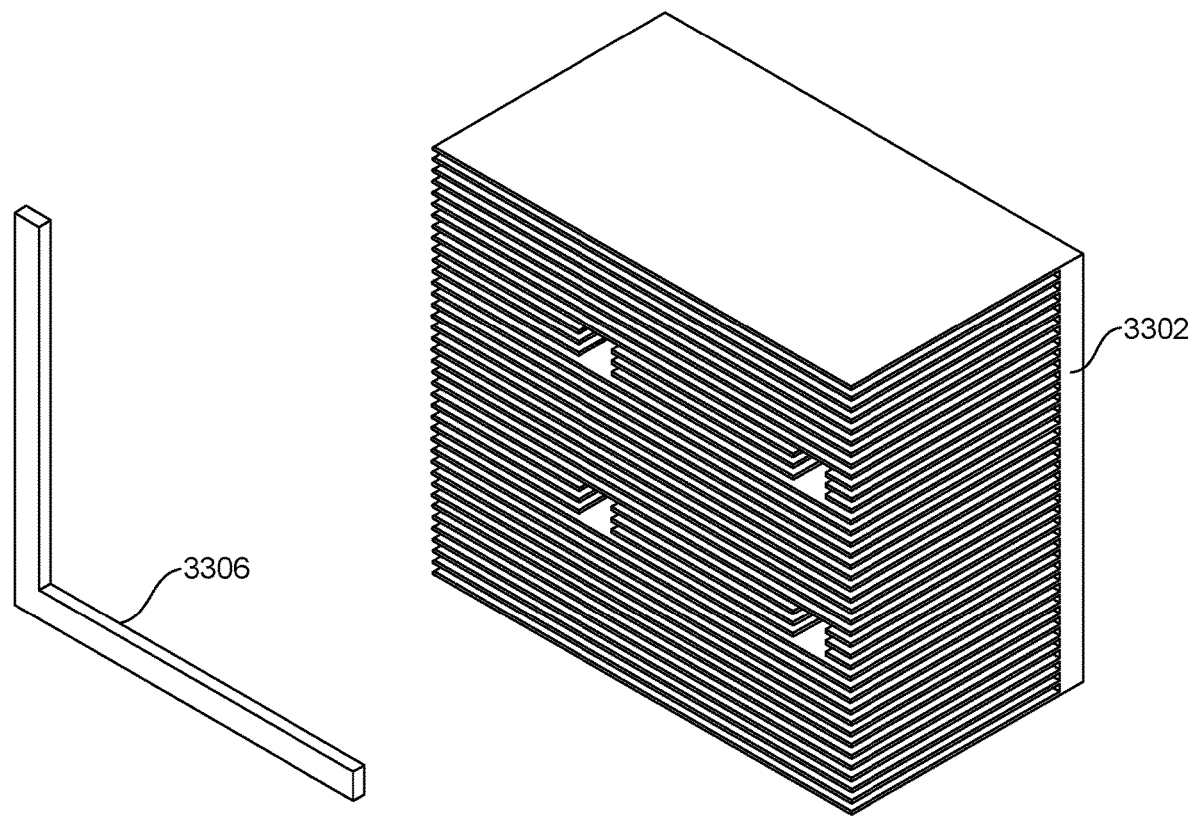
Figure 33C:
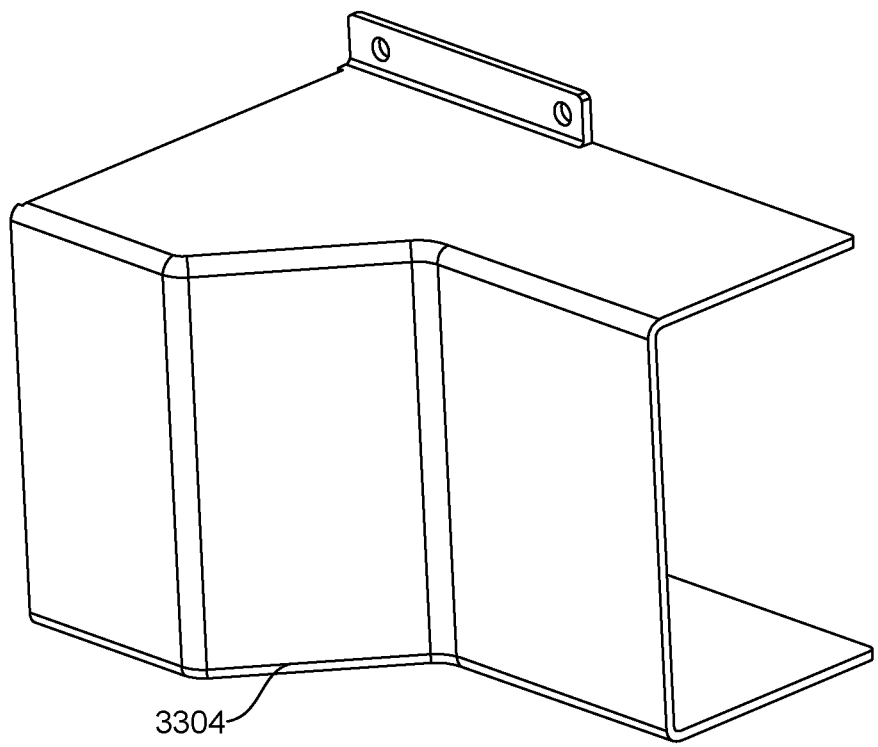

FIGS. 32A-32C show an embodiment of a laser engine heat sink 3200. FIGS. 33A-33C show an embodiment of a laser engine heat sink 3300. The laser engine heat sink 3200 and/or 3300 can be used with, or be included within, one or more other embodiments described herein. In some implementations, the laser engine heat sink 3200 and/or 3300 can be used with, or be included within, the system 100 in FIG. 1. In some implementations, the laser engine heat sink 3200 and/or 3300 can be used with, or be included within, the optical system 200 in FIG. 2. In some implementations, the laser engine heat sink 3200 and/or 3300 can be used with, or be included within, the optical system 500 in FIG. 5. In some implementations, the laser engine heat sink 3200 and/or 3300 can be used with, or be included within, the optical system 820 in FIG. 8B. In some implementations, the laser engine heat sink 3200 and/or 3300 can be used with, or be included within, the optical system 1100 in FIG. 11. In some implementations, the laser engine heat sink 3200 and/or 3300 can be used with, or be included within, the optical system 1200 in FIG. 12. In some implementations, the laser engine heat sink 3200 and/or 3300 can be used with, or be included within, the optical system 1300 in FIG. 13. In some implementations, the laser engine heat sink 3200 and/or 3300 can be used with, or be included within, the optical system 1400 in FIG. 14. In some implementations, the laser engine heat sink 3200 and/or 3300 can be used with, or be included within, the imaging module 1800 in FIGS. 18 and 19A-19B. In some implementations, the laser engine heat sink 3200 and/or 3300 can be used with, or be included within, the imaging module 2100 in FIG. 21. In some implementations, the laser engine heat sink 3200 and/or 3300 can be used with, or be included within, the imaging module 2200 in FIG. 22. In some implementations, the laser engine heat sink 3200 and/or 3300 can be used with, or be included within, the imaging module 2400 in FIG. 24. In some implementations, the laser engine heat sink 3200 and/or 3300 can be used with, or be included within, the optical system 2500 in FIG. 25. In some implementations, the laser engine heat sink 3200 and/or 3300 can be used with, or be included within, the optical system 2600 in FIG. 26. In some implementations, the laser engine heat sink 3200 and/or 3300 can be used with the reflective component 2700 in FIG. 27. In some implementations, the laser engine heat sink 3200 and/or 3300 can be used with the SIM assembly 3400 in FIG. 34. In some implementations, the laser engine heat sink 3200 and/or 3300 can be used with the RIGS 3500 in FIG. 35. In some implementations, the laser engine heat sink 3200 and/or 3300 can be used with the RIGS 3600 in FIG. 36. In some implementations, the laser engine heat sink 3200 and/or 3300 can be used with the piezo phase shifter 3700 in FIG. 37. In some implementations, the laser engine heat sink 3200 and/or 3300 can be used with the piezo phase shifter 3800 in FIG. 38. In some implementations, the laser engine heat sink 3200 and/or 3300 can be used with the projection lens 3900 in FIG. 39. In some implementations, the laser engine heat sink 3200 and/or 3300 can be used with the projection lens 4000 in FIG. 40.

The laser engine heat sink 3200 can include a heat sink 3202. The laser engine heat sink 3300 can include a heat sink 3302. The heat sink 3200 and/or 3300 can include one or more heat sink materials. In some implementations, the heat sink material can be aluminum or copper. For example, the heat sink 3202 can include copper and the heat sink 3302 can include aluminum. The heat sink 3202 and/or 3302 can have heat sink fins of a predetermined size. In some implementations, the size of the heat sink fins of the heat sink 3302 can be larger than the size of the heat sink fins of the heat sink 3202. For example, the size of the heat sink fins of the heat sink 3302 can be about 20 mm larger than the size of the heat sink fins of the heat sink 3202. In some implementations, the thermal resistance of the heat sink 3302 can be lower than the thermal resistance of the heat sink 3302. For example, the thermal resistance of the heat sink 3302 can be about 30-40% lower, such as about 36% lower, than the thermal resistance of the heat sink 3302. In some implementations, the airflow of the laser engine heat sink 3300 can be higher than the airflow of the laser engine heat sink 3200. For example, the airflow of the laser engine heat sink 3300 can be about 40-50% higher, such as about 45% higher, than the airflow of the laser engine heat sink 3200. In some implementations, the heat sink 3202 can have a size of about 80×80×30 mm. In some implementations, the heat sink 3302 can have a size of about 80×90×50 mm. In some implementations, the duct size of the heat sink 3302 can be larger than the duct size of the heat sink 3202. In some implementations, the heat sink 3302 can have ducts made from a different material than ducts of the heat sink 3202. For example, the heat sink 3302 can have ducts of molded plastic. For example, the heat sink 3202 can have ducts of sheet metal. The laser engine heat sink 3200 can include a housing 3204. The laser engine heat sink 3300 can include a housing 3304. In some implementations, the laser engine heat sink 3300 can include a gasket 3306. For example, the gasket 3306 can provide duct sealing between the heat sink 3302 and the housing 3304.

Figure 34:
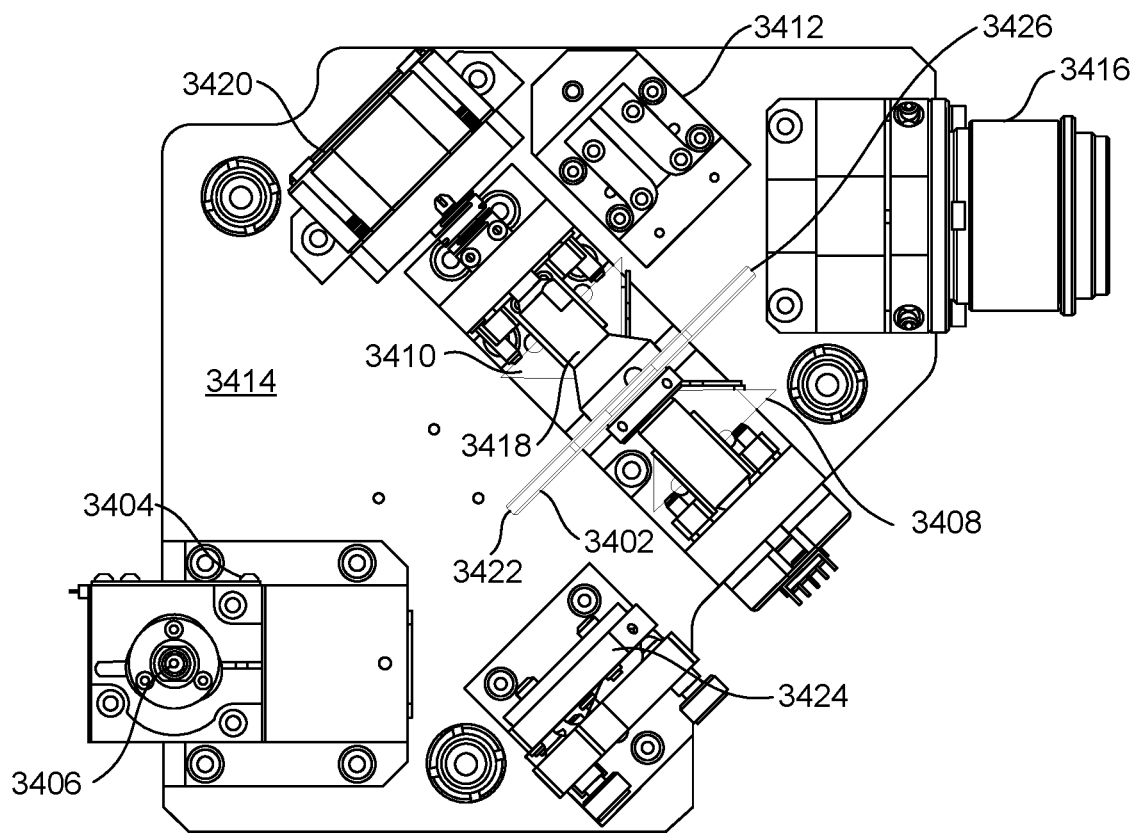
FIG. 34 shows an embodiment of a SIM assembly.

FIG. 34 shows an embodiment of a SIM assembly 3400. The SIM assembly 3400 can be used with, or be included within, one or more other embodiments described herein. In some implementations, the SIM assembly 3400 can be used with, or be included within, the system 100 in FIG. 1. In some implementations, the SIM assembly 3400 can be used with, or be included within, the optical system 200 in FIG. 2. In some implementations, the SIM assembly 3400 can be used with, or be included within, the optical system 500 in FIG. 5. In some implementations, the SIM assembly 3400 can be used with, or be included within, the optical system 820 in FIG. 8B. In some implementations, the SIM assembly 3400 can be used with, or be included within, the optical system 1100 in FIG. 11. In some implementations, the SIM assembly 3400 can be used with, or be included within, the optical system 1200 in FIG. 12. In some implementations, the SIM assembly 3400 can be used with, or be included within, the optical system 1300 in FIG. 13. In some implementations, the SIM assembly 3400 can be used with, or be included within, the optical system 1400 in FIG. 14. In some implementations, the SIM assembly 3400 can be used with the lateral displacement prism 1600 in FIGS. 16A-16B. In some implementations, the SIM assembly 3400 can include, or be used with, the beam splitter 1700 in FIG. 17. In some implementations, the SIM assembly 3400 can be used with, or be included within, the imaging module 1800 in FIG. 18 or 19A-19B. In some implementations, the SIM assembly 3400 can include, or be included within, the SIM assembly 2000 in FIG. 20. In some implementations, the SIM assembly 3400 can be included with, or be used with, the imaging module 2100 in FIG. 21. In some implementations, the SIM assembly 3400 can be included within the imaging module 2200 in FIG. 22. In some implementations, the SIM assembly 3400 can be included within the imaging module 2400 in FIG. 24. In some implementations, the SIM assembly 3400 can be included within the optical system 2500 in FIG. 25. In some implementations, the SIM assembly 3400 can be included within the optical system 2600 in FIG. 26. In some implementations, the SIM assembly 3400 can include, or be used with, the reflective component 2700 in FIG. 27. In some implementations, the SIM assembly 3400 can include, or be used with, the reflective component 2800 in FIG. 28.

In some implementations, the SIM assembly 3400 can generate the autofocus light 2900 in FIG. 29. In some implementations, the SIM assembly 3400 can generate the autofocus light 3000 in FIG. 30. In some implementations, the SIM assembly 3400 can generate the autofocus light 3100 in FIGS. 31A-31C. In some implementations, the SIM assembly 3400 can be used with the laser engine heat sink 3200 in FIGS. 32A-32C. In some implementations, the SIM assembly 3400 can be used with the laser engine heat sink 3300 in FIGS. 33A-33C. In some implementations, the SIM assembly 3400 can include, or be used with, the RIGS 3500 in FIG. 35. In some implementations, the SIM assembly 3400 can include, or be used with, the RIGS 3600 in FIG. 36. In some implementations, the SIM assembly 3400 can include, or be used with, the piezo phase shifter 3700 in FIG. 37. In some implementations, the SIM assembly 3400 can include, or be used with, the piezo phase shifter 3800 in FIG. 38. In some implementations, the SIM assembly 3400 can be used with the projection lens 3900 in FIG. 39. In some implementations, the SIM assembly 3400 can be used with the projection lens 4000 in FIG. 40. In some implementations, the SIM assembly 3400 can generate the field of view 4100 in FIG. 41.

The SIM assembly 3400 includes a rotatable mirror 3402. The SIM assembly 3400 includes a light source 3404. In some implementations, the light source 3404 provides light that it in turn receives through at least one fiber optic cable 3406. For example, the light source 3404 and the fiber optic cable 3406 can collectively be considered a fiber launch module. The SIM assembly 3400 includes a grating 3408 and a grating 3410. In some implementations, the grating 3408 and/or 3410 can serve as a diffractive component with regard to light from the light source 3404. For example, the grating 3408 and/or 3410 can comprise a substrate with a periodic structure, the substrate combined with a prism. The gratings 3408 and 3410 can be positioned relative to each other according to one or more arrangements. Here, the gratings 3408 and 3410 face each other in the SIM assembly 3400. The gratings 3408 and 3410 can be substantially identical to each other or can have one or more differences. The size, periodicity or other spatial aspect of one of the gratings 3408 and 3410 can differ from that/those of the other. The grating orientation (i.e., the spatial orientation of the periodic structure) of one of the gratings 3408 and 3410 can differ from that/those of the other. In some implementations, the respective grating orientations of the gratings 3408 and 3410, which gratings themselves face toward each other, can be substantially perpendicular to each other or at any other angle relative to each other. In some implementations, the gratings 3408 and 3410 can be at offset positions relative to the rotatable mirror 3402. In some implementations, the gratings 3408 and/or 3410 can be in a fixed position relative to the light source 3404.

The SIM assembly 3400 can include one or more components (e.g., as a phase selector) to facilitate phase selection with regard to the light that should be applied to a sample. Here, the SIM assembly 3400 includes a phase shifter 3412. In some implementations, the phase shifter 3412 includes a piezo fringe shifter. For example, the phase shifter 3412 can receive light from the grating 3408 and/or 3410 and can perform phase selection with regard to some or all of that light. For example, the phase shifter 3412 can be used for controlling the pattern phase of the structured light using which a particular image should be captured. The phase shifter 3412 can include a piezo actuator. For example, a piezo piston system can be used to effectuate phase selection. Other approaches can be used. For example, a tilting optical plate can be used for phase selection. For example, the SIM assembly 3400 is here implemented on a board 3414, and one or more areas of the board 3414 can be tilted to accomplish phase selection. As another example, one or more of the gratings 3408 and 3410 can be moved (e.g., translated) for the phase selection, such as by a piezo actuator. Light emanating from the phase shifter 3412 is sometimes referred to as phase-selected light, to indicate that the light has been conditioned according to a particular phase selection. In some implementations, the gratings 3408 and/or 3410 can be in a fixed position relative to the light source 3404.

The SIM assembly 3400 includes a projection lens 3416 that can include one or more optical components (e.g., a lens) to condition light that is received from the phase shifter 3412. For example, the projection lens 3416 can control the characteristics of the light before the light enters an objective lens (e.g., the objective 204 in FIG. 2).

The rotatable mirror 3402 can be used to redirect at least one beam of light toward, and/or arriving from, one or more of the gratings 3408 or 3410. The rotatable mirror 3402 can include one or more materials so as to be sufficiently reflective of the electromagnetic waves with which the sample is to be illuminated. In some implementations, the light from the light source 3404 includes a laser beam of one or more wavelengths. For example, a metal-coated mirror and/or a dielectric mirror can be used. The rotatable mirror 3402 can be double-sided. For example, the rotatable mirror 3402 can be considered double-sided if it is capable of performing reflection on at least part of both its sides (e.g., reflective at a first end for a first beam path and reflective at a second end, opposite the first end, for a second beam path).

The rotatable mirror 3402 can include an elongate member. The rotatable mirror 3402 can have any of a variety of form factors or other shape characteristics. The rotatable mirror 3402 can have a generally flat configuration. The rotatable mirror 3402 can have a substantially square or otherwise rectangular shape. The rotatable mirror 3402 can have rounded corners. The rotatable mirror 3402 can have a substantially constant thickness. The reflective surfaces of the rotatable mirror 3402 can be substantially planar.

The rotatable mirror 3402 can be supported by an axle 3418 of the SIM assembly 3400. The axle 3418 can allow the rotatable mirror 3402 to be rotated about the axle 3418 in either or both directions. The axle 3418 can be made of a material with sufficient rigidity to hold and manipulate the rotatable mirror 3402, such material(s) including, but not limited to, metal. The axle 3418 can be coupled substantially at a center of the rotatable mirror 3402. For example, the rotatable mirror 3402 can have an opening at the center, or a cutout from one side that reaches the center, so as to facilitate coupling with the axle 3418. The axle 3418 can extend at least substantially to one side of the rotatable mirror 3402. As another example, the axle 3418 can include separate axle portions that are coupled to respective faces of the rotatable mirror 3402, without the need for any opening in the rotatable mirror 3402. The axle 3418 can have at least one suspension relative to the board 3414. The suspension can be positioned at the ends of the axle 3418 on both sides of the rotatable mirror 3402. The suspension can include a bearing or other feature that facilitates low-friction operation.

The rotatable mirror 3402 can be actuated to assume one or more positions. Any form of motor or other actuator can be used for controlling the rotatable mirror 3402. In some implementations, a stepper motor 3420 is used. The stepper motor 3420 can be coupled to the axle 3418 and be used for causing the axle 3418, and thereby the rotatable mirror 3402, to rotate and assume the desired position(s). In some implementations, the rotatable mirror 3402 rotates in the same direction toward the new positions (e.g., always clockwise, or always counter-clockwise, about the rotation axis of the axle 3418). In some implementations, the rotatable mirror 3402 reciprocates between two or more positions (e.g., alternatingly clockwise or counter-clockwise, about the rotation axis of the axle 3418).

In some implementations, the light source 3404 can generate light that initially propagates toward a mirror 3424. After reflection at the mirror 3424, the light propagates toward the grating 3410. The rotatable mirror 3402 can currently be positioned (e.g., oriented about the rotational axis of the axle 3418) so that a first end 3422 of the rotatable mirror 3402 does not interrupt the light. Currently, the first end 3422 may be positioned closer to the viewer than is the light which may propagate in the plane of the drawing. That is, a reflective surface of the rotatable mirror 3402 that faces toward the light source 3404 currently does not interrupt the light because the first end 3422 does not block the path of the light. The light therefore propagates (through air, vacuum, or another fluid) until reaching the grating 3410.

The light interacts with the grating 3410 in one or more ways. In some implementations, the light undergoes diffraction based on the grating 3410. Here, light that emanates from the grating 3410 can be structured light (e.g., light having one or more pattern fringes) based on the interaction therewith by the light. The light that emanates from the grating 3410 initially propagates substantially in a direction generally toward the projection lens 3416. However, the position of the rotatable mirror 3402 is such that a second end 3426 of the rotatable mirror 3402 does interrupt the light. The second end 3426 can be opposite the first end 3422. In some implementations, the first end 3422 and the second end 3426 can be positioned at any angle relative to each other, such as any angle between 0 degrees and 180 degrees. Currently, the second end 3426 may be positioned about as close to the viewer as is the light. That is, a reflective surface of the rotatable mirror 3402 that faces toward the grating 3410 does interrupt the light that emanates from the grating 3410 because the second end 3426 blocks the path of the light. From the light, the rotatable mirror 3402 therefore directs light toward the phase shifter 3412.

The phase shifter 3412 performs phase selection on the light. For example, the phase shifter 3412 selects the pattern phase to which the sample is to be subjected in the present illumination (e.g., for purposes of capturing one or more particular images). Light emanates from the phase shifter 3412 and propagates toward, and enters, the projection lens 3416. The light corresponds to a specific phase selection made using the phase shifter 3412. The light can therefore be characterized as phase-selected light. The light can then continue to propagate through the system, for example to illuminate a sample.

Here, the characteristics of the phase-selected electromagnetic waves of the light entering the projection lens 3416 correspond to the fact that the light is diffracted by the grating 3410 and that phase-selection is performed by the phase shifter 3412. The involvement of the grating 3410, moreover, was here a result of the positioning of the rotatable mirror 3402 so that the second end 3426 thereof interrupted the light, whereas the first end 3422 did not interrupt the light.

Assume now that the rotatable mirror 3402 instead is placed in a different position. The light source 3404 here generates light that initially is reflected by the mirror 3424, and thereafter propagates toward the grating 3410. The rotatable mirror 3402 is positioned (e.g., oriented about the rotational axis of the axle 3418) so that the first end 3422 of the rotatable mirror 3402 does interrupt the light. The first end 3422 may be positioned about as close to the viewer as is the light. That is, the reflective surface of the rotatable mirror 3402 that faces toward the light source 3404 does interrupt the light because the first end 3422 blocks the path of the light. Light therefore propagates (through air, vacuum, or another fluid) until reaching the grating 2008.

The light interacts with the grating 3408 in one or more ways. In some implementations, the light undergoes diffraction based on the grating 3408. Here, light is structured light (e.g., having one or more pattern fringes) that emanates from the grating 3408 based on the interaction therewith by the light. The light propagates substantially in a direction toward the phase shifter 3412. The position of the rotatable mirror 3402 is such that the second end 3426 of the rotatable mirror 3402 does not interrupt the light. Currently, the second end 3426 may be positioned closer to the viewer than is the light. That is, no reflective surface of the rotatable mirror 3402 currently interrupts the light because the second end 3426 does not block the path of the light. The light therefore propagates until reaching the phase shifter 3412.

The phase shifter 3412 performs phase selection on the light. For example, the phase shifter 3412 selects the pattern phase to which the sample is to be subjected in the present illumination (e.g., for purposes of capturing one or more particular images). Light emanates from the phase shifter 3412 and propagates toward, and enters, the projection lens 3416. The light corresponds to a specific phase selection made using the phase shifter 3412. The light can therefore be characterized as phase-selected light. The light can then continue to propagate through the system, for example to illuminate a sample.

Here, the characteristics of the phase-selected electromagnetic waves of the light correspond to the fact that the light is diffracted by the grating 3408 and that phase-selection is performed by the phase shifter 3412. The involvement of the grating 3408, moreover, was here a result of the positioning of the rotatable mirror 3402 so that the first end 3422 thereof interrupted the light, whereas the second end 3426 did not interrupt the light. The rotatable mirror 3402 can be caused to repeatedly assume different positions by various rotations. For example, the rotatable mirror 3402 can reciprocate between positions. As another example, the rotatable mirror 3402 can rotate in the same direction (e.g., clockwise or counter-clockwise, from the perspective of the stepper motor 3420) to repeatedly assume positions.

Figure 35:
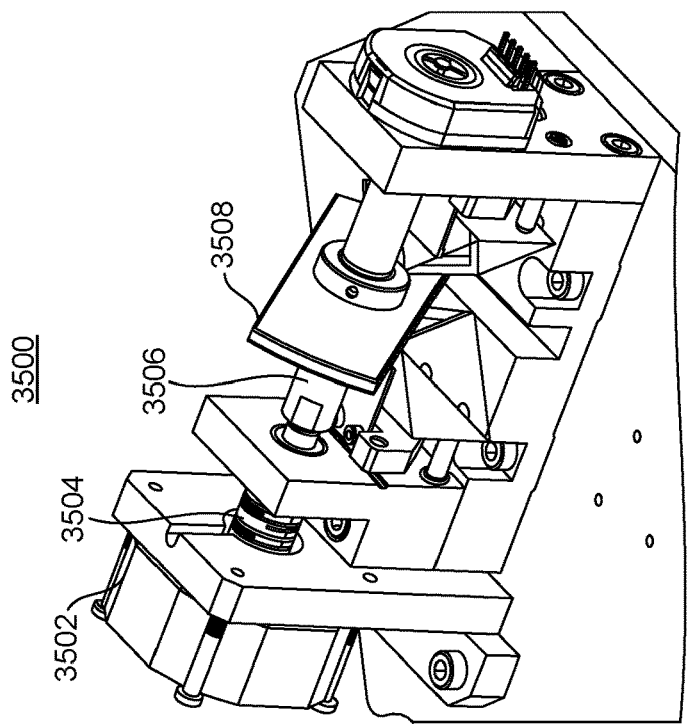
FIG. 35 shows an example of a rotating in-plane grating switcher (RIGS).

FIG. 35 shows an example of a RIGS 3500. The RIGS 3500 can be used with, or be included within, one or more other embodiments described herein. In some implementations, the RIGS 3500 can be used with, or be included within, the system 100 in FIG. 1. In some implementations, the RIGS 3500 can be used with, or be included within, the optical system 200 in FIG. 2. In some implementations, the RIGS 3500 can be used with, or be included within, the optical system 500 in FIG. 5. In some implementations, the RIGS 3500 can be used with, or be included within, the optical system 820 in FIG. 8B. In some implementations, the RIGS 3500 can be used with, or be included within, the optical system 1100 in FIG. 11. In some implementations, the RIGS 3500 can be used with, or be included within, the optical system 1200 in FIG. 12. In some implementations, the RIGS 3500 can be used with, or be included within, the optical system 1300 in FIG. 13. In some implementations, the RIGS 3500 can be used with, or be included within, the optical system 1400 in FIG. 14. In some implementations, the RIGS 3500 can be used with the lateral displacement prism 1600 in FIGS. 16A-16B. In some implementations, the RIGS 3500 can include, or be used with, the beam splitter 1700 in FIG. 17. In some implementations, the RIGS 3500 can be used with, or be included within, the imaging module 1800 in FIG. 18 or 19A-19B. In some implementations, the RIGS 3500 be included within the SIM assembly 2000 in FIG. 20. In some implementations, the RIGS 3500 can be included with, or be used with, the imaging module 2100 in FIG. 21. In some implementations, the RIGS 3500 can be included within the imaging module 2200 in FIG. 22. In some implementations, the RIGS 3500 can be included within the imaging module 2400 in FIG. 24. In some implementations, the RIGS 3500 can be included within the optical system 2500 in FIG. 25. In some implementations, the RIGS 3500 can be included within the optical system 2600 in FIG. 26. In some implementations, the RIGS 3500 can be used with the reflective component 2700 in FIG. 27. In some implementations, the RIGS 3500 can be used with the reflective component 2800 in FIG. 28. In some implementations, the RIGS 3500 can generate the autofocus light 2900 in FIG. 29. In some implementations, the RIGS 3500 can generate the autofocus light 3000 in FIG. 30. In some implementations, the RIGS 3500 can generate the autofocus light 3100 in FIGS. 31A-31C. In some implementations, the RIGS 3500 can be used with the laser engine heat sink 3200 in FIGS. 32A-32C. In some implementations, the RIGS 3500 can be used with the laser engine heat sink 3300 in FIGS. 33A-33C. In some implementations, the RIGS 3500 can be included within the SIM assembly 3400 in FIG. 34. In some implementations, the RIGS 3500 can be used with the RIGS 3600 in FIG. 36. In some implementations, the RIGS 3500 can include, or be used with, the piezo phase shifter 3700 in FIG. 37. In some implementations, the RIGS 3500 can include, or be used with, the piezo phase shifter 3800 in FIG. 38. In some implementations, the RIGS 3500 can be used with the projection lens 3900 in FIG. 39. In some implementations, the RIGS 3500 can be used with the projection lens 4000 in FIG. 40. In some implementations, the RIGS 3500 can generate the field of view 4100 in FIG. 41.

The RIGS 3500 includes a RIGS motor 3502. The RIGS motor 3502 can be an electric motor having custom windings. The RIGS motor 3502 can be coupled to a spindle 3504 which in turn is coupled to an axle 3506 on which a rotatable mirror 3508 is mounted. The RIGS motor 3502, the spindle 3504, and the axle 3506 can cause the rotatable mirror 3508 to rotate and assume the desired position(s). In some implementations, the rotatable mirror 3508 rotates in the same direction toward the new positions (e.g., always clockwise, or always counter-clockwise, about the rotation axis of the axle 3506). In some implementations, the rotatable mirror 3508 reciprocates between two or more positions (e.g., alternatingly clockwise or counter-clockwise, about the rotation axis of the axle 3506). A blade transition time of the rotatable mirror 3508 can in part depend on the RIGS motor 3502 and the spindle 3504. For example, the blade transition time can be about 47 ms.

Figure 36:
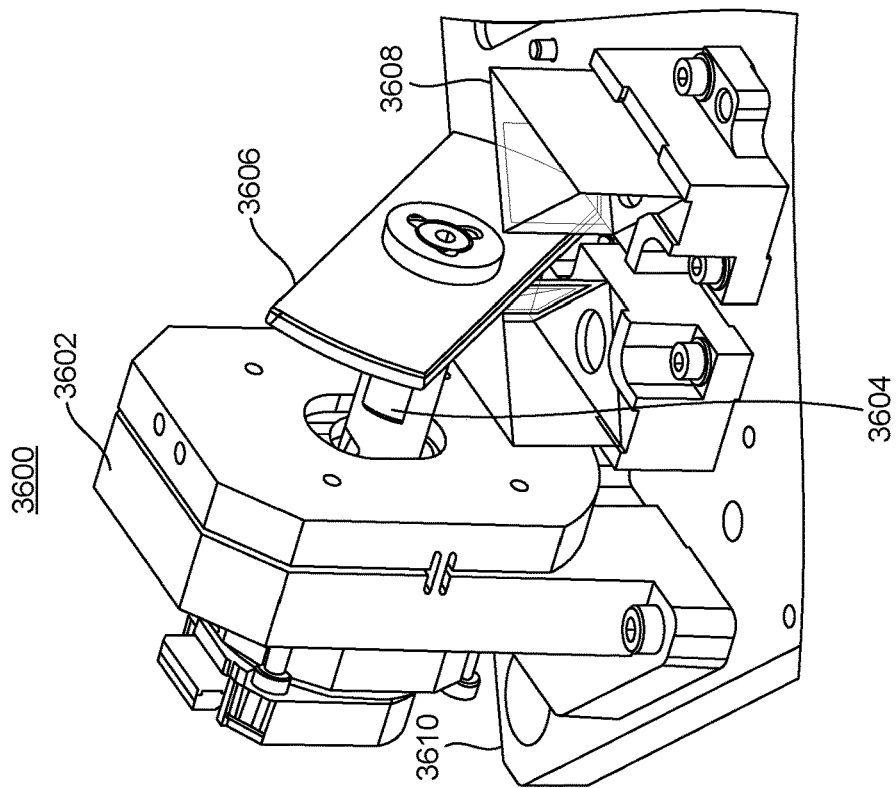
FIG. 36 shows an example of a RIGS.

FIG. 36 shows an example of a RIGS 3600. The RIGS 3600 can be used with, or be included within, one or more other embodiments described herein. In some implementations, the RIGS 3600 can be used with, or be included within, the system 100 in FIG. 1. In some implementations, the RIGS 3600 can be used with, or be included within, the optical system 200 in FIG. 2. In some implementations, the RIGS 3600 can be used with, or be included within, the optical system 500 in FIG. 5. In some implementations, the RIGS 3600 can be used with, or be included within, the optical system 820 in FIG. 8B. In some implementations, the RIGS 3600 can be used with, or be included within, the optical system 1100 in FIG. 11. In some implementations, the RIGS 3600 can be used with, or be included within, the optical system 1200 in FIG. 12. In some implementations, the RIGS 3600 can be used with, or be included within, the optical system 1300 in FIG. 13. In some implementations, the RIGS 3600 can be used with, or be included within, the optical system 1400 in FIG. 14. In some implementations, the RIGS 3600 can be used with the lateral displacement prism 1600 in FIGS. 16A-16B. In some implementations, the RIGS 3600 can include, or be used with, the beam splitter 1700 in FIG. 17. In some implementations, the RIGS 3600 can be used with, or be included within, the imaging module 1800 in FIG. 18 or 19A-19B. In some implementations, the RIGS 3600 be included within the SIM assembly 2000 in FIG. 20. In some implementations, the RIGS 3600 can be included with, or be used with, the imaging module 2100 in FIG. 21. In some implementations, the RIGS 3600 can be included within the imaging module 2200 in FIG. 22. In some implementations, the RIGS 3600 can be included within the imaging module 2400 in FIG. 24. In some implementations, the RIGS 3600 can be included within the optical system 2500 in FIG. 25. In some implementations, the RIGS 3600 can be included within the optical system 2600 in FIG. 26. In some implementations, the RIGS 3600 can be used with the reflective component 2700 in FIG. 27. In some implementations, the RIGS 3600 can be used with the reflective component 2800 in FIG. 28. In some implementations, the RIGS 3600 can generate the autofocus light 2900 in FIG. 29. In some implementations, the RIGS 3600 can generate the autofocus light 3000 in FIG. 30. In some implementations, the RIGS 3600 can generate the autofocus light 3100 in FIGS. 31A-31C. In some implementations, the RIGS 3600 can be used with the laser engine heat sink 3200 in FIGS. 32A-32C. In some implementations, the RIGS 3500 can be used with the laser engine heat sink 3300 in FIGS. 33A-33C. In some implementations, the RIGS 3600 can be included within the SIM assembly 3400 in FIG. 34. In some implementations, the RIGS 3600 can be used with the RIGS 3500 in FIG. 35. In some implementations, the RIGS 3600 can include, or be used with, the piezo phase shifter 3700 in FIG. 37. In some implementations, the RIGS 3600 can include, or be used with, the piezo phase shifter 3800 in FIG. 38. In some implementations, the RIGS 3600 can be used with the projection lens 3900 in FIG. 39. In some implementations, the RIGS 3600 can be used with the projection lens 4000 in FIG. 40. In some implementations, the RIGS 3600 can generate the field of view 4100 in FIG. 41.

The RIGS 3600 includes a RIGS motor 3602. The RIGS motor 3602 can be an electric motor having custom windings. The RIGS motor 3602 can be coupled to a spindle 3604 on which a rotatable mirror 3606 is mounted. The RIGS motor 3602 and the spindle 3604 can cause the rotatable mirror 3606 to rotate and assume the desired position(s). In some implementations, the rotatable mirror 3606 rotates in the same direction toward the new positions (e.g., always clockwise, or always counter-clockwise, about the rotation axis of the spindle 3604). In some implementations, the rotatable mirror 3606 reciprocates between two or more positions (e.g., alternatingly clockwise or counter-clockwise, about the rotation axis of the spindle 3604). The RIGS 3600 can have a reduced part count compared to another RIGS, including, but not limited to, the RIGS 3500 in FIG. 35. For example, the RIGS 3600 can have eliminate the spindle 3504 in FIG. 35 and two bearings. A blade transition time of the rotatable mirror 3606 can in part depend on the RIGS motor 3602 and the spindle 3604. For example, the blade transition time can be about 40 ms. The RIGS 3600 includes a prism 3608. For example, the prism 3608 can be bonded to a sub-plate 3610 of the RIGS 3600.

Figure 37:
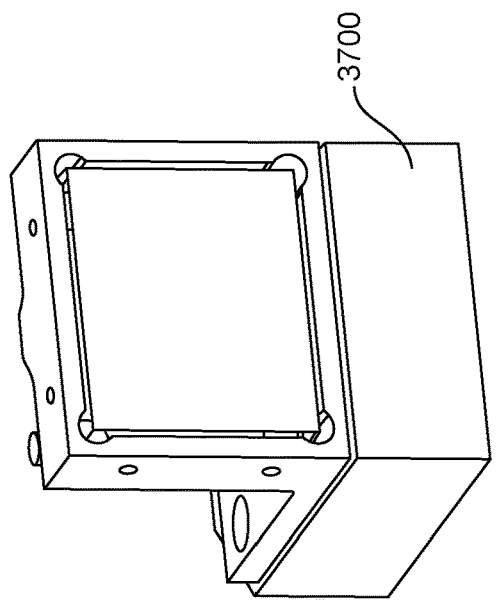
FIG. 37 shows an embodiment of a piezo phase shifter.

FIG. 37 shows an embodiment of a piezo phase shifter 3700. The piezo phase shifter 3700 can be used with, or be included within, one or more other embodiments described herein. In some implementations, the piezo phase shifter 3700 can be used with, or be included within, the system 100 in FIG. 1. In some implementations, the piezo phase shifter 3700 can be used with, or be included within, the optical system 200 in FIG. 2. In some implementations, the piezo phase shifter 3700 can be used with, or be included within, the optical system 500 in FIG. 5. In some implementations, the piezo phase shifter 3700 can be used with, or be included within, the optical system 820 in FIG. 8B. In some implementations, the piezo phase shifter 3700 can be used with, or be included within, the optical system 1100 in FIG. 11. In some implementations, the piezo phase shifter 3700 can be used with, or be included within, the optical system 1200 in FIG. 12. In some implementations, the piezo phase shifter 3700 can be used with, or be included within, the optical system 1300 in FIG. 13. In some implementations, the piezo phase shifter 3700 can be used with, or be included within, the optical system 1400 in FIG. 14. In some implementations, the piezo phase shifter 3700 can be used with, or be included within, the imaging module 1800 in FIGS. 18 and 19A-19B. In some implementations, the piezo phase shifter 3700 can be used with, or be included within, the imaging module 2100 in FIG. 21. In some implementations, the piezo phase shifter 3700 can be used with, or be included within, the imaging module 2200 in FIG. 22. In some implementations, the piezo phase shifter 3700 can be used with, or be included within, the imaging module 2400 in FIG. 24. In some implementations, the piezo phase shifter 3700 can be used with, or be included within, the optical system 2500 in FIG. 25. In some implementations, the piezo phase shifter 3700 can be used with, or be included within, the optical system 2600 in FIG. 26. In some implementations, the piezo phase shifter 3700 can be used with the reflective component 2700 in FIG. 27. In some implementations, the piezo phase shifter 3700 can be used with the reflective component 2800 in FIG. 28. In some implementations, the piezo phase shifter 3700 can generate the autofocus light 2900 in FIG. 29. In some implementations, the piezo phase shifter 3700 can generate the autofocus light 3000 in FIG. 30. In some implementations, the piezo phase shifter 3700 can generate the autofocus light 3100 in FIGS. 31A-31C. In some implementations, the piezo phase shifter 3700 can be used with the laser engine heat sink 3200 in FIGS. 32A-32C. In some implementations, the piezo phase shifter 3700 can be used with the laser engine heat sink 3300 in FIGS. 33A-33C. In some implementations, the piezo phase shifter 3700 can be included within the SIM assembly 3400 in FIG. 34. In some implementations, the piezo phase shifter 3700 can be included within the RIGS 3500 in FIG. 35. In some implementations, the piezo phase shifter 3700 can be included within the RIGS 3600 in FIG. 36. In some implementations, the piezo phase shifter 3700 can be used with the piezo phase shifter 3800 in FIG. 38. In some implementations, the piezo phase shifter 3700 can be used with the projection lens 3900 in FIG. 39. In some implementations, the piezo phase shifter 3700 can be used with the projection lens 4000 in FIG. 40.

Figure 38:
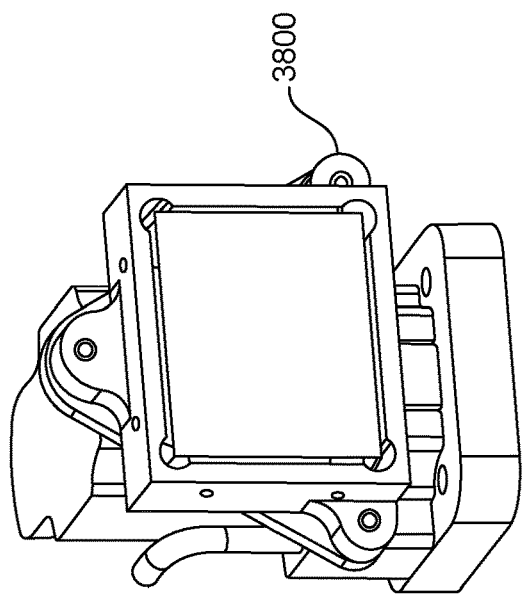
FIG. 38 shows an embodiment of a piezo phase shifter.

FIG. 38 shows an embodiment of a piezo phase shifter 3800. The piezo phase shifter 3800 can be used with, or be included within, one or more other embodiments described herein. In some implementations, the piezo phase shifter 3800 can be used with, or be included within, the system 100 in FIG. 1. In some implementations, the piezo phase shifter 3800 can be used with, or be included within, the optical system 200 in FIG. 2. In some implementations, the piezo phase shifter 3800 can be used with, or be included within, the optical system 500 in FIG. 5. In some implementations, the piezo phase shifter 3800 can be used with, or be included within, the optical system 820 in FIG. 8B. In some implementations, the piezo phase shifter 3800 can be used with, or be included within, the optical system 1100 in FIG. 11. In some implementations, the piezo phase shifter 3800 can be used with, or be included within, the optical system 1200 in FIG. 12. In some implementations, the piezo phase shifter 3800 can be used with, or be included within, the optical system 1300 in FIG. 13. In some implementations, the piezo phase shifter 3800 can be used with, or be included within, the optical system 1400 in FIG. 14. In some implementations, the piezo phase shifter 3800 can be used with, or be included within, the imaging module 1800 in FIGS. 18 and 19A-19B. In some implementations, the piezo phase shifter 3800 can be used with, or be included within, the imaging module 2100 in FIG. 21. In some implementations, the piezo phase shifter 3800 can be used with, or be included within, the imaging module 2200 in FIG. 22. In some implementations, the piezo phase shifter 3800 can be used with, or be included within, the imaging module 2400 in FIG. 24. In some implementations, the piezo phase shifter 3800 can be used with, or be included within, the optical system 2500 in FIG. 25. In some implementations, the piezo phase shifter 3800 can be used with, or be included within, the optical system 2600 in FIG. 26. In some implementations, the piezo phase shifter 3800 can be used with the reflective component 2700 in FIG. 27. In some implementations, the piezo phase shifter 3800 can be used with the reflective component 2800 in FIG. 28. In some implementations, the piezo phase shifter 3800 can generate the autofocus light 2900 in FIG. 29. In some implementations, the piezo phase shifter 3800 can generate the autofocus light 3000 in FIG. 30. In some implementations, the piezo phase shifter 3800 can generate the autofocus light 3100 in FIGS. 31A-31C. In some implementations, the piezo phase shifter 3800 can be used with the laser engine heat sink 3200 in FIGS. 32A-32C. In some implementations, the piezo phase shifter 3800 can be used with the laser engine heat sink 3300 in FIGS. 33A-33C. In some implementations, the piezo phase shifter 3800 can be included within the SIM assembly 3400 in FIG. 34. In some implementations, the piezo phase shifter 3800 can be included within the RIGS 3500 in FIG. 35. In some implementations, the piezo phase shifter 3800 can be included within the RIGS 3600 in FIG. 36. In some implementations, the piezo phase shifter 3800 can be used with the piezo phase shifter 3700 in FIG. 37. In some implementations, the piezo phase shifter 3800 can be used with the projection lens 3900 in FIG. 39. In some implementations, the piezo phase shifter 3800 can be used with the projection lens 4000 in FIG. 40.

The piezo phase shifter 3800 can have one or more performance parameters. In some implementations, a total travel of the piezo phase shifter 3800 is greater than about 5 µm. In some implementations, the piezo phase shifter 3800 provides closed loop control. For example, one or more strain gauge sensors can be mounted on a flexure. In some implementations, the piezo phase shifter 3800 can have a step and settle parameter of about 1.165 μm in less than about 4-9 ms. In some implementations, the piezo phase shifter 3800 can have a straightness of travel (boresight) of about 0.25 microradians through 2.5 μm of travel. In some implementations, the piezo phase shifter 3800 is operated by way of an analog controller.

Figure 39:
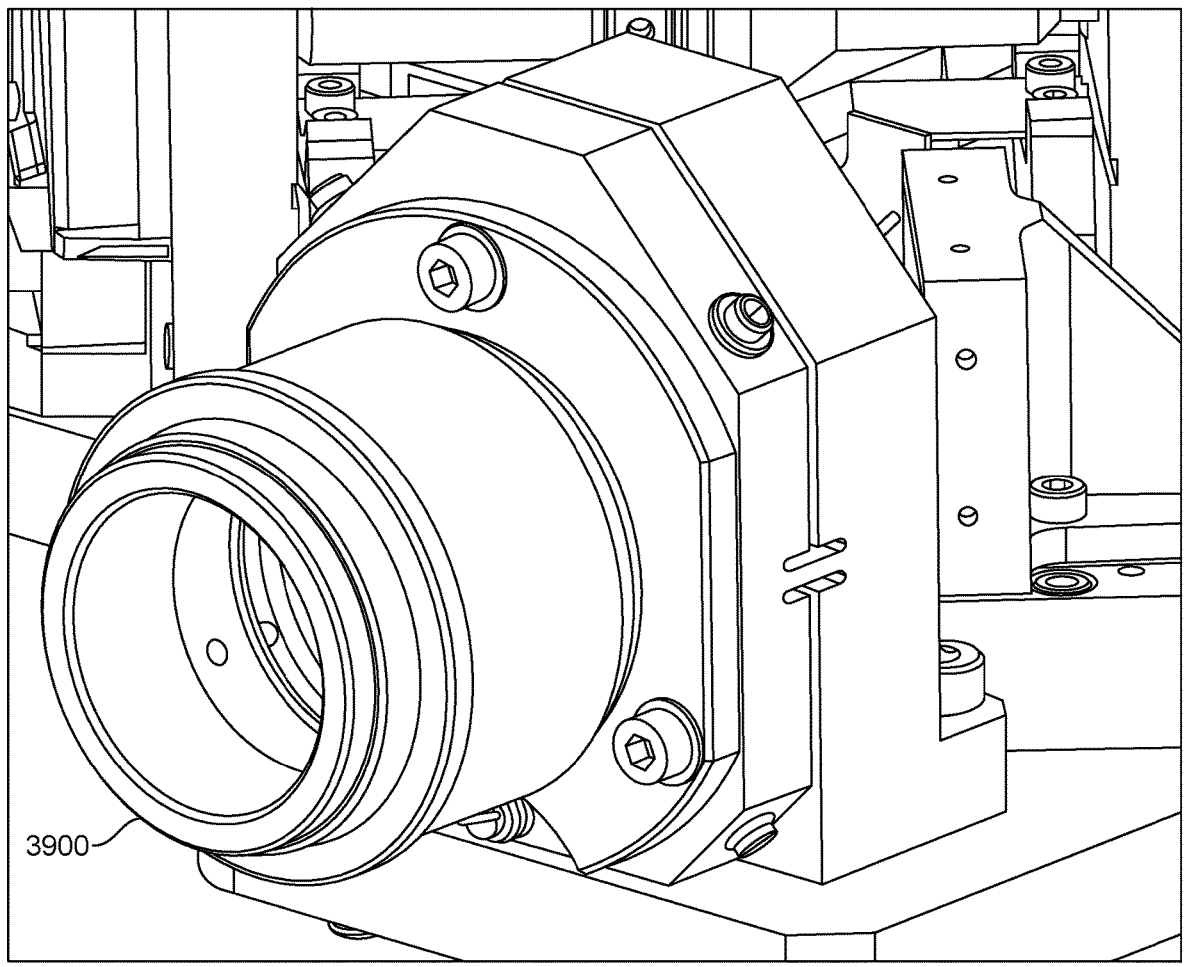
FIG. 39 shows an embodiment of a projection lens.

FIG. 39 shows an embodiment of a projection lens 3900. The projection lens 3900 can be used with, or be included within, one or more other embodiments described herein. In some implementations, the projection lens 3900 can be used with, or be included within, the system 100 in FIG. 1. In some implementations, the projection lens 3900 can be used with, or be included within, the optical system 200 in FIG. 2. In some implementations, the projection lens 3900 can be used with, or be included within, the optical system 500 in FIG. 5. In some implementations, the projection lens 3900 can be used with, or be included within, the optical system 820 in FIG. 8B. In some implementations, the projection lens 3900 can be used with, or be included within, the optical system 1100 in FIG. 11. In some implementations, the projection lens 3900 can be used with, or be included within, the optical system 1200 in FIG. 12. In some implementations, the projection lens 3900 can be used with, or be included within, the optical system 1300 in FIG. 13. In some implementations, the projection lens 3900 can be used with, or be included within, the optical system 1400 in FIG. 14. In some implementations, the projection lens 3900 can be used with, or be included within, the imaging module 1800 in FIGS. 18 and 19A-19B. In some implementations, the projection lens 3900 can be used with, or be included within, the imaging module 2100 in FIG. 21. In some implementations, the projection lens 3900 can be used with, or be included within, the imaging module 2200 in FIG. 22. In some implementations, the projection lens 3900 can be used with, or be included within, the imaging module 2400 in FIG. 24. In some implementations, the projection lens 3900 can be used with, or be included within, the optical system 2500 in FIG. 25. In some implementations, the projection lens 3900 can be used with, or be included within, the optical system 2600 in FIG. 26. In some implementations, the projection lens 3900 can be used with the reflective component 2700 in FIG. 27. In some implementations, the projection lens 3900 can be used with the reflective component 2800 in FIG. 28. In some implementations, the projection lens 3900 can generate the autofocus light 2900 in FIG. 29. In some implementations, the projection lens 3900 can generate the autofocus light 3000 in FIG. 30. In some implementations, the projection lens 3900 can generate the autofocus light 3100 in FIGS. 31A-31C. In some implementations, the projection lens 3900 can be used with the laser engine heat sink 3200 in FIGS. 32A-32C. In some implementations, the projection lens 3900 can be used with the laser engine heat sink 3300 in FIGS. 33A-33C. In some implementations, the projection lens 3900 can be used with the SIM assembly 3400 in FIG. 34. In some implementations, the projection lens 3900 can be used with the RIGS 3500 in FIG. 35. In some implementations, the projection lens 3900 can be used with the RIGS 3600 in FIG. 36. In some implementations, the projection lens 3900 can be used with the piezo phase shifter 3700 in FIG. 37. In some implementations, the projection lens 3900 can be used with the piezo phase shifter 3800 in FIG. 38. In some implementations, the projection lens 3900 can be used with the projection lens 4000 in FIG. 40.

Figure 40:
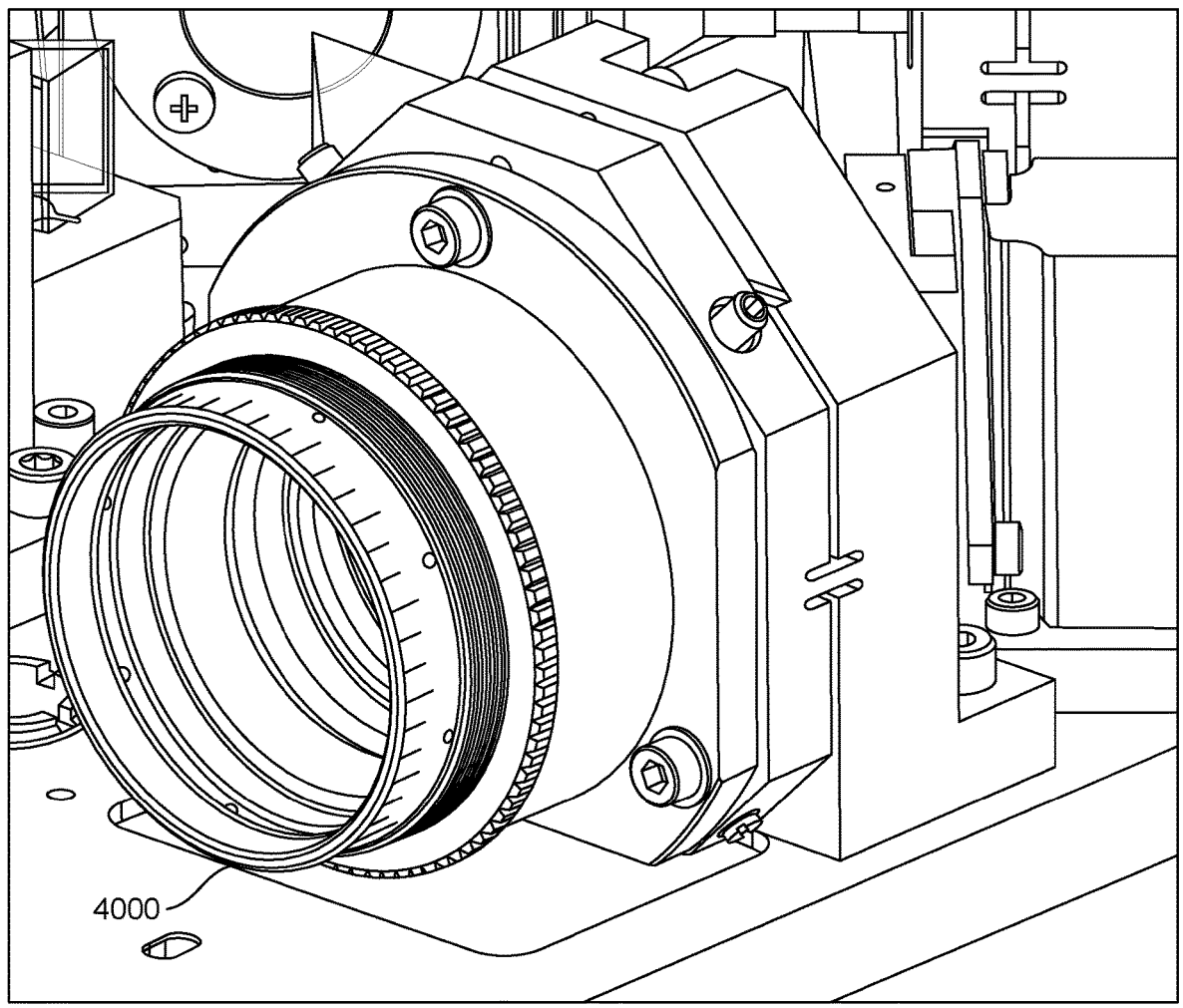
FIG. 40 shows an embodiment of a projection lens.

FIG. 40 shows an embodiment of a projection lens 4000. The projection lens 4000 can be used with, or be included within, one or more other embodiments described herein. In some implementations, the projection lens 4000 can be used with, or be included within, the system 100 in FIG. 1. In some implementations, the projection lens 4000 can be used with, or be included within, the optical system 200 in FIG. 2. In some implementations, the projection lens 4000 can be used with, or be included within, the optical system 500 in FIG. 5. In some implementations, the projection lens 4000 can be used with, or be included within, the optical system 820 in FIG. 8B. In some implementations, the projection lens 4000 can be used with, or be included within, the optical system 1100 in FIG. 11. In some implementations, the projection lens 4000 can be used with, or be included within, the optical system 1200 in FIG. 12. In some implementations, the projection lens 4000 can be used with, or be included within, the optical system 1300 in FIG. 13. In some implementations, the projection lens 4000 can be used with, or be included within, the optical system 1400 in FIG. 14. In some implementations, the projection lens 4000 can be used with, or be included within, the imaging module 1800 in FIGS. 18 and 19A-19B. In some implementations, the projection lens 4000 can be used with, or be included within, the imaging module 2100 in FIG. 21. In some implementations, the projection lens 4000 can be used with, or be included within, the imaging module 2200 in FIG. 22. In some implementations, the projection lens 4000 can be used with, or be included within, the imaging module 2400 in FIG. 24. In some implementations, the projection lens 4000 can be used with, or be included within, the optical system 2500 in FIG. 25. In some implementations, the projection lens 4000 can be used with, or be included within, the optical system 2600 in FIG. 26. In some implementations, the projection lens 4000 can be used with the reflective component 2700 in FIG. 27. In some implementations, the projection lens 4000 can be used with the reflective component 2800 in FIG. 28. In some implementations, the projection lens 4000 can generate the autofocus light 2900 in FIG. 29. In some implementations, the projection lens 4000 can generate the autofocus light 3000 in FIG. 30. In some implementations, the projection lens 4000 can generate the autofocus light 3100 in FIGS. 31A-31C. In some implementations, the projection lens 4000 can be used with the laser engine heat sink 3200 in FIGS. 32A-32C. In some implementations, the projection lens 4000 can be used with the laser engine heat sink 3300 in FIGS. 33A-33C. In some implementations, the projection lens 4000 can be used with the SIM assembly 3400 in FIG. 34. In some implementations, the projection lens 4000 can be used with the RIGS 3500 in FIG. 35. In some implementations, the projection lens 4000 can be used with the RIGS 3600 in FIG. 36. In some implementations, the projection lens 4000 can be used with the piezo phase shifter 3700 in FIG. 37. In some implementations, the projection lens 4000 can be used with the piezo phase shifter 3800 in FIG. 38. In some implementations, the projection lens 4000 can be used with the projection lens 3900 in FIG. 39.

Figure 41:
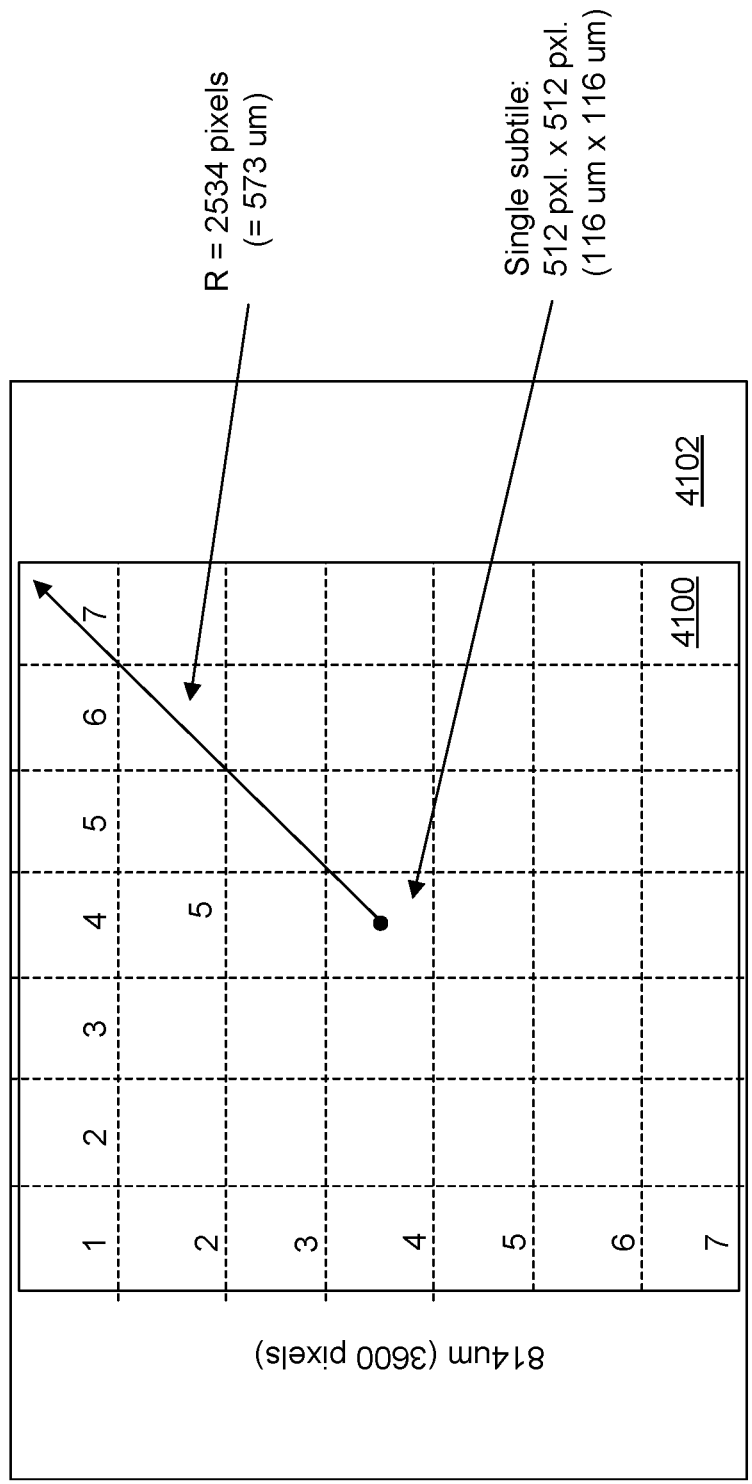
FIG. 41 shows an example of a field of view.

FIG. 41 shows an example of a field of view 4100. The field of view 4100 can be generated by one or more other embodiments described herein. In some implementations, the field of view 4100 can be generated by the system 100 in FIG. 1. In some implementations, the field of view 4100 can be generated by the optical system 200 in FIG. 2. In some implementations, the field of view 4100 can be generated by the optical system 500 in FIG. 5. In some implementations, the field of view 4100 can be generated by the optical system 820 in FIG. 8B. In some implementations, the field of view 4100 can include the reflections 900 and 900' in FIGS. 9A-9B. In some implementations, the field of view 4100 can be generated by the optical system 1100 in FIG. 11. In some implementations, the field of view 4100 can be generated by the optical system 1200 in FIG. 12. In some implementations, the field of view 4100 can be generated by the optical system 1300 in FIG. 13. In some implementations, the field of view 4100 can be generated by the optical system 1400 in FIG. 14. In some implementations, the field of view 4100 can be detected using the imaging module 1800 in FIGS. 18 and 19A-19B. In some implementations, the field of view 4100 can be created using the SIM assembly 2000 in FIG. 20. In some implementations, the field of view 4100 can be created using the imaging module 2100 in FIG. 21. In some implementations, the field of view 4100 can be created using the imaging module 2200 in FIG. 22. In some implementations, the field of view 4100 can be created using the imaging module 2400 in FIG. 24. In some implementations, the field of view 4100 can be created using the optical system 2500 in FIG. 25. In some implementations, the field of view 4100 can be created using the optical system 2600 in FIG. 26. In some implementations, the field of view 4100 can be created using the reflective component 2700 in FIG. 27. In some implementations, the field of view 4100 can be created using the reflective component 2800 in FIG. 28. In some implementations, the field of view 4100 can be created using the SIM assembly 3400 in FIG. 34. In some implementations, the field of view 4100 can be created using the RIGS 3500 in FIG. 35. In some implementations, the field of view 4100 can be created using the RIGS 3600 in FIG. 36. In some implementations, the field of view 4100 can be created using the piezo phase shifter 3700 in FIG. 37. In some implementations, the field of view 4100 can be created using the piezo phase shifter 3800 in FIG. 38. In some implementations, the field of view 4100 can be created using the projection lens 3900 in FIG. 39. In some implementations, the field of view 4100 can be created using the projection lens 4000 in FIG. 40.

The field of view 4100 can be defined relative to a sensor area 4102. In some implementations, the sensor area can include about 5472×3694 pixels. In some implementations, the field of view 4100 includes multiple tiles. For example, the field of view 4100 can include a 7×7 tile region. For example, one tile can include about 512×512 pixels (about 116×116 µm). In some implementations, the field of view 4100 can have a width of about 814 µm (about 3600 pixels). In some implementations, the field of view 4100 can have a height of about 814 µm (about 3600 pixels).

Figure 42:
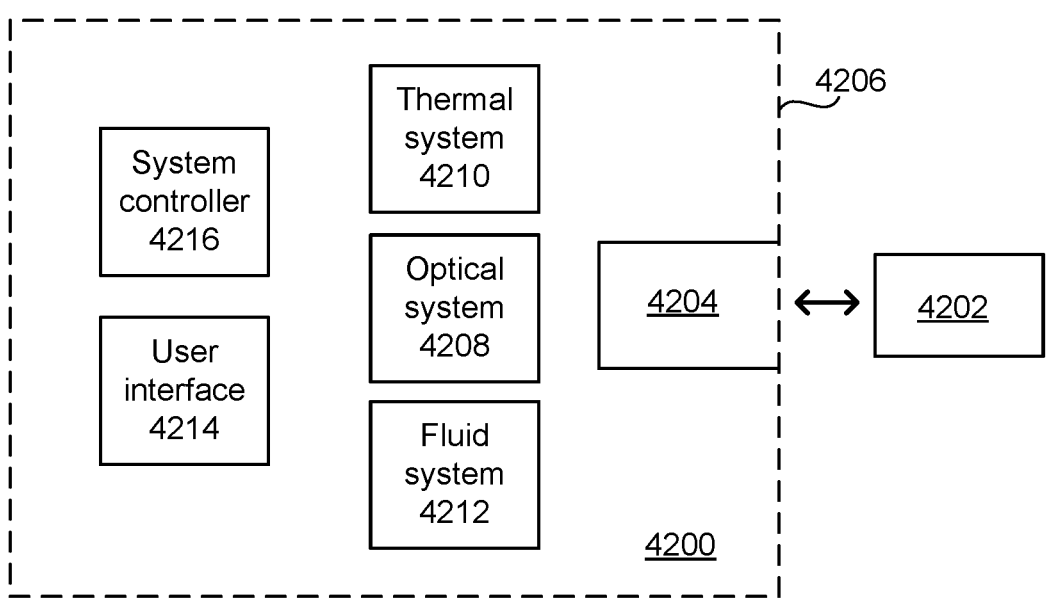
FIG. 42 is a schematic view of an example system that can be used for biological and/or chemical analysis.

FIG. 42 is a schematic view of an example system 4200 that can be used for biological and/or chemical analysis. The system 4200 can operate to obtain any information or data that relates to at least one biological and/or chemical substance. In some implementations, a carrier 4202 supplies material to be analyzed. For example, the carrier 4202 can include a cartridge or any other component holding the material. In some implementations, the system 4200 has a receptacle 4204 to receive the carrier 4202 at least during the analysis. The receptacle 4204 can form an opening in a housing 4206 of the system 4200. For example, some or all components of the system 4200 can be within the housing 4206.

The system 4200 can include an optical system 4208 for biological and/or chemical analysis of the material(s) of the carrier 4202. The optical system 4208 can perform one or more optical operations, including, but not limited to, illumination and/or imaging of the material(s). For example, the optical system 4208 can include any or all systems described elsewhere herein. As another example, the optical system 4208 can perform any or all operations described elsewhere herein.

The system 4200 can include a thermal system 4210 for providing thermal treatment relating to biological and/or chemical analysis. In some implementations, the thermal system 4210 thermally conditions at least part of the material(s) to be analyzed and/or the carrier 4202.

The system 4200 can include a fluid system 4212 for managing one or more fluids relating to biological and/or chemical analysis. In some implementations, the fluid(s) can be provided for the carrier 4202 or its material(s). For example, fluid can be added to and/or removed from the material of the carrier 4202.

The system 4200 includes a user interface 4214 that facilitates input and/or output relating to biological and/or chemical analysis. The user interface can be used to specify one or more parameters for the operation of the system 4200 and/or to output results of biological and/or chemical analysis, to name just a few examples. For example, the user interface 4214 can include one or more display screens (e.g., a touchscreen), a keyboard, and/or a pointing device (e.g., a mouse or a trackpad).

The system 4200 can include a system controller 4216 that can control one or more aspects of the system 4200 for performing biological and/or chemical analysis. The system controller 4216 can control the receptacle 4204, the optical system 4208, the thermal system 4210, the fluid system 4212, and/or the user interface 4214. The system controller 4216 can include at least one processor and at least one storage medium (e.g., a memory) with executable instructions for the processor.

Figure 43:
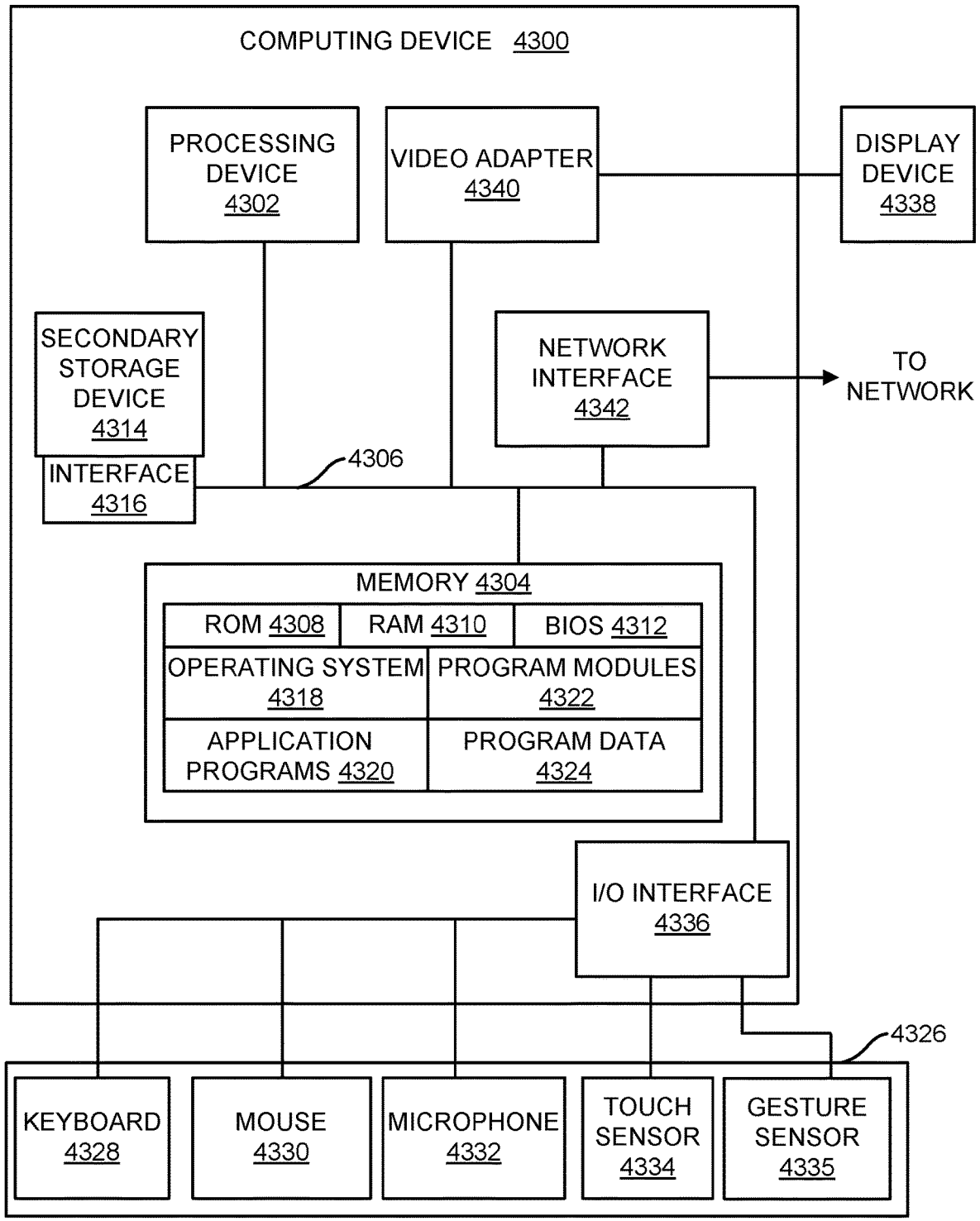
FIG. 43 illustrates an example architecture of a computing device that can be used to implement aspects of the present disclosure.

FIG. 43 illustrates an example architecture of a computing device 4300 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 43 can be used to execute the operating system, application programs, and/or software modules (including the software engines) described herein.

The computing device 4300 includes, in some embodiments, at least one processing device 4302 (e.g., a processor), such as a central processing unit (CPU). A variety of processing devices are available from a variety of manufacturers, for example, Intel or Advanced Micro Devices. In this example, the computing device 4300 also includes a system memory 4304, and a system bus 4306 that couples various system components including the system memory 4304 to the processing device 4302. The system bus 4306 is one of any number of types of bus structures that can be used, including, but not limited to, a memory bus, or memory controller; a peripheral bus; and a local bus using any of a variety of bus architectures.

Examples of computing devices that can be implemented using the computing device 4300 include a desktop computer, a laptop computer, a tablet computer, a mobile computing device (such as a smart phone, a touchpad mobile digital device, or other mobile devices), or other devices configured to process digital instructions.

The system memory 4304 includes read only memory 4308 and random access memory 4310. A basic input/output system 4312 containing the basic routines that act to transfer information within computing device 4300, such as during start up, can be stored in the read only memory 4308.

The computing device 4300 also includes a secondary storage device 4314 in some embodiments, such as a hard disk drive, for storing digital data. The secondary storage device 4314 is connected to the system bus 4306 by a secondary storage interface 4316. The secondary storage device 4314 and its associated computer readable media provide nonvolatile and non-transitory storage of computer readable instructions (including application programs and program modules), data structures, and other data for the computing device 4300.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 4314 and/or system memory 4304, including an operating system 4318, one or more application programs 4320, other program modules 4322 (such as the software engines described herein), and program data 4324. The computing device 4300 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 4300 through one or more input devices 4326. Examples of input devices 4326 include a keyboard 4328, mouse 4330, microphone 4332 (e.g., for voice and/or other audio input), touch sensor 4334 (such as a touchpad or touch sensitive display), and gesture sensor 4335 (e.g., for gestural input. In some implementations, the input device(s) 4326 provide detection based on presence, proximity, and/or motion. In some implementations, a user may walk into their home, and this may trigger an input into a processing device. For example, the input device(s) 4326 may then facilitate an automated experience for the user. Other embodiments include other input devices 4326. The input devices can be connected to the processing device 4302 through an input/output interface 4336 that is coupled to the system bus 4306. These input devices 4326 can be connected by any number of input/output interfaces, such as a parallel port, serial port, game port, or a universal serial bus. Wireless communication between input devices 4326 and the input/output interface 4336 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 4338, such as a monitor, liquid crystal display device, projector, or touch sensitive display device, is also connected to the system bus 4306 via an interface, such as a video adapter 4340. In addition to the display device 4338, the computing device 4300 can include various other peripheral devices (not shown), such as speakers or a printer.

The computing device 4300 can be connected to one or more networks through a network interface 4342. The network interface 4342 can provide for wired and/or wireless communication. In some implementations, the network interface 4342 can include one or more antennas for transmitting and/or receiving wireless signals. When used in a local area networking environment or a wide area networking environment (such as the Internet), the network interface 4342 can include an Ethernet interface. Other possible embodiments use other communication devices. For example, some embodiments of the computing device 4300 include a modem for communicating across the network.

The computing device 4300 can include at least some form of computer readable media. Computer readable media includes any available media that can be accessed by the computing device 4300. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 4300.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 43 is also an example of programmable electronics, which may include one or more such computing devices, and when multiple computing devices are included, such computing devices can be coupled together with a suitable data communication network so as to collectively perform the various functions, methods, or operations disclosed herein.

The following Examples illustrate some aspects of the present subject matter.

Example 1: A method comprising: directing, using an objective and a first reflective surface, first autofocus light toward a sensor, the first autofocus light reflected from a first surface of a substrate; preventing second autofocus light from reaching the sensor, the second autofocus light reflected from a second surface of the substrate; and directing, using the objective and a second reflective surface, emission light toward the sensor, the emission light originating from a sample at the substrate.

Example 2: The method of Example 1, further comprising directing the first autofocus light toward the second reflective surface, the second reflective surface transparent to the first autofocus light, wherein the first reflective surface is positioned behind the second reflective surface relative to a travel direction of the first autofocus light.

Example 3: The method of Example 2, further comprising directing also the second autofocus light toward the second reflective surface, the second reflective surface transparent to the second autofocus light, wherein the first reflective surface is transparent to the second autofocus light to prevent the second autofocus light from reaching the sensor.

Example 4: The method of Example 1, wherein the first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component.

Example 5: The method of Example 4, wherein orienting the first reflective component comprises steering the first autofocus light on the sensor independently of a position of the emission light on the sensor.

Example 6: The method of Example 1, further comprising: forming, using a lateral displacement prism, left autofocus light and right autofocus light that diverge at a predetermined angle from each other, wherein the first autofocus light comprises first left autofocus light from reflection of the left autofocus light off the first surface of the substrate, wherein the first autofocus light further comprises first right autofocus light from reflection of the right autofocus light off the first surface of the substrate, wherein the second autofocus light comprises second left autofocus light from reflection of the left autofocus light off the second surface of the substrate, and wherein the second autofocus light further comprises second right autofocus light from reflection of the right autofocus light off the second surface of the substrate; wherein directing the first autofocus light toward the sensor comprises directing, using the objective and the first reflective surface, the first left autofocus light and the first right autofocus light toward the sensor; and wherein preventing the second autofocus light from reaching the sensor comprises preventing the second left autofocus light and the second right autofocus light from reaching the sensor.

Example 7: The method of Example 6, wherein the substrate further comprises a third surface, wherein the left autofocus light forms third left autofocus light upon reflection off the third surface, wherein the right autofocus light forms third right autofocus light upon reflection off the third surface, the method further comprising directing, using the objective and the first reflective surface, the third left autofocus light and the third right autofocus light toward the sensor.

Example 8: The method of any of Examples 1 to 7, further comprising adjusting a distance between the objective and the substrate based on the first autofocus light.

Example 9: A system comprising: a substrate to hold a sample for analysis; a sensor; an objective; a first reflective surface to direct first autofocus light to the sensor, the first autofocus light reflected from a first surface of the substrate and conveyed by the objective; a second reflective surface to direct emission light to the sensor, the emission light originating from the sample and conveyed by the objective; and a structure that prevents second autofocus light from reaching the sensor, the second autofocus light reflected from a second surface of the substrate and conveyed by the objective.

Example 10: The system of Example 9, wherein the first reflective surface is positioned behind the second reflective surface relative to a travel direction of the first autofocus light, and wherein the second reflective surface is transparent to the first autofocus light.

Example 11: The system of Example 10, wherein the first reflective surface is positioned on a first reflective component, wherein the second reflective surface is positioned on a second reflective component, and wherein the first reflective component is separate from the second reflective component.

Example 12: The system of Example 10, wherein the second reflective surface is positioned on a front surface of a reflective component relative to the travel direction of the first autofocus light, wherein the first reflective surface covers a first portion of a rear surface of the reflective component relative to the travel direction of the first autofocus light, and wherein the structure covers a second portion of the rear surface of the reflective component.

Example 13: The system of any of Examples 9 to 12, further comprising a lateral displacement prism, the lateral displacement prism forming left autofocus light and right autofocus light that diverge at a predetermined angle from each other, wherein the first autofocus light comprises first left autofocus light from reflection of the left autofocus light off the first surface of the substrate, wherein the first autofocus light further comprises first right autofocus light from reflection of the right autofocus light off the first surface of the substrate, wherein the second autofocus light comprises second left autofocus light from reflection of the left autofocus light off the second surface of the substrate, and wherein the second autofocus light further comprises second right autofocus light from reflection of the right autofocus light off the second surface of the substrate.

Example 14: The system of Example 13, wherein the lateral displacement prism includes exit surfaces having a non-zero angle relative to each other.

Example 15: The system of Example 13, wherein the lateral displacement prism comprises: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface.

Example 16: The system of Example 15, wherein: the first surface has boundaries with the third surface, the fourth surface, and the fifth surface; and the second surface has boundaries with the third surface, the fourth surface, and the fifth surface.

Example 17: The system of any of Examples 15 to 16, wherein the third surface is an entry surface, wherein the fourth surface is an exit surface for the left autofocus light, and wherein the fifth surface is an exit surface for the right autofocus light.

Example 18: The system of Example 13, wherein the lateral displacement prism comprises: a first prism having a first wedge profile, the first wedge profile including a first side forming a non-zero angle with regard to a first exit side; a second prism having a second wedge profile, the second wedge profile including a second side forming a non-zero angle with regard to a second exit side; and a third prism having a parallelogram profile, the parallelogram profile including a third side parallel to a fourth side, and a fifth side parallel to a sixth side, the third side of the parallelogram profile being part of an entry surface of the lateral displacement prism; wherein each of the first side of the first prism and the second side of the second prism faces toward the fourth side of the third prism.

Example 19: The system of any of Examples 9 to 18, configured for analysis of nucleic material at the substrate.

Example 20: A method comprising: forming left autofocus light and right autofocus light that diverge at a predetermined angle from each other; directing the left autofocus light and the right autofocus light through an objective toward a first surface of a substrate; and after reflection off the first surface, directing at least a first part of the left autofocus light and at least a first part of the right autofocus light toward a sensor, wherein a predefined separation between the first part of the left autofocus light and the first part of the right autofocus light at the sensor indicates that the substrate is in focus of the objective.

Example 21: The method of Example 20, wherein the substrate further includes a second surface, wherein the reflection of the left autofocus light off the first surface forms first left autofocus light, wherein a reflection of the left autofocus light off the second surface forms second left autofocus light, wherein at the sensor the first part of the left autofocus light comprises the first left autofocus light and the second left autofocus light, wherein the reflection of the right autofocus light off the first surface forms first right autofocus light, wherein a reflection of the right autofocus light off the second surface forms second right autofocus light, wherein at the sensor the first part of the right autofocus light comprises the first right autofocus light and the second right autofocus light.

Example 22: The method of Example 21, wherein a first predefined separation between the first left autofocus light and the first right autofocus light at the sensor indicates that the first surface of the substrate is in focus of the objective.

Example 23: The method of Example 22, wherein a second predefined separation between the second left autofocus light and the second right autofocus light at the sensor indicates that the second surface of the substrate is in focus of the objective.

Example 24: The method of Example 20, wherein directing the first part of the left autofocus light and the first part of the right autofocus light toward the sensor comprises directing, using a first reflective surface, the first part of the left autofocus light and the first part of the right autofocus light toward the sensor.

Example 25: The method of Example 24, further comprising directing, using the objective and a second reflective surface, emission light toward the sensor, the emission light originating from a sample at the substrate.

Example 26: The method of Example 25, further comprising directing the first part of the left autofocus light and the first part of the right autofocus light toward the second reflective surface, the second reflective surface transparent to the first part of the left autofocus light and the first part of the right autofocus light, wherein the first reflective surface is positioned behind the second reflective surface relative to a travel direction of the first part of the left autofocus light and the first part of the right autofocus light.

Example 27: The method of Example 26, wherein the substrate further comprises a second surface, wherein a second part of the left autofocus light is formed upon reflection of the left autofocus light off the second surface, and wherein a second part of the right autofocus light is formed upon reflection of the right autofocus light off the second surface, the method further comprising directing the second part of the left autofocus light and the second part of the right autofocus light toward the second reflective surface, the second reflective surface also transparent to the second part of the left autofocus light and the second part of the right autofocus light, wherein the first reflective surface is transparent to the second part of the left autofocus light and the second part of the right autofocus light to prevent the second part of the left autofocus light and the second part of the right autofocus light from reaching the sensor.

Example 28: The method of Example 25, wherein the first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component.

Example 29: The method of Example 28, wherein orienting the first reflective component causes steering of the first part of the left autofocus light and the first part of the right autofocus light on the sensor independently of a position of the emission light on the sensor.

Example 30: The method of any of Examples 20 to 29, further comprising adjusting a distance between the objective and the substrate based on the first part of the left autofocus light and the first part of the right autofocus light.

Example 31: A system comprising: a beam splitter to form left autofocus light and right autofocus light that diverge at a predetermined angle from each other; an objective to convey the left autofocus light and the right autofocus light toward a first surface of a substrate; and a sensor to receive at least a first part of the left autofocus light and at least a first part of the right autofocus light, after reflection off the first surface, wherein a predefined separation between the first part of the left autofocus light and the first part of the right autofocus light at the sensor indicates that the substrate is in focus of the objective.

Example 32: The system of Example 31, wherein the beam splitter is part of a lateral displacement prism.

Example 33: The system of Example 32, wherein the lateral displacement prism includes exit surfaces having a non-zero angle relative to each other.

Example 34: The system of Example 32, wherein the lateral displacement prism comprises: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface.

Example 35: The system of Example 34, wherein: the first surface has boundaries with the third surface, the fourth surface, and the fifth surface; and the second surface has boundaries with the third surface, the fourth surface, and the fifth surface.

Example 36: The system of any of Examples 34 to 35, wherein the third surface is an entry surface, wherein the fourth surface is an exit surface for the left autofocus light, and wherein the fifth surface is an exit surface for the right autofocus light.

Example 37: The system of Example 32, wherein the lateral displacement prism comprises: a first prism having a first wedge profile, the first wedge profile including a first side forming a non-zero angle with regard to a first exit side; a second prism having a second wedge profile, the second wedge profile including a second side forming a non-zero angle with regard to a second exit side; and a third prism having a parallelogram profile, the parallelogram profile including a third side parallel to a fourth side, and a fifth side parallel to a sixth side, the third side of the parallelogram profile being part of an entry surface of the lateral displacement prism; wherein each of the first side of the first prism and the second side of the second prism faces toward the fourth side of the third prism.

Example 38: The system of Example 31, wherein the beam splitter comprises: a first reflective surface at which initial autofocus light is incident; a partially reflective layer at which the initial autofocus light is incident after being reflected at the first reflective surface, the partially reflective layer forming the left autofocus light and the right autofocus light; and a second reflective surface at which one of the left autofocus light or the right autofocus light is incident after being formed at the partially reflective layer.

Example 39: The system of Example 31, further comprising a first reflective surface to direct the first part of the left autofocus light and the first part of the right autofocus light to the sensor.

Example 40: The system of Example 39, further comprising a second reflective surface to direct emission light to the sensor, the emission light originating from a sample at the substrate and conveyed by the objective.

Example 41: The system of Example 40, wherein the substrate further includes a second surface, wherein a second part of the left autofocus light is formed upon reflection of the left autofocus light off the second surface of the substrate, and wherein a second part of the right autofocus light is formed upon reflection of the right autofocus light off the second surface of the substrate, the system further comprising a structure to prevent the second part of the left autofocus light and the second part of the right autofocus light from reaching the sensor.

Example 42: The system of Example 41, wherein the first reflective surface is positioned behind the second reflective surface relative to a travel direction of the first part of the left autofocus light, the second part of the left autofocus light, the first part of the right autofocus light, and the second part of the right autofocus light, wherein the second reflective surface is transparent to the first part of the left autofocus light, the second part of the left autofocus light, the first part of the right autofocus light, and the second part of the right autofocus light.

Example 43: The system of Example 42, wherein the first reflective surface is positioned on a first reflective component, wherein the second reflective surface is positioned on a second reflective component, and wherein the first reflective component is separate from the second reflective component.

Example 44: The system of Example 42, wherein the second reflective surface is positioned on a front surface of a second reflective component relative to the travel direction of the first part of the left autofocus light, the second part of the left autofocus light, the first part of the right autofocus light, and the second part of the right autofocus light, wherein the first reflective surface covers a first portion of a rear surface of the second reflective component relative to the travel direction of the first part of the left autofocus light, the second part of the left autofocus light, the first part of the right autofocus light, and the second part of the right autofocus light, and wherein the structure covers a second portion of the rear surface of the second reflective component.

Example 45: The system of any of Examples 31 to 44, configured for analysis of nucleic material at the substrate.

Example 46: An autofocus assembly comprising: a prism comprising: a first surface; a second surface that is parallel to the first surface; a third surface; a fourth surface; a fifth surface having a boundary with the fourth surface, wherein each of the fourth surface and the fifth surface forms a common angle with the third surface; and a partially reflective layer extending between the third surface and the boundary of the fourth surface and the fifth surface; and a light source to direct light at the prism, the prism to form first autofocus light and second autofocus light from the light, the first autofocus light and the second autofocus light diverging at a predetermined angle from each other.

Example 47: The autofocus assembly of Example 46, wherein the fourth surface and the fifth surface form exit surfaces having a non-zero angle relative to each other.

Example 48: The autofocus assembly of Example 46, wherein: the first surface has boundaries with the third surface, the fourth surface, and the fifth surface; and the second surface has boundaries with the third surface, the fourth surface, and the fifth surface.

Example 49: The autofocus assembly of any of Examples 46 to 48, wherein the third surface is an entry surface.

Example 50: The autofocus assembly of Example 46, wherein the prism comprises: a first prism having a first wedge profile, the first prism forming the fourth surface, the first wedge profile including a first side forming a non-zero angle with regard to the fourth surface; a second prism having a second wedge profile, the second prism forming the fifth surface, the second wedge profile including a second side forming a non-zero angle with regard to the fifth surface; and a third prism having a parallelogram profile, the parallelogram profile including a third side parallel to a fourth side, the third side defining the third surface, and a fifth side parallel to a sixth side; wherein each of the first side of the first prism and the second side of the second prism faces toward the fourth side of the third prism.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
generating autofocus light using a first light source of an optical system;
directing the autofocus light through an objective of the optical system and thereafter onto a substrate having first and second surfaces, wherein the autofocus light is reflected as first autofocus light at the first surface, and wherein the autofocus light is reflected as second autofocus light at the second surface;
generating excitation light using a second light source of the optical system;
directing the excitation light through the objective and thereafter onto the substrate;
directing, using the objective and a first reflective surface, the first autofocus light toward a sensor;
preventing the second autofocus light from reaching the sensor; and
directing, using the objective and a second reflective surface, emission light toward the sensor, the emission light originating from a sample at the substrate receiving the excitation light.

2. The method of claim 1, further comprising directing the first autofocus light toward the second reflective surface, the second reflective surface transparent to the first autofocus light, wherein the first reflective surface is positioned behind the second reflective surface relative to a travel direction of the first autofocus light.

3. The method of claim 2, further comprising directing also the second autofocus light toward the second reflective surface, the second reflective surface transparent to the second autofocus light, wherein the first reflective surface is transparent to the second autofocus light to prevent the second autofocus light from reaching the sensor.

4. The method of claim 1, wherein the first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component.

5. The method of claim 4, wherein orienting the first reflective component comprises steering the first autofocus light on the sensor independently of a position of the emission light on the sensor.

6. The method of claim 1, further comprising:
forming, using a lateral displacement prism, left autofocus light and right autofocus light that diverge at a predetermined angle from each other, wherein the first autofocus light comprises first left autofocus light from reflection of the left autofocus light off the first surface of the substrate, wherein the first autofocus light further comprises first right autofocus light from reflection of the right autofocus light off the first surface of the substrate, wherein the second autofocus light comprises second left autofocus light from reflection of the left autofocus light off the second surface of the substrate, and wherein the second autofocus light further comprises second right autofocus light from reflection of the right autofocus light off the second surface of the substrate;
wherein directing the first autofocus light toward the sensor comprises directing, using the objective and the first reflective surface, the first left autofocus light and the first right autofocus light toward the sensor; and
wherein preventing the second autofocus light from reaching the sensor comprises preventing the second left autofocus light and the second right autofocus light from reaching the sensor.

7. The method of claim 6, wherein the substrate further comprises a third surface, wherein the left autofocus light forms third left autofocus light upon reflection off the third surface, wherein the right autofocus light forms third right autofocus light upon reflection off the third surface, the method further comprising directing, using the objective and the first reflective surface, the third left autofocus light and the third right autofocus light toward the sensor.

8. The method of claim 1, further comprising adjusting a distance between the objective and the substrate based on the first autofocus light.

9. A method comprising:
forming, using a first light source of an optical system, left autofocus light and right autofocus light that diverge at a predetermined angle from each other;
directing the left autofocus light and the right autofocus light through an objective toward a first surface of a substrate;
after reflection off the first surface, directing at least a first part of the left autofocus light and at least a first part of the right autofocus light toward a sensor, wherein a predefined separation between the first part of the left autofocus light and the first part of the right autofocus light at the sensor indicates that the substrate is in focus of the objective;
generating excitation light using a second light source of the optical system;
directing the excitation light through the objective and thereafter onto the substrate; and
directing, using the objective and a reflective surface, emission light toward the sensor, the emission light originating from a sample at the substrate receiving the excitation light.

10. The method of claim 9, wherein the substrate further includes a second surface, wherein the reflection of the left autofocus light off the first surface forms first left autofocus light, wherein a reflection of the left autofocus light off the second surface forms second left autofocus light, wherein at the sensor the first part of the left autofocus light comprises the first left autofocus light and the second left autofocus light, wherein the reflection of the right autofocus light off the first surface forms first right autofocus light, wherein a reflection of the right autofocus light off the second surface forms second right autofocus light, wherein at the sensor the first part of the right autofocus light comprises the first right autofocus light and the second right autofocus light.

11. The method of claim 10, wherein a first predefined separation between the first left autofocus light and the first right autofocus light at the sensor indicates that the first surface of the substrate is in focus of the objective.

12. The method of claim 11, wherein a second predefined separation between the second left autofocus light and the second right autofocus light at the sensor indicates that the second surface of the substrate is in focus of the objective.

13. The method of claim 9, wherein directing the first part of the left autofocus light and the first part of the right autofocus light toward the sensor comprises directing, using a first reflective surface, the first part of the left autofocus light and the first part of the right autofocus light toward the sensor.

14. The method of claim 9, further comprising directing the first part of the left autofocus light and the first part of the right autofocus light toward the second reflective surface, the second reflective surface transparent to the first part of the left autofocus light and the first part of the right autofocus light, wherein the first reflective surface is positioned behind the second reflective surface relative to a travel direction of the first part of the left autofocus light and the first part of the right autofocus light.

15. The method of claim 14, wherein the substrate further comprises a second surface, wherein a second part of the left autofocus light is formed upon reflection of the left autofocus light off the second surface, and wherein a second part of the right autofocus light is formed upon reflection of the right autofocus light off the second surface, the method further comprising directing the second part of the left autofocus light and the second part of the right autofocus light toward the second reflective surface, the second reflective surface also transparent to the second part of the left autofocus light and the second part of the right autofocus light, wherein the first reflective surface is transparent to the second part of the left autofocus light and the second part of the right autofocus light to prevent the second part of the left autofocus light and the second part of the right autofocus light from reaching the sensor.

16. The method of claim 9, wherein the first reflective surface is positioned on a first reflective component, wherein the second reflective surface is positioned on a second reflective component, and wherein the first reflective component is separate from the second reflective component, the method further comprising orienting the first reflective component independently of an orientation of the second reflective component.

17. The method of claim 16, wherein orienting the first reflective component causes steering of the first part of the left autofocus light and the first part of the right autofocus light on the sensor independently of a position of the emission light on the sensor.

18. The method of claim 9, further comprising adjusting a distance between the objective and the substrate based on the first part of the left autofocus light and the first part of the right autofocus light.

19. A structured illumination microscopy assembly comprising:
   a light source providing first light;
   an anamorphic prism to provide second light by transforming the first light;
   a first grating;
   a second grating that is separate from the first grating; and
   a rotatable mirror configured to assume (i) a first position for redirecting the second light toward the first grating, and (ii) a second position for receiving the second light from the second grating without the rotatable mirror redirecting the second light toward the second grating in the second position.

* * * * *